US006773344B1

(12) United States Patent
Gabai et al.

(10) Patent No.: US 6,773,344 B1
(45) Date of Patent: Aug. 10, 2004

(54) METHODS AND APPARATUS FOR INTEGRATION OF INTERACTIVE TOYS WITH INTERACTIVE TELEVISION AND CELLULAR COMMUNICATION SYSTEMS

(75) Inventors: Oz Gabai, Tel Aviv (IL); Jacob Gabai, Tel Aviv (IL); Nimrod Sanlerman, Ramat Gan (IL); Nathan Weiss, Rehovot (IL)

(73) Assignee: Creator Ltd., Shmuel (IL)

(*) Notice: Subject to any disclaimer, the term of this patent is extended or adjusted under 35 U.S.C. 154(b) by 10 days.

(21) Appl. No.: 09/628,664

(22) Filed: Jul. 28, 2000

Related U.S. Application Data

(60) Provisional application No. 60/216,238, filed on Jul. 5, 2000, provisional application No. 60/209,471, filed on Jun. 5, 2000, provisional application No. 60/207,128, filed on May 25, 2000, provisional application No. 60/200,647, filed on Apr. 28, 2000, provisional application No. 60/192,014, filed on Mar. 24, 2000, and provisional application No. 60/189,914, filed on Mar. 16, 2000.

(51) Int. Cl.[7] .................................................. A63F 13/00
(52) U.S. Cl. ............................................. 463/1; 463/42
(58) Field of Search ........................... 463/1, 6, 30, 40, 463/41, 42; 434/307 R

(56) References Cited

U.S. PATENT DOCUMENTS

| | | | |
|---|---|---|---|
| 4,117,605 A | | 10/1978 | Kurland et al. |
| 4,984,380 A | | 1/1991 | Anderson |
| 5,191,615 A | * | 3/1993 | Aldava et al. ............... 348/485 |
| 5,270,480 A | | 12/1993 | Hikawa |
| 5,636,994 A | | 6/1997 | Tong |

(List continued on next page.)

FOREIGN PATENT DOCUMENTS

| | | | |
|---|---|---|---|
| BE | 1011272 | 7/1999 | |
| DE | 29815874 | 1/1999 | ........... A45C/11/24 |

(List continued on next page.)

Primary Examiner—Teresa Walberg
Assistant Examiner—Aaron L. Enatsky
(74) Attorney, Agent, or Firm—Abelman, Frayne & Schwab

(57) ABSTRACT

Methods and apparatus for integrating interactive toys with interactive television and cellular communication systems are described. Interactive toys have real time conversations with users, preferably employing speech recognition. Interactive toys are preferably connected to at least one interactive toy server which is preferably connected to entertainment, education, sales promotion and other content providers possibly via Internet communication systems. Such a connection may utilize, for example, telephone lines, cellular communication systems, coaxial cables, satellite, DSL or other broadband systems. Interactive toys may be connected, via a wireless link, to a computing device such as a home computer, an Interactive Television set-top box or a base unit which provides Internet connectivity for the toy. Interactive toys may support mobile cellular or satellite communication. These toys are able to provide entertainment, education, sales promotion and other content to a user. Content is provided to users for their toys which enables toys to form relationships with users. Interactive Toys further utilize user knowledge bases to match entertainment, education and sales promotion content to user histories, behaviors and habits. Content is thus personalized to an individual user as well as to a user's environment including the user's location and the time at which the toy is used. Integration of content, such as entertainment, education and sales promotion is provided by merging Interactive Television techniques with Interactive Toys.

1 Claim, 68 Drawing Sheets

U.S. PATENT DOCUMENTS

| | | | |
|---|---|---|---|
| 5,746,602 A | 5/1998 | Kikinis | |
| 5,752,880 A | 5/1998 | Gabai et al. | |
| 5,855,483 A | 1/1999 | Collins et al. | |
| 5,944,533 A | 8/1999 | Wood | |
| 5,977,951 A * | 11/1999 | Danieli et al. | 345/156 |
| 6,012,961 A * | 1/2000 | Sharpe et al. | 446/175 |
| 6,022,273 A | 2/2000 | Gabai et al. | |
| 6,075,195 A | 6/2000 | Gabai et al. | |
| 6,160,540 A * | 12/2000 | Fishkin et al. | 345/156 |
| 6,295,448 B1 * | 9/2001 | Hayes et al. | 455/420 |
| 6,407,779 B1 * | 6/2002 | Herz | 348/734 |

FOREIGN PATENT DOCUMENTS

| | | |
|---|---|---|
| HU | 50648 | 5/1911 |
| WO | WO 97/18871 | 3/1997 |
| WO | WO 98/43456 | 10/1998 |
| WO | WO 98/52667 | 11/1998 |
| WO | WO 98/53567 | 11/1998 |
| WO | WO 99/08762 | 2/1999 |
| WO | WO 99/10065 | 3/1999 |
| WO | WO 99/54015 | 10/1999 |

* cited by examiner

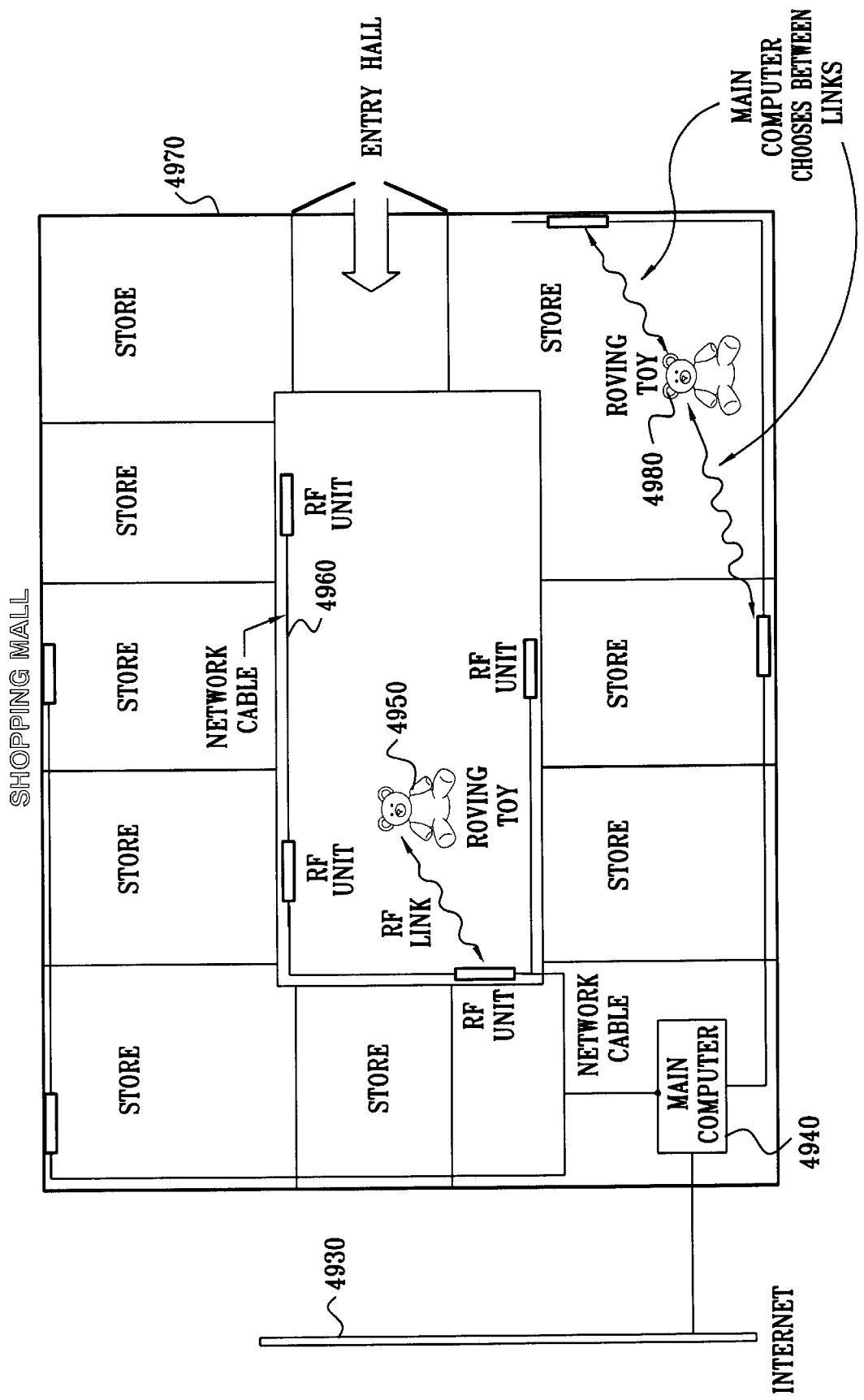

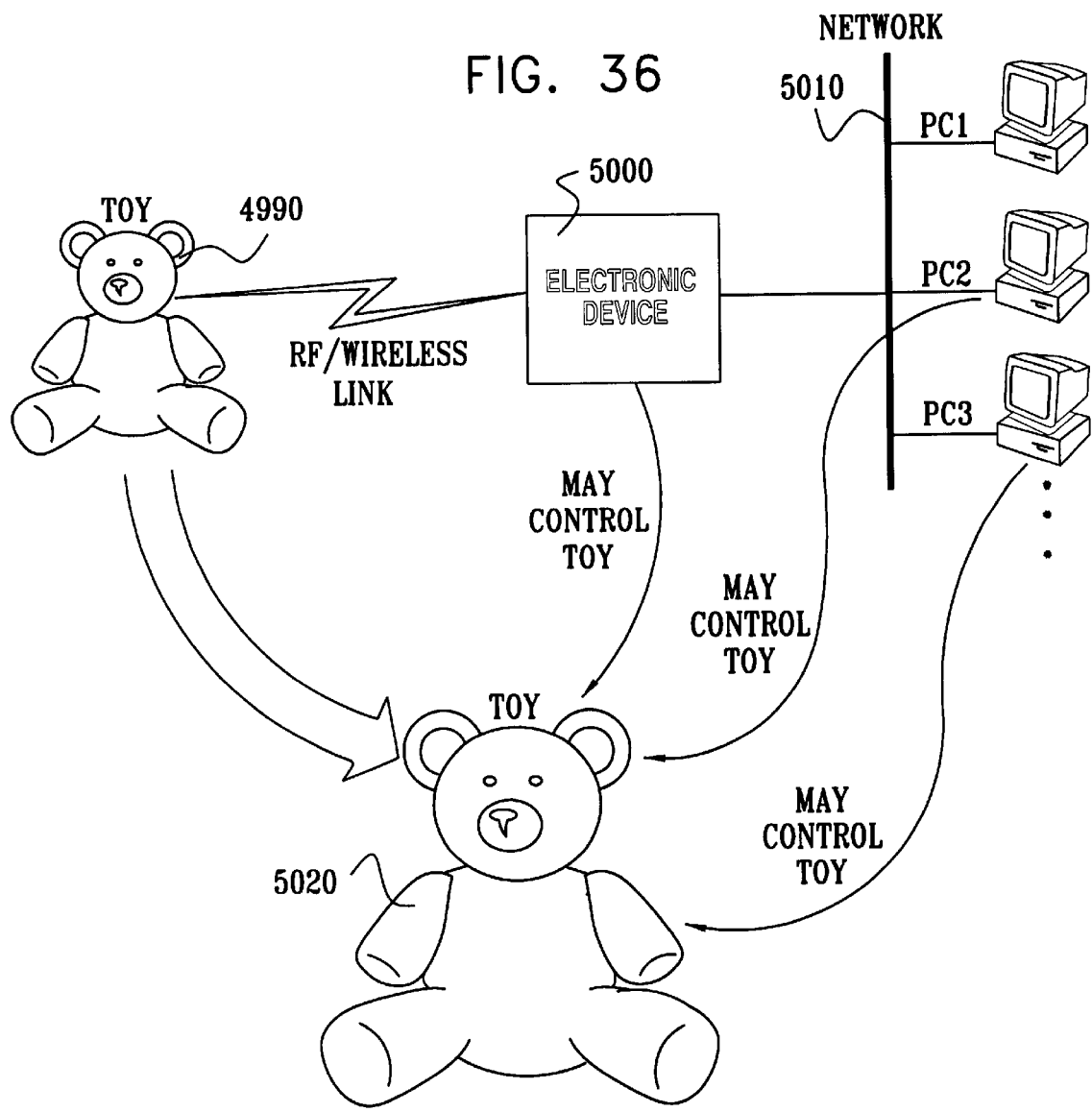

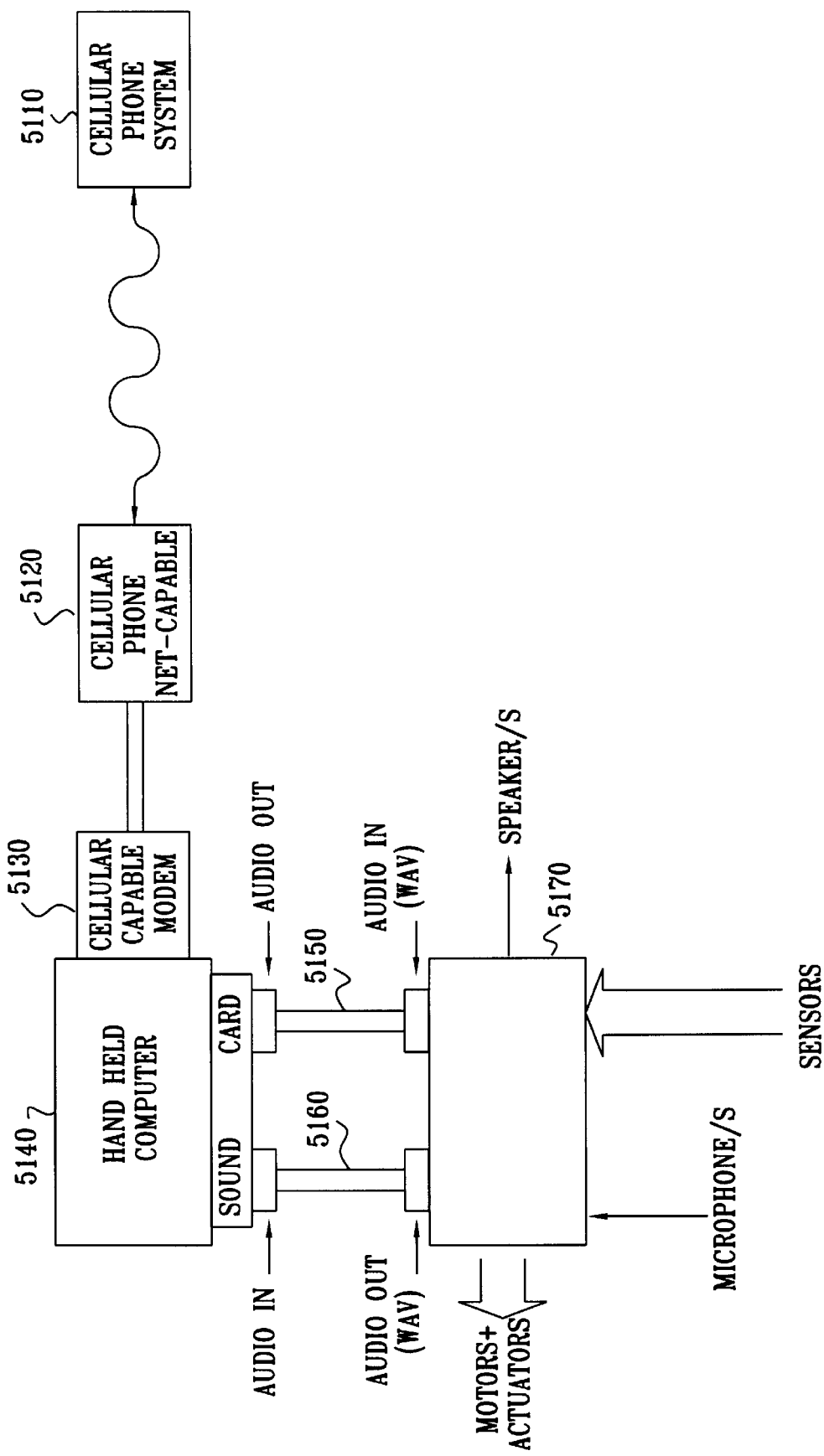

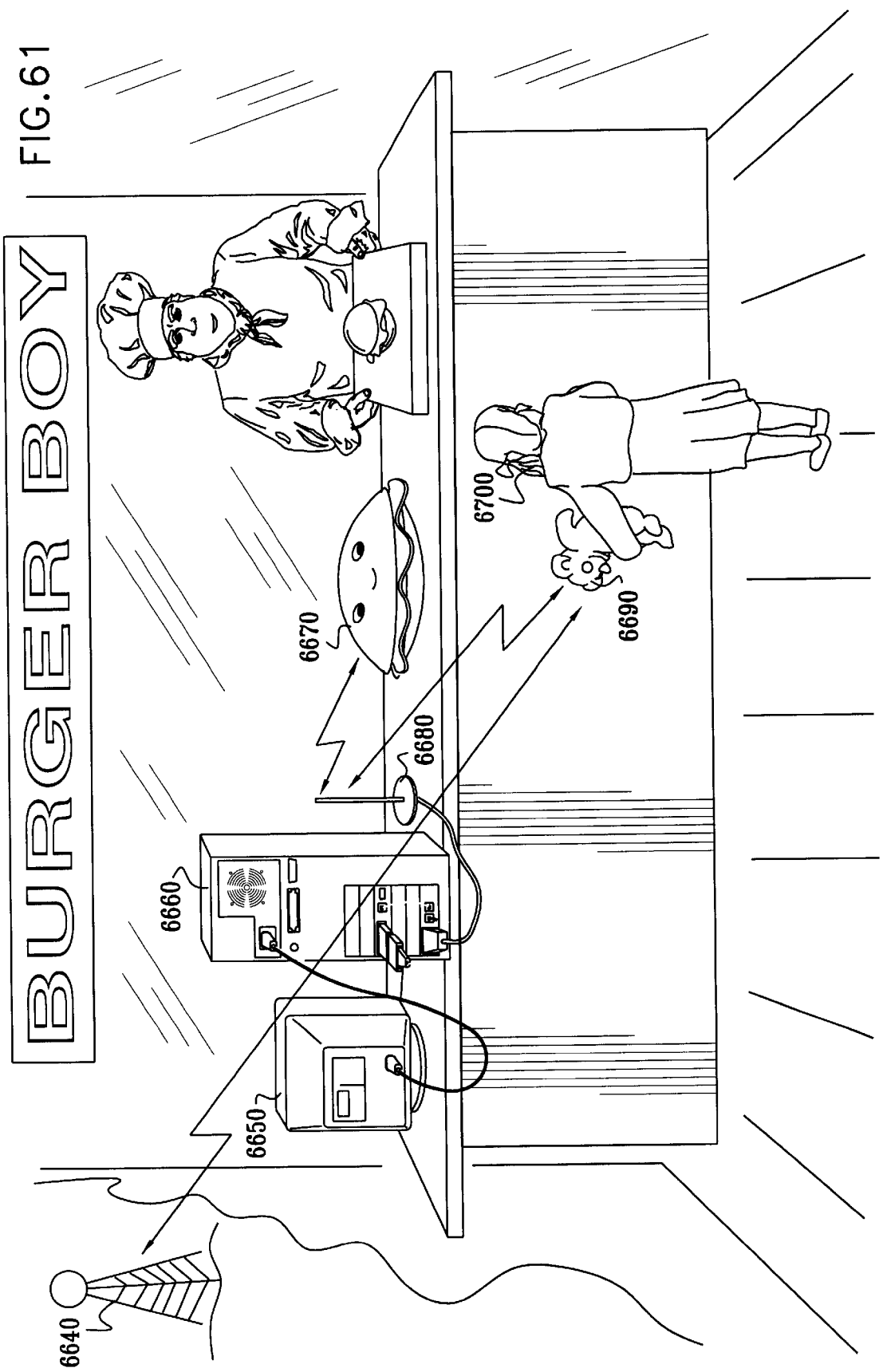

METHODS AND APPARATUS FOR INTEGRATION OF INTERACTIVE TOYS WITH INTERACTIVE TELEVISION AND CELLULAR COMMUNICATION SYSTEMS

This application claims benefit of Provisional Applications No. 60/189,914 filed Mar. 16, 2000 No. 60/192,014 filed Mar. 24, 2000; No. 60/200,647 filed Apr. 28, 2000; No. 60/207,128 filed May 25, 2000; No. 60/209,471 filed Jun. 5, 2000 and No. 60/216,238 filed Jul. 5, 2000.

FIELD OF THE INVENTION

The present invention relates to computerized toys.

BACKGROUND OF THE INVENTION

Interactive toys are described in U.S. Pat. Nos. 5,752,880, 6,022,273 and 6,075,195 to Gabai et al. They are further described in U.S. Pat. No. 5,636,994 to Tong, U.S. Pat. No. 5,746,602 to Kikinis, and U.S. Pat. No. 5,855,483 to Compaq.

They are further described in the following published PCT Patent Applications filed by applicant, entitled Interactive Doll, WO 97/18871; Apparatus Methods for Controlling Household Appliances WO 98/43456; Programmable Assembly Toy WO 98/52667; Controllable Toy Operative with Audio Player, WO 98/53567; Techniques and Apparatus for Entertainment Sites, Amusement Parks and Other Information and/or Entertainment Dispensing Sites, WO 99/08762; Interactive Talking Toy, WO 99/10065; and Interactive Toy WO 99/54015.

The disclosure of all publications accessible to the public, mentioned in the specification, and of the publications cited therein, are hereby incorporated by reference.

REFERENCE TO CO-PENDING APPLICATIONS

Interactive toys are described in U.S. Patent applications Ser. Nos. 08/975,347, 09/061,481, 09/081,889, 09/062,499, and 09/081,255.

They are also described in U.S. Patent Application No. 60/208390 entitled "Networked interactive toy apparatus operative to promote sales". They are also described in U.S. provisional applications entitled "Cell-phone toy" No. 60/189914, "Secure systems for interactive toys" No. 60/189,915, and "A system and method for the promotion of shopping" No. 60/189,916, "User manual for interactive development environment (IDE) for living object technology" No. 60/191,300, and "User club and user shop for toys incorporating living objects technology" No. 60/190,874, and four U.S. provisional applications entitled: "A system method and service for the promotion of entertainment and other media and selling associated products, through interactive toys" No. 60/192,014 and "Networked interactive toys ("living objects") as a novel entertainment medium" No. 60/192,013.

They are further described in U.S. provisional applications entitled "Language teaching with toys" No. 60/192,012, and "Corrective toys" No. 60/192,011, and U.S. provisional applications entitled "Customer price selection shopping (reverse auction) with networked interactive toys" No. 60,193,699, "Billing for t-commerce" No. 60/193,702, "Interactive toy as verbal directory inquiry service (yellow pages)" No. 60,193,704, "Auctioning with networked interactive toys" No. 60,193,704; and "Networked interactive toys as a search engine" No. 60,193,697, and U.S. provisional applications entitled "Networked interactive toys providing medical services" No. 60/195,865, "Interactive toy as verbal diary (voice diary)" No. 60/195,862, "One word buy" filed Apr. $7^{th}$, 2000, "Interactive verbal advertising" No. 60/195,861, and "Collectibles" No. 60/195,864.

They are further described in U.S. provisional applications entitled "Storyteller I" No. 60/197,579, and in four other U.S. provisional applications entitled "Credit point system for use with networked interactive toys" No. 60/197,579, "Database for networked interactive toys" No. 60/197,576, "Networked interactive toy as coach and trainer" No. 60/197,578, and "Teaching knowledge with networked interactive toys" No. 60/197,577, and in other U.S. provisional applications "Music via networked interactive toys" No. 60/200,640, "Interactive toy controlled by a Networked Computer Via Interactive Television, Cable Modem, Or Other Method Of Network Connection" No. 60/200,647, "Cloning Networked Interactive Toys" No. 60/200,641, "Gambling via Networked Interactive Toys" No. 60/200,513, and "Storyteller Content III" No. 60/200,508, and four U.S. provisional applications entitled "R & D via Networked Interactive Toys" No. 60/203,244, and "Networked Interactive Toy Upgrades PC" No. 60/203,175.

They are further described in U.S. provisional applications entitled "Networked Interactive Toys as Aides/Aids To The Handicapped" No. 60/203,182 and "Networked Interactive Toy Help User To Sell/Buy" No. 60/203,177, and in U.S. provisional applications entitled "Charities via Networked Interactive Toys" No. 60/204,201, "Pay Content For Items Such As News, Weather, TV, Films and Diet Via Networked Interactive Toys" No. 60/204,200, and in the following U.S. provisional applications, "Storyteller II" No. 197,573, "Web TV" No. 60/200,647 and "Networked Interactive Toy As Tour Guide" No. 60/207,128.

They are further described in U.S. provisional applications entitled "Interactive Toy Presentation May 2000" No. 60/208,105, "Networked Interactive Toy With Video Camera" No. 60/208,391, "Cable-Toy" No. 60/208,392, "Sales Promotion With Interactive Toys" No. 60/208,390, "Integration Of Interactive Toys And Interactive Television Systems" No. 60/209,471, "Interactive Toys Controlled by Networked Computer, via Interactive Television, Cable Modem, or other Networked Connection" No. 60/200,647, "Authoring Tool and Simulator for Networked Interactive Toys" filed on Jun. 18, 2000, and "Enhanced Networked Interactive Doll" No. 60/210,445.

They are further described in U.S. provisional applications entitled "Changeable Form Toy" No. 60/210,44, "Self-recharging toy" filed on Jul. 2, 2000, and "Integrating Home Entertainment and Home Automation Systems with Interactive Toys" sent for filing on Jul. 2, 2000.

They are further described in a U.S. provisional application entitled "Speech Processing Method and Apparatus for Interactive Toys" sent for filing on Jul. 10, 2000.

They are further described in a U.S. provisional application entitled "Gaming with Networked Interactive Toys" sent for filing on Jul. 16, 2000.

They are further described in a U.S. provisional application entitled "Method of Delivery of Customized Toy Content", sent for filing on Jul. 21, 2000.

SUMMARY OF THE INVENTION

An interactive toy system, as described, for example, in U.S. Pat. No. 5,752,880, to Gabai et al., includes a toy with one or many sensors and actuators including a microphone and a speaker, and connected, via a wireless connection to a computer which is usually a Personal Computer which runs programs to control the toy including interactive programs in which the commands sent to the toy by the computer depend partly or wholly on previous communication from the toy to the computer. In systems such as described above, the computer is preferably connected to a computer network such as the Internet and it is thus connected to many other computers including those which many be controlling additional toys.

As a result of the advent of reliable high speed network connections it is no longer necessary for an interactive toy to be controlled by a computer to which it is directly connected, for example, by a wireless link as described in the previous paragraph. Thus, for example, a toy may be connected to a home computer via a wireless link (as above) but the home computer may not provide some or all of the controlling commands for the toy. Some or all of the toy control commands may be provided by one or more additional computers on a computer network such as a local intranet or the Internet. This (i.e. the partial or full control of a toy by a remote computer) may be desirable if, for example, the home computer is not very powerful and/or it is being heavily used by other users and/or if the software for controlling toys is not present on such a local home computer and/or if more powerful software for controlling a toy is available on another computer on the network and/or if access to specific or all software for controlling a toy is commercially controlled and available primarily or entirely via the Internet and/or if a local computer is unavailable as is the case, for example, if a toy uses a cellular phone connection to connect to the Internet and/or for any other reason.

In a case in which one or more network computers control the operation of a toy it is no longer necessary to use a home or other local computer. This allows toy owners who do not have available a personal or other computers to operate interactive toys. Furthermore commercial or other establishments which wish to host users of toys do not need to own nor use computers for this purpose. The current invention describes several ways to accomplish this.

One particular embodiment of this invention is in the incorporation of toys into Interactive Television systems. In the past few years there has been a revolution in the manner in which entertainment, education and commerce is being delivered to homes. This is a result of the merging of two extremely powerful entertainment, education and commercial media namely television (including movies which have been integrated into television systems for several decades) and computer networks such as the Internet. The merging of these two systems has become possible due to the continuously improving bandwidth of communication systems which provide broadband analog and digital links to homes worldwide. On the one hand, Cable Television systems provide television programming to homes worldwide by connecting televisions in homes to coaxial cables or to satellite dishes which then often use extremely broadband links such as fiber optic links to connect to the Cable Service Provider. On the other hand, digital data networks are being installed in people's homes at a very high rate either by cable companies themselves using an upgraded digital infrastructure (for transmitting data on coaxial cables) or by telecommunication companies which use packet switching technologies to provide Internet service to subscribers' homes.

Due to the merging of television and computer networks the distinction between browsing the Internet and watching television programs and/or watching movies or commercials on television is being greatly reduced. Full length digital movies may be downloaded from the Internet as can music with CD quality (currently using MP3 or similar compression schemes), as well as a wide range of e-commerce activities. Computers in subscribers' homes are capable of controlling this content. For example they are capable of pausing, rewinding or fast-forwarding a movie.

There are currently available worldwide a broad range of Interactive Television systems which merge computer and television technologies into an integrated solution. Interactive Television systems such as, for example the system provided by Scientific-Atlanta Inc. as well as by other leading manufacturers of entertainment systems, give viewers a convenient way to interact with programs and advertisements while they continue to watch TV. By clicking a remote control unit during an enhanced program or by use of a cordless keyboard or mouse, a viewer can access program—related information such as weather, news, sports updates, trivia and interactive games. A viewer may also request product samples, product descriptions, coupons and other free offers from advertisers as well as using e-commerce facilities to make purchases online. In some systems (such as a system by Peach Networks) a viewer may use a mouse, keyboard or simply a remote unit to send and receive email and even run any computer application by using programs installed on a server accessible via the interactive television network (which, in fact, connects to the Internet).

Interactive Television systems typically use a device called a set-top box which is connected to a viewer's television set and to the cable provider's network. The network connection is usually via a coaxial cable although there are systems in which telephone lines are used for outgoing data and coaxial cables for incoming data. Satellite communication as well as fiber optic cables are often utilized as part of the infrastructure of these systems and, in the future, individual homes may be provided with connectivity to fiber optic or other extremely high bandwidth communication lines. An Interactive TV set-top box is equipped with a microprocessor or other computer chip which controls both signals from the service provider and signals coming from a viewer and meant to control entertainment content. Incoming signals are typically received via a remote control unit but may also be received by a cordless keyboard and/or mouse. Set-top boxes are typically provided with serial or USB (Universal Serial Bus) interfaces to enable connection of other electronic devices to the set-top box.

A particular embodiment of the current invention describes the integration into this system of yet another powerful entertainment and commercial medium namely the medium of Networked Interactive Toys in which case interactive toys are controlled either totally or partly not by a Personal Computer in a user's home but rather by a computer on a network which is capable of merging the medium of Interactive Television with entertainment, educational and commercial applications of Interactive Toys.

There is thus provided in accordance with a preferred embodiment of the present invention a network-controlled toy system operative in conjunction with a first network including a multiplicity of interconnected electronic devices, the system including at least one toy connected to a first network via at least one of a multiplicity of interconnected electronic devices, thereby to define at least one network-mediated toy-device data link and wherein the individual device is operative to pass on toy behavior control signals operative to at least partly control at least one parameter of the behavior of at least one individual toy from among at least one of the toys without adding any level of detail to the toy behavior control signals.

Further in accordance with a preferred embodiment of the present invention the individual device is operative to pass up to the network user inputs received by the toy and the toy behavior control signals are at least partly dependent on the user inputs received by the toy.

Further in accordance with a preferred embodiment of the present invention at least a portion of the first network includes a computer network.

Additionally in accordance with a preferred embodiment of the present invention at least a portion of the computer network includes the Internet.

Still further in accordance with a preferred embodiment of the present invention at least a portion of the first network includes a telephone network.

Still further in accordance with a preferred embodiment of the present invention at least one of the toys is connected via a wireless data link to a base station and the base station is connected to the first network.

Additionally in accordance with a preferred embodiment of the present invention the base station is operative for data linkage to the first network via a telephone line.

Further in accordance with a preferred embodiment of the present invention at least a portion of the first network includes a cable TV network and the base station is connected to the cable TV network via a cable modem.

Still further in accordance with a preferred embodiment of the present invention the base station is connected to the first network via an interactive television set-top box.

Still further in accordance with a preferred embodiment of the present invention the interactive television set-top box includes an interactive satellite television set-top box.

Additionally in accordance with a preferred embodiment of the present invention there is included an interactive television script, controlling the television screen display and the toy, including providing interaction between the television screen display and the toy.

There is further provided in accordance with another preferred embodiment of the present invention a toy-interactive television system including at least one electronically controlled toy devices and an interactive television network including at least one television display, wherein at least one data communication link is defined between the at least one toy device and the interactive television network.

There is additionally provided in accordance with another preferred embodiment of the present invention a network-controlled toy system including at least one toy connected to a first network via at least one of a multiplicity of interconnected electronic devices, thereby to define at least one network-mediated toy-device data link, wherein the network-mediated toy-device data link comprises a toy-controlling data link operative to at least partly control at least one parameter of the behavior of at least one individual toy from among the toys, wherein the at least one toy is connected to the first network via a public wireless transceiver operative to perform at least one of a transmitting operation and a receiving operation, to and from a public wireless network.

Further in accordance with a preferred embodiment of the present invention the public wireless transceiver comprises a cellular transceiver and the public wireless network comprises a cellular communication network.

Still further in accordance with a preferred embodiment of the present invention the public wireless transceiver is satellite-based and the public wireless network includes a satellite communication network.

Additionally in accordance with a preferred embodiment of the present invention the public wireless transmitter is connected to the first network via a telephone line.

Also in accordance with a preferred embodiment of the present invention the telephone line connects the public wireless transmitter to a network service provider connected to the first network.

Further in accordance with a preferred embodiment of the present invention at least a portion of the first network comprises the Internet and the network service provider comprises an ISP (Internet service provider).

Additionally in accordance with a preferred embodiment of the present invention the first network includes a computer network and the public wireless transceiver is connected via a telephone line and a modem to an individual computer within the computer network.

Further in accordance with a preferred embodiment of the present invention the cellular communication network comprises a cellular telephone network.

Also in accordance with a preferred embodiment of the present invention the individual toy comprises at least one sensor and at least one actuator.

Additionally in accordance with a preferred embodiment of the present invention the least one sensor includes a microphone and the at least one actuator includes a speaker.

Also in accordance with a preferred embodiment of the present invention at least one parameter of the behavior of the individual toy is at least partly controlled locally rather than via the toy-controlling data link, thereby to provide distributed control of the toy.

Further in accordance with a preferred embodiment of the present invention the locally controlled parameter is at least partly controlled by an on-board controller located on board the toy.

Still further in accordance with a preferred embodiment of the present invention the locally controlled parameter is at least partly controlled by a computer with a direct wireless link to the toy, via the direct wireless link.

Still further in accordance with a preferred embodiment of the present invention simple aspects of the behavior of the toy are controlled locally and complex aspects of the behavior of the toy are controlled via the network-mediated toy-controlling data link.

There is thus provided in accordance with another preferred embodiment of the present invention a toy content data receptacle apparatus including toy content, stored in a data receptacle, for a network-controlled toy system including at least one toy connected to a first network including a multiplicity of interconnected electronic devices, thereby to define at least one network-mediated toy-device data link, wherein the network-mediated toy-device connection includes a toy-controlling data link operative to at least partly control at least one parameter of the behavior at least one individual toy from among the at least one toys.

Also in accordance with a preferred embodiment of the present invention the individual toy comprises an interactive toy.

Further in accordance with a preferred embodiment of the present invention the individual toy includes speech recognition capability and a microphone operative to receive speech specimens generated by a user of the toy.

Still further in accordance with a preferred embodiment of the present invention the individual toy has on-board speech recognition capability.

Additionally in accordance with a preferred embodiment of the present invention the individual toy also includes a speech recognition unit located remotely relative to the individual toy, wherein the speech recognition unit provides the speech recognition capability of the individual toy.

Still further in accordance with a preferred embodiment of the present invention the speech recognition unit communicates with the individual toy at least partly through the first network.

Still further in accordance with a preferred embodiment of the present invention at least a portion of the first network comprises an interactive television network.

Further in accordance with a preferred embodiment of the present invention at least one individual toy from among the at least one toys plays a role in interactive television entertainment provided to the user over the interactive television network.

Still further in accordance with a preferred embodiment of the present invention the individual toy performs at least one action coordinated with at least one televised component of the interactive television entertainment.

Still further in accordance with a preferred embodiment of the present invention the coordinated action includes a kinetic action.

Also in accordance with a preferred embodiment of the present invention the action includes generation of a sound.

Further in accordance with a preferred embodiment of the present invention the toy is operative to sense at least one user input and at least one individual television set is connected to the interactive television network and a TV set control signal is generated at least partly based on the sensed user input and the TV set control signal arrives at the individual television set via the interactive television network.

Still further in accordance with a preferred embodiment of the present invention the at least one user input includes a speech input and the toy is operative to perform speech recognition.

Additionally in accordance with a preferred embodiment of the present invention the toy is operative to perform speech recognition at least partly by transmitting the speech input to a remote speech recognition unit via the first network.

Further in accordance with a preferred embodiment of the present invention the individual toy plays a role in interactive television sales promotion provided to the user over the interactive television network.

There is further provided in accordance with another preferred embodiment of the present invention a network-controlled system for controlling mobile toys including at least one toy comprising a wireless receiver connected to a first network via at least one of a multiplicity of electronic devices interconnected via the first network, at least one of the devices including a wireless transmitter having a range of operation and communicating with the at least one wireless receiver when the at least one receiver is within the range of operation, thereby to define at least a portion of at least one network-mediated toy-device data link, wherein each network-mediated toy-device data link defined by an individual transmitter includes a toy-controlling data link operative to at least partly control at least one parameter of the behavior of at least one individual toy from among the at least one toys, when the toy's wireless receiver is within the range of operation of the individual transmitter.

Further in accordance with a preferred embodiment of the present invention the toy-device data link also includes a networked link connecting the transmitter, via the first network, to at least one of the electronic devices, the at least one of device being operative to provide at least one toy behavior control signal to the toy via the network and the transmitter.

Still further in accordance with a preferred embodiment of the present invention at least one of the wireless receivers includes a wireless transceiver and at least one of the wireless transmitters includes a wireless transceiver and at least one of the data links includes a two-way data link.

Additionally in accordance with a preferred embodiment of the present invention at least one of the electronic devices includes a computer.

Further in accordance with a preferred embodiment of the present invention the device providing a toy behavior control signal to the toy includes a computer.

Also in accordance with a preferred embodiment of the present invention the device providing a toy behavior control signal to the toy includes a computer.

Further in accordance with a preferred embodiment of the present invention at least a portion of the first network includes a cellular telephone network and at least one of the transmitters includes a cellular transceiver and at least one of the receivers includes a cellular transceiver.

Still further in accordance with a preferred embodiment of the present invention there is included a database of localized toy content items configured and operative to pass over the toy-device data link, and a toy localizing system operative to monitor the locations of the toys, and a toy content controller operative to select, from the database, localized toy content items to feed over individual toy-device data links to individual toys, depending on the locations of the individual toys as determined by the toy localizing system.

Further in accordance with a preferred embodiment of the present invention at least one of the data communication links comprises a link allowing the television network to feed toy behavior control signals to at least one of the toy devices.

Still further in accordance with a preferred embodiment of the present invention at least one of the data communication links comprises a link allowing the toy device to feed interactive television control signals to the television network.

Still further in accordance with a preferred embodiment of the present invention the toy device is operative to sense at least one user input provided by a user of the toy and at least one of the interactive television control signals is at least partly determined by the at least one user input.

Still further in accordance with a preferred embodiment of the present invention the user input includes a sensed parameter of the user's behavior toward the toy.

Also in accordance with a preferred embodiment of the present invention the toy behavior control signals include at least one signal affecting at least one toy device's behavior toward a user of the toy device.

Also in accordance with a preferred embodiment of the present invention a script is included which includes at least one sequence of events including at least one first event displayed on at least one of the television displays and at least one second event in which at least one of the toy devices participates.

There is additionally provided in accordance with another preferred embodiment of the present invention a toy system controlled by interactive television, the toy system including, at least one electronically controlled toy system each having an electronic toy control input channel, and an interactive television system providing toy control signals to each of the toy systems via each of the electronic control input channels.

There is further provided in accordance with another preferred embodiment of the present invention a toy system for controlling a remotely controlled interactive television system, the toy system including at least one interactive toy system operative to sense at least one user-generated input, the interactive toy system including an interactive television controlling unit operative to remotely control the interactive television system responsive to the at least one user-generated input.

Further in accordance with a preferred embodiment of the present invention a software unit is included for controlling subsequent interactive television content responsive to at least one user-generated input and to current interactive television content.

Further in accordance with a preferred embodiment of the present invention at least one of the toy systems includes an interactive toy system operative to sense at least one user-generated input, the interactive toy system including an interactive television controlling unit operative to remotely control the interactive television system responsive to the at least one user-generated input.

Still further in accordance with a preferred embodiment of the present invention a software unit is included for controlling subsequent interactive television content responsive to the at least one user-generated input and to current interactive television content.

Still further in accordance with a preferred embodiment of the present invention the user-generated input includes at least one of the following groups: a verbal input, a tactile input, an olfactory input, a kinetic input, an audio input, an input comprising an emotional communication, an input comprising a positional communication.

Additionally in accordance with a preferred embodiment of the present invention the interactive toy system includes a speech recognition unit operative to sense at least one user-generated verbal input.

Further in accordance with a preferred embodiment of the present invention at least one of the toy systems is operative, responsive to at least one of the toy control signals, to perform at least one of the following toy operations: emitting a verbal utterance, emitting a non-verbal sound, performing a sequence of at least one body motions, generating at least one visual effect.

Still further in accordance with a preferred embodiment of the present invention at least one of the toy systems includes a video system operative to visually sense at least one visible user-generated input.

Also in accordance with a preferred embodiment of the present invention the toy control signals actuate at least one of the toy systems to present at least one of the following types of content: entertainment content, sales promotion content and functional content such as e-commerce content.

Further in accordance with a preferred embodiment of the present invention the toy and at least one output medium of the interactive television system jointly provide the user with an integrated presentation of content.

There is further provided in accordance with another preferred embodiment of the present invention a toy system including a first plurality of toy-controlling networked electronic devices defining a network and a second plurality of computer-controlled toys roaming between and controlled by individual ones of the first plurality of electronic devices.

Further in accordance with a preferred embodiment of the present invention at least one of the electronic devices includes a computer.

Still further in accordance with a preferred embodiment of the present invention the computer includes a personal computer.

Additionally in accordance with a preferred embodiment of the present invention at least one of the second plurality of toys connects to the network via a cellular transceiver.

Further in accordance with a preferred embodiment of the present invention at least one of the second plurality of toys connects to the network via a cellular telephone transceiver.

Still further in accordance with a preferred embodiment of the present invention at least one of the second plurality of toys connects to the network via an individual one of the following group of network connections: telephone, telephone modem, cable modem and a direct network connection such as a connection based on DSL (Digital Subscriber Line) or Fiber Optic technology.

Further in accordance with a preferred embodiment of the present invention each toy has an identity recognizable by an electronic device controlling it and wherein at least an individual one of the electronic devices is operative to record, and share with at least one other electronic device, the location and identity of at least one toy controlled by that electronic device.

Additionally in accordance with a preferred embodiment of the present invention at least one electronic device is included which is operative to select toy content to deliver to at least one of the toys, at least partly in accordance with the location of the toy.

Also in accordance with a preferred embodiment of the present invention the toy content includes a sequence of at least one prompts to a user of an individual toy to travel between a sequence of locations wherein each location is serviced by individual ones from among the electronic devices which is operative to deliver an individual one of the sequence of prompts.

Further in accordance with a preferred embodiment of the present invention at least one of the electronic devices is operative to prompt a user of a toy to travel to a particular location and wherein an electronic device serving the particular location is operative to reward the user for traveling to the particular location.

Still further in accordance with a preferred embodiment of the present invention an interactive television network is operative to store branching television content, comprising a plurality of television content branches, and wherein the interactive television network is operative to select an individual one of the branches for display on an individual television display watched by an individual user depending on at least one characteristic of the user, learned by at least one of the toy devices and conveyed to the network.

Still further in accordance with a preferred embodiment of the present invention the user's characteristic includes at least one aspect of the user's behavior toward the toy.

Also in accordance with a preferred embodiment of the present invention the characteristic includes at least one aspect of the user's behavior toward the toy while watching the television content.

Further in accordance with a preferred embodiment of the present invention at least a portion of the data receptacle resides on-board the at least one toy.

Still further in accordance with a preferred embodiment of the present invention at least a portion of the data receptacle resides on-board one of the electronic devices.

Additionally in accordance with a preferred embodiment of the present invention the toy content comprises at least one of the following group of toy content types: games, scripts, sales promotion content, educational content, informational content and user profile-dependent content.

Further in accordance with a preferred embodiment of the present invention a base station is connected to the first network via a direct network link.

Still further in accordance with a preferred embodiment of the present invention the direct network link is based on fiber optic technology.

Still further in accordance with a preferred embodiment of the present invention the direct network link is based on DSL (Digital Subscriber Line) technology.

Still further in accordance with a preferred embodiment of the present invention the direct network connection is connected via a DSL (Digital Subscriber Line).

Still further in accordance with a preferred embodiment of the present invention the direct network connection is connected via Fiber Optic technology.

BRIEF DESCRIPTION OF THE DRAWINGS

The present invention will be understood and appreciated from the following detailed description, taken in conjunction with the drawings and appendices in which:

FIG. 35 illustrates connections of a toy to RF or other wireless transceivers, and to a store computer, and to the Internet, in accordance with a preferred embodiment of the present invention;

FIG. 36 shows how connections of an electronic device with a direct wireless link to a toy constructed and operative in accordance with a preferred embodiment of the present invention;

FIG. 38 shows an example of how a cellular connection can be implemented using a standard toy controller for connecting a toy to a local PC using a toy controller, constructed and operative in accordance with a preferred embodiment of the present invention;

FIG. 61 is a part pictorial and part block diagram representation of an interactive toy and its user in a retail outlet, in accordance with a preferred embodiment of the present invention;

DETAILED DESCRIPTION OF PREFERRED EMBODIMENTS

Figure 1:
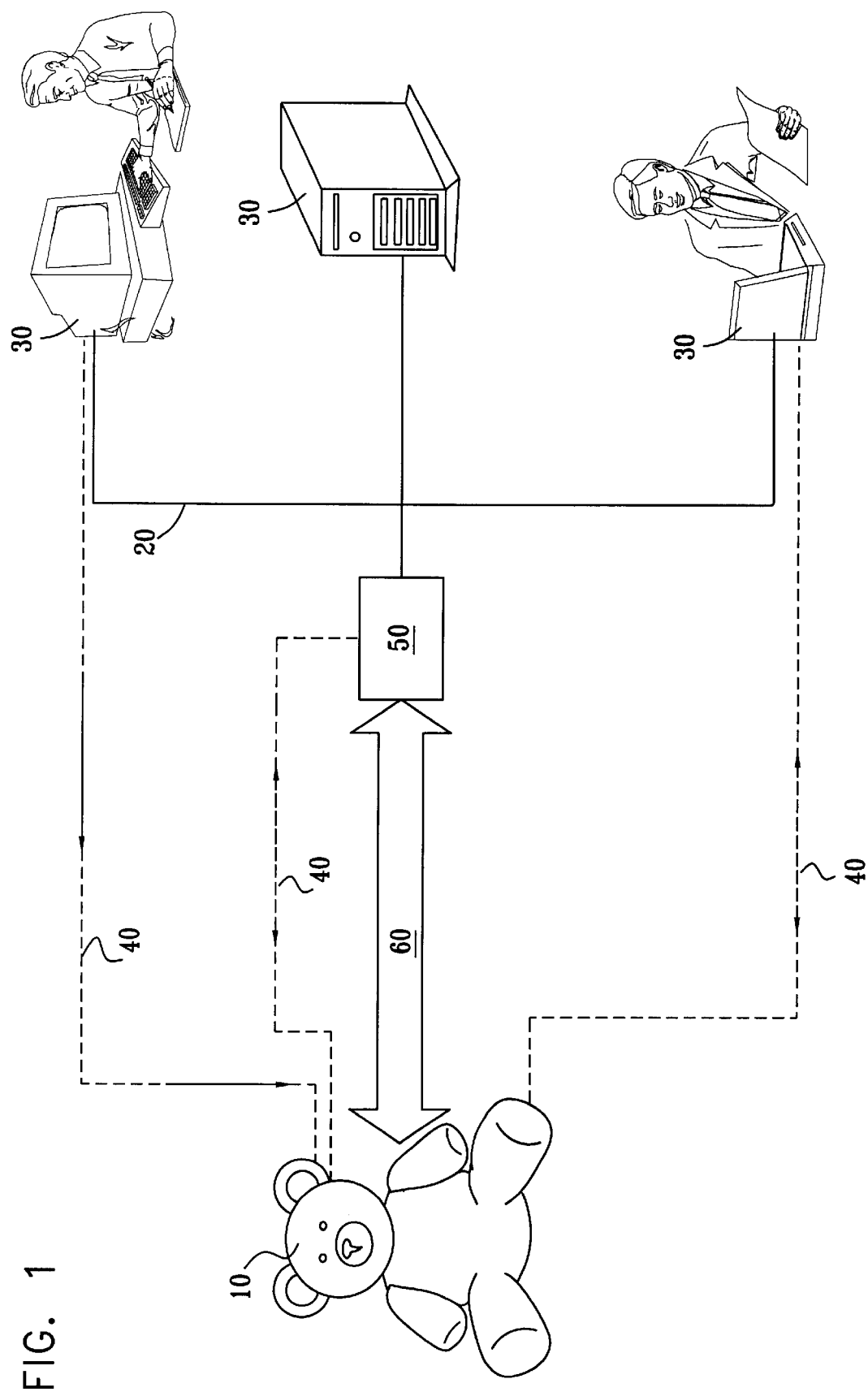
FIG. 1 is a simplified semi-pictorial semi-block diagram of a network-controlled toy system, constructed and operative in accordance with a preferred embodiment of the present invention.

Reference is now made to FIG. 1 which is a simplified diagram of a network-controlled toy system including at least one toys (one toy, 10, in the illustrated example) connected to a first network 20 comprising a multiplicity of interconnected electronic devices 30 (four, in the illustrated example), thereby to define at least one network-mediated toy-device data link (three links 40 in the illustrated example, represented by dotted lines). The network-mediated toy-device data links 40 each comprise a toy-controlling data link operative to at least partly control at least one parameter of the behavior of toy 10.

The network-mediated toy-device data links 40 are all, in the illustrated example, routed through an electronic toy-network connector 50 which, in a preferred embodiment of this invention, is one of the electronic devices interconnected via the network. In another preferred embodiment of this invention the toy-network connector 50 is an electronic device whose main function is to provide a physical data connection between the network and the toy. The connector 50 establishes the physical data connection between the network and the toy (toy network connection 60). This physical data connection is typically at least partly wireless, for example is a connection which partly or completely comprises an RF (radio frequency) link.

The network 20 may comprise a computer network in which some or all of the interconnected electronic devices comprise computers.

Figure 2:
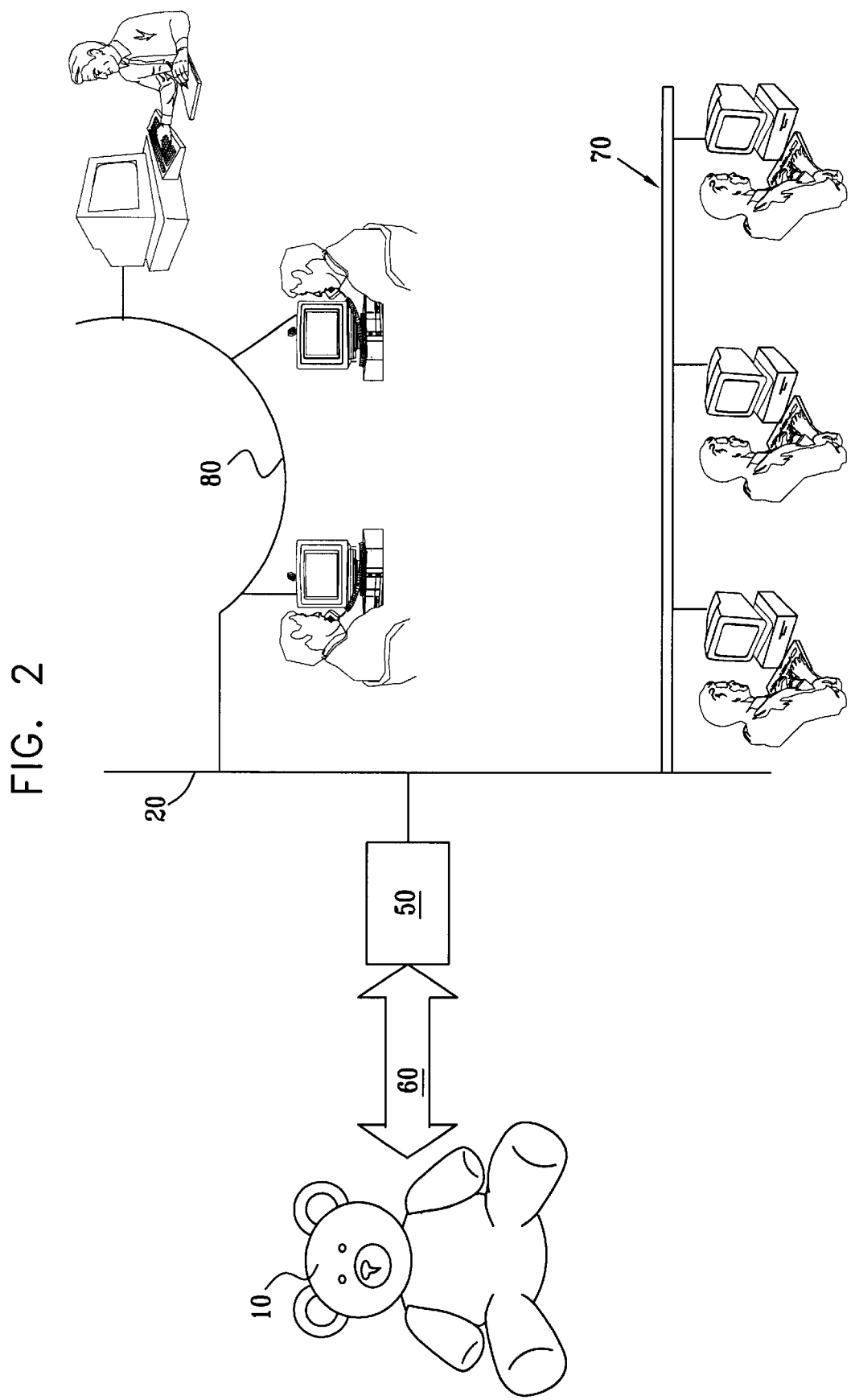
FIG. 2 is a simplified part-pictorial diagram showing a typical implementation of a networked interactive toy system constructed and operative in accordance with a preferred embodiment of the present invention.

FIG. 2 shows one implementation of the toy system of FIG. 1 in which the first network comprises at least first and second portions 70 and 80, the first portion 70 comprising the Internet and the second portion 80 comprising a LAN (local area network).

Figure 3:
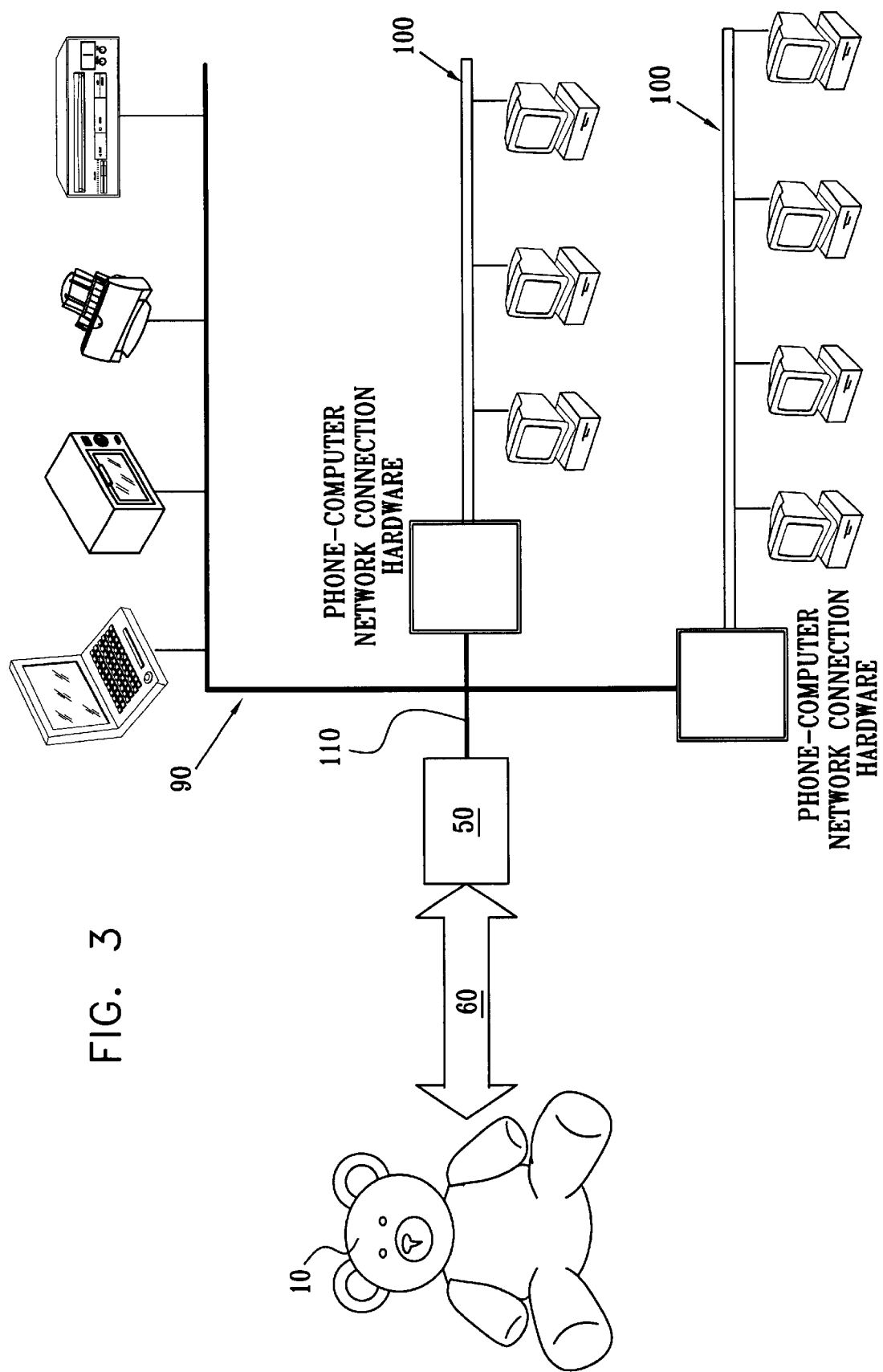
FIG. 3 is another simplified part-pictorial diagram showing another typical implementation of a networked interactive toy system, constructed and operative in accordance with a preferred embodiment of the present invention.
Figure 4:
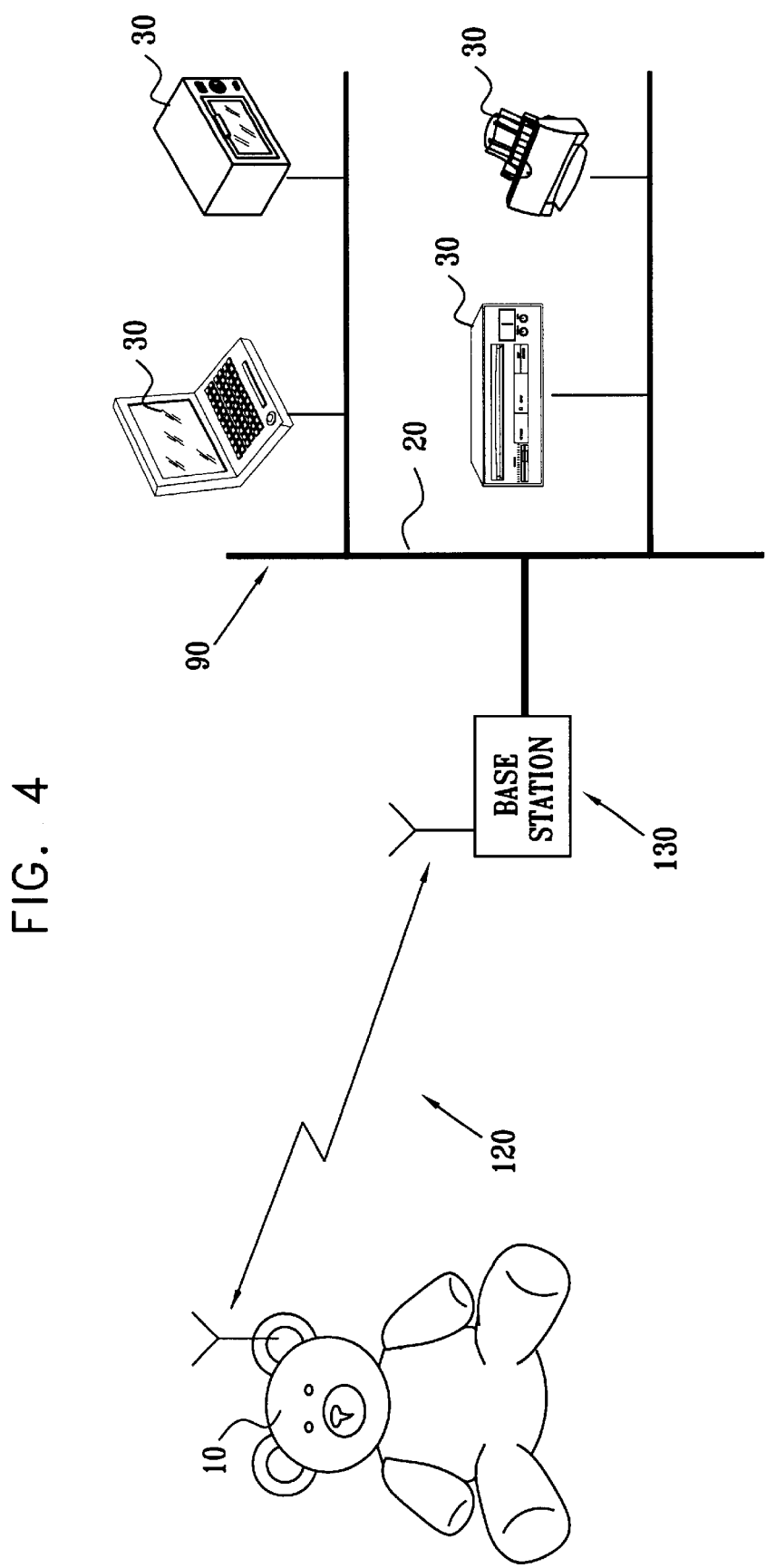
FIG. 4 is a simplified semi-pictorial semi-block diagram of a network-controlled toy system constructed and operative in accordance with a preferred embodiment of the present invention.

FIG. 3 is another simplified part-pictorial diagram showing another typical implementation of a networked interactive toy system, constructed and operative in accordance with a preferred embodiment of the present invention in which the first network comprises a telephone network portion 90, indicated by heavy lines and a computer network portion 100, indicated by double lines, and the electronic toy-network connector 50 connects to the telephone network portion 90 via a telephone connection 110. FIG. 4 is a simplified semi-pictorial semi-block diagram of a network-controlled toy system constructed and operative in accordance with a preferred embodiment of the present invention. A toy 10 is connected via a wireless data link 120 to a base station 130 and the base station is connected to the first network 20.

Figure 5:
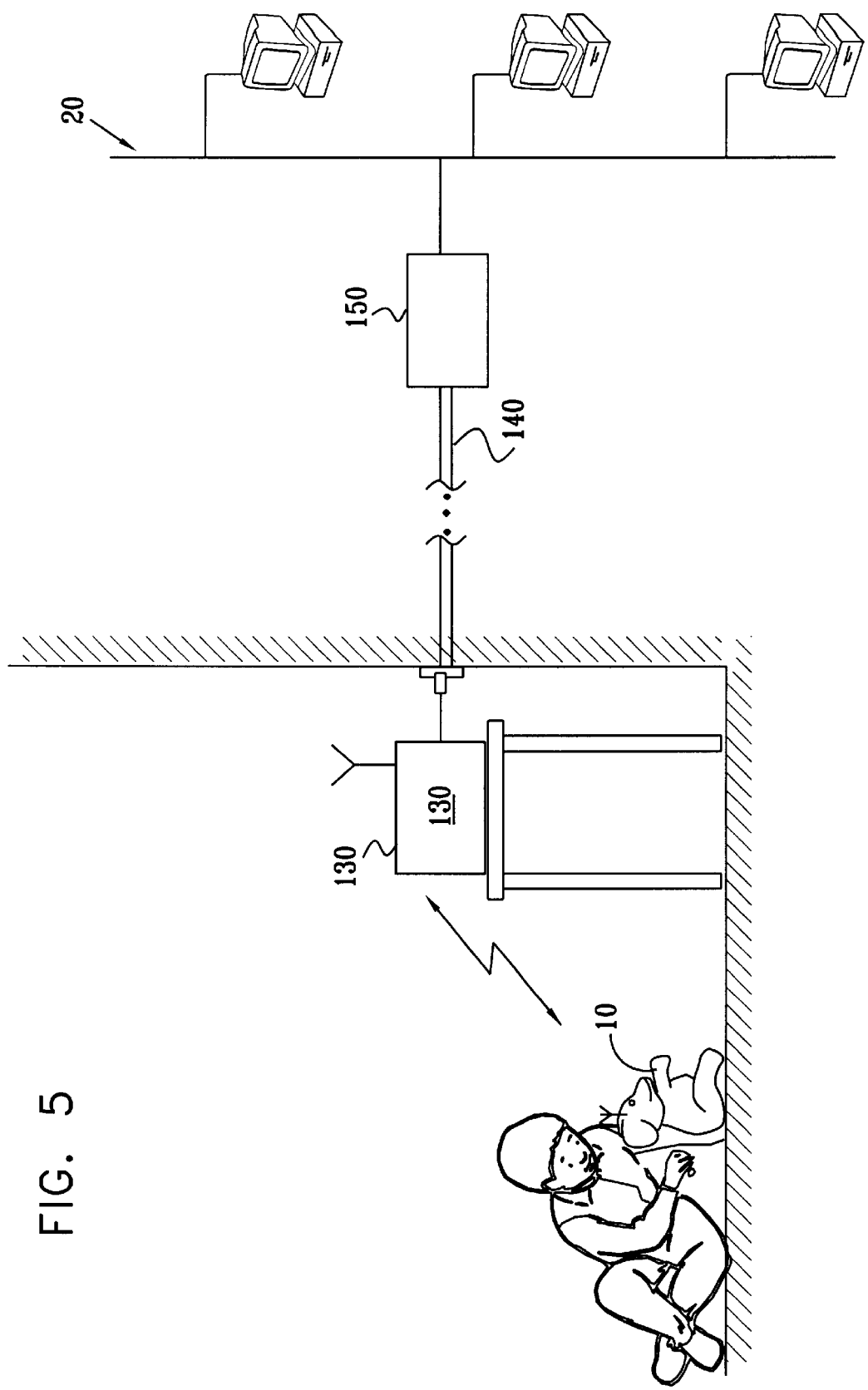
FIG. 5 is a semi-pictorial semi-block diagram illustrating an implementation of a networked interactive toy system, constructed and operative in accordance with a preferred embodiment of the present invention.

FIG. 5 is a semi-pictorial semi-block diagram illustration of a user, such as a child, playing with a toy 10 which has an RF or other wireless link to the base station 130. The base station 130 is operative for continuous or occasional or intermittent data linkage to the first network 20 via a telephone line 140 and (in the illustrated example) an Internet service provider (ISP) 150. The Internet service provider may comprise a conventional ISP or alternatively may comprise a customized toy server operative to provide Internet-mediated toy services including toy control, toy interaction, toy-mediated advertising services, toy related games and other toy services. The toy service provider 150 may or may not additionally provide conventional Internet-mediated services, which may, for example, target parents of child users of the toy services.

Figure 6:
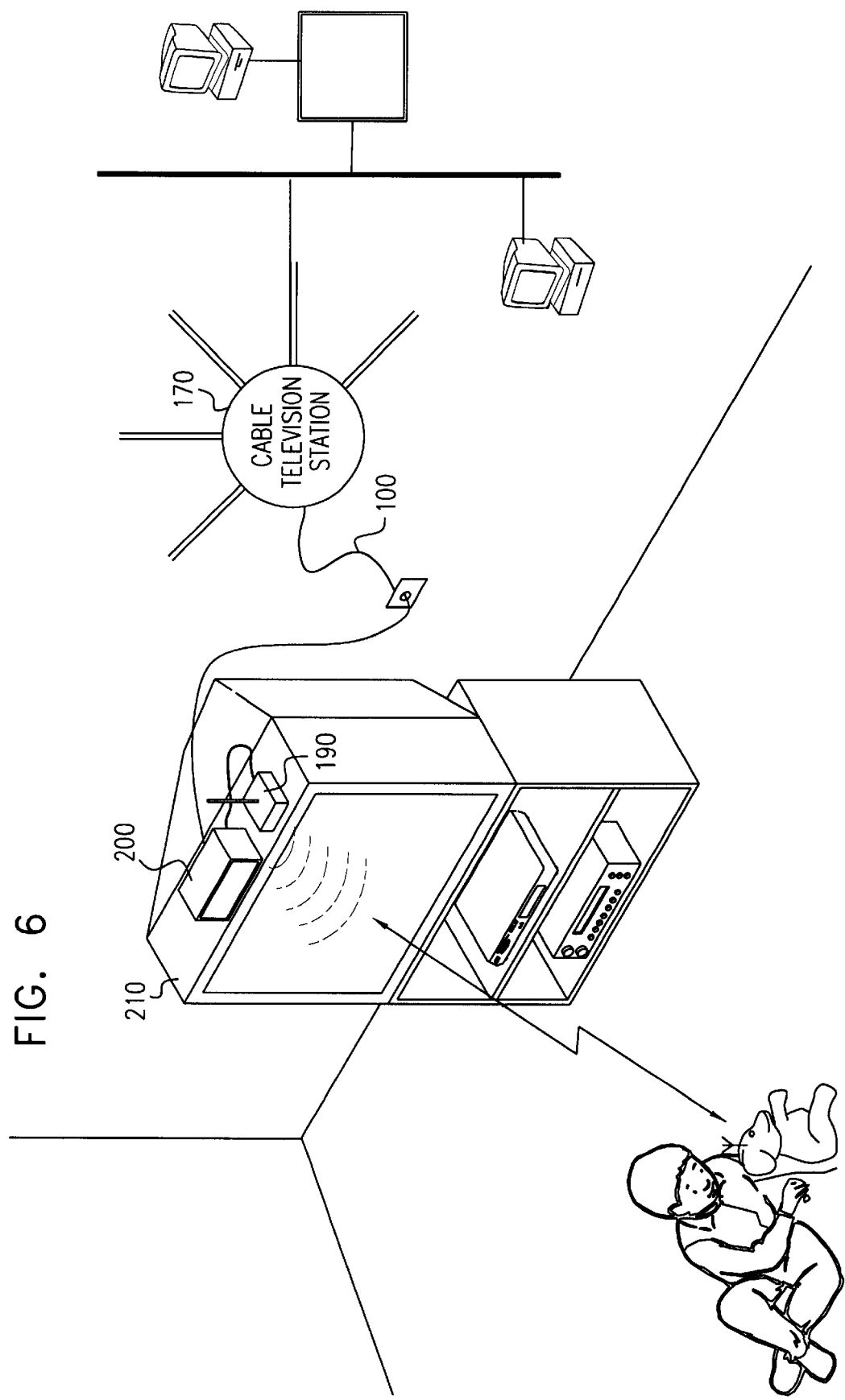
FIG. 6 is a semi-pictorial semi-block diagram illustrating yet another implementation of a networked interactive toy system, constructed and operative in accordance with a preferred embodiment of the present invention.

FIG. 6 is a semi-pictorial semi-block diagram illustrating yet another implementation of a networked interactive toy system, constructed and operative in accordance with a preferred embodiment of the present invention in which the first network comprises, at least in part, a cable TV network 160 having a connection 170 to a computer network 180 such as the Internet. A base station 190 is connected to the cable TV network 160 via an interactive television set-top box 200. The set-top box 200 typically provides, apart from Internet connectivity, also connectivity of a television set 210 to interactive television services.

Figure 7:
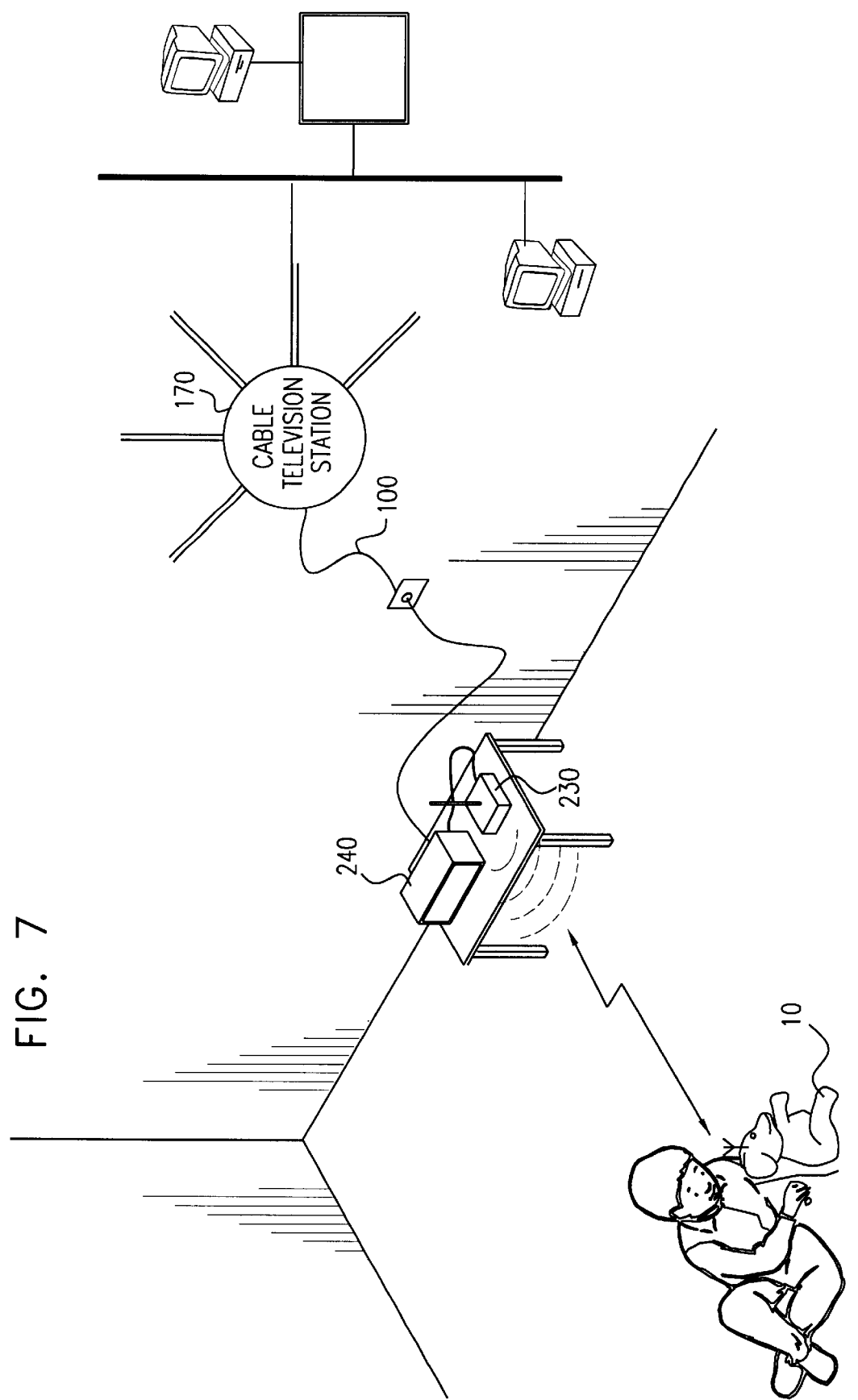
FIG. 7 is a semi-pictorial semi-block diagram illustrating another implementation of a networked interactive toy system, constructed and operative in accordance with a preferred embodiment of the present invention.

FIG. 7 is a semi-pictorial semi-block diagram illustrating another implementation of a networked interactive toy system, constructed and operative in accordance with a preferred embodiment of the present invention in which at least a portion of the first network 20 comprises a cable TV network. A base station 230 is connected to the cable TV network via a cable modem 240.

Figure 8:
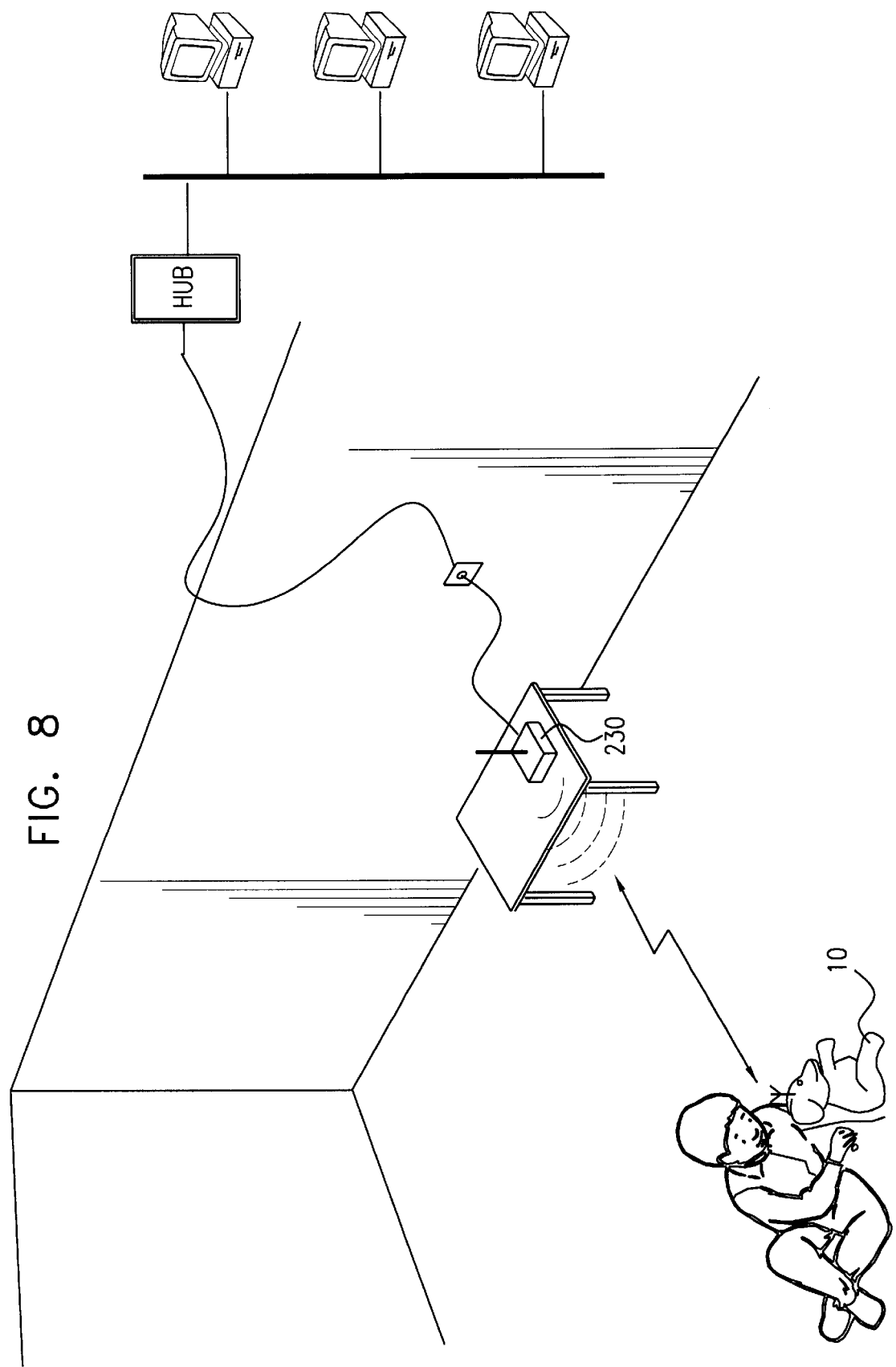
FIG. 8 is a semi-pictorial semi-block diagram illustrating another implementation of a networked interactive toy system, constructed and operative in accordance with a preferred embodiment of the present invention in which the base station is connected to the network by means of a direct network connection such as technology based on DSL (Digital Subscriber Line) or fiber optic technology.

FIG. 8 is a semi-pictorial semi-block diagram illustrating another implementation of a networked interactive toy system, constructed and operative in accordance with a preferred embodiment of the present in which the connection of the base station 230 to the network, rather than comprising a cable portion of a cable TV network as in FIG. 7, instead is implemented based on conventional technology for connecting a computer to a network, such as ADSL, SDSL (Asymmetric or Symmetric Digital Subscriber Line based on twisted pair technology) or fiber optic technology. In the present example the base station 230 provides electronics for implementing an RF link to the toy as well as electronics for providing a link to the DSL, fiber optic or other Internet connection provided.

DSL (Direct Subscriber Line) technology for connecting home and office computers directly to the Internet suitable for the implementation of preferred embodiments of the present invention is described in the following references:
1. DSL Bible by Mark Gray (IDG Books Worldwide—July 2000)
2. DSL: Simulation Techniques and Standards Development for Digital Subscriber Lines by Walter Y. Chen (Macmillan Technical Publishing—January 1998)

A full range of products which implement the transmission of digital data through fiber optic lines is provided by Lucent Technologies 600 Mountain Avenue Murray Hill, N.J. U.S.A.

Figure 9:
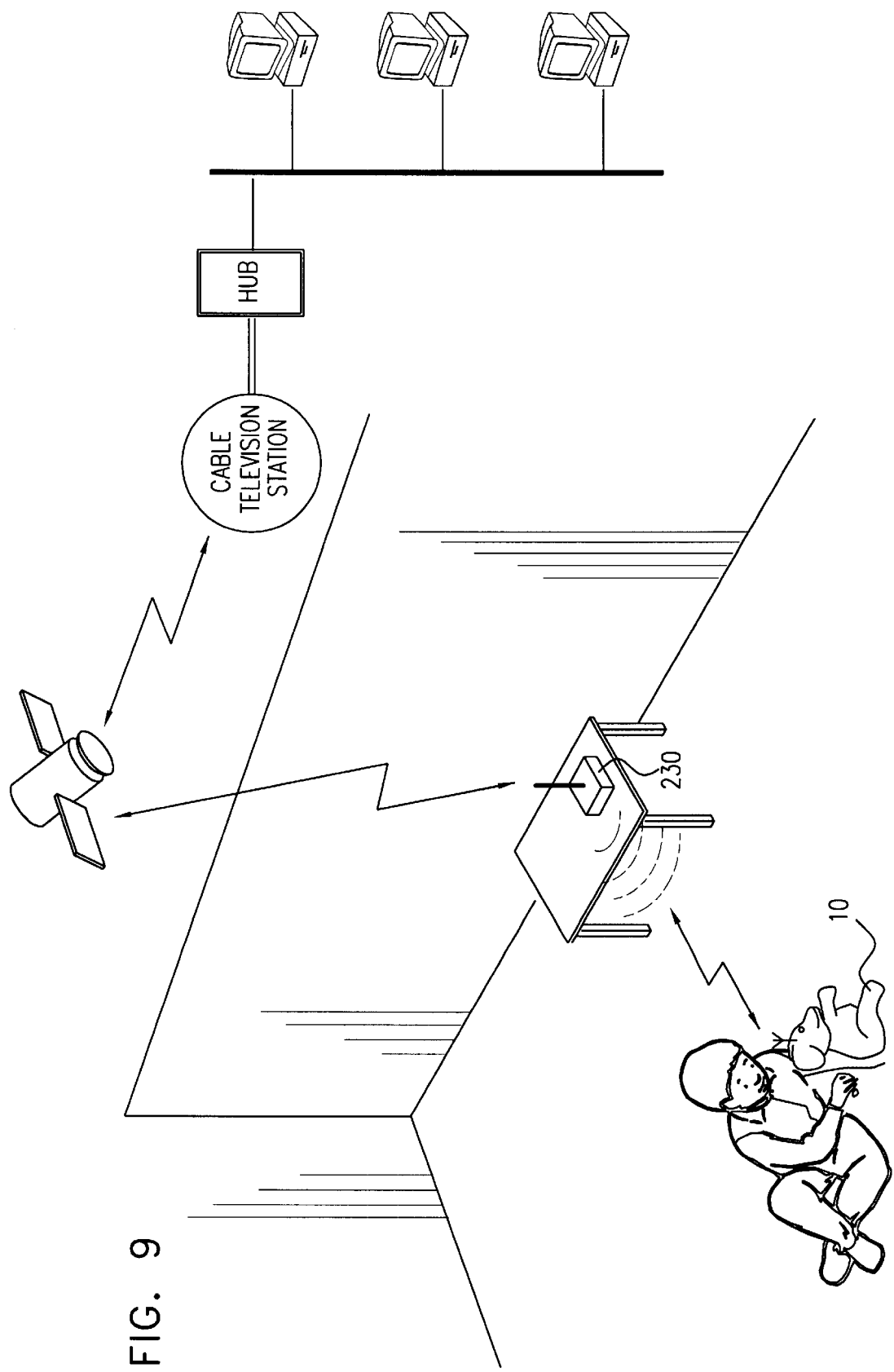
FIG. 9 is a semi-pictorial semi-block diagram illustrating another implementation of a networked interactive toy system, constructed and operative in accordance with a preferred embodiment of the present invention.

FIG. 9 illustrates still another embodiment in which the base station is connected to a computer network such as the Internet via a satellite communication system.

Figure 10:
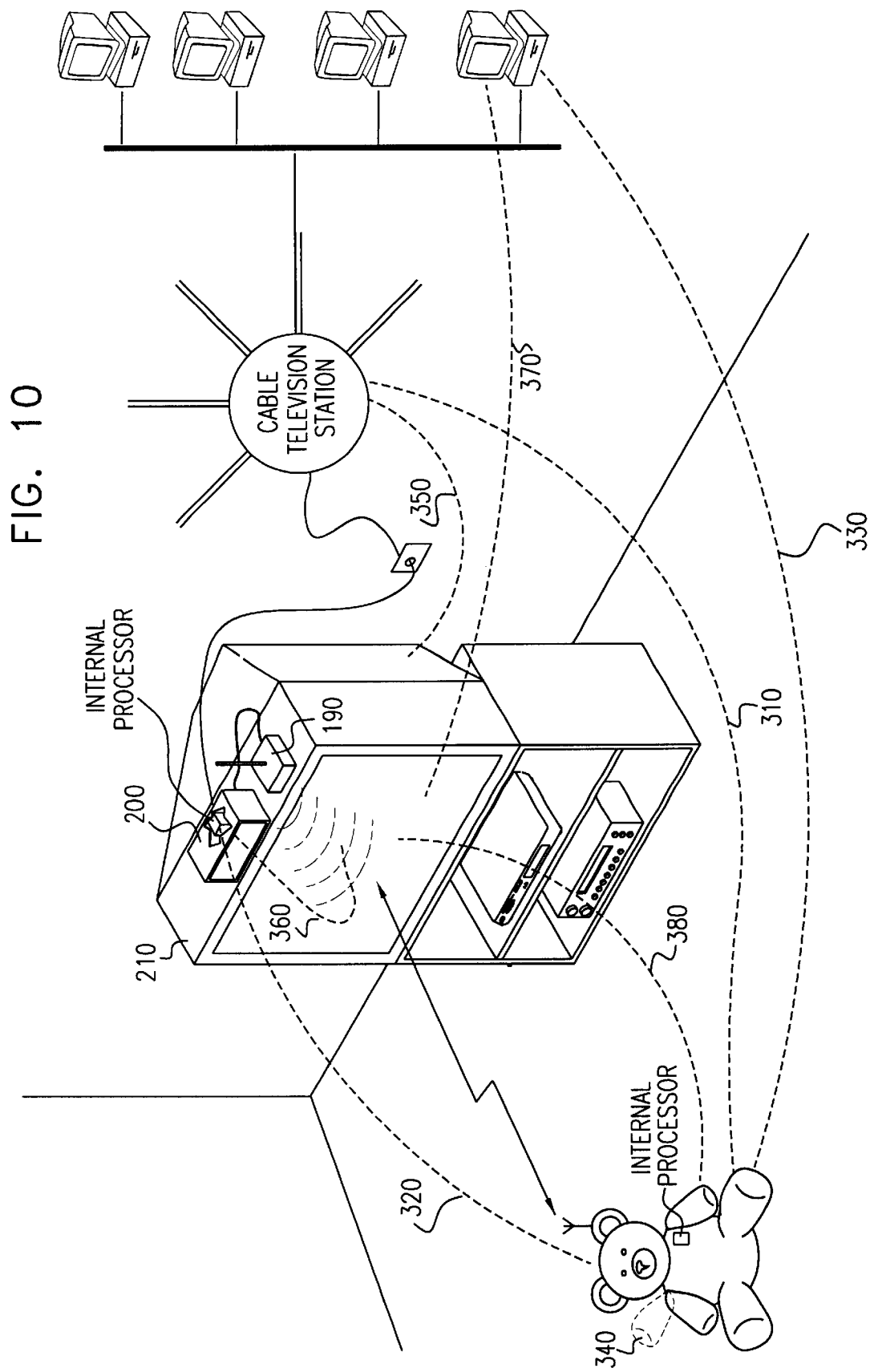
FIG. 10 is a semi-pictorial semi-block diagram illustrating control routes in yet another implementation of a networked interactive toy system, constructed and operative in accordance with a preferred embodiment of the present invention.

FIG. 10 is a semi-pictorial semi-block diagram illustrating control routes in yet another implementation of a networked interactive toy system, constructed and operative in accordance with a preferred embodiment of the present invention in which 8 separate control routes, indicated by dotted lines, are provided which may or may not all be simultaneously operative. Four of the control routes are control of the toy by the following four controlling elements respectively: A cable TV station (route 310), a set-top box processor residing in the set-top box of the TV set (route 320), a computer on the network (route 330), an onboard computer residing within the toy (route 340).

The other four control routes are control of the TV set by any of the above four controlling elements respectively (routes 350, 360, 370 and 380).

The eight control routes illustrated in FIG. 10, or any subset thereof, can preferably operate simultaneously.

Each of these eight control routes can operate in either of two directions or in both directions simultaneously. Thus, for example, when a user interacts with a toy by activating one of its sensors or speaking to the toy, the results of this interaction is passed on to one or more of the devices involved in control of the computer at least one of which includes data which may, for example, be in the form of scripts which may be operative to modify future television, toy or other content at least partly in response to this interaction. Additionally an interactive television system may provide signals to a toy preferably via a set-top box which control kinetic, audio and other activities of the toy.

It is appreciated that the meshing of the control circuits of the toy and the TV set are clearly advantageous because they allow a user such as a child to integrate playing activities with television viewing activities. For example:

a. User can use the toy as a remote pointer to the interactive television. In this way a user can control operation and content of interactive television either by using one or more of the toy's sensors or by speaking to the toy preferably using speech recognition capabilities which are present either onboard the toy, on a processor on board an Interactive TV set-top box connected to the television set, on one or more remote computers connected to a remote network or on a combination of such devices.

b. If a user (for example a child) is too stimulated (typically too frightened) by TV content, such as a horror movie, the child can tightly hug the toy, which typically comprises a cuddly toy, and a suitable sensor can sense the tight hug and reduce the stimulation level of the TV content, for example by reducing the fear level of the horror movie, typically by selecting, at the next movie script junction, a movie segment or path of movie segments with less fear content.

It is appreciated that in any of the embodiments described herein, the base unit may be integrally formed with the set-top box, with a computer or with any other electronic device.

In a preferred embodiment of this invention a toy comprises a cellular phone transceiver operative to connect the toy to a network such as the Internet via a cellular phone system. The toy may then be controlled by any computer on the network as well as possibly, at least partly, by a processor onboard the toy.

Figure 11:
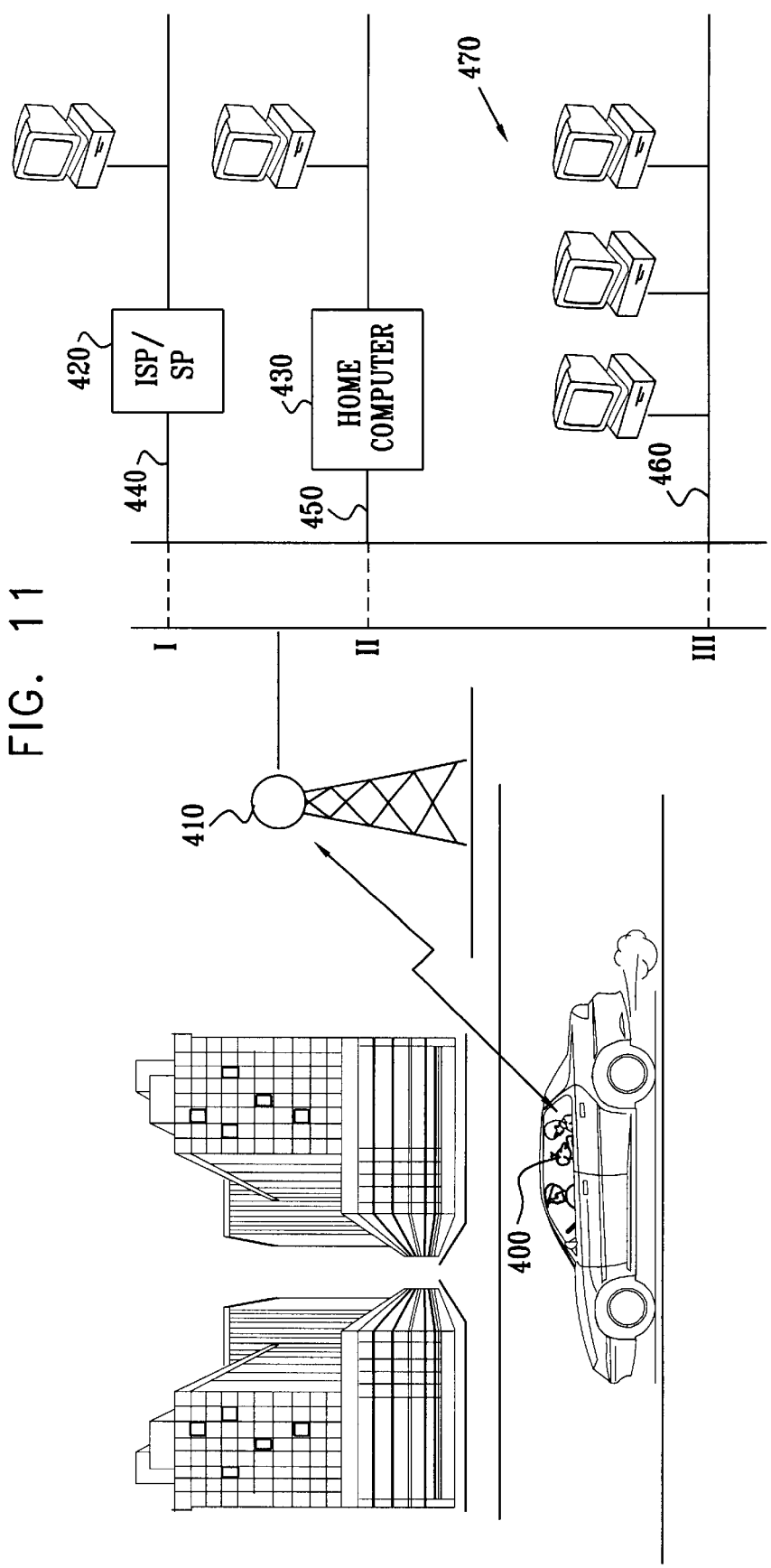
FIG. 11 is a semi-pictorial semi-block diagram illustrating typical control routes of a toy en-route in yet another implementation of a networked interactive toy system, constructed and operative in accordance with a preferred embodiment of the present invention.

FIG. 11 illustrates three alternative connections I–III between an interactive toy, which may be located in a moving vehicle, and a computer network such as the Internet. The first connection is via a conventional ISP (Internet server provider). In this case the toy, using a cellular phone transceiver, makes a phone connection with an Internet Service Provider which provides, for the toy, Internet connectivity to a computer on the Internet which controls the toy. The second connection is via a computer, typically a home computer which typically belongs to the owner of the toy or to one of the toy owner's friends. In this case the toy, using a cellular phone transceiver, makes a phone connection with a modem connected to the computer which either provides at least partial control of the toy or Internet connectivity to another computer which provides at least partial control of the toy. The third connection is via a net connection such as, for example, the WAP (wireless application protocol) which is typically handled by a cellular telephone company. In this case a cellular phone transceiver on the toy is operative to use, for example, the WAP technology to provide direct connection of the toy to the Internet thus providing a connection to a computer on the network which at least partly controls the toy.

Figure 12:
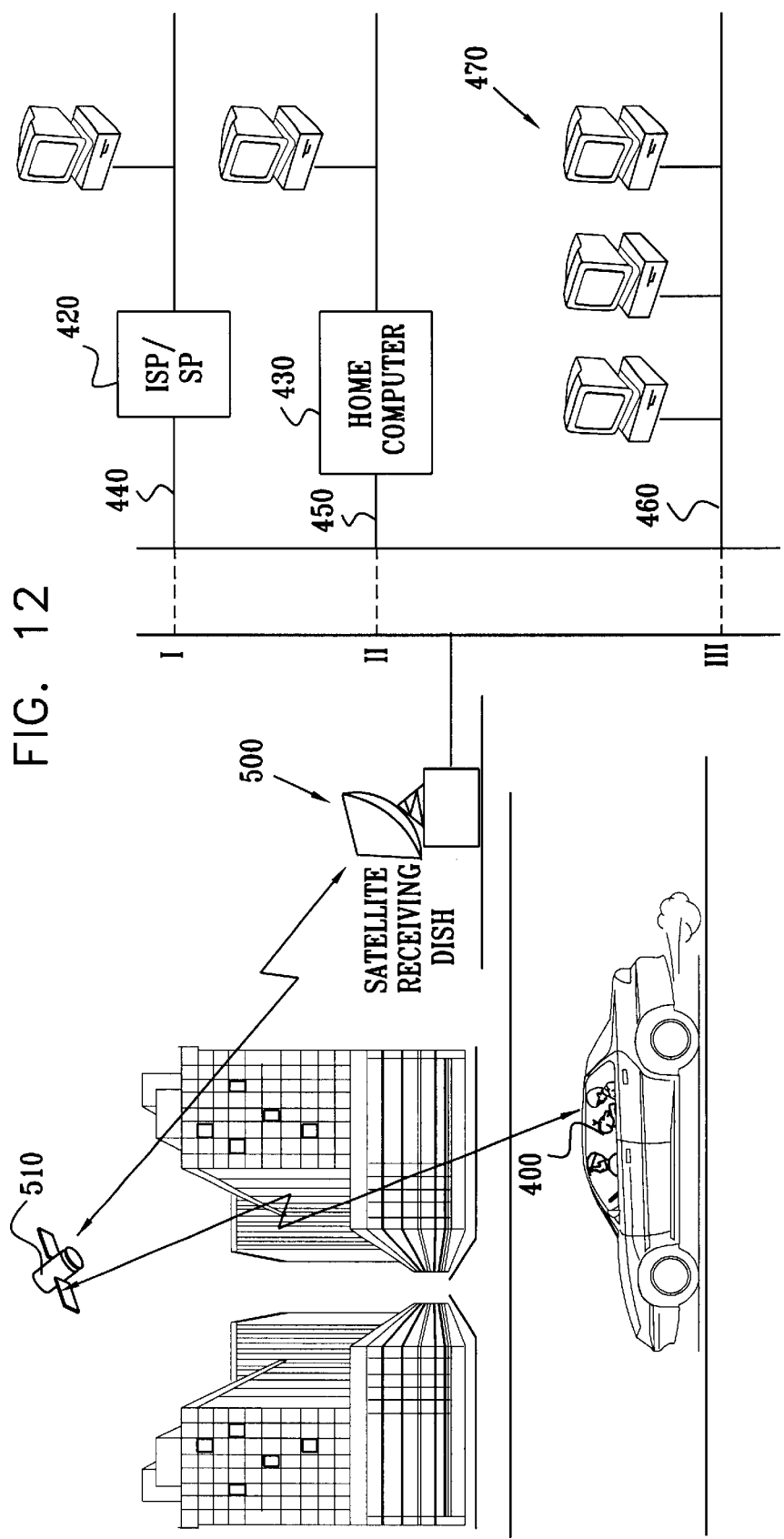
FIG. 12 is a semi-pictorial semi-block diagram illustrating another control route of a toy en-route in yet another implementation of a networked interactive toy system, constructed and operative in accordance with a preferred embodiment of the present invention.

FIG. 12 is similar to FIG. 11 except that the cellular telephone link of FIG. 11 is replaced by a satellite link in FIG. 12.

Figure 13:
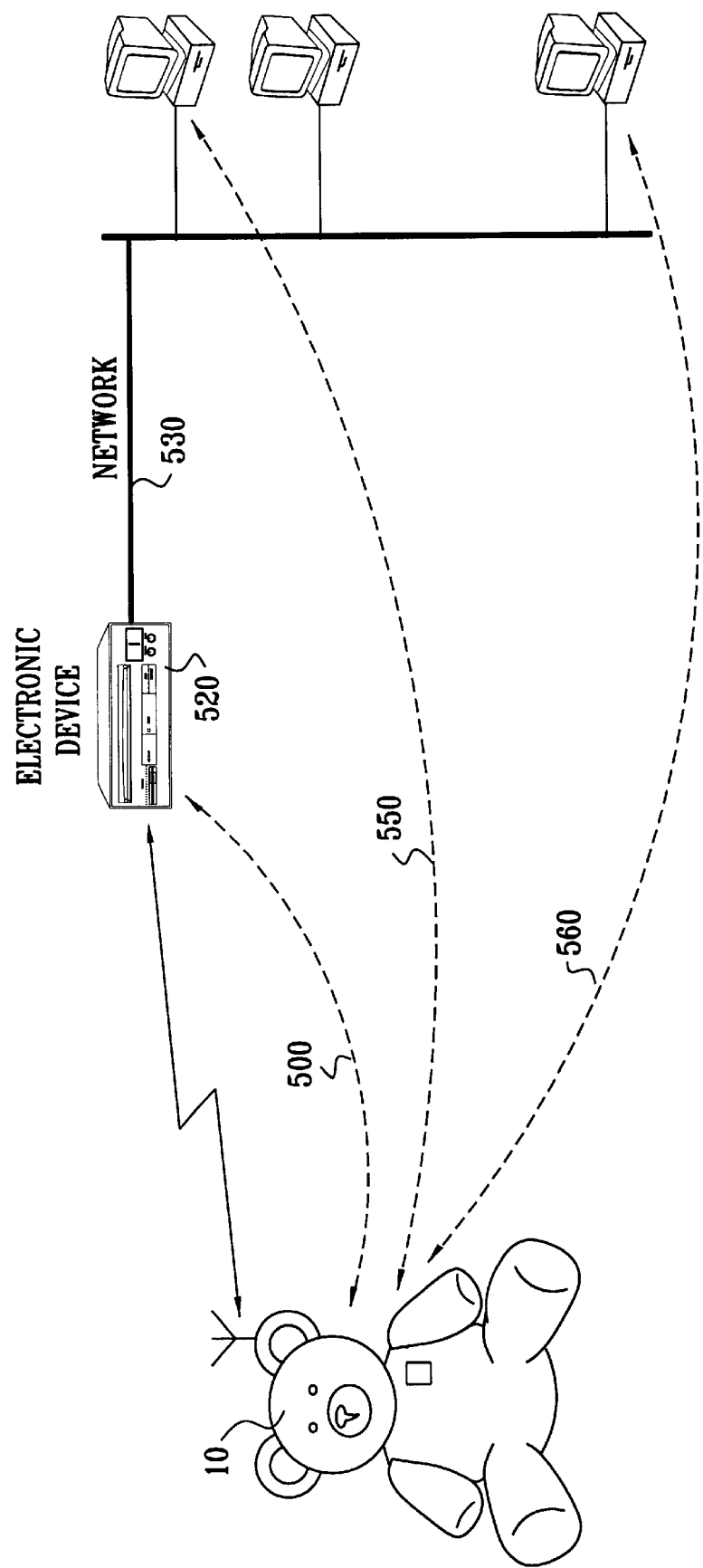
FIG. 13 is a semi-pictorial semi-block diagram illustrating typical local and remote control routes of a networked interactive toy, constructed and operative in accordance with a preferred embodiment of the present invention.

FIG. 13 illustrates a toy system wherein at least one parameter of the behavior of the toy is at least partly controlled locally and at least one other parameter of the behavior of the toy is at least partly controlled remotely, typically via a toy-controlling data link, thereby to provide distributed control of the toy. Control routes are indicated by dotted lines. The local control route is typically implemented by the physical RF/wireless link shown connecting the local electronic device with the toy. For example, simple aspects of the behavior of the toy may be controlled locally by relatively inexpensive on-board or local processors, and complex aspects of the behavior of the toy may be controlled by relatively expensive, centralized toy control equipment serving a large population of toys through a network via one or more network-mediated toy-controlling data links such as those linking various computers on the network to the toy of FIG. 13.

Figure 14:
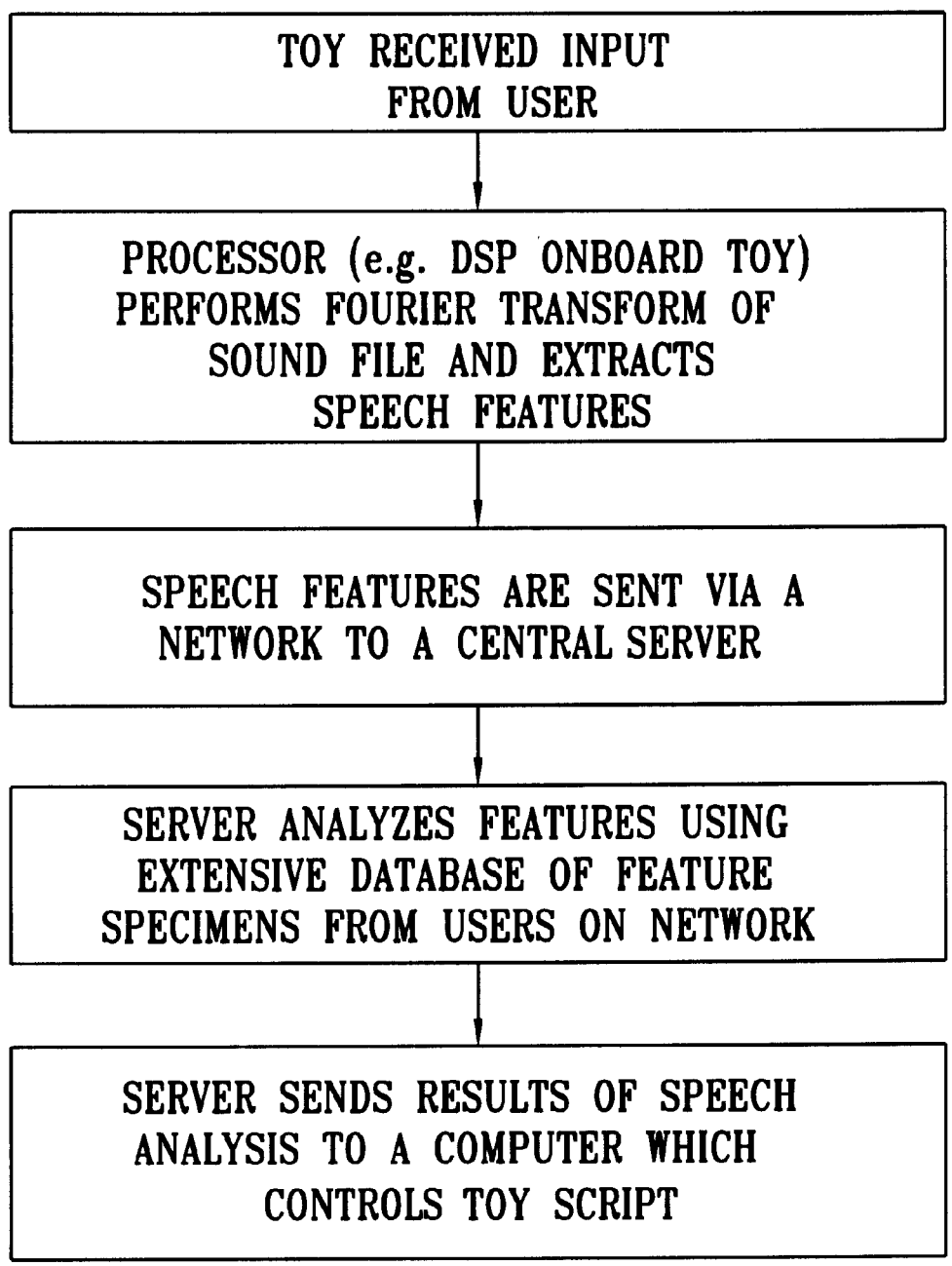
FIG. 14 is a flowchart showing a preferred distributed control method of the apparatus of FIG. 13.

FIG. 14 is a flowchart showing a preferred distributed control method in which different steps in a speech recognition process are performed by different elements in the apparatus of FIG. 13, and the outputs of the various steps are transferred as appropriate between the various elements in order to allow subsequent steps to be performed. The flowchart of FIG. 14 illustrates that it is possible for an individual electronic device to only partly control a particular behavior parameter of the toy for example because the individual electronic device performs only a subset of the totality of steps comprising the control method governing the particular behavior parameter.

Figure 15:
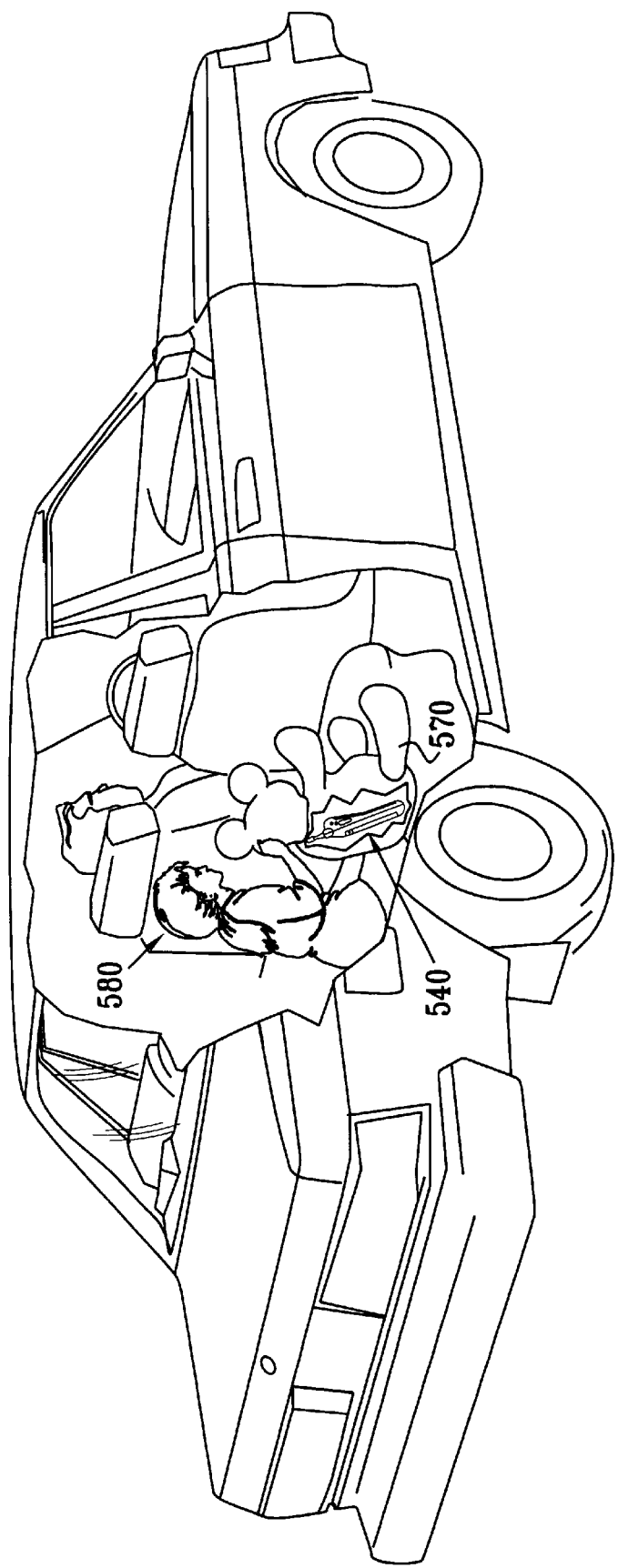
FIG. 15 is a pictorial illustration of a user en-route with a toy comprising an embedded mobile phone, constructed and operative in accordance with a preferred embodiment of the present invention.

FIG. 15 is a pictorial illustration of a moving family car in which is seated a child holding a toy such as a doll, in which a conventional cellular phone is removably embedded. A particular advantage of the apparatus of FIG. 15 is that parents can provide a child with en-route entertainment by simply embedding their cellular telephone, during a car-trip, into the cavity defined in the toy. It is appreciated that alternatively, no cavity may be defined in the toy and the cellular telephone may be associated differently with the toy, for example the cellular telephone may be strapped to a protruding outlet.

Typically, since different cellular phones have different connector structures, the toy is sold with a uniform terminal which is connected to a selected one from among a plurality of connector structures mating with the various connector structures of commercially available cellular phones.

Figure 16:
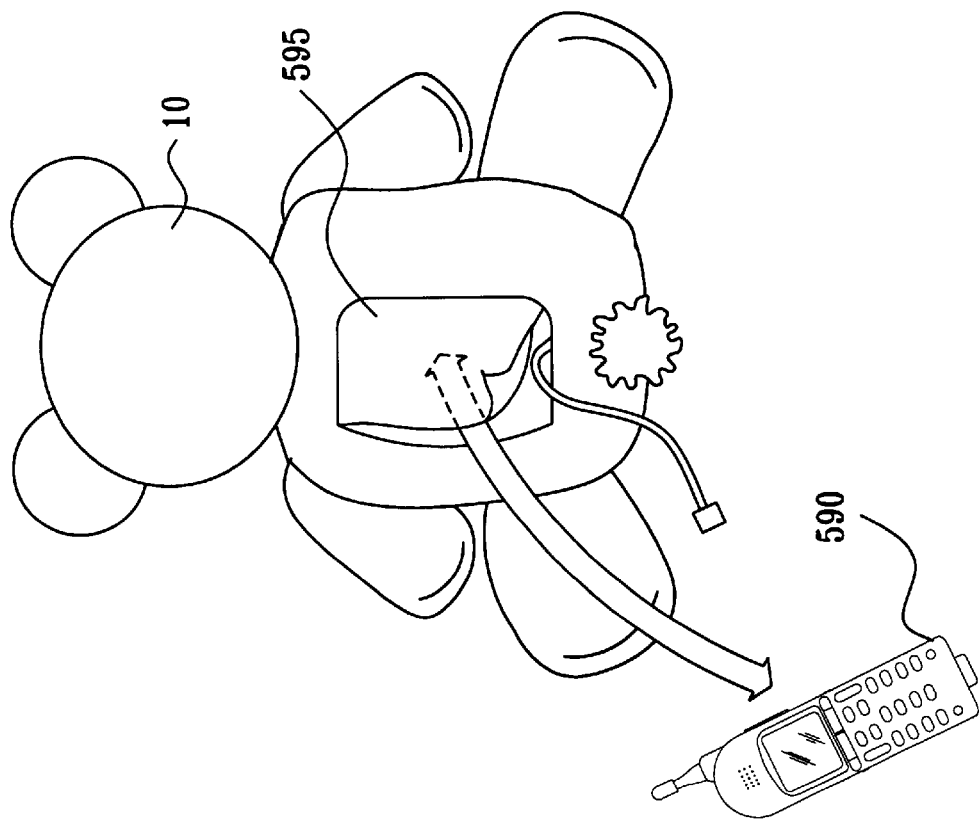
FIG. 16 is a rear view of disassembled toy apparatus comprising a cellular telephone, constructed and operative in accordance with a preferred embodiment of the present invention.

FIG. 16 is a rear view of disassembled apparatus comprising a cellular telephone with a first connector structure, and an associated telephone-receiving cavity defined within a toy, typically within the torso of the toy.

Figure 17:
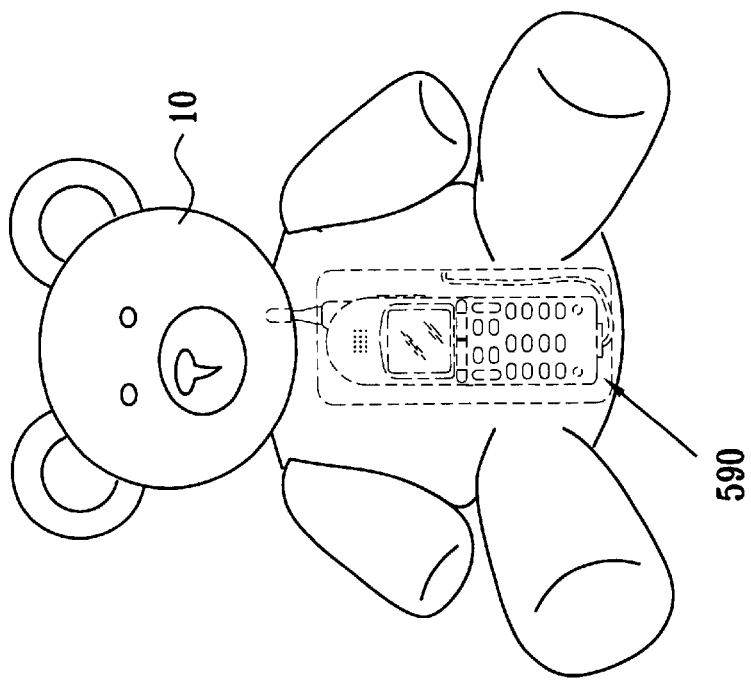
FIG. 17 is a front view of an assembled toy apparatus comprising a cellular telephone, constructed and operative in accordance with a preferred embodiment of the present invention.

FIG. 17 is a front view of the assembled apparatus showing the cellular phone now within the cavity in the toy.

In a preferred embodiment of this invention toys connected to a network are interactive toys which employ "Living Objects" technology as described in various patent documents referred to in this application. Such toys are equipped with one or more controllers with wireless communication with one or more computer systems. In a preferred embodiment of the present invention, wireless communication is achieved by providing toys with a cellular, or other mobile phone, or with some or all of the hardware contained in a cellular phone. Such toys are henceforth referred to as interactive cell-phone toys.

Figure 18:
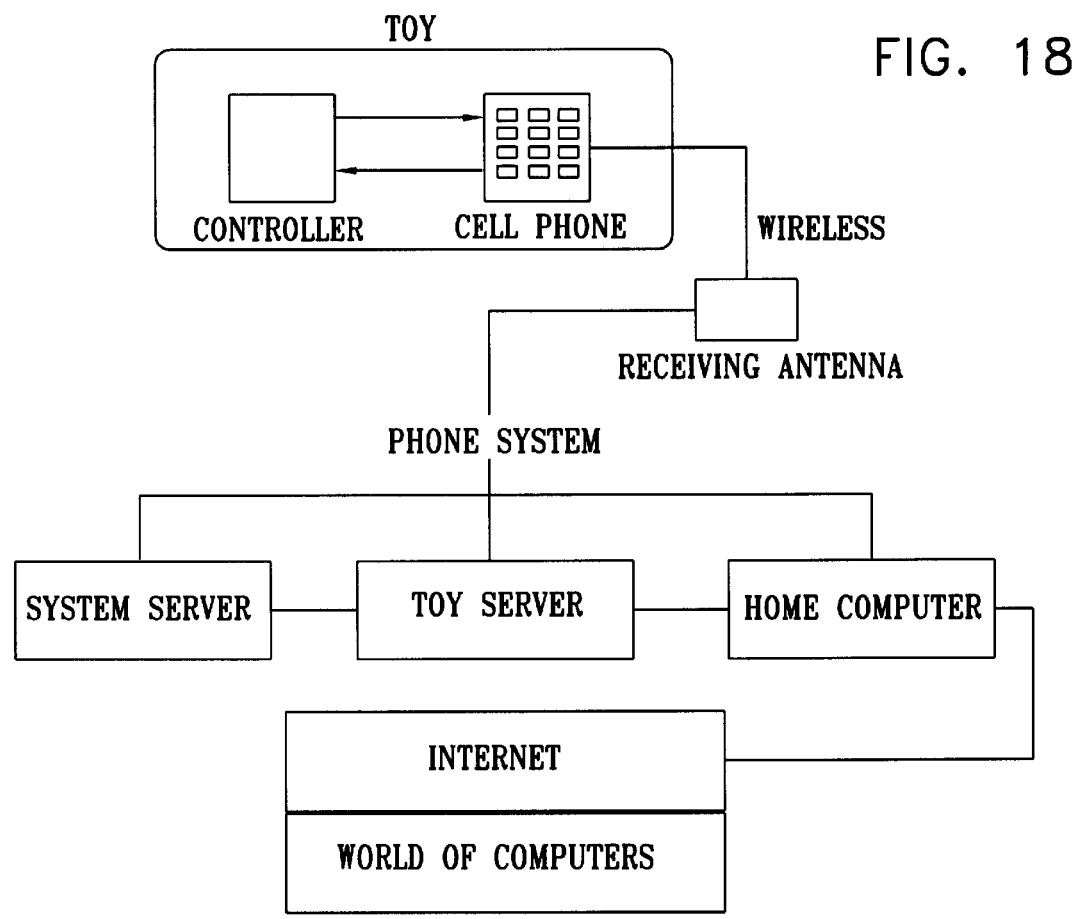
FIG. 18 is a schematic diagram showing a toy comprising a cellular phone or a cellular phone transceiver, constructed and operative in accordance with a preferred embodiment of the present invention.

FIG. 18 shows schematically a toy comprising a cellular phone or a cellular phone transceiver which is operative to dial, for example, a computer on a phone network. This computer may be a central server of a cellular phone network; a central server dedicated to serving toys, one or more user's home computer, or any other computer, which is capable of connecting to a phone network. It is preferred that such a computer be then connected to a global network such as the Internet. Such a configuration allows communication with other computers, and with other computer controlled interactive toys.

In another preferred embodiment of this invention, an interactive cell phone toy contains a cell phone or a controller employing cellular phone technology operative to connect directly to the Internet using, for example, the WAP (wireless application protocol) technology.

Figure 19:
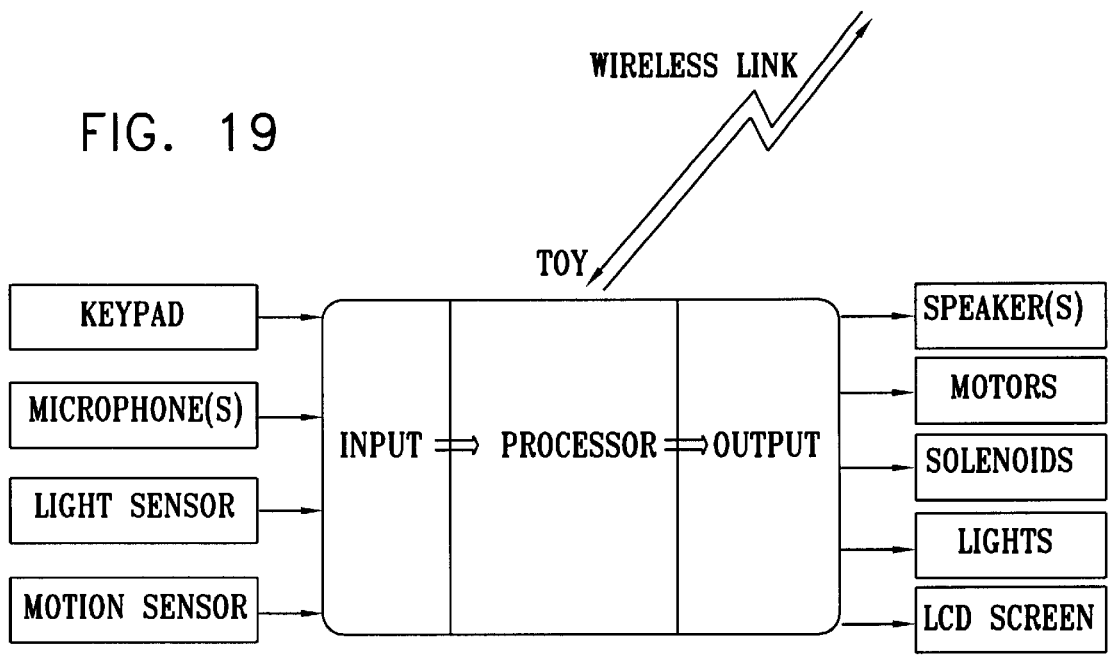
FIG. 19 is a schematic diagram showing a toy comprising elements which enable interactive speaking, listening and sensing functionality, constructed and operative in accordance with a preferred embodiment of the present invention.

FIG. 19 is a schematic diagram showing a toy comprising elements which enable interactive speaking, listening and sensing functionality, constructed and operative in accordance with a preferred embodiment of the present invention. An interactive toy may be equipped with one or more speakers, microphones, sensors and actuators (solenoids, motors, and lights) and the like. These control the motion of the toy. Interaction with one or more users is mainly but not entirely verbal using speech recognition technology processed by the computer, which may or may not be remote from the toy.

An interactive toy may have a screen such as an LCD screen for viewing information or it may transfer information to the user through sound (possibly using text-to-speech technology) and motions. An interactive toy may also be equipped with one or more video cameras, which can be used either passively to send pictures to the network or actively to identify the environment of the user using software on the computer.

In another preferred embodiment of this invention, an interactive cell-phone toy has a keypad for input of phone numbers and other information though this function can also be performed using speech combined with voice recognition.

In a preferred embodiment of this invention interactive toys are built modularly, so that there are different basic interior electronic components, reflecting the cost and range of functions of the toy as defined by design, producers and/or by toy users. The exterior parts, "externals", henceforth, are also modular. They can be removed, updated, and exchanged to suit user requirements. Externals are designed to envelop any of the modular inner component configurations. In another preferred embodiment of this invention, interactive toy externals are "camouflaged" in ordinary objects such as a bicycle helmet or schoolbag. The toy may have a casing of a known or unknown toy personality, or in a soft toy.

In a preferred embodiment of this invention, such a toy can be tracked, both with respect to location and with respect to time.

In another preferred embodiment of this invention, an interactive cell-phone toy pushes commercial applications relevant to location/time and personal profile of the user. The network system updates one or more user personal profiles based on those specific users' histories.

In another preferred embodiment of this invention, the interactive cell-phone toy can generate discounts or coupons, which can be used by its user(s) to the users' economic advantage.

In another preferred embodiment of this invention, an interactive cell-phone toy server can exchange information with a merchant database.

In another preferred embodiment of this invention, an interactive cell-phone toy can locate one or more users within the home-base, or when away from the home base.

In another preferred embodiment of this invention an interactive cell-phone toy has an alarm system.

In a preferred embodiment of this invention, a cell-phone company database is used for personalization information. This may or may not be in exchange with the interactive toy Server Company.

In another preferred embodiment of this invention, such information provided by the Cell-phone Company provides interactive cell-phone toy users with family commercial packages.

In another preferred embodiment of this invention, such information provided by the cell phone company provides interactive cell-phone toy users with discounts from the cell-phone provider and or from the Cell-phone Company.

In another preferred embodiment of this invention, such information provided by the cell phone Company provides interactive cell-phone toy users with family commercial packages.

In a preferred embodiment of this invention, interactive cell-phone toys communicate with one or more cell-phones.

In addition to containing technology for mobile communication via the cellular or other mobile phone network, an interactive cell phone toy may or may not contain hardware for communicating with any computer directly, once it is within range of this computer. Thus, for example, when a user enters a home, an office, a store, a mail, an amusement park, or any other site, containing one or more networks of computers, which are equipped with a wireless transmitter and receiver, capable of communicating with such a toy, an interactive toy is be able to connect to the computer directly. This provides a more reliable link of an interactive toy to a computer, and also avoids the cost to toy users of using the cellular phone system.

Figure 20:
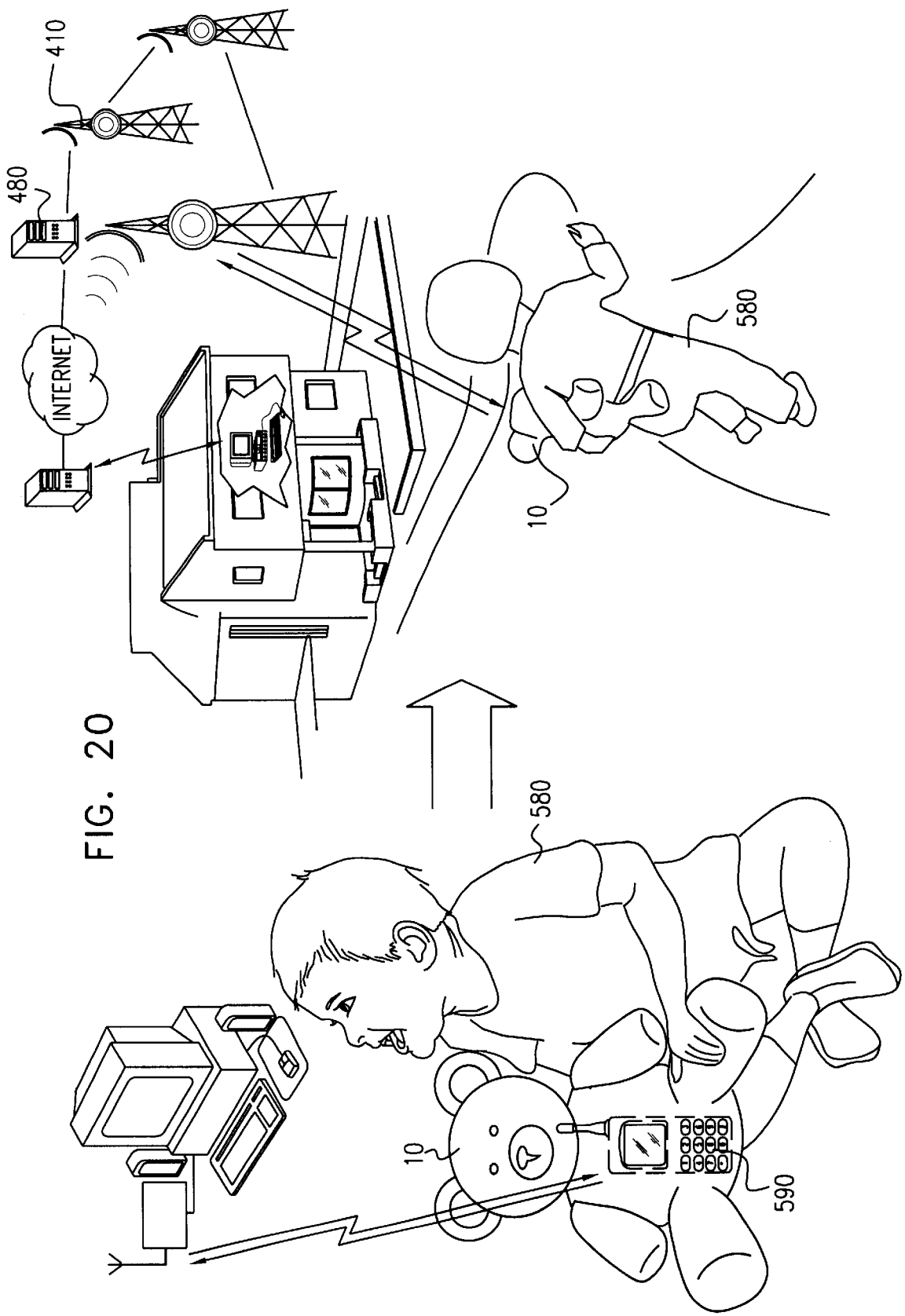
FIG. 20 shows a pictorial illustration of a user having a toy with a direct link to a computer at home, and toy connecting to a cellular network when away from home, constructed and operative in accordance with a preferred embodiment of the present invention.

FIG. 20 shows an artist's conception of a child using a direct link to his computer while at home and using the cellular network for controlling his toy while he is away from home. An advantage of using a home computer while a user is at home is to reduce the cost of cellular communication and to overcome limitations related to limited bandwidth in cellular communication.

Figure 21:
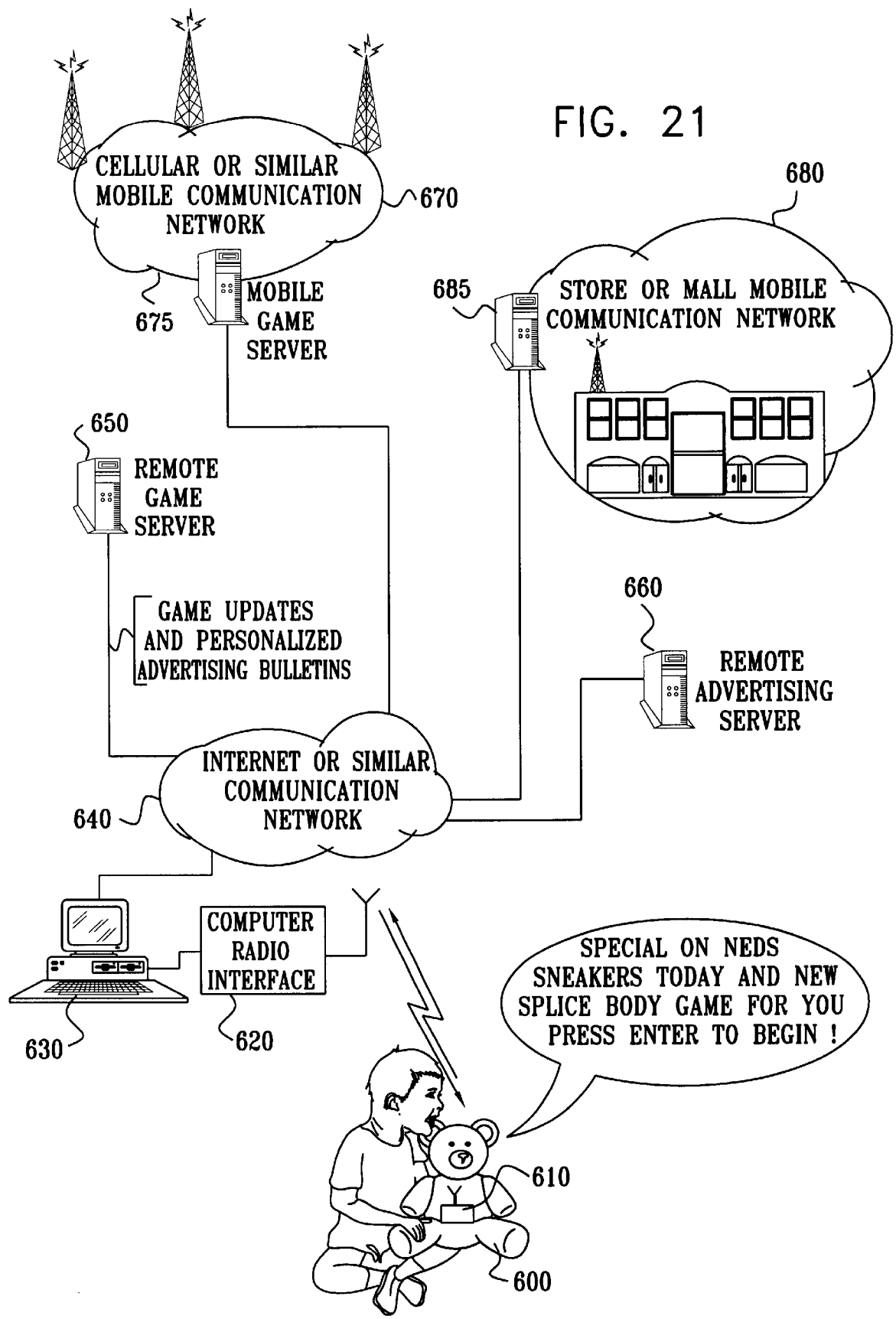
FIG. 21 shows connections between a central interactive toy server and other systems, constructed and operative in accordance with a preferred embodiment of the present invention.
Figure 22:
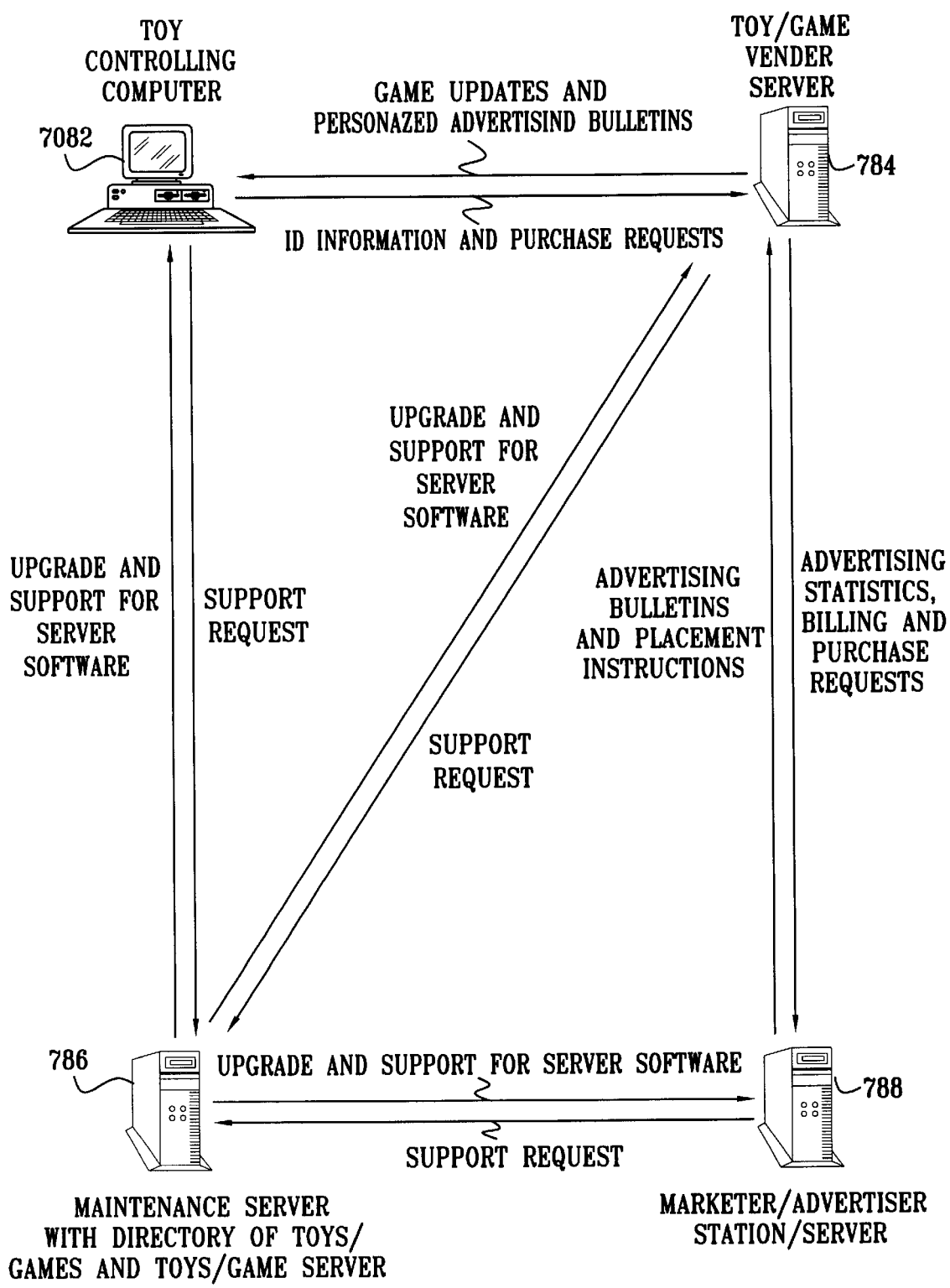
FIG. 22 shows other connections between a central interactive toy server and other systems, constructed and operative in accordance with a preferred embodiment of the present invention.

FIG. 21 and FIG. 22 show the connection between a central interactive toy server and various other system computer connections and communications. In FIG. 21 a user's toy is connected to a network via an RF link to a local computer. In this example a cellular or similar mobile communication network 670 as well as a remote toy content server 650, a store or mall mobile communication network 680 as well as a remote advertising server are also connected to the network. In the example shown in FIG. 21 the remote advertising server presents the user with a sales promotion script.

Figure 23:
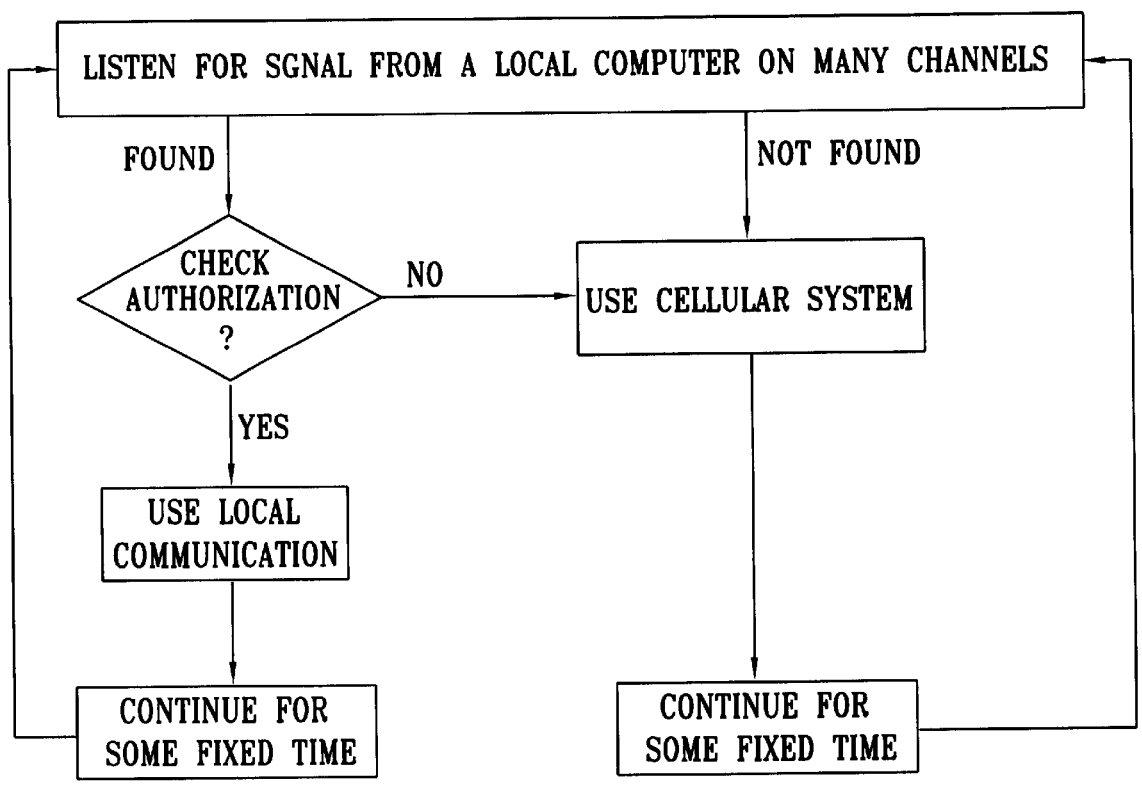
FIG. 23 is a flow chart describing the decision process for a toy linking up to a local computer or to a cellular system, constructed and operative in accordance with a preferred embodiment of the present invention.

FIG. 23 is a flow chart describing the decision process in a case where an interactive cell phone toy links up to a local computer system when within range of such a system or, when not in the range of a local computer system with appropriate toy controlling technology and authorization, communicates via a cellular system. In the present example a computer program is run on a microprocessor onboard the toy which constantly listens for a signal from a local computer to establish whether a local computer is active and able to serve the toy. If no such computer is found or if the toy is not authorized to use the found local computer, the toy uses cellular phone communication. If a local computer is found and if the toy is authorized to use the computer then such local communication is used.

In a preferred embodiment of this invention, interactive toys are connected to one or more computers with significant processing power. Such a configuration greatly enhances the interactive ability of such a toy, since one or more powerful computers can aid is speech recognition, text-to-speech processing, intelligent speech (as is present in currently provided by software using "Artificial Intelligence"), and other functions of a toy requiring processing power.

The present invention further describes a configuration whereby one or more computers, interact with one or more interactive toys, and are part of a network of computers. Such a configuration enhances the entertainment advantages of such a toy even more. The first example of this is that two or more users can interact with each other through their toys. This interaction can be as simple as a voice conversation or it can involve the playing of games in which one toy processes information from its user and decides, based on this information and the rules of the game what information the second toy passes on to its user. In either case two toys, which might even be on opposite sides of the world, can communicate with each other.

Figure 24:
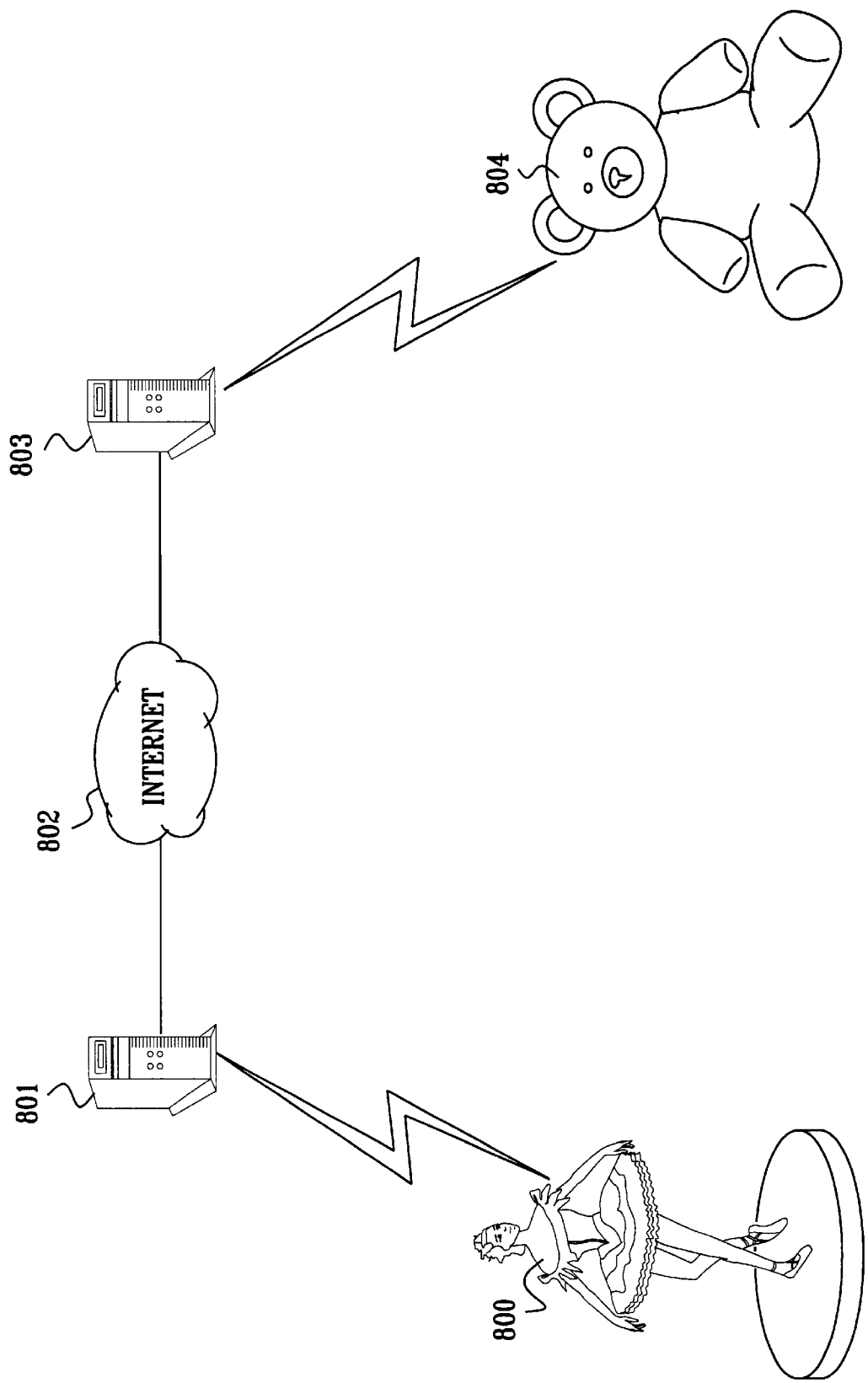
FIG. 24 shows pictorially two toys communicating with each other via the Internet, constructed and operative in accordance with a preferred embodiment of the present invention.

FIG. 24 shows pictorially two toys communicating with each other via the Internet. In this example a first toy 800 is controlled by a computer 801 which is either local or on a network. Computer 801 is connected to computer 803 via the Internet 802. Computer 803 controls a toy 804. A script running on both computer 801 and 804 allows communication between toys 800 and 804 which may give the impression that the two toys are talking to each other.

An example of indirect communication between two toys is given below:

Child A, who lives in California, tells Toy A that he really would like to visit London.

Computer checks database to find a child (Child B) in London who is of similar age and has similar interests as Child A.

Computer sends message to the computer connected to Toy B to tell Toy B to ask child B if he's interested in meeting a child from California.

Computer B does this at a later time when he is connected.

Child B decides to ask Toy B to send Child A a joke about London or a song or a photo of some part of London In another preferred embodiment of this invention, an interactive cell-phone toy play a game with one or more users.

In another preferred embodiment of this invention, an interactive cell-phone toy can be linked up to a computer game so that the toy becomes an integral part of a game played on a computer using a computer screen as well as possibly a keyboard, mouse, joystick or other computer accessory.

Entertainment is greatly enhanced by entertainment who, in a manner similar to that with conventional entertainment, provide games, scripts and entertainment for use with toys. This entertainment is passed to the toys via the computer network. This was shown in FIG. 22.

The fact that an interactive toy is equipped with a cellular phone or other mobile communicator allows the user to access this entertainment while the user is mobile. Furthermore, the fact that mobile phone technology is contained within an interactive toy greatly enhances the commercial utilization of the mobile phone.

A user has a relationship with his interactive toy (not only with a cuddly bear but also some amount of relationship with toy cars, and other figures, especially if they have "living" characteristics with speech and Artificial Intelligence. This makes it easier to get an interactive toy user to use all the commercial material available through a network combining cellular phones with computers (also known as a Mobile Commerce or M-Commerce network.

Figure 25:
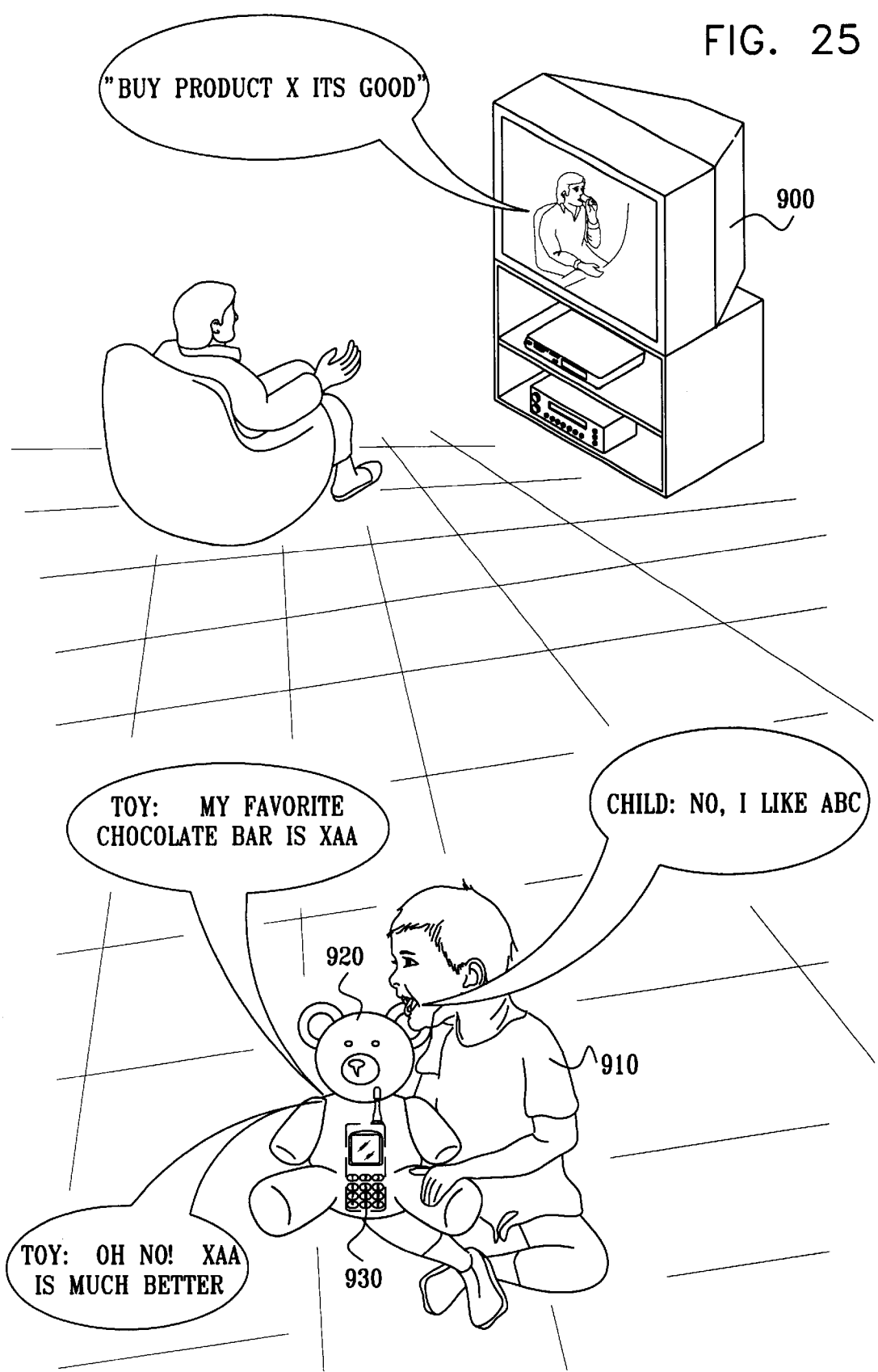
FIG. 25 shows pictorially how a toy makes a user more susceptible to advertising; in accordance with a preferred embodiment of the present invention.

FIG. 25 shows how the aforementioned relationship makes a user more susceptible to advertising. This figure compares a person sitting in front of a television set and hearing an advertisement which simply states "Buy product X; it's good!". This is to be compared with a child playing with his toy which is pushing a particular product despite the child's objection. In this case both interactivity with the user as well as the relationship of child and toy is used to enhance the sales promotion activity.

It is appreciated that although in many of the figures a toy is shown with an actual cellular phone inside the toy, the technology with such a cellular phone may be fully or partly integrated into the toy's internal hardware.

Interactive toy systems are able utilize and apply all commercial applications of e-commerce and m-commerce such as purchases on the web, advertising, remote purchasing of products, remote download of emails and other web applications.

Figure 26:
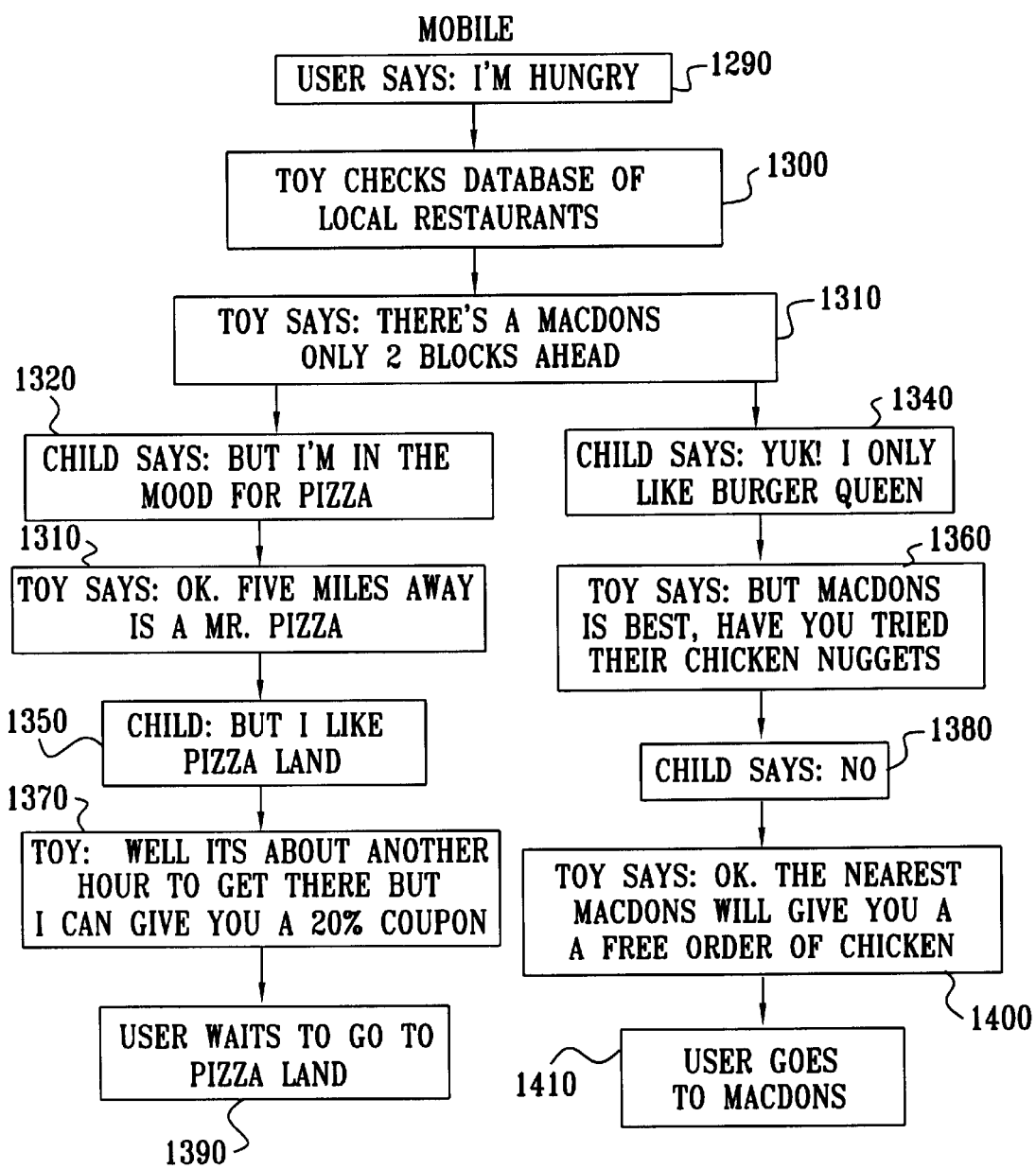
FIG. 26 is a flow chart showing interactive toys using speech recognition to parse user's speech, in accordance with a preferred embodiment of the present invention.

FIG. 26 is a flow chart showing an example of how interactive toys use speech recognition to parse user's speech and determine user's likes and dislikes and advertise accordingly. They may either direct advertising towards a user's preferences or alternatively try to change a user's opinion. FIG. 26 makes use of the ability of a cellular phone network to locate a user and thus direct a user to a particular site, in this case a retail sales outlet.

FIG. 26 shows several other features of interactive toy systems. Such systems have the ability to offer discounts to users based on special circumstances encountered by the system. In the case described in FIG. 26 the toy is trying to convince a customer to go to a popular hamburger restaurant by suggesting a new product and by offering a free (or discounted) trial. The system can keep track of a user's history in order to avoid a user abusing this.

Another feature shown in FIG. 26 is the function of an interactive toy in sending its user to one or more stores. This may be accomplished, for example, by means of a game in which points are collected and the winner gets a prize. Points may be earned in many ways including finding a treasure in a store (which gets a child into a store to look and then encourages purchase). Interactive toy may have point of sale toys or just the computer but the child brings his toy to verify he was there.

Figure 27:
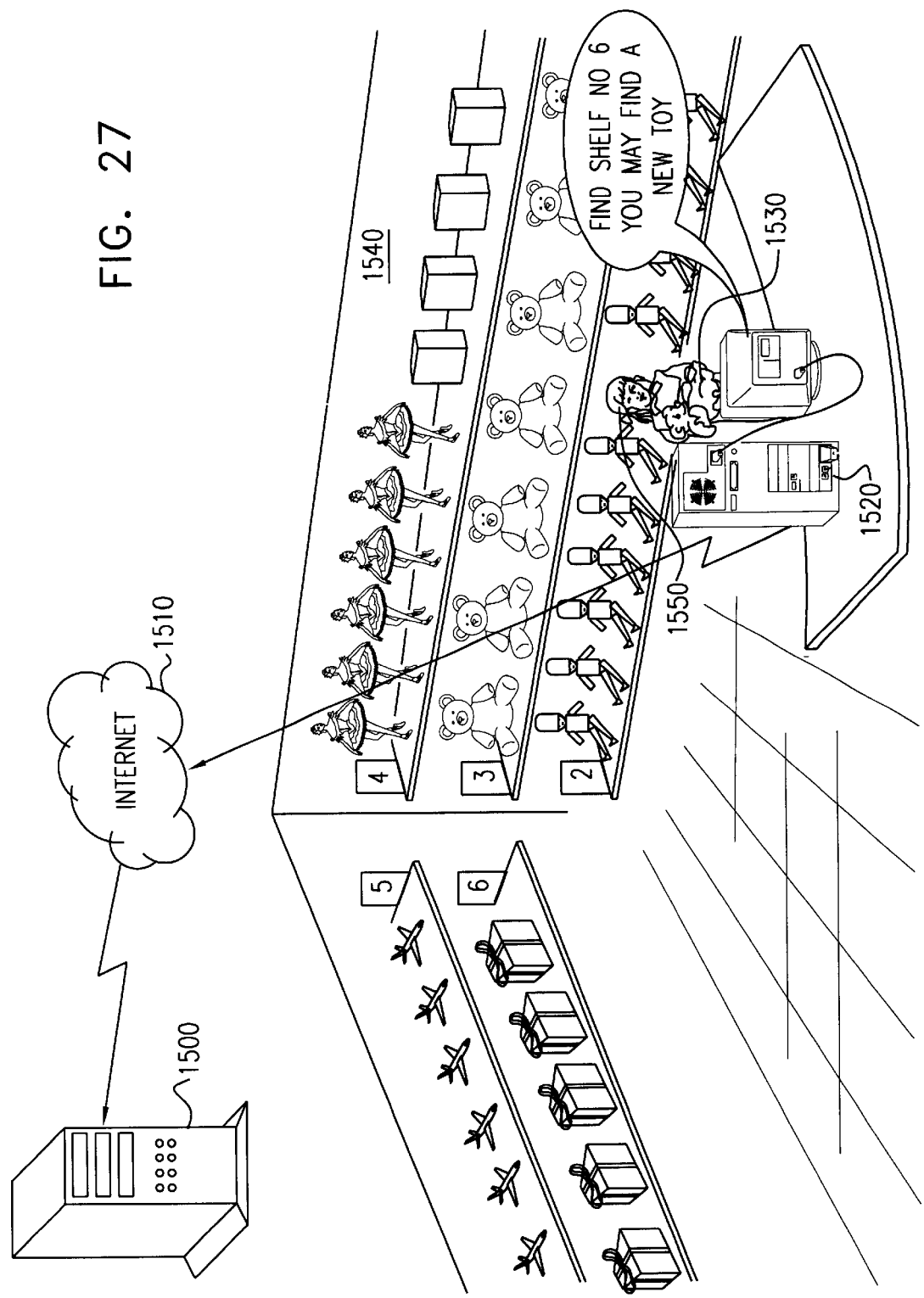
FIG. 27 shows pictorially a user and toy in a store, and toy interacting with a computer within the store, constructed and operative in accordance with a preferred embodiment of the present invention.

FIG. 27 shows pictorially a user in a store in which user's toy interacts with a computer within the store. The local computer encourages user to purchase more items by means of a game in which user is asked to find a new toy. An interactive toy server company may bill an advertiser for getting a child into a store.

Connection of interactive toys to a cell network enables both one or more interactive toy server company's database and one or more cell phone company's databases to be mutually informative and informed. An interactive toy server company's database arises from user registration, as well as all the information which interactive toys get from their users: Response to questions about likes and dislikes in conversation, types of content requested, history of purchases and the like, Thus an interactive toy server company's database acquires much data. Cell Phone Companies also have a huge database of its customers—not all have toys and the type of info is different. The sharing of these two or more databases can provide a huge commercial advantage in terms of profiling of customers and other applications of the wealth of information present in these databases.

Database utilization helps personalize information both for an interactive toy server company in providing advertising and entertainment content, and for Cell Phone Companies in providing services and sales to their customers. (They could learn about who likes Hamburgers and the like, and about other facts of commercial interest.)

Toy with cell phone can track the location and/or time of where a user is using currently available technology A child, or other user, with an interactive cell phone toy, who gets lost, can easily be tracked. The toy can meanwhile keep him calm since his toy is with him. Similarly, a lost cell-phone toy can be located, found and returned to its owner.

Figure 28:
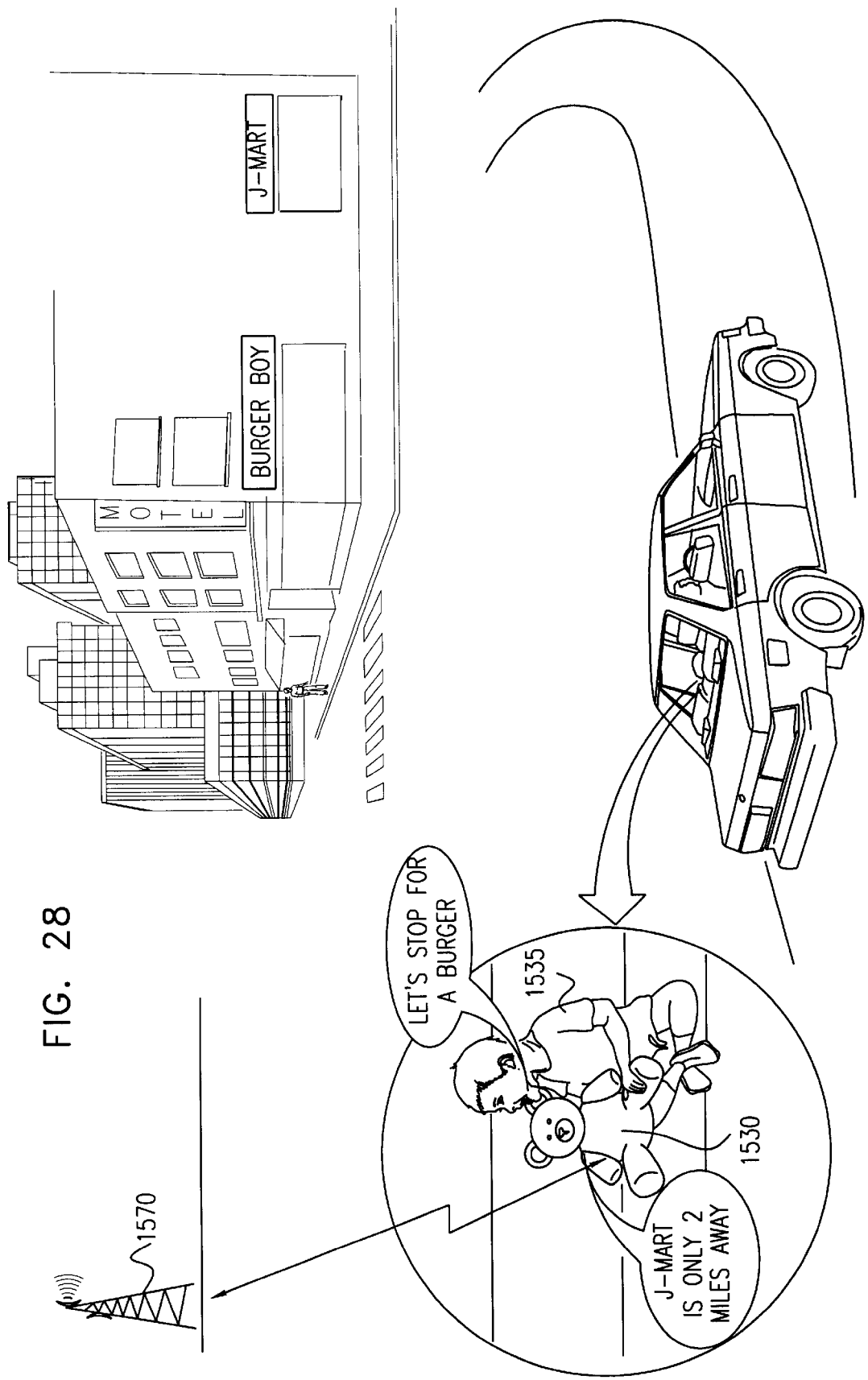
FIG. 28 shows pictorially an example of location tracking by a toy system, constructed and operative in accordance with a preferred embodiment of the present invention.

FIG. 28 shows an example of how the ability of a cell phone system to the location of where a user is using currently available technology may be used for commercial purposes so that the system can push commercial applications relevant to location, time and personal profile of a user. The addition of time tracking allows, for example, a toy to send a user to nearby places of business which are currently open knowing that user likes them, or tries to persuade user(s) that they should like them.

User personal profile is updated continuously, to see which advertising was effective, what techniques worked to convince the user, and what the user's likes and dislikes are. Interactive toy server system combines experience of all the toys to see trends in sales and marketing techniques to make them more effective.

Figure 29:
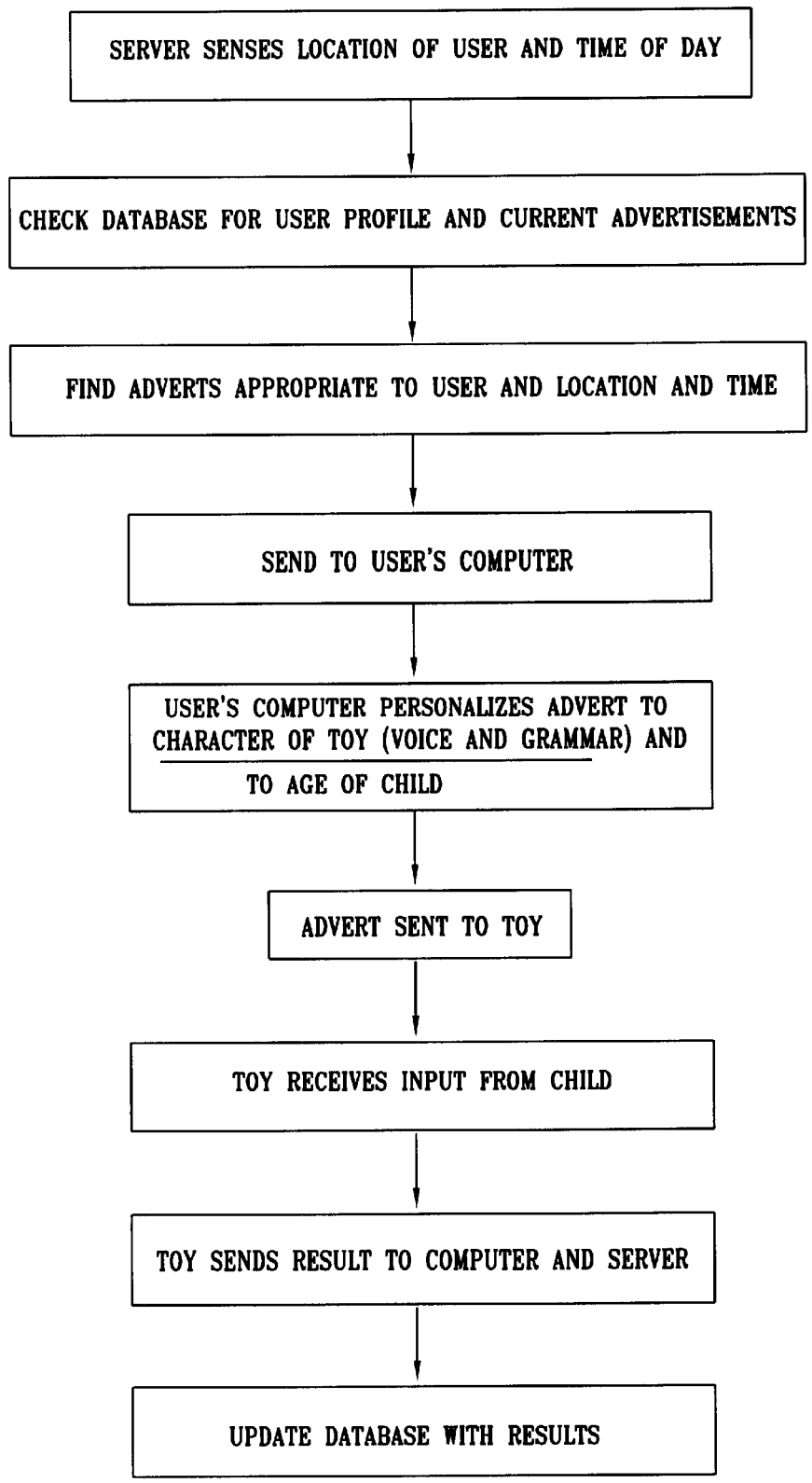
FIG. 29 is a flowchart showing how an interactive toy uses a database to improve advertising, and updates its database, in accordance with a preferred embodiment of the present invention.

FIG. 29 shows how an interactive toy uses a database to improve advertising and then uses the result of the advertising to update its database.

Figure 30:
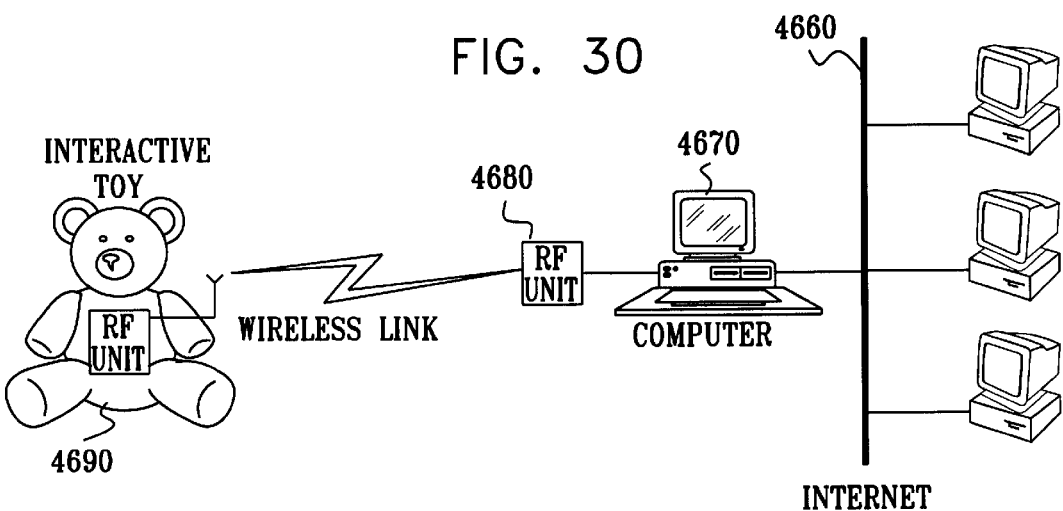
FIG. 30 shows pictorially a toy in wireless communication with a local computer which in turn is connected to a network such as the Internet, constructed and operative in accordance with a preferred embodiment of the present invention.

FIG. 30 shows pictorially a toy in wireless communication with a local computer which in turn is connected to a network such as the Internet, constructed and operative in accordance with a preferred embodiment of the present invention. The precise method of connection of the computer to the Internet is not shown and may be of any form including for example by means of a modem and a telephone line, by means of a cable modem, by means of a direct Internet connection such as a DSL (Digital Subscriber Line) connection provided by most commercial telecommunication companies or by any other available means. In the example of FIG. 30 the local computer which may be a Personal Computer runs programs to control the toy. These programs include interactive programs in which the commands sent to the toy by the computer depend partly or wholly on previous communication from the toy to the computer. Such a computer is preferably connected to a computer network such as the Internet and it is thus connected to many other computers including those which may be controlling additional toys.

As a result of the advent of reliable high speed network connections it is no longer necessary for an interactive toy to be controlled by a computer to which it is directly connected for example by a wireless link as described in the previous paragraph. Thus, for example, a toy may be connected to a home computer via a wireless link (as above) but the home computer may not provide some or all of the controlling commands for the toy. Said commands may be provided by any other computer on a computer network such as a local intranet or the Internet. This (i.e. the partial or full control of a toy by a remote computer) may be desirable if, for example, the home computer is not very powerful and/or it is being heavily used by other users and/or if the software for controlling toys is not present on such a local home computer and/or if more powerful software for controlling a toy is available on another computer on the network and/or if access to specific or all software for controlling a toy is commercially controlled and available primarily or entirely via the Internet and/or for any other reason.

Figure 31:
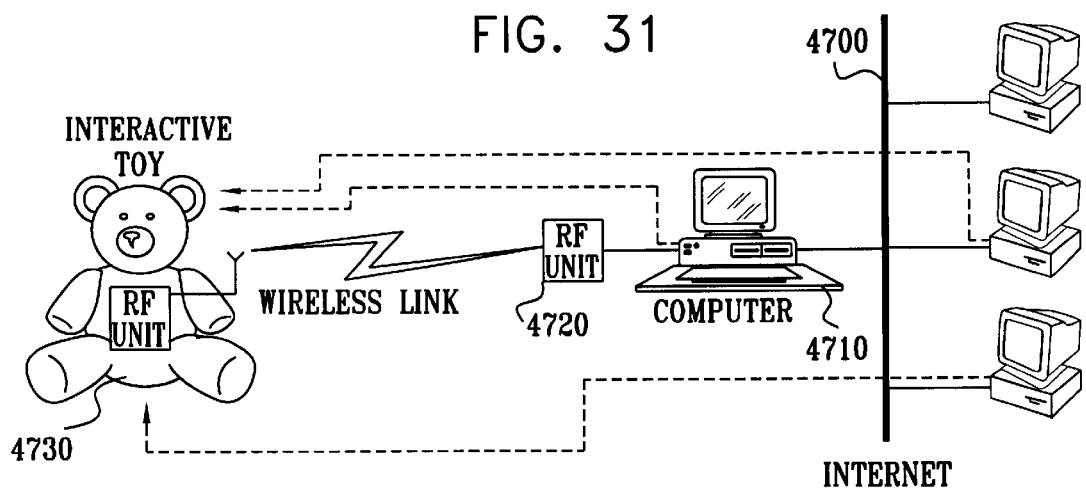
FIG. 31 shows a toy connected via a wireless link to a home computer via a direct wireless link, wherein the commands for operation of the computer come from one or more computers on a network, constructed and operative in accordance with a preferred embodiment of the present invention.

FIG. 31 shows an example in which a toy is connected via a wireless link to a home (or office or other) computer via a direct wireless link but that the commands for operation of the computer come either partially or entirely from one or more computers on a network. Some of the commands may come from the local computer. It is also possible that some of the commands come from hardware within the toy itself.

In the case in which one or more network computers control the operation of a toy it is no longer necessary to use a home or other local computer. This allows toy owners who do not have available a personal or other computers to operate interactive toys. Furthermore commercial or other establishments which wish to host users of toys would not need to own nor use computers for this purpose.

Figure 32:
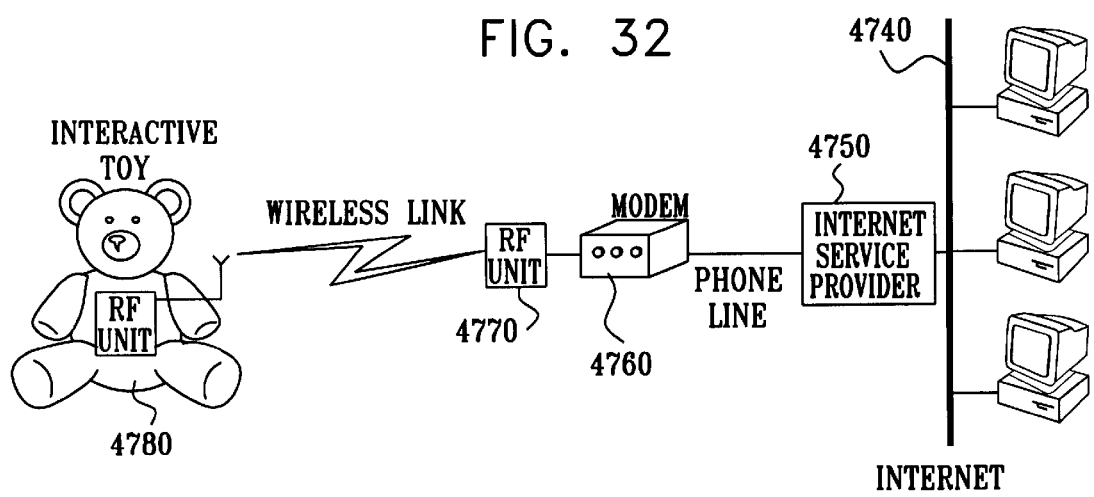
FIG. 32 shows a method of connecting a toy to computers on a network using a standard phone line, in accordance with a preferred embodiment of the present invention.

FIG. 32 shows a method of connecting a toy to computers on a network using a standard phone line. The system comprises an interactive toy connected by an RF link to an RF unit capable of transmission and reception. The RF unit contains hardware which converts a signal received from the toy to a signal capable of being sent by a standard modem connected to a telephone line (i.e. it demodulates the signal and digitizes it in case it is an analog signal) and, conversely it receives a digital signal from the modem and modulates it so that it can be sent to the toy by the RF unit.

Figure 33:
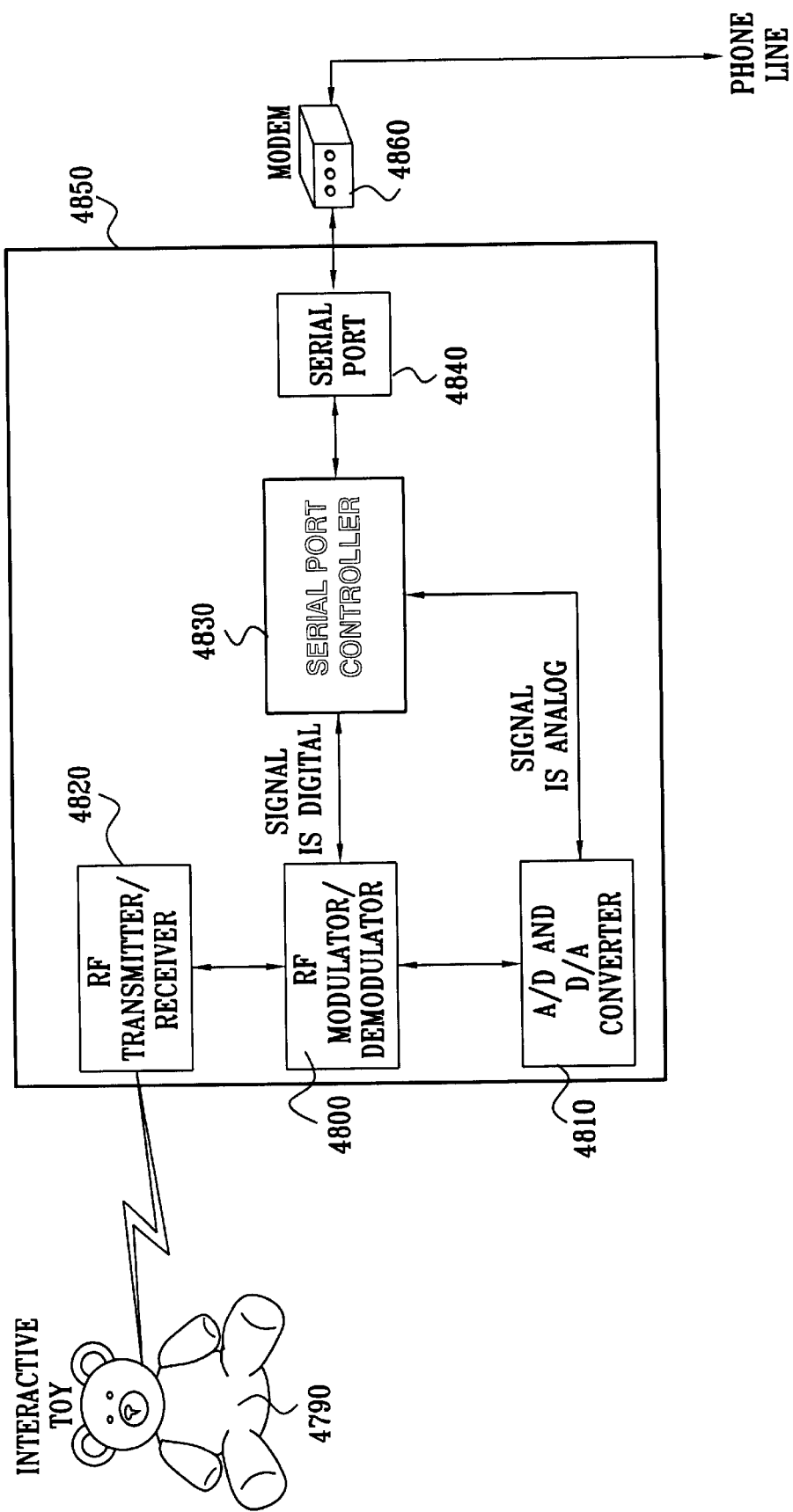
FIG. 33 shows typical components of a toy with an RF unit, constructed and operative in accordance with a preferred embodiment of the present invention.

FIG. 33 shows the components of such an RF unit. In a preferred embodiment of this invention the modem is an integral part of the RF unit. In this case a user plugs such an RF unit into a standard telephone line. A controller contained within the RF unit dials an Internet Service Provider and establishes an Internet connection and subsequently controls the connection. In another preferred embodiment of this invention all activity related to connection to the Internet is handled by the toy controller contained within a toy rather than by the RF controller. The controller within the toy senses whether it is communicating with a computer, with an RF controller connected to a modem or to any other possible Internet connection mechanism such as may be described later in this document. In either of the above cases a controller (either on the toy or on the RF unit) makes contact with a computer on the network whose role it is to control the toy's operation. Methods for establishing this connection are now described.

In a preferred embodiment of this invention the hardware in the above mentioned controller contains the Internet address (possibly the IP address) of a computer on the network which is authorized to control a toy. In another preferred embodiment of this invention the controller contains non-volatile read-write memory (such as eeprom memory) which stores the Internet address of the controlling computer so that the contents of this memory can be modified as required.

Figure 34:
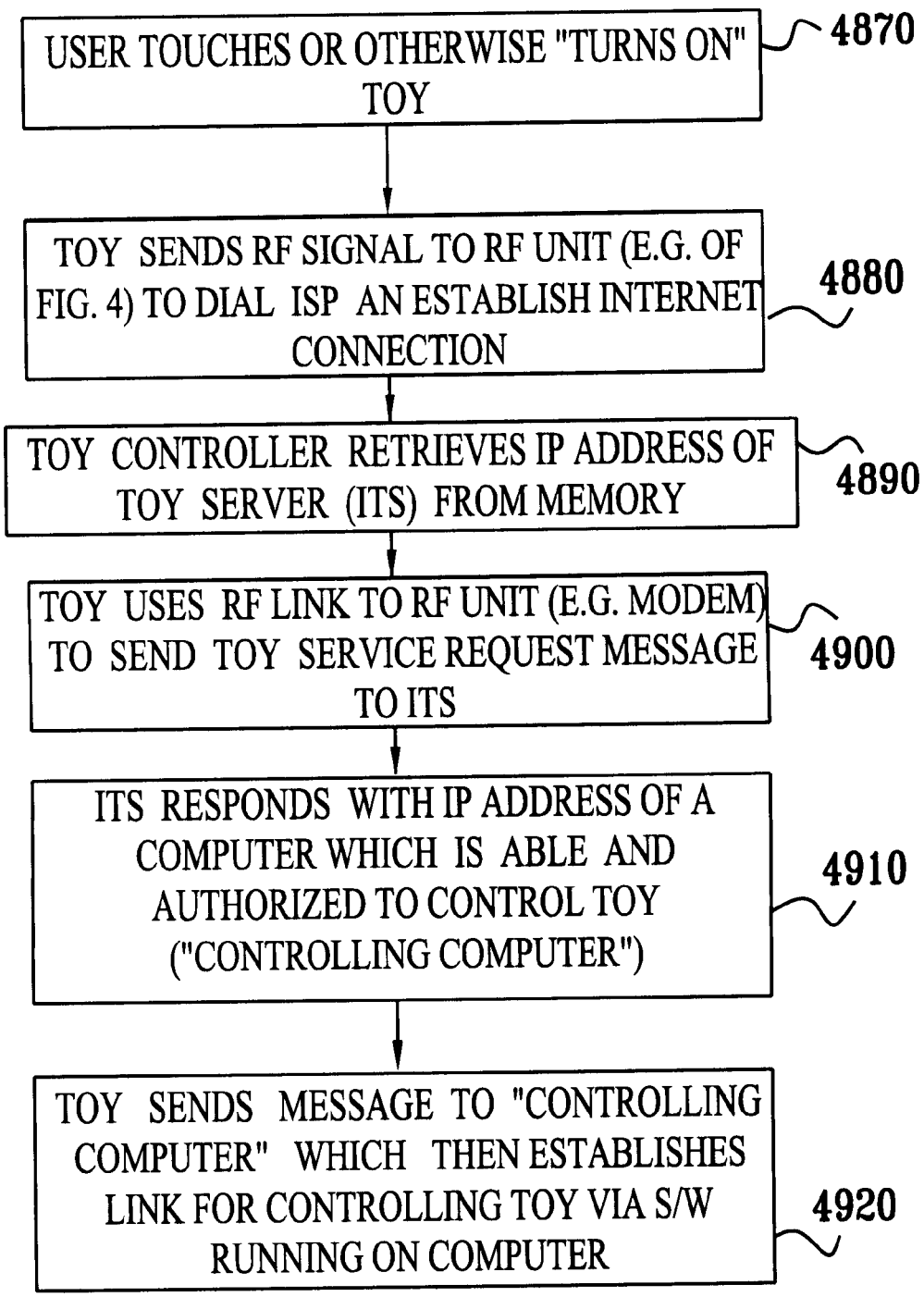
FIG. 34 is a flow chart of a toy controller contacting one or more servers on the Internet, constructed and operative in accordance with a preferred embodiment of the present invention.

FIG. 34 is a flow chart describing another preferred embodiment of this invention in which the controller contacts one or more servers on the Internet which are programmed to respond to such a contact by providing the Internet address of one or more computers which control the toy's operation.

In yet another preferred embodiment of this invention a controller broadcasts its Internet address (as assigned to it either dynamically or permanently by an Internet Service Provider or by any other means) to a computer network and requests computers connected to the network which are capable and authorized to control a toy. In a preferred embodiment of this invention each toy is assigned a permanent Internet address. In another preferred embodiment of this invention each RF control unit (such as in FIG. 33) is assigned a permanent Internet address. In a preferred embodiment of this invention specific Internet Service Providers (ISP's) are provided whose main purpose is to serve the community of toys discussed later in this document. In another preferred embodiment of this invention these special ISP's are the same as the Interactive Toy Servers (ITS) discussed later in this document. In yet another preferred embodiment of this invention ISP's which serve the general community of computer users provide special services to aid toy controllers with their connection to the Internet.

In another preferred embodiment of this invention the home, office, commercial or other establishment has a permanently established direct cable connection or a permanently established wireless connection to a computer network such as the Internet. In this case the toy connects to via its (first) RF unit to a (second) RF unit which is permanently connected to a computer network. The second RF unit contains hardware to convert a signal from a toy to a signal appropriate for transmission through the network or, alternately, to convert a signal from the network to a signal which controls a toy. An embodiment of this invention uses a setup as shown in FIG. 33 in which the modem is replaced by a device which connects to the serial port of an RF unit. As a basic example this device is a device provided by the ISP for connecting a computer to its network.

An example of the situation described in the previous paragraph is provided by Internet systems which are set up by cable television companies. These companies use the same cable (usually coaxial cables though fiber optic cables are used for parts of their network) that they use for providing television service to homes and other sites, in order to provide Internet service to these sites. Typically a device called a "cable modem" is provided which connects to the serial or other port of a user's computer and to the cable of the service provider. A Networked Interactive Toy connects to the cable network and to the Internet using this system in a manner similar to that shown in FIG. 33 in which the modem of FIG. 33 is replaced by the cable modem of a service provider.

Another example is provided by packet-switched Internet service often provided by telephone companies in which a user's computer is connected via a serial port or other port (often a USB port) to the service provider's line which is either a standard phone line or an upgraded line possibly using "twisted pair" lines. The service provider provides hardware to connect a computer to the Internet via these lines. The setup of FIG. 33 can also be used in this case with the service provider's hardware replacing the modem of FIG. 33. In a preferred embodiment of this invention hardware, which receives an RF signal from a toy and then converts it to a form capable of being transmitted directly through the above described cable or packet-switched phone line, is integrated into an RF base unit without necessarily using a serial port such as is shown in FIG. 33.

FIG. 35 illustrates another preferred embodiment of this invention in which an RF or other wireless transceivers connected to the Internet either directly or via a modem may be used in a very large home or business establishments in which the RF unit on a toy is not always within range of a main computer containing software for controlling a toy. The example shown is that of a shopping mall. In such a case several computers, or preferably a single computer together with several RF units as described in the previous paragraphs, can be set up which are connected via a network to the main computer. The toy then receives its control commands from the same computer on the network while it is mobile throughout the large home or business establishment. In the example shown in FIG. 35 one or more central computers run software to control all toys within the mall In case the mall is large, many RF units are set up throughout the mall which are connected via a computer network to the central computer or computers. A toy that roves throughout the mall connects to the closest RF unit. A central computer decides which RF unit receives the signal by choosing the RF unit with the strongest signal from the toy. (This is similar to typical methods employed in cellular phone systems.) A central computer identifies the RF unit which, at any given time, is receiving the strongest signal from the toy and uses that RF unit to communicate with the toy.

In a preferred embodiment of this invention a toy is connected via a wireless link to an electronic device which is connected to a computer network. Said electronic device is capable of establishing a network connection so that the toy is effectively connected to the computer network. Sensor and other signals from the toy as well as control signals to the toy are provided by one or more of the following:

1. The electronic device which may be a personal computer or any other device capable of controlling the toy. A device with significant computing power is preferred in order to provide speech recognition services and possibly video recognition services if one or more video cameras are provided on the toy.
2. One or more computer on the computer network. The computer network may be a local network such as an Intranet or a global network such as the Internet. In the latter case the possibly slow speed of distant connections may lead to a desire to provide some control by a local electronic device such as a computer.
3. Hardware on the toy itself. For example the toy may have an onboard computer which may provide some or all of the basic toy control services. Connection to a local computer and to the Internet may be used to provide more computing power, to allow the downloading of more content, to access a vast database of knowledge of interest to the toy (see later for details), to allow communication between two or more toys as well as other possible uses.

FIG. 36 shows an example of how an electronic device with a direct wireless link to a toy (if provided with independent computing ability) as well as one or more computers on a network combine either individually or together to control a toy. Additionally, an onboard computer may provide service for basic scripts involving short questions with short expected answers whereas more complicated scripts may be referred to a local PC or any computer on a network.

Thus far several examples of an "electronic device" which connects an interactive toy to a network have been mentioned including a computer, a specially designed RF unit connected to a modem, an RF unit connected to a cable modem and an RF unit connected to a packet-switched phone line.

Figure 37A:
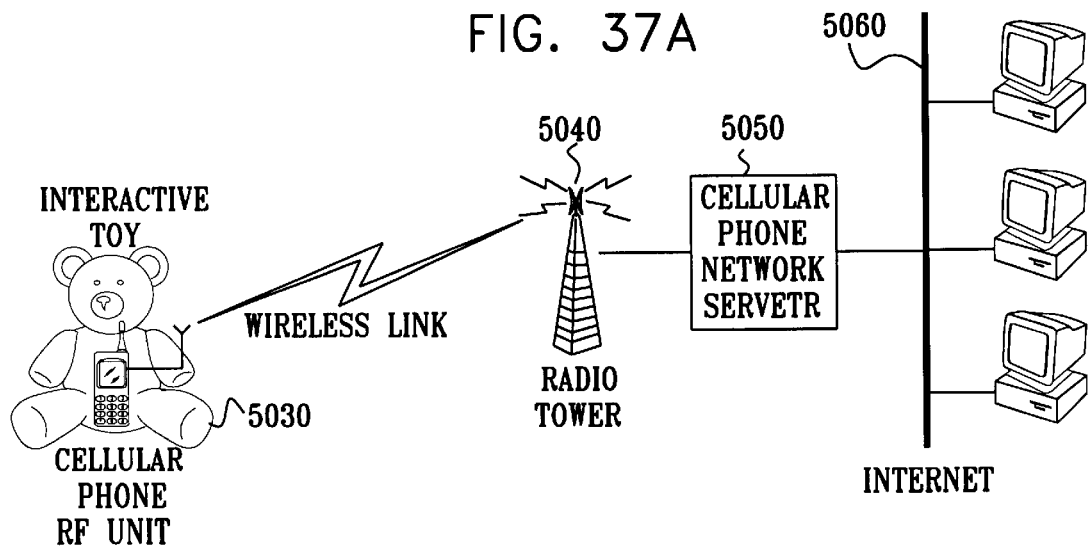
FIG. 37A show an Interactive Toy connecting to a computer network such as the Internet via a wireless phone system such as a cellular phone system, constructed and operative in accordance with a preferred embodiment of the present invention.
Figure 37B:
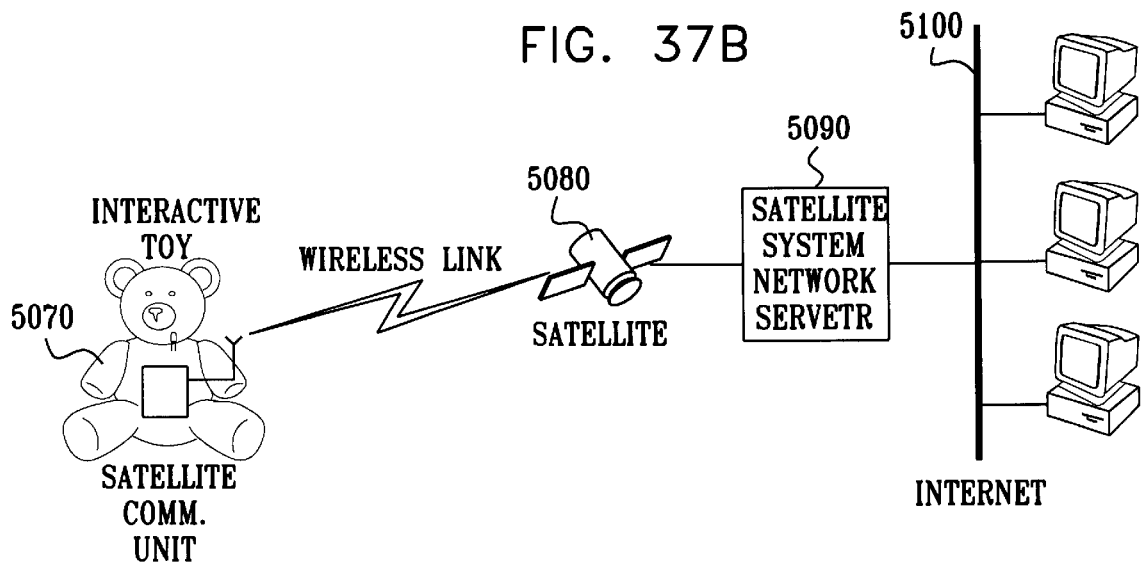
FIG. 37B shows an interactive toy connecting via a wireless link and via a satellite system to a computer network such as the Internet, constructed and operative in accordance with a preferred embodiment of the present invention.

FIG. 37A and FIG. 37B show two example methods by which an Interactive Toy may connect to a computer network such as the Internet via a wireless phone system such as a cellular phone system or via a satellite system. In this case a toy is provided with hardware which allows wireless communication with a cellular phone tower or a satellite and which allows the subsequent establishment of a network connection between the toy and a computer network.

FIG. 38 shows an example of how a cellular connection can be implemented using a standard toy controller for connecting a toy to a local PC using a toy controller as described in U.S. Pat. No. 5,752,880, to Gabai et al. Analog versions of such a standard toy controller encodes all speech and toy action in a standard audio format suitable for transmission through standard audio cables to a computer (PC) sound card. Such an audio signal is, in fact, sent to an RF unit to be transmitted to a local computer. Both input and output sound and action are transferred to an RF unit in a standardized manner capable of being directly connected to the input and output ports of a standard PC sound card such as, for example, a Sound Blaster compatible sound card. In the example of FIG. 38 a toy contains a possibly small computer (possibly a handheld computer) with a sound card and with a modem capable of connection to a cellular phone. The toy further contains a cellular phone which is capable of connecting to the modem and of connecting the computer onboard the toy to a computer network such as the Internet. The toy further contains a standard toy controller which connects to the computer by means of a sound card with which the computer is equipped. As in situations mentioned previously control of a toy may be done partly or mostly by the computer which is within the toy or, preferably, much of the control of the toy is done by a computer on the network to which the cellular or satellite phone connects the toy. The procedure for establishing a network connection may be similar to that shown in FIG. 34 as follows:

1. User touches or otherwise turns on toy
2. Toy controller senses this and causes computer within toy to be activated (either (preferably) woken from a sleep state or booted).
3. Computer loads and runs local toy control software and attempts to control toy locally
4. If requested actions are too complicated (such as, for example, the running of scripts which require significant speech recognition) or if network activity is requested (such as connection to other toys, downloading of content, or advertising or sales activity) then local computer uses cellular modem and phone to establish a network connection and finds (using one of the methods describe previously) a computer on the network which can be used to help control the toy.
5. In cases where all toy control is done on the network the above step is performed immediately when the toy is turned on.

Yet another example of an electronic device which provides a medium for connecting Interactive Toys to a network such as the Internet is an Interactive Television system. This method of Internet connection is especially suited for people who do not have a computer or who do not wish to use a local computer to connect to the Internet or for integration of computers with other entertainment systems such as interactive television. Standard operation of such a unit is often used as follows: A so-called "set-top box" is connected between a user's television set and the cable (such as, for example, a coaxial cable) provided by a Cable company or other Interactive Television service provider. This set-top box serves both as a decoder of a Cable Television signal so that it can be viewed on a Television set and as an Internet connection box allowing the Television to act as a network terminal. Thus, for example, email can be sent and received using either a cordless keyboard and mouse or the Televisions remote control switch, the net can be browsed and, especially, television programs and other Internet content can be downloaded via the cable network and the set-top box to the television. Set-top boxes typically include a powerful processor and possibly a significant amount of hard disk storage space. In some versions of such a system users may choose programs interactively and television programs may be written in such a manner as to allow users to interact with the show by clicking on certain parts of the screen and thus changing the content provided by the cable service provider.

Figure 39:
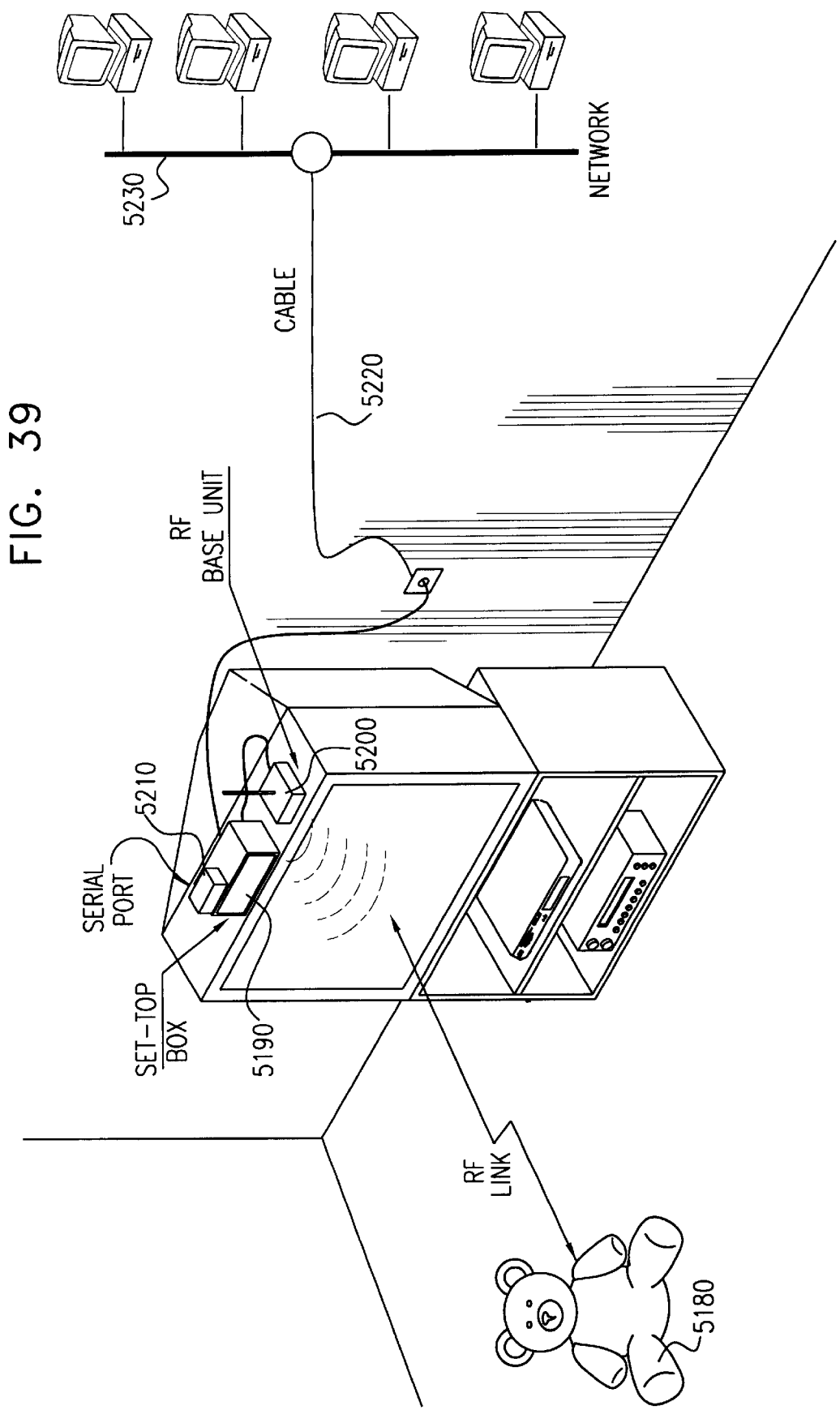
FIG. 39 shows an example of how a networked interactive toy is connected to a set-top box, constructed and operative in accordance with a preferred embodiment of the present invention.

FIG. 39 shows an example of how a networked interactive toy is connected to a set-top box. An RF link is provided between a toy and a base unit (comprising an RF transceiver) which is either connected to an available port (such as a serial or a USB port) of the set-top box or integrally designed within the set-top box. In FIG. 39 an RF base unit which comprises an RF transceiver is connected to a serial port on a set-top box. The RF base unit communicates with a toy via the toy's RF transceiver. In another preferred embodiment of this invention the RF base unit is integrated into the set-top box. An interactive toy now forms an integral part of the Interactive Television experience.

In a preferred embodiment of the present invention a toy connected to a set-top box is controlled by one or more computers on a computer network such as the Internet. In another preferred embodiment of this invention the toy is wholly or partly controlled by a computer which is also responsible for the transfer of Interactive Television content from a Cable Television service provider. In another preferred embodiment of this invention the set-top box comprises hardware capable of partly or wholly controlling a toy.

In yet another preferred embodiment of this invention one or more toys plays a role in Interactive Television entertainment which is sent to a Television viewer. Thus, for example, a toy may perform certain actions or make certain sounds which are coordinated with related actions and/or sounds on a television. The television program may respond in reaction to speech or other sensory input from a user to a toy. For example a user may say "I hate this program" and the television may respond by offering a different selection of programs.

Some other items related to Interactive Television with Toys:
1. Toy may be used as an advertising medium both due to its inherent entertainment value and due to a user profile which a computer maintains relating to a user and its toy.
2. Toy aids characters in advertisements to send user to a store or a web sites.
3. Game may be played which requires user to visit another Interactive TV site and bring his toy to win prizes or better content.
4. It is preferred that such a site be a commercial establishment.
5. Interactive Toy adds speech recognition as well as other sensors and actuators of a toy to the interactive ability of Interactive TV.
6. Toys with personalities or physical forms similar to characters on television may be used to make shows more entertaining.
7. Toys at various sites (for example homes) may be used together (collectively) to aid in entertainment value or to play multi-user games.

As an example, a scene in a movie may proceed differently depending on whether most people cheered or booed at a specific previous scene.

In recent years there has been a revolution in the manner in which entertainment, education and commerce is being delivered to homes. This is partially a result of the merging of two extremely powerful entertainment, education and commercial media namely television (including movies which have been integrated into television systems for several decades) and computer networks such as the Internet. The merging of these two systems has become possible due to the continuously improving bandwidth of communication systems which provide broadband analog and digital links to homes worldwide. On the one hand Cable Television systems provide television programming to homes worldwide by connecting televisions in homes to coaxial cables or to satellite dishes which then often use extremely broadband links such as fiber optic links to connect to the Cable Service Provider. On the other hand digital data networks are being installed in people's homes at a very high rate either by cable companies themselves using an upgraded digital infrastructure (for transmitting data on coaxial cables) or by telecommunication companies which use packet switching technologies to provide Internet service to subscribers' homes.

Due to the merging of television and computer networks, the distinction between browsing the Internet and watching television programs and/or watching movies or commercials on television is being greatly reduced. Full length digital movies may be downloaded from the Internet as can music with CD quality (currently using MP3 or similar compression schemes) as well as a wide range of e-commerce activities. Computers in subscribers' homes are capable of controlling this content. For example they are capable of pausing, rewinding or fast-forwarding a movie.

There are currently available worldwide a broad range of Interactive Television systems which merge computer and television technologies into an integrated solution. Interactive Television systems such as, for example the system provided by Scientific-Atlanta Inc.) give viewers a convenient way to interact with programs and advertisements while they continue to watch TV. By clicking a remote control unit during an enhanced program or by use of a cordless keyboard or mouse, a viewer can access program—related information such as weather, news, sports updates, trivia and interactive games. A viewer may also request product samples, product descriptions, coupons and other free offers from advertisers as well as using e-commerce facilities to make purchases online. In some systems (such as a system by Peach Networks) a viewer may use a mouse, keyboard or simply a remote unit to send and receive email and even run any computer application by using programs installed on a server accessible via the interactive television network (which, in fact, connects to the Internet).

Interactive Television systems typically use a device called a set-top box which is connected to a viewer's television set and to the cable provider's network. The network connection is usually via a coaxial cable although there are systems in which telephone lines are used for outgoing data and coaxial cables for incoming data. Satellite communication as well as fiber optic cables are often utilized as part of the infrastructure of these systems and, in the future, individual homes may be provided with connectivity to fiber optic or other extremely high bandwidth communication lines. An Interactive TV set-top box is equipped with a microprocessor or other computer chip which controls both signals from the service provider and signals coming from a viewer and meant to control entertainment content. Incoming signals are typically received via a remote control unit but may also be received by a cordless keyboard and/or mouse. Set-top boxes are typically provided with serial or USB (Universal Serial Bus) interfaces to enable connection of other electronic devices to the set-top box.

A preferred embodiment of the current invention describes the integration into this system of yet another powerful entertainment and commercial medium namely the medium of Networked Interactive Toys.

Figure 40:
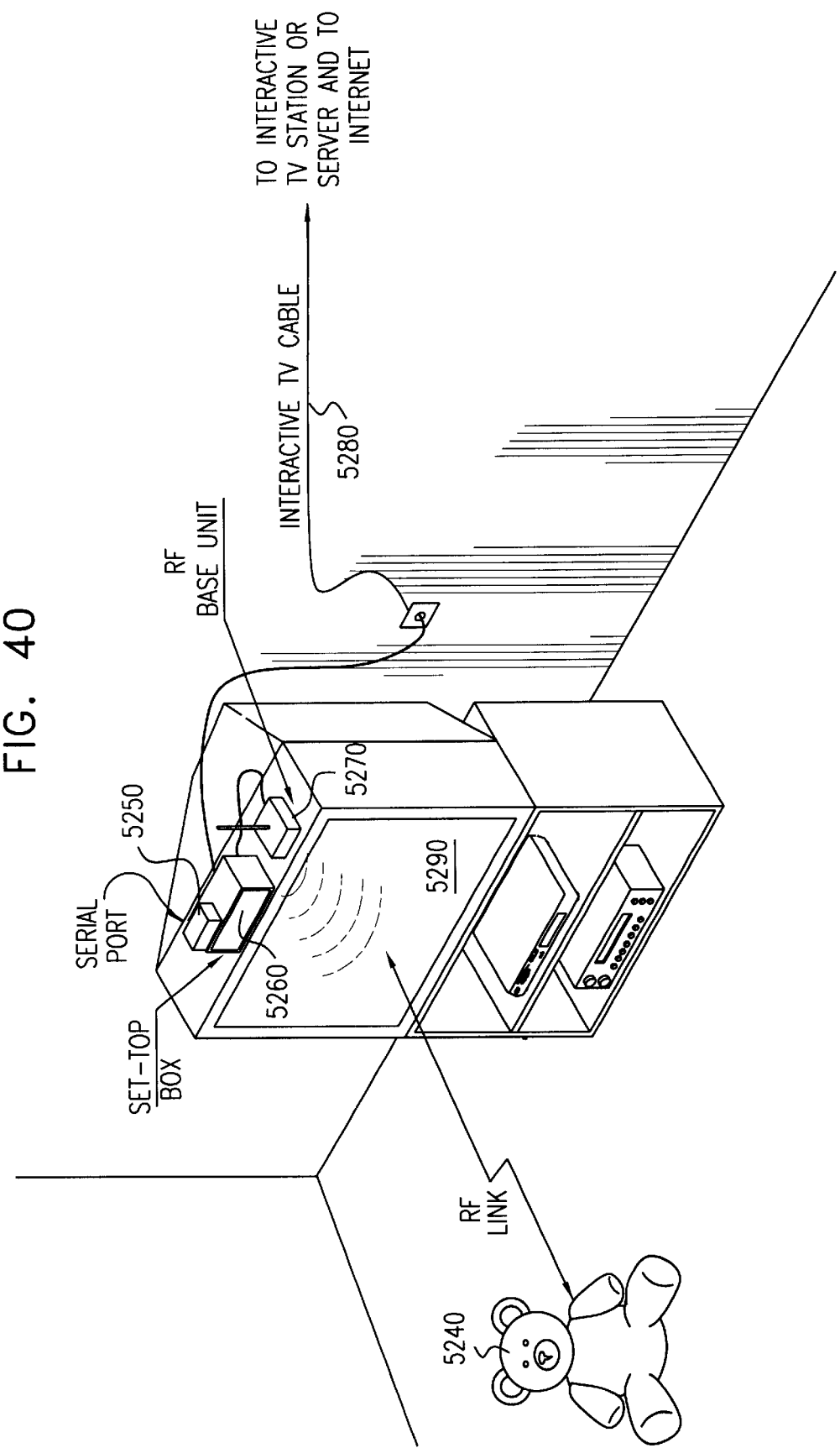
FIG. 40 shows an electronically controlled toy with an RF transceiver connected to a set-top box which connects to other wireless communication systems, constructed and operative in accordance with a preferred embodiment of the present invention.

FIG. 40 shows a sketch of a system described by a preferred embodiment of the current invention. The system comprises an electronically controlled toy with an RF (radio frequency) transceiver connected by a wireless link to a base unit with its own RF transceiver. The base unit is connected to a serial or USB port of a set-top box such as, for example, the set-top box of Scientific-Atlanta Inc. (for example Explorer 2000). The set-top box is connected to a household television set as well as to a cable (typically a coaxial cable) provided by the Interactive Television service provider.

Figure 41:
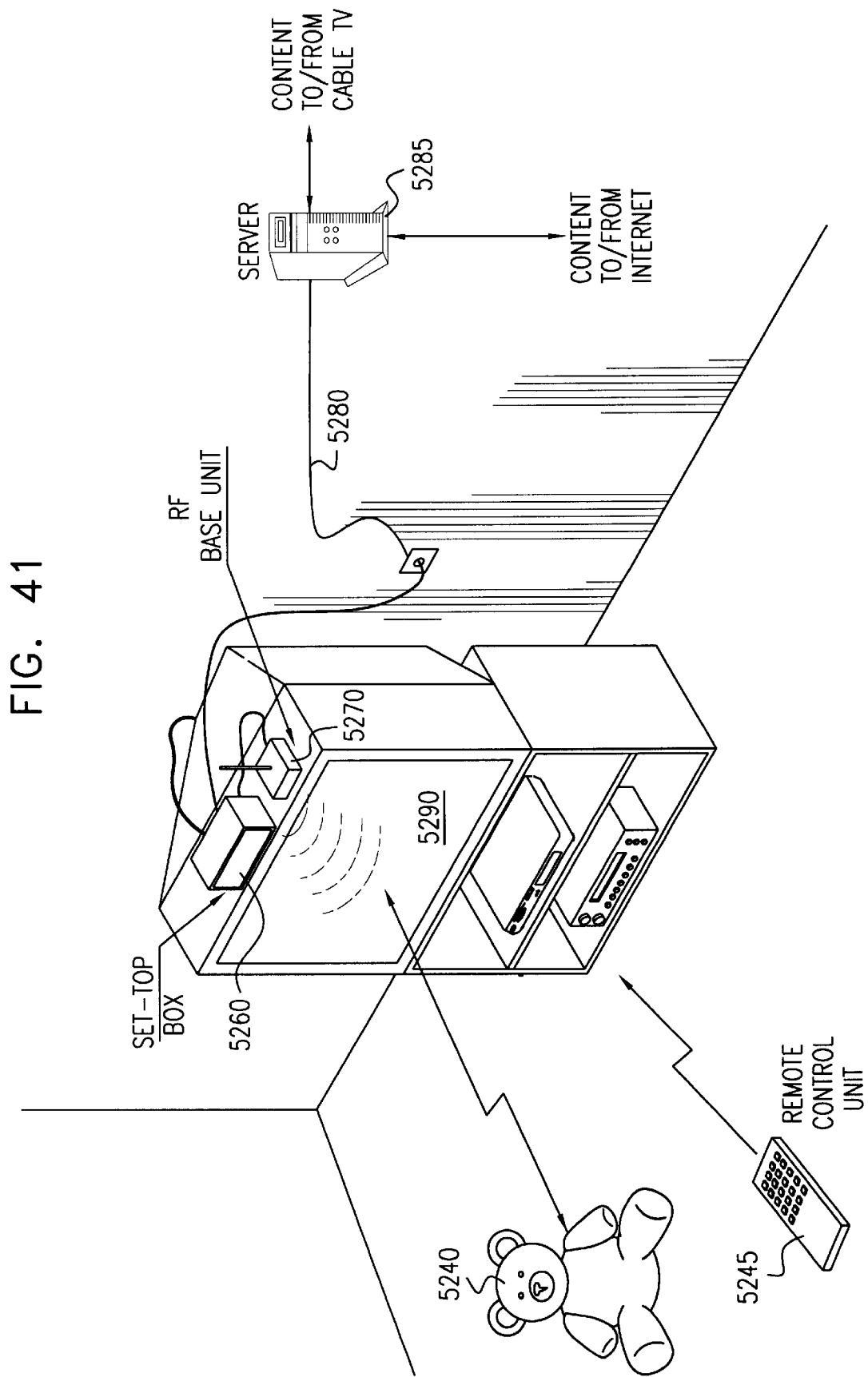
FIG. 41 shows a toy linked to an Interactive TV network, via a set-top box, constructed and operative in accordance with a preferred embodiment of the present invention.

FIG. 41 shows a preferred embodiment of this invention in which the Interactive TV network comprises a server such as is provided, for example, by Peach Networks Inc. which is a computer which controls all data including television data which is sent to and received from the set-top box. This is accomplished using the fact that the set-top box is equipped with a microprocessor and is provided with an operating system such as, for example, the operating system provided by Power TV Inc. referred to as Power TV™. The combined ability to control the server computer and the microprocessor onboard the set-top box allows for flexible control of all input and output to and from the set-top box including full integration of input and output from the USB or serial port of the set-top box. By connecting an interactive toy system to the serial port of a set-top box and employing toy control software on the server computer and on the microprocessor of the set-top box we are able to fully integrate Interactive Television content with an Interactive Toy system.

Figure 42:
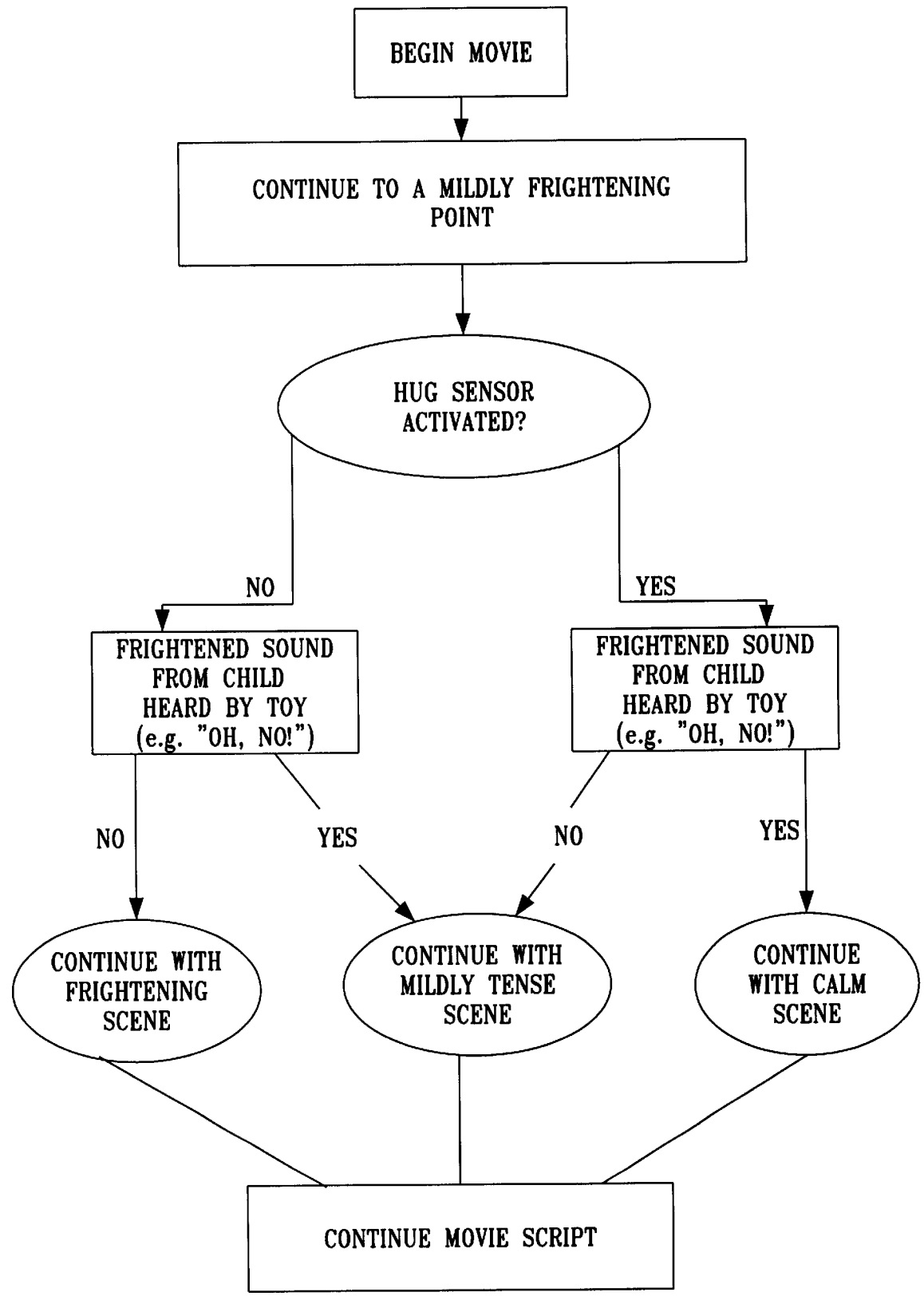
FIG. 42 is a flow chart describing how an Interactive Toy is employed to change the content of a movie, advertisement or other Interactive Television content, constructed and operative in accordance with a preferred embodiment of the present invention.

FIG. 42 is a flow chart describing how an Interactive Toy is employed to change the content of a movie, advertisement or other Interactive Television content. In this flow chart a movie has been specially designed for Interactive Television by providing, at a crucial stage of the movie, three alternative scripts. One script which is very frightening, one which is very calming and the other which provides only a limited amount of tension to a viewer. A mildly frightening scene is shown immediately prior to the point at which the movie splits into these three alternative. In this example a toy is equipped with a sensor which senses whether the toy is being hugged and a microphone to detect user's speech and speech recognition software on the server able to recognize user's words. During the mildly frightening scene the toy senses whether user has hugged toy and whether any verbal indication of fright has been received. There is then a split in the scene of the movie depending on user's input. In this example the various scenes of the movie recombine into a single continuation of the script. It is appreciated that the various scripts may proceed completely independently after the choice between them is made.

Figure 43:
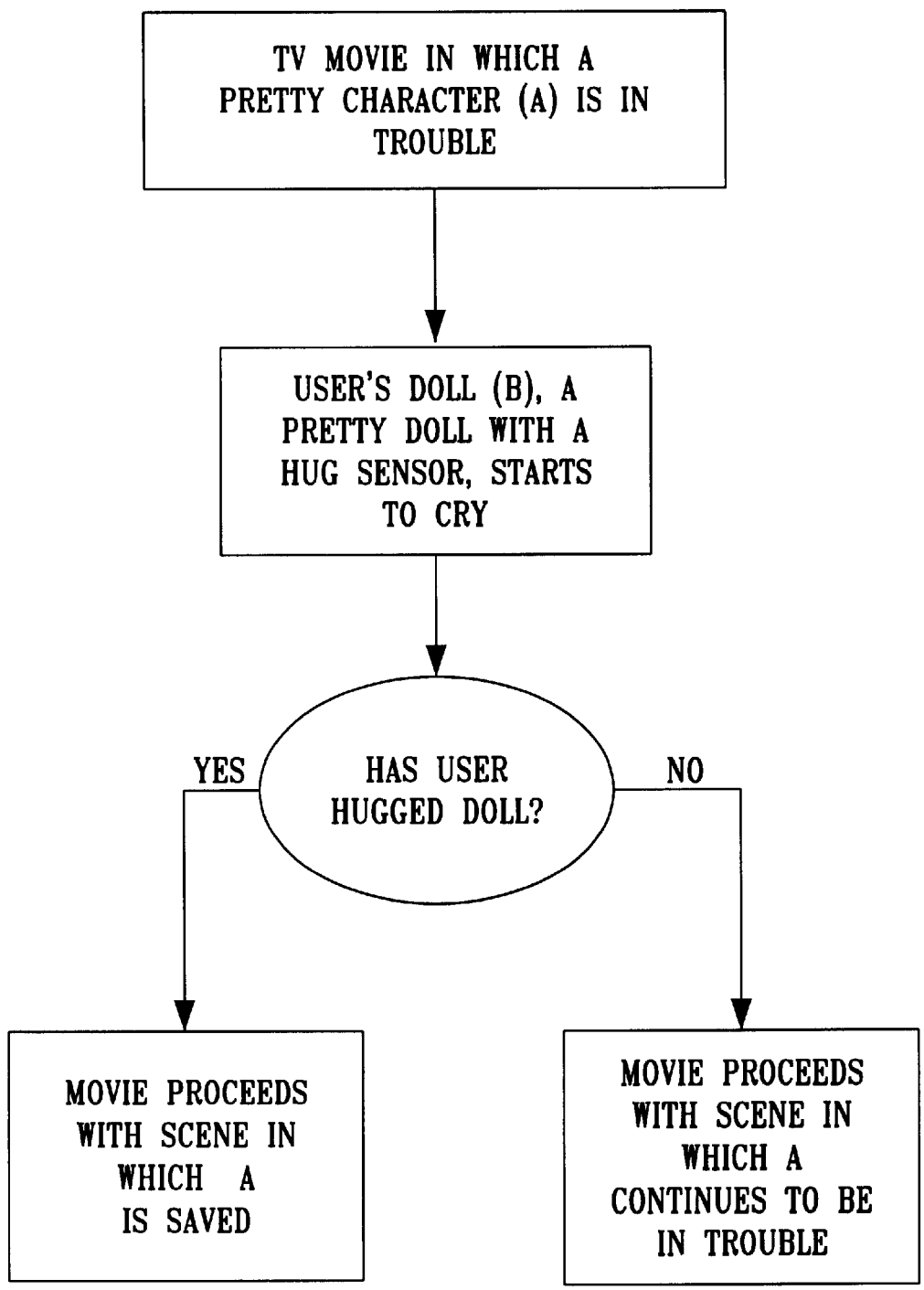
FIG. 43 is a flow chart showing how an Interactive Toy participates in a television or movie script, in accordance with a preferred embodiment of the present invention.

FIG. 43 is yet another flow chart showing how an Interactive Toy participates in a television or movie script. In this example a toy is portrayed as a pretty girl and another pretty girl in a movie is in a frightening situation and requires consoling. The script in the movie changes depending on whether the viewer has consoled his toy or has simply ignored his toy. In this example the user's doll cries during a scene in a movie in which the protagonist is in trouble. If the user hugs the doll as if to comfort the doll then the protagonist is saved from trouble. If the user does not hug the doll then a version of the movie script is played in which the protagonist continues to be in trouble.

Figure 44:
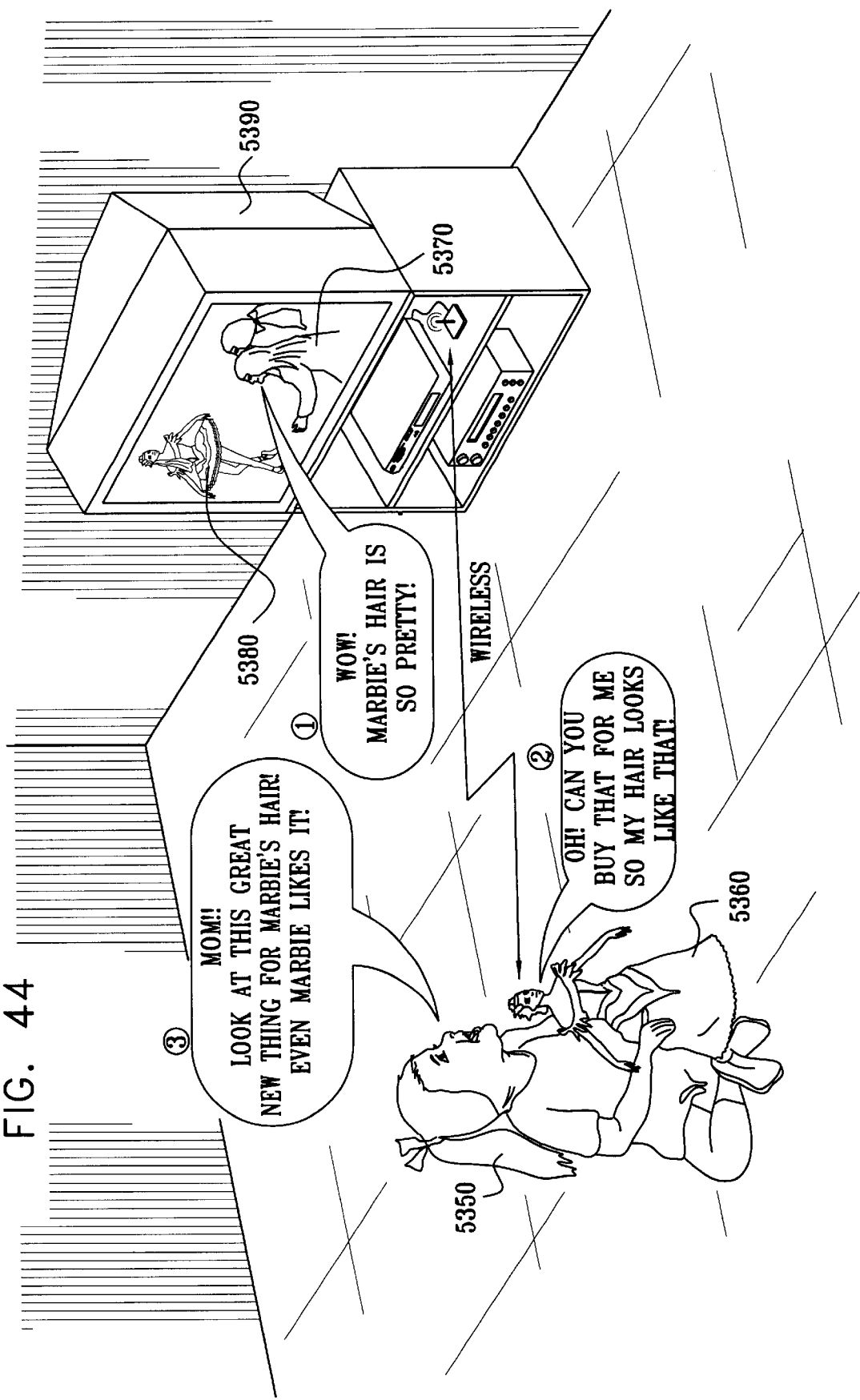
FIG. 44 shows a pictorial example of a way in which a toy is an active participant in an Interactive Television program, in accordance with a preferred embodiment of the present invention.

FIG. 44 shows a pictorial example of yet another way in which a toy is an active participant in an Interactive Television program—in this case an advertisement for new doll clothes. The advertisement shows a girl and her doll on television and the girl is excited about the doll's new dress. A child is watching this advertisement with her doll. Using its communication ability with the set-top box the physical doll expresses excitement with the new dress and asks the child for one as well. The child is impressed and informs her mother that even the doll enjoys the dress.

At this point it is appreciated that the toy may recognize the child's positive response to the advertisement and make an entry in a database on a server computer on the Internet that this interactive advertisement has been successful with the user. Such an entry into this database may be used for statistical purposes on effectiveness of the advertisement, for profiling purposes i.e. to note the kinds of ads this particular user responds to, and for billing purposes. The sales promoter may be billed an amount depending on the number of viewers for which the ad was successful.

The following example interaction shows another way in which a toy can influence and be influenced by Interactive Television:

EXAMPLE I

User: I'm Thirsty!

Toy identifies the word "thirsty".

Toy checks user information database and finds that user likes soft drinks.

Toy checks sales promotion database and finds that this week advertiser A has outbid advertiser B, i.e. has offered a higher fee for advertising his product Toy: "Come to the television and see what I have for you!'"

Child: "Sure"

Toy downloads television ad for product A and participates in the ad by singing and making motions as programmed by the advertiser.

Toy: "Just take me to the store and you'll get a discount on Product A!"

In the above example the promoter of product A will be billed an additional amount if user actually goes to the store to buy the product.

It is also possible for user to request information on characters participating in a television program or request comments on a particular scene. Thus, for example, if there is a political speech being made by a politician a user may request running commentary on the political speech by a commentator of his choice. He may do this by simply asking the toy using key words which can be identified by the toy's speech recognition capability.

Another preferred embodiment of the present invention comprises an integrated system of home entertainment and home automation in which one or more interactive toys participates in and/or provides control of household devices including entertainment media, appliances and other electrically controlled household devices. Commercial applications of interactive toys when used in conjunction with the aforementioned system are further provided.

Home automation systems are known in the art. Examples of such systems are described by "HomeVision" of "Custom Solution Inc.", "Home Control Inc.", and "CyberHouse" (trademark). Such systems typically provide a variety of methods of controlling and monitoring household appliances using a home PC, a variety of appliance controllers and sensors, and possibly an Internet connection. With the advent of broadband Internet connections including Interactive TV, Cable Internet as well as Satellite TV and Internet, and direct Internet Digital Subscriber Line (DSL) connections the idea of home control has expanded to include systems in which home entertainment (television, video, stereo, DVD etc.) is integrated with home computing and with home automation systems (appliance control, climate control etc.). In fact since Interactive TV systems use a set-top box which contains a powerful processor, it is now possible to provide centralized control from such a set-top box.

Since the set-top box is connected to the Interactive Television system (either via cable, satellite, phone lines or other Internet connection method) it is possible to integrate all electronic devices in a home with television, movies, entertainment as well as with all forms of Internet content. Furthermore it is possible for a user to control such a system from any computer on the Internet so that, for example, a parent at work may control, from a computer at work, which programs his child may watch on television or at what temperature the air conditioning is set. This control can even be done while a user of the system is traveling by using, for example, an Internet connection of a cellular phone such as provided by the Wireless Application Protocol (WAP) system. Thus, with such new integrated systems, the television, stereo, movie, appliance, security, climate control, computer, Internet, e-commerce and other home systems all function as an integrated system with applications and functions which are shared between these various systems.

The present invention describes a method of adding yet another element to such a home automation system by including Networked Interactive toys as part of the aforementioned integrated system. As will be appreciated in accordance with the following description, the integration of one or more interactive toys into an integrated entertainment and home automation system considerably enhances the efficiency, entertainment value, commercial value and ease of use of such a system. In particular, interactive toys provide a control interface for home automation that is especially suitable for children. Even for adults, databases kept by a local computer as well as by an Interactive Toy Server as described elsewhere in this document allow automated personalization of home control, entertainment, sales promotion and other material provided by such a system. In this way, interactive toys offer a unique opportunity to enhance the entertainment and commercial value of integrated home entertainment and automation systems.

Figure 45:
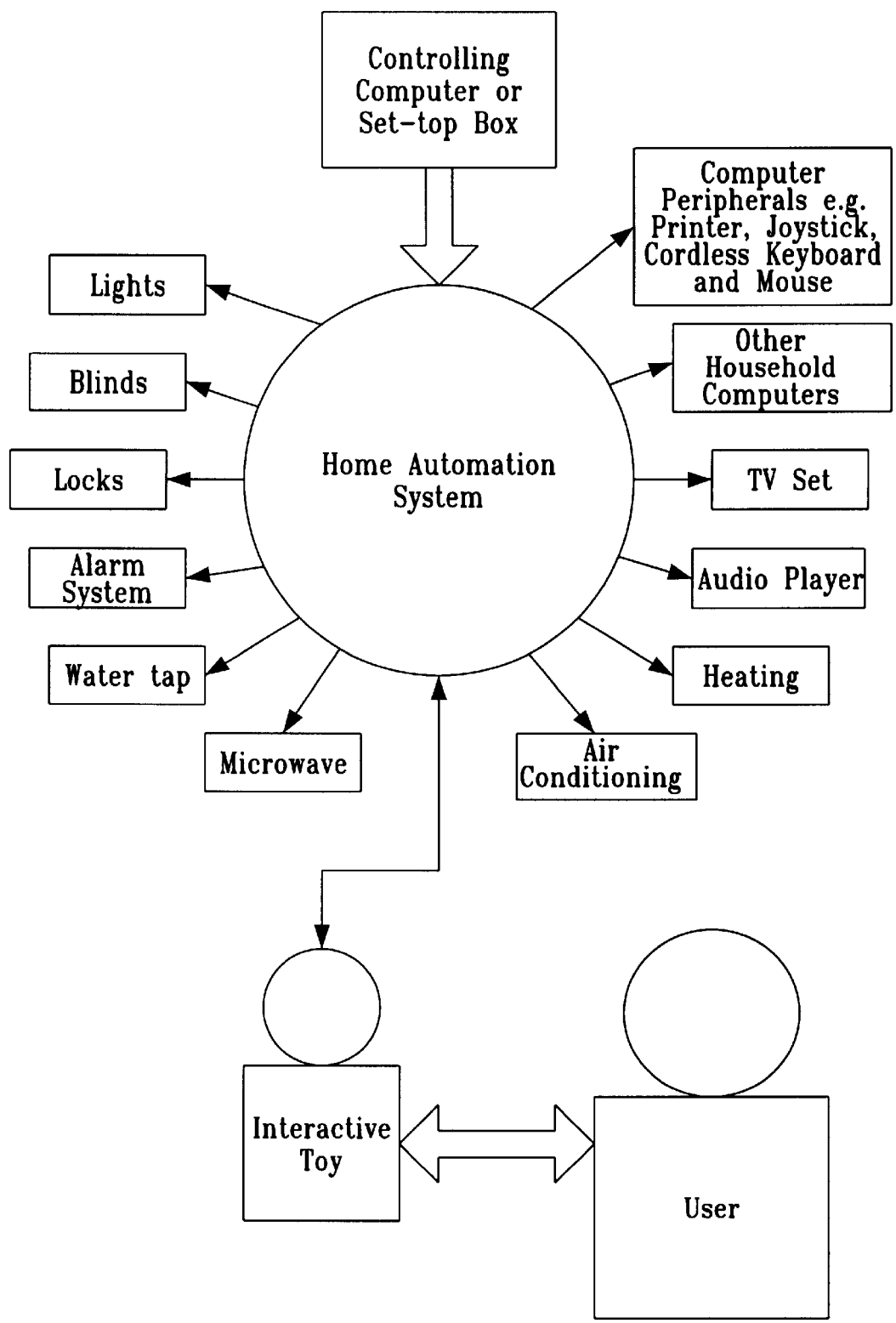
FIG. 45 shows schematically a system comprising an interactive toy linked to a home automation system, constructed and operative in accordance with a preferred embodiment of the present invention.

FIG. 45 shows schematically a system described by a preferred embodiment of the present invention which comprises one or more of the following elements:

1. One or more entertainment devices such as, for example, televisions, stereos, CD players, DVD players etc.,
2. One or more household appliances such as, for example, microwave oven, ordinary oven, refrigerator, washer etc.
3. Climate control devices such as thermostat, air conditioning/heating control, electrical curtain/blind control etc.
4. Other home automation devices such as home alarm, car alarm, garage door control etc.
5. One or more home computer and/or electronic game systems including computer peripherals including joystick, mouse, keyboard (which may be cordless), printer etc. Such computers are preferably connected to a computer network such as the Internet either by a phone line or by any other broadband technology such as, for example, a cable modem, DSL connection, fiber optic connection, satellite connection or by any other means.
6. Interactive Television system including a Interactive Television set-top box connected to an entertainment/telecommunication/computer network such as the Cable TV network, phone system, Internet, Satellite communication system etc.
7. One or more computing devices such as, for example, a home computer or an Interactive Television set-top box whose function is to serve as interface for the system's user/s and to coordinate and integrate the functioning of the various components of the system.
8. An Interactive Toy controlled either by one of the computing devices in the home or by a computing device on a network accessible to the toy. An interactive toy may be controlled, for example, by a set-top box in the home, a home computer, a computer on the Internet either via a direct network connection or, if so equipped, using cellular telephone or other wireless technology to connect directly to the Internet (for example the WAP (Wireless Application Protocol) system used in cellular communication). An interactive toy serves several purposes:
   a) It plays an active role in entertainment, education and sales promotion content provided by the system.
   b) It provides an interface between a human user and the integrated system described above which is more user-friendly than sitting at a computer terminal.
   c) Interactive Toys are preferably part of a global network of a global network of interactive toys which participate in an integrated living experience combining education, entertainment, sales promotion and home automation.
   d) An Interactive Toy server maintains a database of user experiences with Interactive Toys allows personalization of all the elements mentioned above and thus makes the living experience provided by such a system more relevant to an individual user or to a family.

Interactive toys typically connect to a controlling computer in a variety of ways which can be classified into two main categories.

1. A computing device such as, for example, a PC or an Interactive Television set-top box at a home site controls a toy. Thus, for example, a toy may be wirelessly connected to a personal computer or a set-top box that is preferably further connected to an Interactive Toy Server via the Internet.
2. A computer on a network remotely controls a toy via a public communication network. Thus, for example, a toy is connected to a TV set-top box that provides Internet connection thus providing a connection to a computer on the Internet which controls the toy as well as connection to an Interactive Toy Server. Alternately a toy may contain cellular communication capabilities so that using, for example, the WAP (wireless application protocol) system it may connect to the Internet directly and be controlled by a computer on the Internet.

Figure 46:
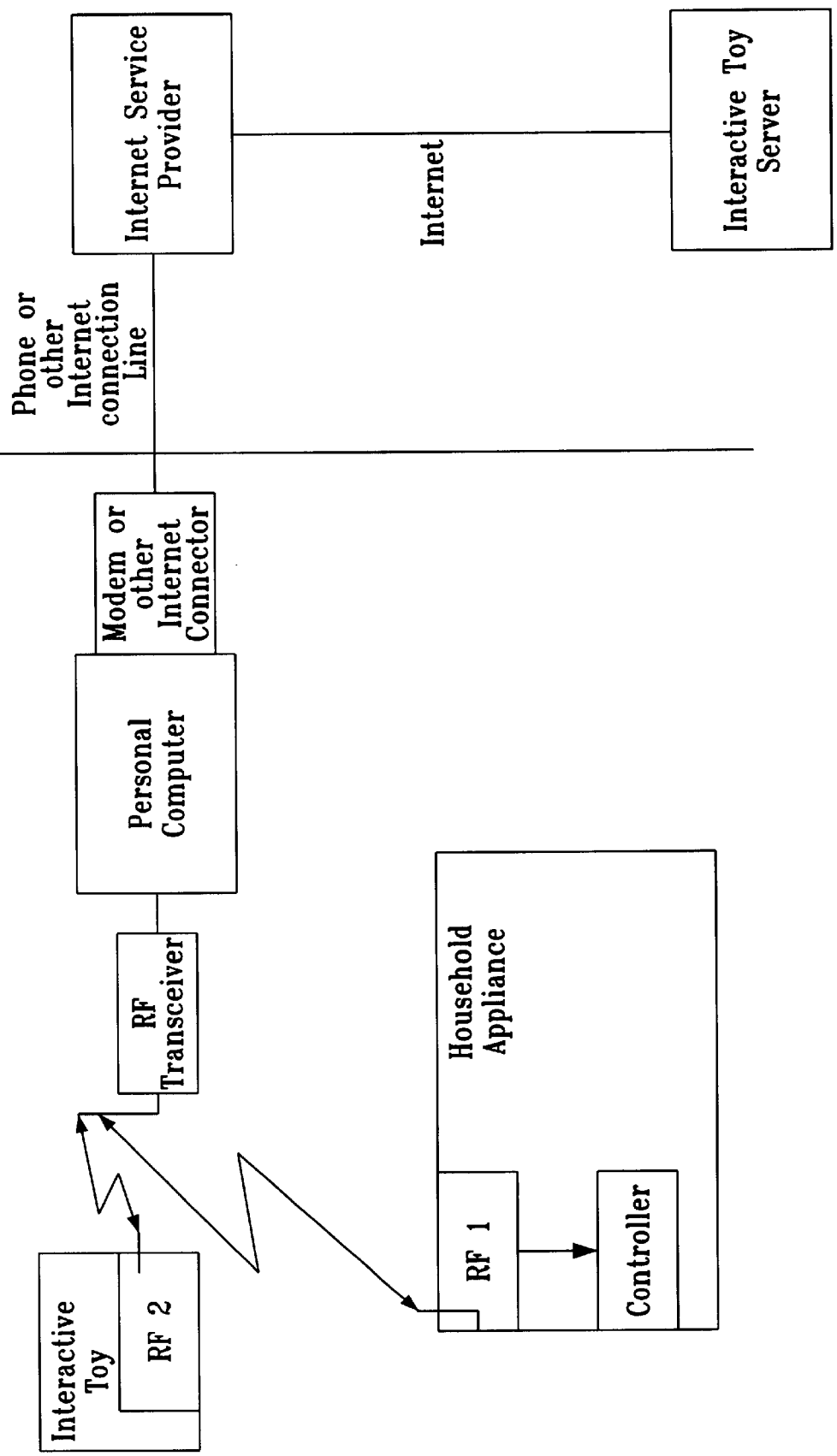
FIG. 46 shows connections between a toy, an integrated entertainment, a home automation system, and a controlling computer, constructed and operative in accordance with a preferred embodiment of the present invention.

FIG. 46 shows two examples of how an integrated entertainment and home automation system is connected to a controlling computer. In FIG. 46 an example of a household appliance controlled by a home personal computer is shown. In this example both the household appliance and an interactive toy are wirelessly connected to a computer. Wireless transmission from the computer's base (designated as RF transceiver in FIG. 46) is received by an RF unit on the household appliance (RF 1) that connects to the appliance's controller. Such a controller is typically built into the household appliance and allows controlling its various functions. In case of simpler devices such as lights or locks, a controller basically sets the device on or off and is preferably connected to the power line rather than built into the device itself. It is preferred that sensors detect the position of a controller, and information about it be transmitted to the controlling computer. It is also preferred in such a case that a computer monitor the state of a household appliance as manually determined by a user. It is further preferred that a controlling computer monitor the function of a household appliance in other ways such as, for example, receiving input from a thermostat within an oven.

The wireless connection shown in FIG. 46 is typically employed in the case of interactive toys and allows transmission of both speech and nonverbal control of a toy. However, in the case of a household appliance that is not intended to be moved about, roughly the same functionality can be attained by using a wired link to the controlling computer. In such a case, the RF unit on a household appliance is replaced by a digital interface suitable for receiving transmission from the controlling computer and passing it on to the controller of the appliance.

As further shown in FIG. 46, a controlling computer preferably has an Internet connection that allows connection to an Interactive Toy Server (ITS). Typically, such a connection is used, for example, for downloading content for an interactive toy, for providing interconnectivity between toys and for providing relevant information regarding a system to the server. In a preferred embodiment of this invention a computer on an Interactive Toy Server preferably takes part in controlling household appliances. For example, the Interactive Toy Server provides connection to appropriate database records, and a personal computer in the home controls a household appliance in accordance with information retrieved from one or more such database records. This issue is discussed in greater detail below.

In a preferred embodiment of this invention a household appliance is equipped with a microphone and preferably also a speaker. In accordance with this embodiment of the invention, a household appliance both fulfills its normal function and also interacts with its user in a way typical to interactive toys. For example, a user can control the household appliance by voice and/or be entertained by the appliance. This embodiment of the present invention is described in detail in a published PCT entitled "Apparatus and Method for Controlling Household Appliances" (WO98/4345) of Gabai et. al.

Figure 47:
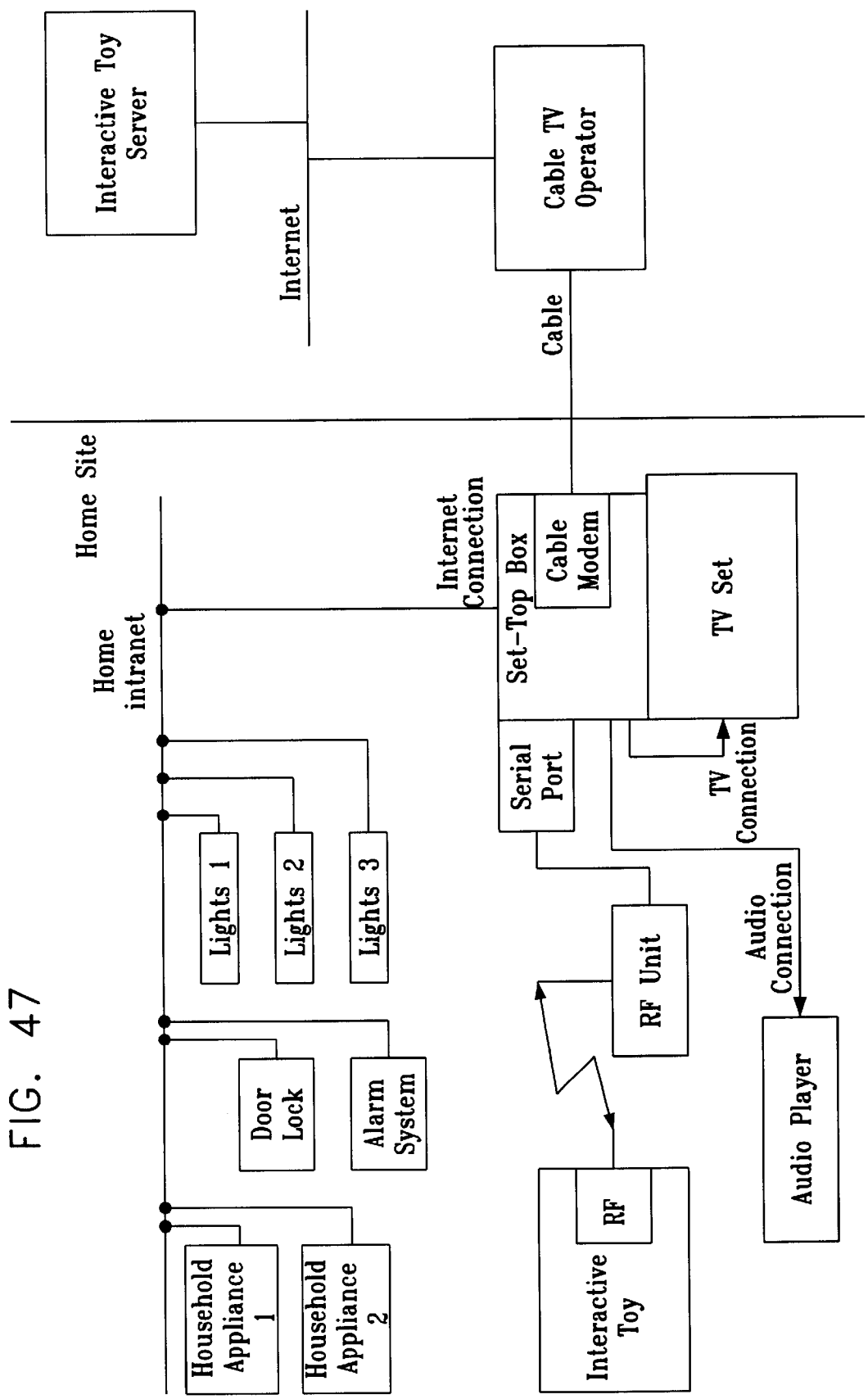
FIG. 47 shows a cable TV set-top box connecting to a variety of household appliances to a computer on a network, constructed and operative in accordance with a preferred embodiment of the present invention.

FIG. 47 shows another embodiment of the present invention in which a cable TV set-top box is used for connecting a variety of household appliances to a computer on a network. There currently exist a variety of interactive TV systems with set-top boxes supplied by leading manufacturers such as Sony, Phillips, Scientific Atlanta, General Instruments, Uniview Technologies, Paradise Innovations, Meternet Corporation, Teknema and Eagle Wireless that provide broadband Internet connection over communication channels that also provide analog and digital television signals. These systems thus allow integration of television and the Internet so that, for example, they allow a user to browse the web via their television sets using, for example, a cordless keyboard and mouse or even just an infrared remote control unit. Such systems are especially suitable for users who do not wish to use a personal computer, or in countries where the best Internet connection are provided by cable operators.

In the example shown in FIG. 47, a set-top box comprising a cable modem is connected to a cable operator that provides both Interactive Television services as well as connection to the Internet. The Internet connection provides connection to a controlling computer which in accordance with this embodiment of the invention is a computer connected to an interactive toy system's server (ITS). The set-top box provides a connection to the TV set as well as an Internet connection for the whole Intranet of household appliances. In addition, the set-top box provides a wireless connection to an interactive toy via a serial port. In accordance with this embodiment of the invention, the computing power is preferably provided partly by the aforementioned computer on the system's server and partly by a processor within the set-top box. For example, the processor on the set-top box manages the home automation Intranet whereas the more complex processing involved in the toy's speech or a "text-to-speech" program requiring a large amount of disk storage or memory may be handled by a remote computer on the system's server.

In another preferred embodiment of this invention, a TV set-top box provides connection to a computer on a network via a wireless communication network such as, for example, a cellular or satellite communication network or wireless Internet connection.

Figure 48:
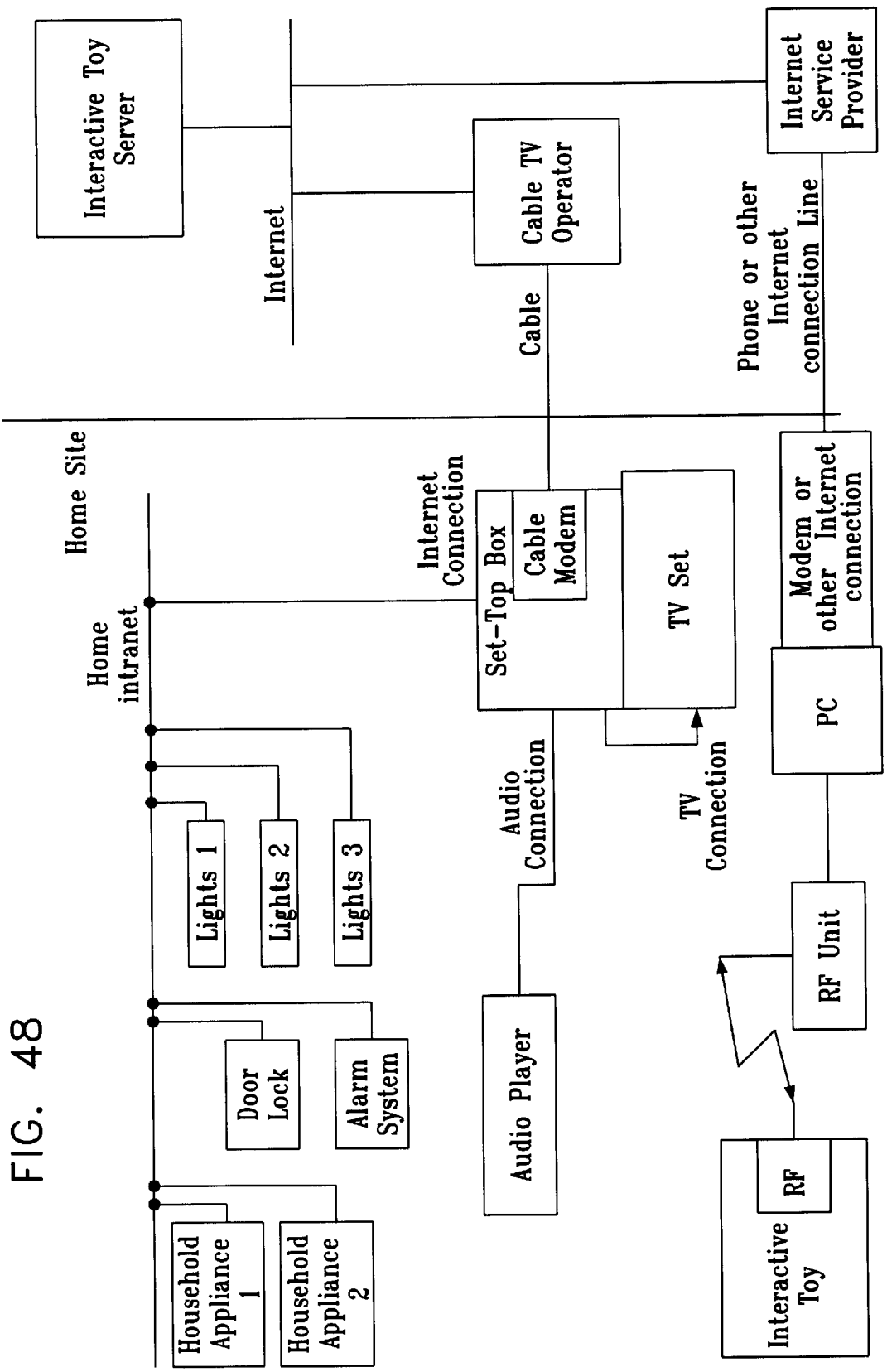
FIG. 48 shows a home automation system comprising one or more interactive toys, a TV set-top box, and a home personal computer, constructed and operative in accordance with a preferred embodiment of the present invention.

FIG. 48 shows another preferred embodiment of this invention in which a home automation system with one or more interactive toys comprises both a TV set-top box and a home personal computer. For example the set-top box provides an Internet connection for the whole system whereas the one or more interactive toys are wirelessly connected to the personal computer. Preferably, a personal computer within this embodiment of the present invention has its own Internet connection. This has the advantage of providing connection to an interactive toy server independently of the cable TV operator. This issue is discussed in greater detail in a section on the billing mechanism below.

In yet another embodiment of the present invention a home automation system with one or more interactive toys employs a method for providing Internet connection via power lines.

Many of the features that characterize interactive toys and that were described in the previous sections of this document have a direct bearing on the issue of home automation. This applies, for example, to the wireless connection of an interactive toy to its controlling computer at a site and preferably further to a more powerful computer on a system's server. Such a wireless connection allows an interactive toy to act as a voice remote control device with enhanced speech recognition.

A networked interactive toy is preferably connected to database records such as a record of weather reports that allow the toy to control household appliances more efficiently. For example, in response to a report on a coming storm a toy causes all windows in a house to close or suggests to its user to close the windows. This feature of interactive toys is further enhanced by the connectivity of all toys on a system. Thus, the actions of many toys and their users preferably effect the way any particular toy controls household appliances and devices.

Figure 49:
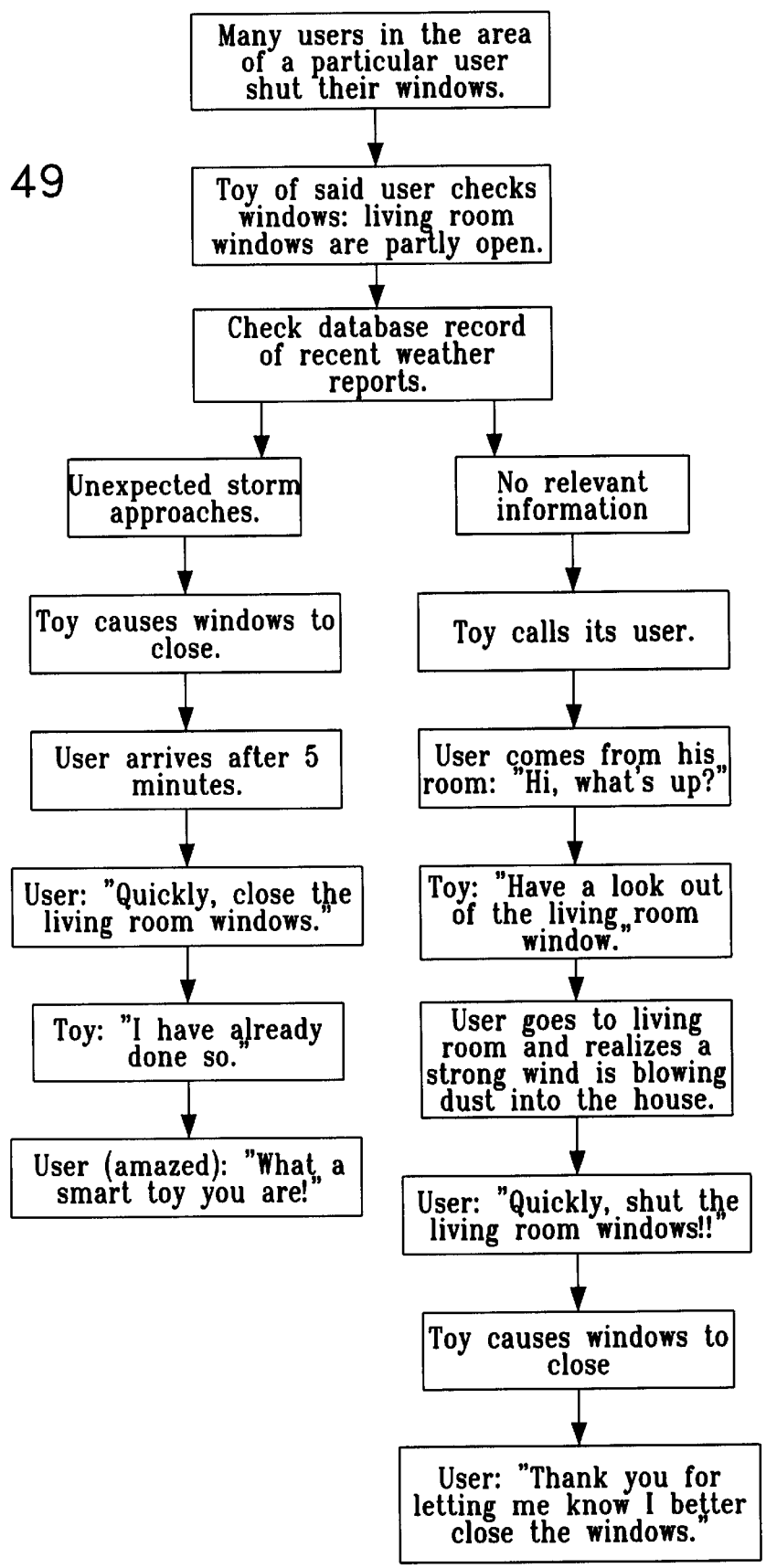
FIG. 49 is a flow chart describing typical scenarios in which a toy activates part of a home automation system, constructed and operative in accordance with a preferred embodiment of the present invention.

FIG. 49 describes an example of such a situation in which many users in a certain area have closed the windows in their houses. These users may be users of home automation systems or users of interactive toys who do not use such systems. In either case, a server of a networked system of toys preferably tracks information about the closing of windows. For example, a toy asks its user where the user is going, and receives the answer that the user is going to close a window. In case of users of home automation systems, a system's server preferably automatically tracks information about such occurrences. This causes all other toys in the same area that function in home automation systems to check the position of windows in their users' houses. A toy in the present example finds out that the living room windows are open. The toy's primary option is to check a database record of weather reports. However, even if no relevant report of such kind is available, the toy still directs its user's attention to the windows. This situation illustrates how the connectivity of all interactive toys on a system can enhance the efficiency of home automation with such toys.

As described in the previous sections of this document, an interactive toy preferably collects information about its user and stores such information in a special database record of user profile. It is preferred that an interactive toy function within a home automation system in accordance with a database record of its user's profile. The unique advantage of interactive toys in this regard is that the information stored in the database record does not relate to home automation alone but to all aspects of the relationship between a toy and its user.

Figure 50:
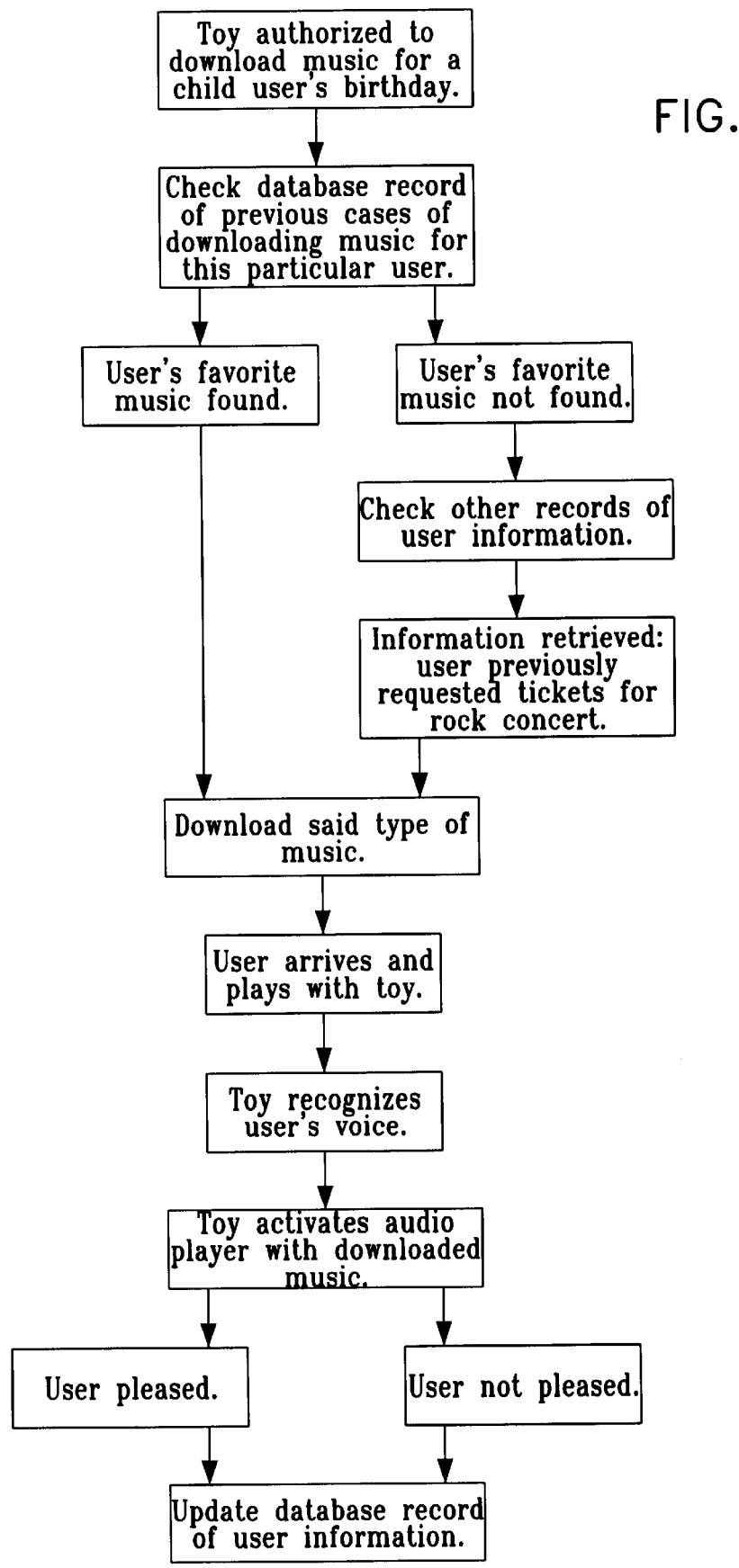
FIG. 50 is a flow chart describing typical scenarios in which a toy provides a user with entertainment, in accordance with a preferred embodiment of the present invention.

FIG. 50 shows an example of a toy which controls an audio player and which is requested to download music for a particular user. The toy in this example has two options of finding the type of music that it appropriate for download in such a case. The toy may either check previous cases of downloading music for this user or, in case no relevant information of this type is available, the toy can check any other experience in the course of its relationship with the user. In the present example, the toy finds out that the user ordered ticket for a rock concert. This example illustrates how an experience encountered in the course of interaction between a toy and its user is used in order enhance the toy's functioning in the context of home automation. In addition, the system keeps track of the user's response. Such information is later preferably used for further enhancing home automation as well as any other aspect of the interaction between a toy and its user. This illustrates how the function of an interactive toy in a home automation system may enhance its relationship with its user in all other contexts.

Figure 51:
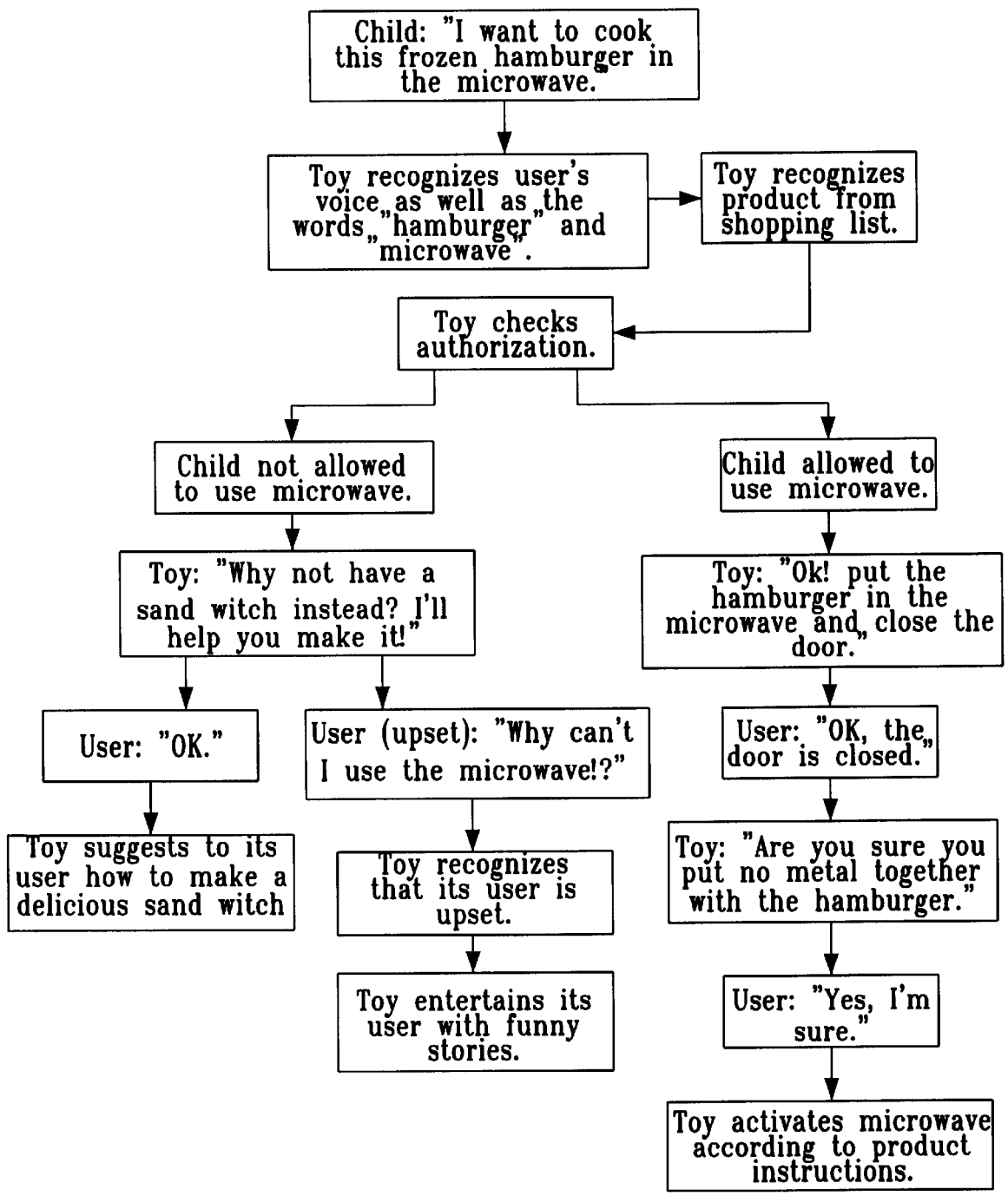
FIG. 51 is a flow chart showing an interactive toy functioning as an interface for controlling household appliances, especially attuned to the needs of children, in accordance with a preferred embodiment of the present invention.

FIG. 51 shows an example of another preferred embodiment of the present invention in which an interactive toy functions as an interface for controlling household appliances that is especially attuned to the needs of children. An interactive toy preferably recognizes its user using, for example, a voiceprint. This feature is preferably used in order to allow parents to program in advance which household appliance any child in the family is authorized to use and under what conditions. In a preferred embodiment of this invention, an interactive toy entertains child when the child wishes to use a household appliance he/she is not authorized to use. In the example of FIG. 51 a child wishes to use a microwave oven. The child's toy checks if the child is authorized to use this appliance. In case he is, the toy helps the child to use the microwave. It is preferred that the toy recognizes the product concerned according to a shopping list that comprises instructions of how to use the product with a microwave. In case a child is not allowed to use the household appliance, the toy suggests alternatives and entertains the child if he is upset.

Figure 52:
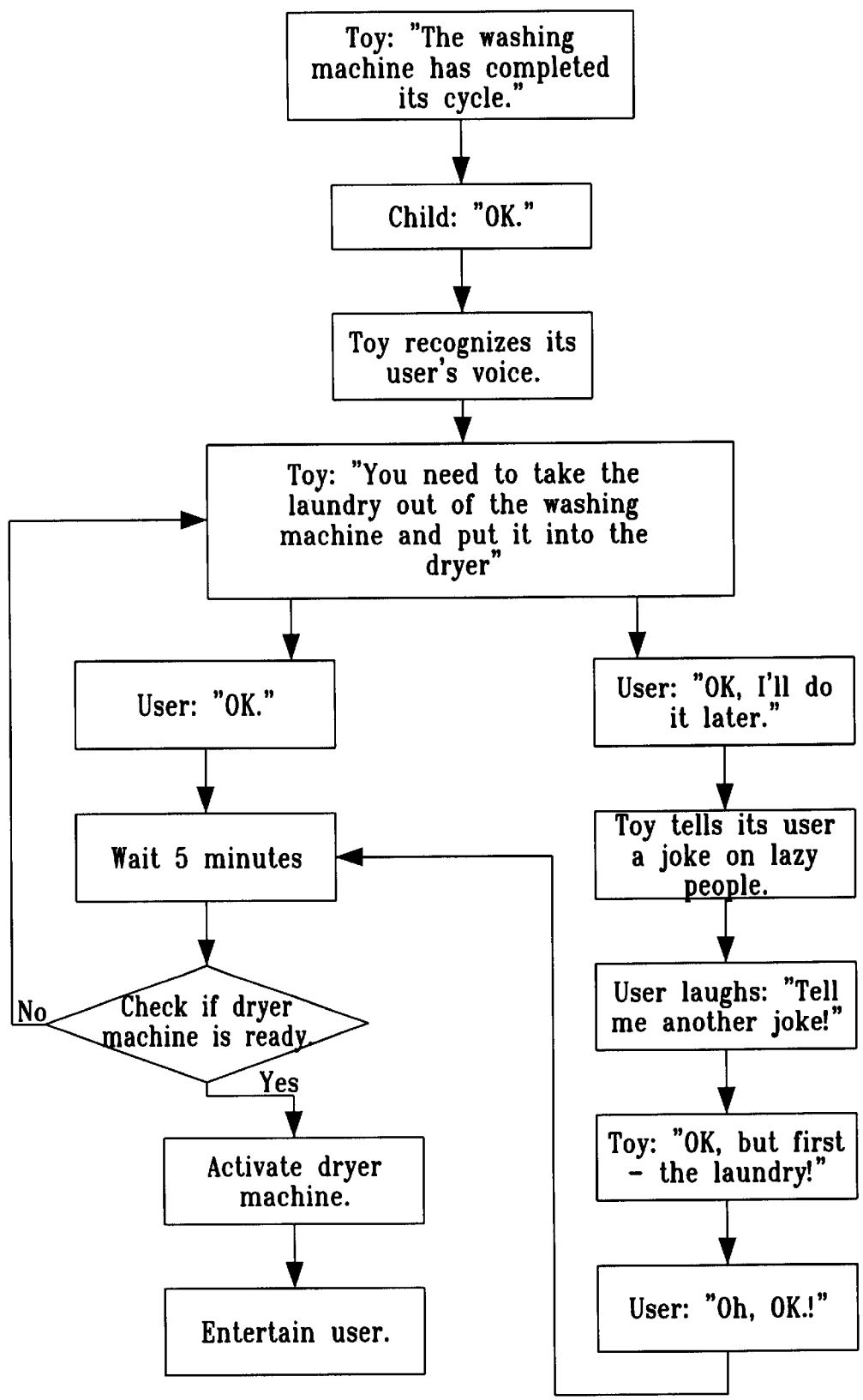
FIG. 52 is a flow chart describing how an interactive toy helps users to adequately handle household appliances, in accordance with a preferred embodiment of the present invention.

FIG. 52 describes yet another preferred embodiment of this invention in which an interactive toy sees to it that family members adequately handle household appliances. It is preferred that a toy provide friendly reminders for managing the function of household appliances such as, for example, taking laundry out of a washing machine once it has competed its cycle. An example of this function of interactive toys is shown in FIG. 8. The advantage of interactive toys in such cases is that they collect information about their users in the course of diverse interaction with them. This feature of interactive toys enables them to provide incentives for handling household appliances in a personalized way. In the example shown in FIG. 52 a toy encourages a user to manage the washing and drying machines by providing entertainment that is specifically intended for this user and promising more entertainment of this kind. The toy has gained this ability to provide such personalized entertainment for its user in the course of the whole of its previous, long-term interaction with this user.

Figure 53:
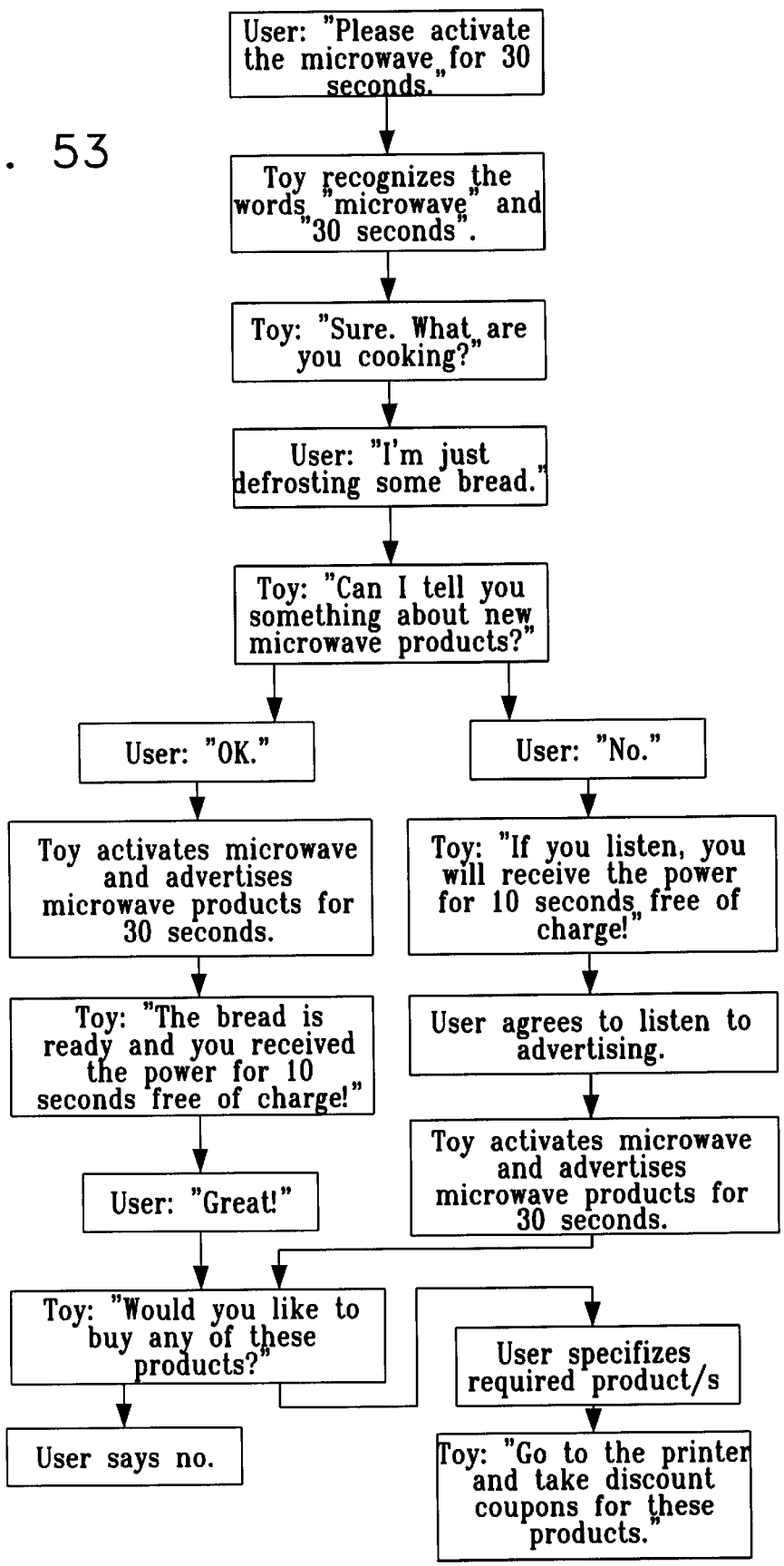
FIG. 53 is a flow chart showing how the integration of interactive toys into home automation systems offers sales promotions to users, in accordance with a preferred embodiment of the present invention.

FIG. 53 shows an example of how the integration of interactive toys into home automation systems offers an opportunity to further enhance their usefulness for sales promotion and thus their commercial value in general. In a preferred embodiment of the present invention, an interactive toy activating a household appliance advertises products related to the appliance. In the example shown in FIG. 53 a toy advertises microwave products while a microwave is being used. Such a method of sales promotion ensures that a user would be informed of new products that he/she is likely to be interested in. As also shown in FIG. 53 a user preferably has an option not to receive advertising.

In another preferred embodiment of this invention a user receives a discount on the power consumed by a household appliance in given period of time, if the user receives advertising related to the function of the household appliance during the period of time. In the example shown in FIG. 53, the user activates a microwave for 30 seconds and is billed for only 20 seconds of power supply, since he was willing to listen to advertising during the whole 30 seconds period. This is similar to a method used by cellular communication companies that offer reduced prices for long distance calls to users who are willing to receive advertising to their cellular phones.

A power supply company is connected to a networked system of toys. Any discount a user receives for listening to advertising is registered and the corresponding bill accordingly computed. The toy system bills the advertisers and pays the power company. In this case, the bill a user receives from the power company is already updated with the discounts he receives. In another embodiment of this invention, the discount is computed by a computer on a server of a networked system of toys without connection to the power supply company. In accordance with this embodiment of the invention, the user receives a regular bill from the power company, and receives a reduced bill from the networked system of toys.

A networked interactive toy system provides a mechanism whereby users and advertisers are billed according to the route by which content items are sent to toys.

Figure 54:
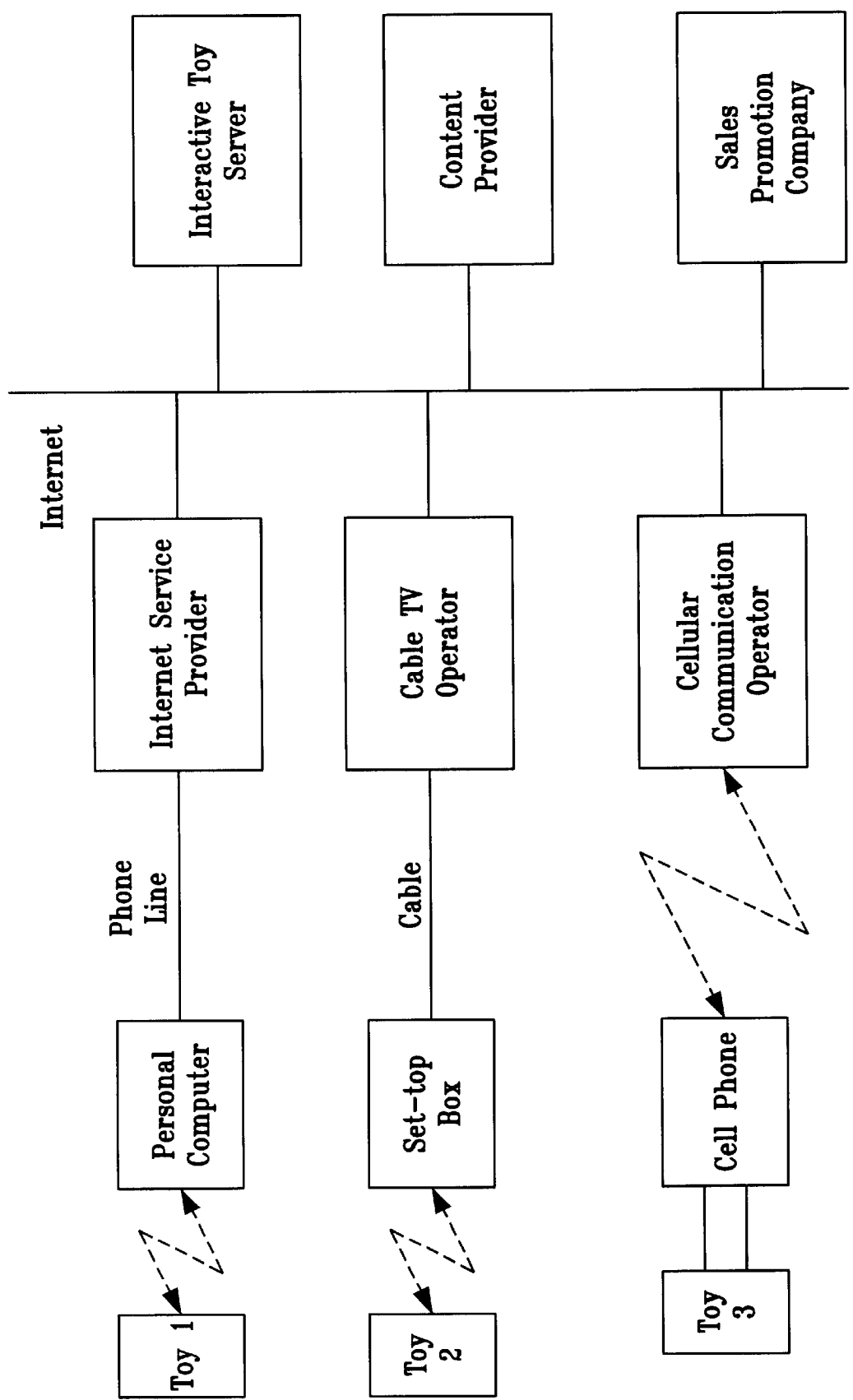
FIG. 54 is a block diagram showing examples of some of the ways by which interactive toys connect to a network, constructed and operative in accordance with a preferred embodiment of the present invention.

FIG. 54 shows examples of some of the ways by which interactive toys can connect to a network. As can be appreciated in accordance with FIG. 46, content can be sent to toys from content providers, sales promotion companies and an Interactive Toy Server over the Internet. For example, the user of toy 1 requests a certain content item by clicking on the web-site of the relevant content provider. If the personal computer of the user of toy 1 is equipped with the appropriate software, then the item of content may be sent to toy 1 directly, namely via its Internet Service Provider (ISP). It is preferred, however, that the content item is sent to toy 1 via an Interactive Toy Server. This method of sending content enhances the security of the system by allowing the system's server to prevent inappropriate content from being sent from a content provider to a toy. The server preferably also provides a variety of database records that allow sending various types of content to interactive toys in a personalized way.

Sales promotion content is typically sent to interactive toys from sales promotion companies via an Interactive Toy Server. There are, however, a number of possible routes for sending the content depending on how an interactive toy is connected to the network, namely whether the content can be send directly over the Internet or whether it is sent via an intermediary such as, for example, a cable TV operator.

Typically, the mechanism whereby users of interactive toys and sales promoters are billed for receiving and sending content depends on the route by which content is sent. It is therefore preferred that a networked system of toys keep track of the routes whereby content items are sent to each and every one of its users. For example, any computer software controlling a toy—whether on a personal computer, a TV set-top box, or any other computer—has to contact an Interactive Toy Server in order to receive content for the toy. By contacting the server the controlling computer sends a toy identification code that comprises the route by which the toy may receive content.

In accordance with a preferred embodiment of the present invention, a networked interactive toy system employs the following method of routing and billing: A user can go directly to the web-site of a content provider, choose a content item and pay the content provider directly. The content item, however, is sent to the user via the Interactive Toy Server, and the Interactive Toy Server accordingly bills the content provider.

Sales promoters are typically billed according to a variety of parameters such as the length of time a user interacted with an advertising content, whether a user enjoyed the content, and whether a user purchased a product as a result of the content item. An Interactive Toy Server typically keeps track of all these parameters. For example, the fact that a purchase was made as a result of advertising is verified using a discount coupon that a toy gives its user as a part of promoting a given product. In addition, sales promoters are billed according to the route by which advertising content is sent to a toy. For example, a sales promotion business is billed a higher amount for sending an advertising content item via a cable TV operator than via an Internet Service Provider. This is done in accordance with an arrangement that prevails between an Interactive Toy Server and a cable TV operator and according to which the cable operator is paid for connecting a toy to a network.

In a preferred embodiment of the present invention networked interactive toys are used to track the location of users while they are, for example, on a trip and to guide them in a variety of ways that enhance the education, entertainment and commercial value of such toys. This can be accomplished, for example, if the toys utilize cellular phone or satellite communication to connect to a computer network such as the Internet. In such cases both the cellular phone system and the satellite systems are operative to determine the location of a toy to within several tens of meters.

In a preferred embodiment of this invention interactive toys may be used as tour guides. Besides providing the basic function as a tour guide an interactive toy system may enhance cooperation between sites of tourism all over the world and a system of such toys. These toys can be further used to collect information on travel trends and tourism that is of value to other establishments involved in such fields.

One of the features of interactive toys as described in above is the personal relationship that develops between a toy and its user. Another feature described above is the accessibility of continuously updateable database records of information for the toy's functioning. Thus a networked interactive toy system offers a unique opportunity to combine the features of a personal friend and those of an extremely knowledgeable guide.

An interactive toy in action as a tour guide connects preferably via wireless to a networked computer. This may or may not be a home personal computer, a networked computer in a car, or a personal computer at a site being visited by the toy and its user. In a preferred embodiment of the present invention a toy connects to a computer on a system's server using a mobile communication network such as a cellular or a satellite network. Such a communication network also enables a system's server to track the location of a user and its toy as detailed below. Upon arriving at a site equipped with a networked computer, a toy tour guide may switch from a mobile communication network and connect to the computer at the site. The presence of a toy in such a site is of considerable commercial value as discussed below. In case a toy connects to a home PC it can function as a trip planner as discussed further below.

It is preferred, as mentioned above, that an interactive toy in action as a tour guide is connected to a mobile communication network. In urban areas cellular antennas make it possible to track a user's location with utmost precision down to a few meters. Such a system also uses software city maps to track the street on which a user is located at any given moment. In areas where cellular communication is not available a toy connects to a system via a satellite communication network. A user's location is tracked in such a case using a GPS device on a toy. A computer on a system's server receives input on a user's location and sends content to the user's toy appropriate to the given location.

In the simplest case, a toy tells its user where he/she is located and how to get to places in the area. The places may be requested by the user or suggested by the toy according to the user's database profile. If a user is driving a car or traveling by train his/her toy contacts an automatic routing and traffic monitoring device and tells its user what time he/she can expect to arrive at an expected destination. One of the advantages of such an interactive toy over a networked computer in a car is that no special installation on a car is required. This is useful in case, for example, a user travels abroad and rents a car or hitchhikes. Another advantage is that a toy accompanies such a tour with a running commentary on sites and objects of interest encountered on the way. This is described in greater detail below.

In a preferred embodiment of the present invention a toy determines the direction which its user faces and identifies objects of interest in that direction. For example, a compass on a toy is used in order to determine the direction in which a user points the toy's face. A computer on a system's server combines this information with the user's location and with a database record of places and objects of interest. This information is processed in order to identify the object a user points to with his/her toy. In case the information is insufficient for precise identification, a toy uses speech interaction in order to clarify the nature of the objects its user asks about. Thus, for example, a user points his/her toy in a certain direction and asks "What is this?". The toy then asks its user if he/she referred to the statue or to the palace behind it.

In another preferred embodiment of the present invention a user asks his/her toy for the direction of a specific object in their location, and a toy points with its arm in the expected direction. A sensor for the toy's arms is used in order to determine the direction of the arm relative to the toy's body. This is used together with the toy's direction in order to determine the expected movement of the arm. Alternatively, a toy asks its user to stop for a minute in a certain central location and lists a number of sites of interest while pointing each time in the direction of the site in question.

Figure 55:
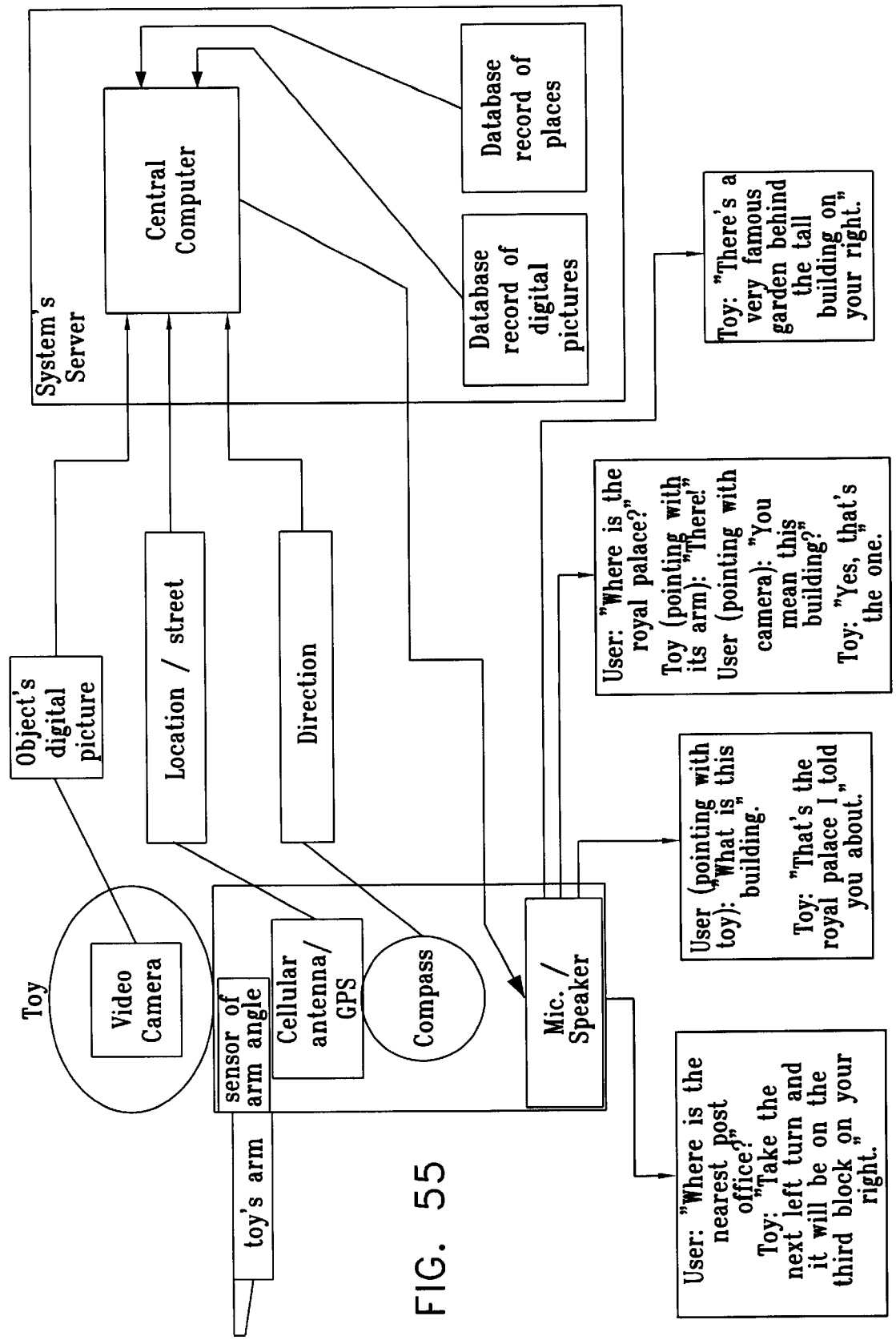
FIG. 55 shows an interactive networked toy equipped with a video camera, constructed and operative in accordance with a preferred embodiment of the present invention.

FIG. 55 shows another preferred embodiment of the present invention in which a toy is equipped, in addition, with a video camera. A user points the camera at objects in his/her location, preferably viewing them on a little screen at the toy's back. A digital picture is sent to the system's server that analyses it in order to determine what the object in question is. It is preferred, in such a case, that a system's database includes a record of digital pictures of sites and objects of interest. Since the system keeps a fairly precise track of a user's location as described above, there will always be a limited if still rather large number of possible objects in each given case. This enables the system to identify an object pointed to by a user even if only limited shape recognition technology is available. This opportunity for identification of objects is greatly enhanced by the interactivity that characterizes a networked system of interactive toys. A digital picture is not analyzed by a system's server as an isolated item. Rather, such a picture is accompanied by a user's question such as, for example, "What is this building?" or "Where does this street lead to?". In addition, the toy itself uses speech in order to direct its user's attention to the various objects of interest in his/her location. Such objects may or may not be hidden from the user's view at any given moment. The example of FIG. 55 shows schematically examples of location and direction tracking using mobile communication.

As mentioned above toy tour guide may connect to a networked computer at a site being visited. In such a case, a computer preferably keeps track of a toy and its user's location within the site in question. For example, a toy receives via wireless a transmission from three antennas located at a site, and a computer at the site processes this transmission in order to determine the exact location of the toy.

The opportunity offered by a networked system of toys to guide its users on tours is further enhanced by an interactive toy's ability to conduct elaborate interaction with its user based on the system's database. Such a database preferably includes records of information on the sites to be visited all over the world as well as records of users' information.

Figure 56A:
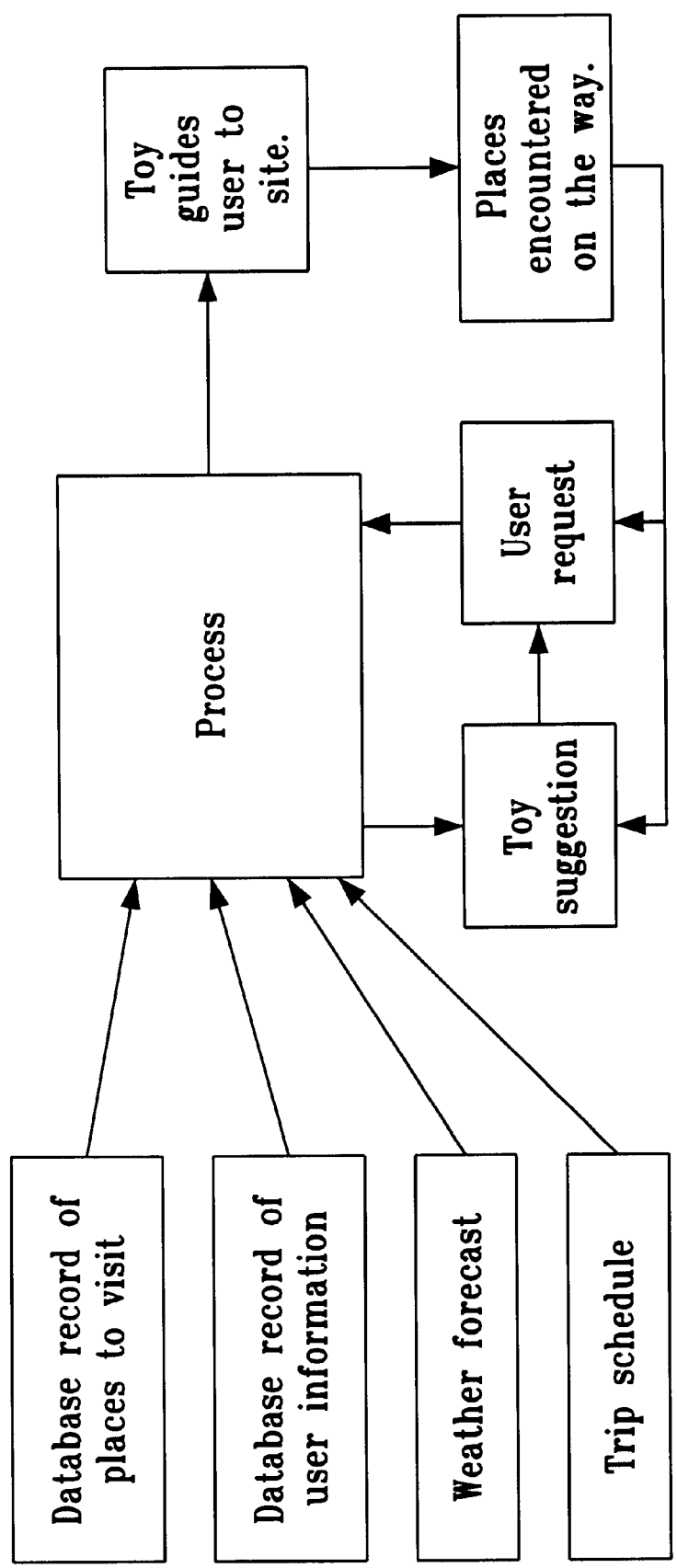
FIG. 56A is a schematic diagram of how a toy and its user decide on tour plans, in accordance with a preferred embodiment of the present invention.
Figure 56B:
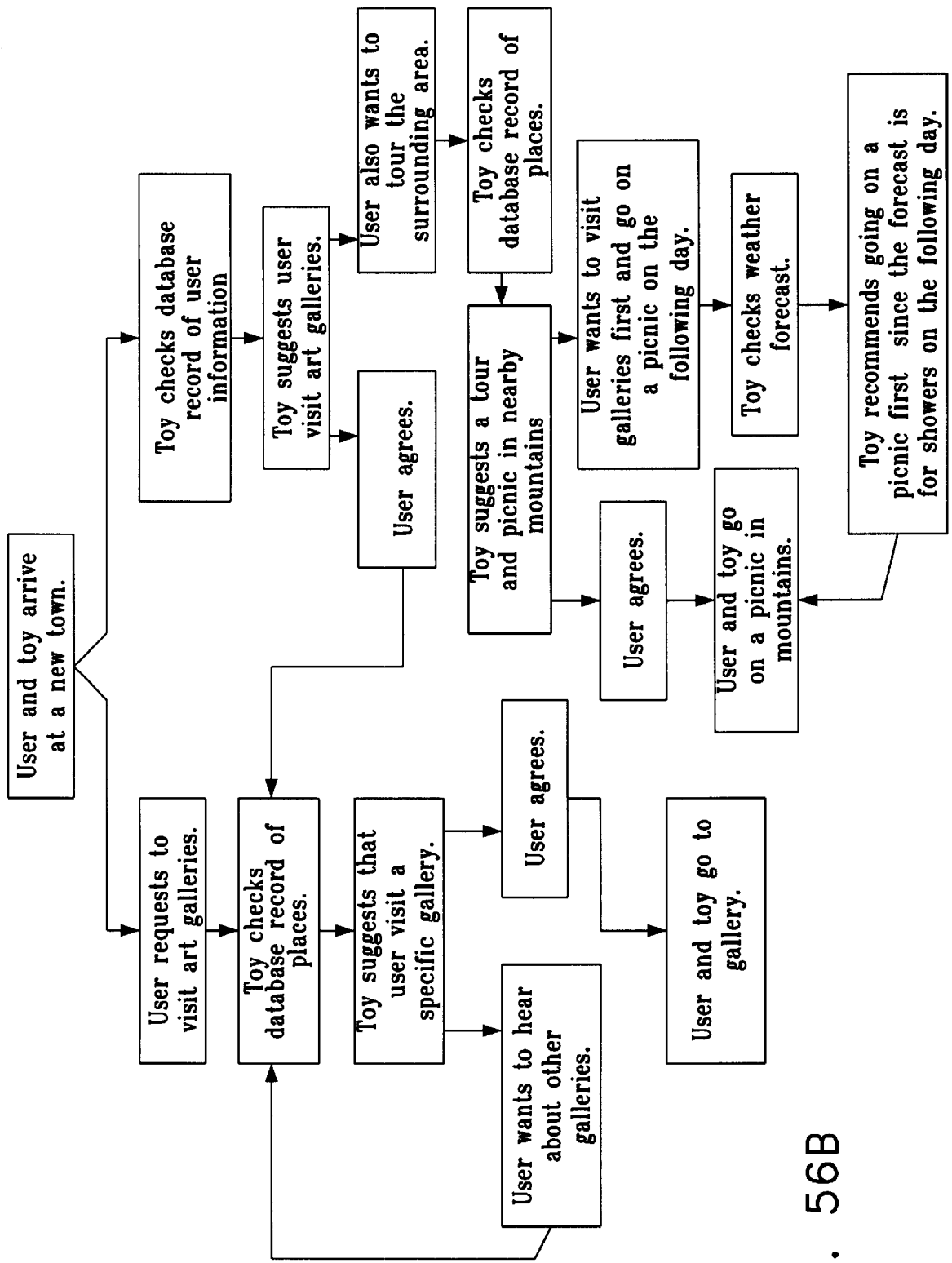
FIG. 56B shows an example of toy and user choosing a site to be visited, in accordance with a preferred embodiment of the present invention.

FIG. 56A and FIG. 56B show how such information allows, for example, a toy and its user to decide efficiently on the sites to be visited when arriving at a town unknown to the user. This can be done in a variety of ways such as but not limited to the following. A user can request that his/her toy suggest sites and places according to the user's fields of interests. A toy can suggest places for its user to go to according to a database record of user information. A user can name specific famous places that are located in the visited town according to his/her knowledge, and ask his/her toy whether and how they could be visited. A toy then combines user information with information on the sites in question and advises its user accordingly. A user, for example, might ask his/her toy to take him/her to a certain night-club. The toy may then warn its user that he/she might have trouble getting in since he/she is under eighteen. Alternatively, a toy tells its user about the type of music played in that club and reminds him/her of his/her preferences in this regard. Finally a toy can guide its user according to a trip plan fixed in advance as described in greater detail below. FIG. 56A. shows schematically an example of a procedure of choosing a site to visit. FIG. 56B shows an example of a particular case of choosing a site.

Figure 57:
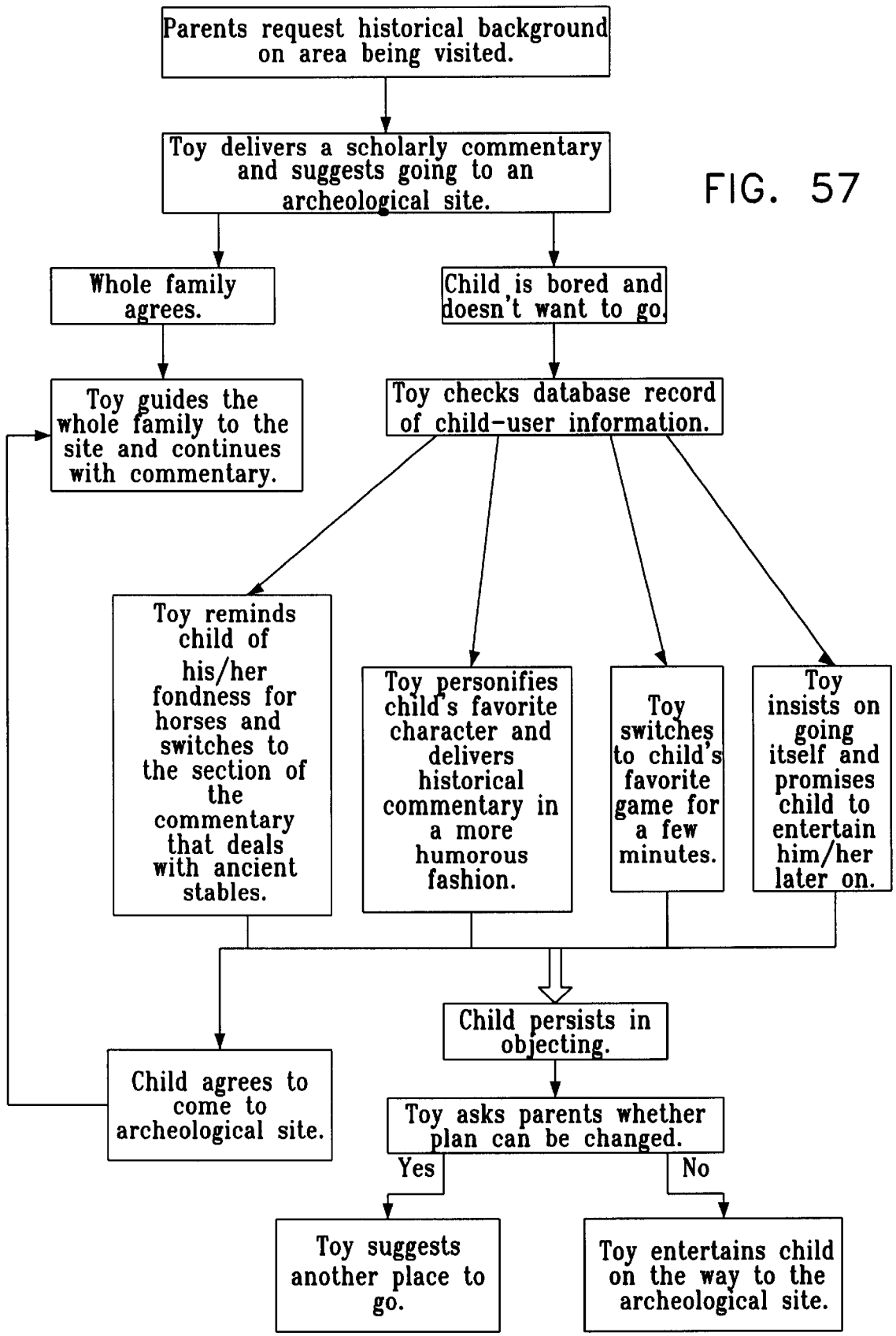
FIG. 57 is a flow chart describing a toy accompanies a user's tour with a running commentary on the sites and objects encountered on the way, in accordance with a preferred embodiment of the present invention.
Figure 58A:
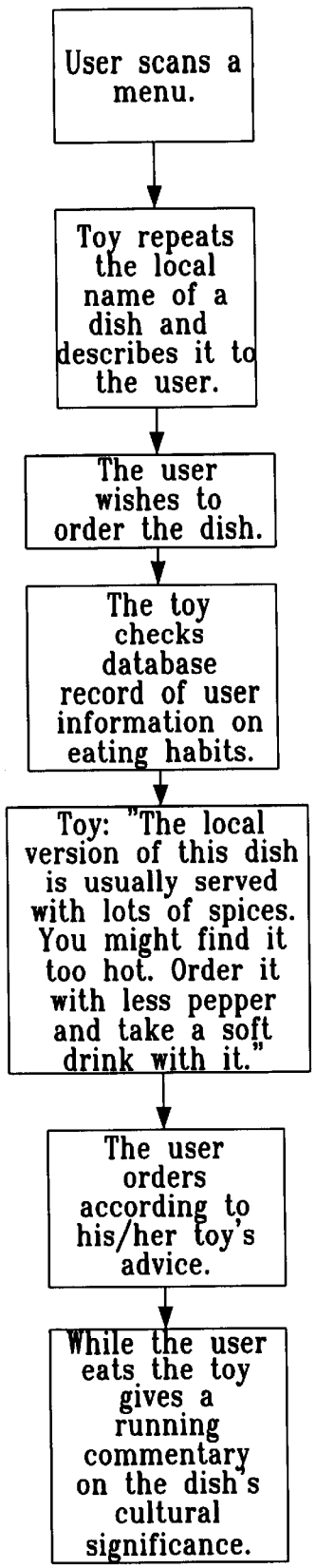
FIG. 58A shows an example of a toy tour guide acting as a translator constructed and operative in accordance with a preferred embodiment of the present invention.
Figure 58B:
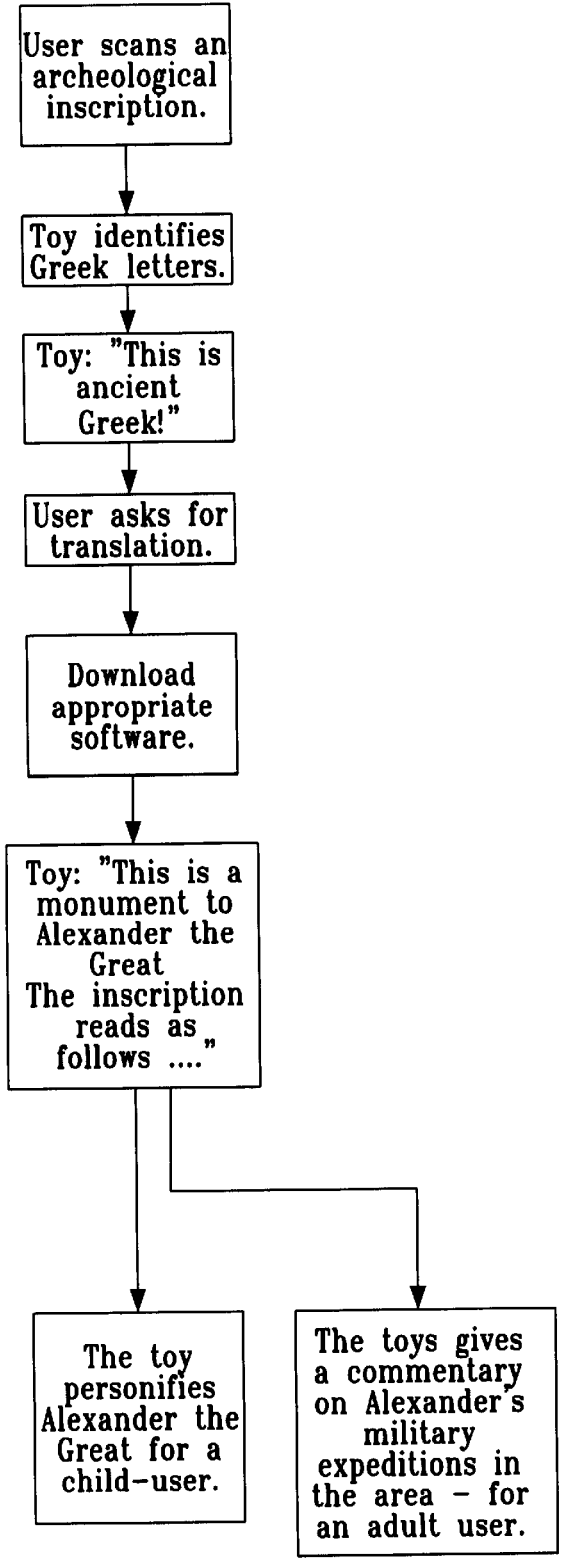
FIG. 58B shows another example of a toy tour guide acting as a translator constructed and operative in accordance with a preferred embodiment of the present invention.
Figure 58C:
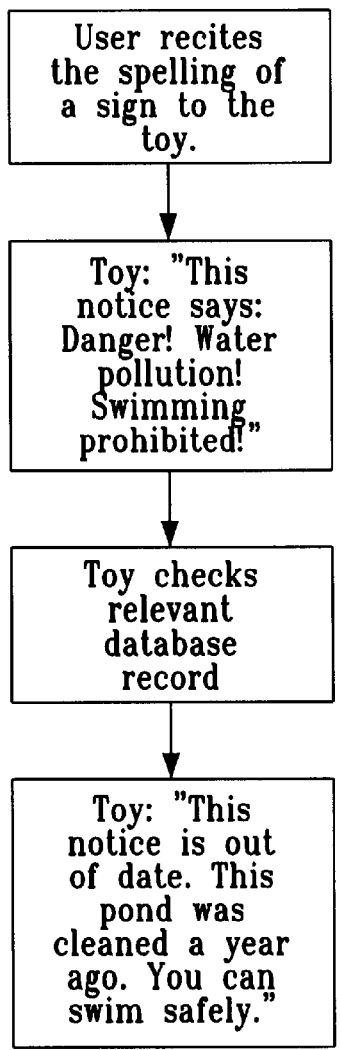
FIG. 58C shows another example of a toy tour guide acting as a translator constructed and operative in accordance with a preferred embodiment of the present invention.
Figure 58D:
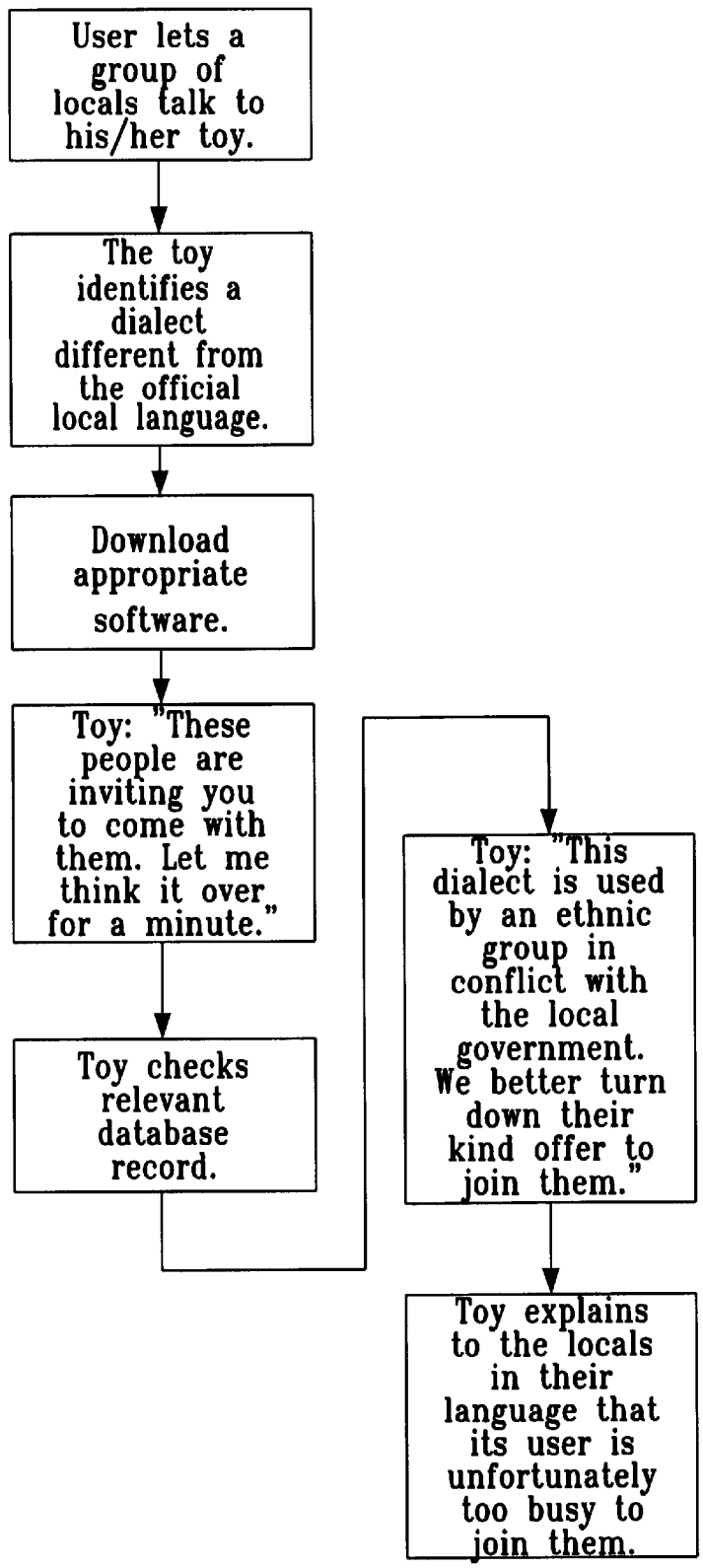
FIG. 58D shows another example of a toy tour guide acting as a translator constructed and operative in accordance with a preferred embodiment of the present invention.

FIG. 57 is a flow chart describing a preferred embodiment of the present invention in which a toy accompanies a tour with a running commentary on the sites and objects encountered on the way. Such a commentary may include, for example, historical and cultural background. Such educational content is continuously updated and can be sent to a user according to the user's database profile. One of the central advantages of an interactive toy in this regard is that such educational content can be delivered in a way that is appealing to children. Thus, a toy can function as an ideal tour guide for the whole family.

Historical background, for example, may be delivered by a toy in such a way as to attract the attention of a child user. A toy can personify a historical figure that is related to the visited site or assume the character of a history professor and combine historical commentary with jokes and games. For example, a toy may entertain its child-user/s with informal quizzes on the sites they visited and offer credit points to the winners. In another example, a toy personifies a famous media figure of a time traveler and leads its user/s through an archeological site related to different historical epochs. Another advantage of an interactive toy in this regard is the relationship that is likely to develop in the course of time between a toy and its child-user. A small child is more likely to pay attention to an educational game with a toy representing a popular mouse character rather than to an adult tour guide. Parents can request that a toy entertain a child user during a part of a tour in which the child is not particularly interested. Alternatively, a toy can encourage children to take an interest in an activity of educational value. For example, a child may wish to stay with a toy in a hotel room rather than join his/her parents on a trip to a museum. The toy can insist on being itself taken to the museum, point out how interesting the trip will be, and promise the child to joke and play with him/her on the way. FIG. 57 provides an example of how a toy tour guide combines commentary and entertainment.

The use of an interactive toy as a tour guide is of considerable commercial value. The presence of a toy at a site increases its visibility and shows to other visitors its utilization as a tour guide. At the same time, businesses and sites of tourism can benefit from toys guiding their users to them. It is preferred that dealers and businesses all over the world be connected to a networked system of toys. It is further preferred that an interactive toy in action as a tour guide direct its user/s to businesses that market products or services characteristic of their country. These include businesses such as, but not limited to, restaurants specializing in local dishes, galleries exhibiting national art, and fashion studios for local products. In a preferred embodiment of this invention a user receives a discount from a dealer if his/her toy guided him/her to this dealer. It is preferred that networked computers are located at such dealers'. Upon arrival at such a site, a toy preferably switches from a mobile communication network to the local computer via wireless communication. This enables a networked system's server to keep track of a user's commercial activities at the site in question. A billing mechanism is then used whereby local businesses are billed according to the user's toy guided activities.

In another preferred embodiment of the present invention public tourism sites are connected to a networked system of toys. A toy preferably offers its user a discount for visiting such a site. It is preferred that a toy offer such a discount in response to its user's request for content relating to one or more sites. Thus, for example, if a user asks a toy about the history of the country being visited, a toy may already offer a discount for visiting an archeological site. This enhances the opportunity for partnership between a system of interactive toys and national sites of tourism all over the world. In addition to discounts, such sites preferably offer special services for users who arrive guided by their toys. The opportunity to track a user's location within a site has already been described above. This is preferably combined with content sent to a toy through a networked computer at the site. For example, a national art gallery may allow to a user to look at pictures while listening to the toy's commentary via ear phones.

In a preferred embodiment of the present invention a toy acts as translator of a spoken language. One of the advantages of a networked toy in such a case is that it is not limited to a fixed version of a source language and can download translation software for any kind of language or dialect that is encountered in the course of a trip. For example, a user, may ask his/her toy how to pronounce a certain word or phrase in the local language. A toy may translate to its user the speech of a local person who addresses the user. It is preferred, in such cases, that a toy not merely translate but combine its translations with other types of content that is appropriate to the given situation. For example, one or more users may interact with local officials using the toy as an intermediary. The toy explains to its users not only what is being said but also the significance of the words for the culture concerned. The toy also tells its user what behavior is advised in such an encounter with local authorities.

In another preferred embodiment of this invention, a toy translates texts in a local or ancient language for its user/s. A toy is equipped with a special scanner that allows it to read inscriptions, signs and menus in a local or ancient language and to translate them to speech in its user/s' language. Once more, the connectivity of an interactive toy to a system's server constitutes an advantage over existing scanner translators. The latter are limited to fixed translation software and thus a fixed source language; if portable, they are also equipped with limited computation power that allows for only separate words to be translated. In contrast, an interactive toy with scanner may download translation software as required. In addition, the translation is carried out by a computer on a system's server whose computation power allows for whole sentences to be translated.

In another preferred embodiment of the present invention, a user recites the spelling of a word or a whole sentence in a local language to his/her toy, and the toy translates it to the user's language. In yet another preferred embodiment of the present invention a toy presents its user with an alphabet of a local language on a screen. This is useful in case the local language is written in letters that are unknown to a user. A user selects the letters either using a touch sensitive screen or by pushing buttons around the screen's edge.

It is preferred that such text translation is used in conjunction with other types of content. For example, on translating a menu a toy explains to its user/s the cultural significance of the dishes in question. Or, in another example, on translating an ancient inscription a toy offers its user a historical commentary on the period and the occasion on which it was written and the subjects it concerns.

FIGS. 58A–D show examples of a toy tour guide acting as a translator.

In another preferred embodiment of the present invention an interactive toy acting as a tour guide is connected to a world news service and informs its user/s of the latest news related to the region currently being visited. It is preferred that such information be passed on selectively according to user-specific requirements such as, for example, security matters or the weather. Thus, for example, a user who is worried about local political trends due to his/her own nationality may ask that news related to this issue alone to be sent to him/her instead of having to spend time listening to irrelevant information. Or, for example, a user may ask for weather forecasts to be sent to him/her according to a specific travel plan.

In a preferred embodiment of the present invention, an interactive toy helps one or more users to plan their trip in advance. This combines the toy's capabilities as a tour guide and as an organizer. The latter are especially useful given the amount of detailed information involved in planning a trip abroad. A toy may suggest important sites to visit in a given country. A toy may also schedule a trip according to a user's desire to visit a series of places under time and/or budget limitations. A toy may plan a trip according to a user's specific limitations such as a disability or handicap. A toy may mediate the possibly conflicting requirements of a number of users of different ages and interests such as, for example, members of a family, and offer them a compromise. A toy may arrange the cheapest way for its user/s to visit certain places. In all such forms of planning, a toy preferably takes into account flights and hotels prices, distances between places and means of transportation, local climate and weather in a given time of the year, and local facilities and standard of living. A toy may order flight tickets, make hotel reservations and arrange for entertainment activity for its user/s. An interactive toy may or may not later join its user/s on a trip it helped to plan.

Figure 59:
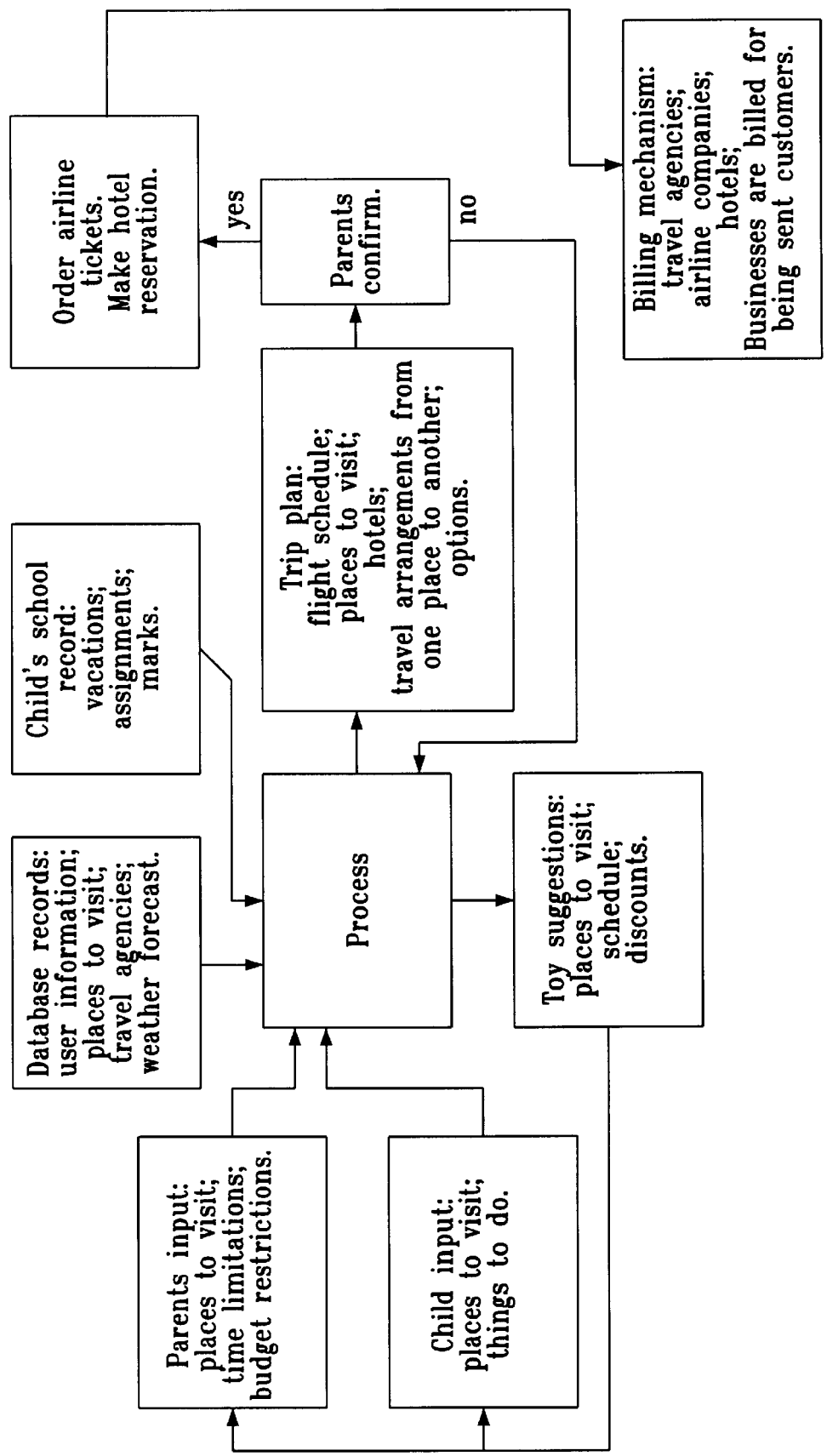
FIG. 59 is a diagrammatic illustration showing how the interactivity that characterizes a networked interactive toy provides enhances use and entertainment value in trip planning, constructed and operative in accordance with a preferred embodiment of the present invention.

FIG. 59 shows how the interactivity that characterizes a networked interactive toy provides greatly enhanced ease of use and entertainment value as a tool for trip planning. A whole family may sit around an interactive toy and plan a trip in a way that cannot be matched by a web page on a computer screen. An interactive toy preferably recognizes the voices of all family members. Such a toy also uses database records of user information in order to make its suggestions for trip planning appropriate to the user/s. Preferably a toy takes into account a child user's school record on considering his/her requests for a trip. For example, a toy demands that a summer vacation assignment be completed before the trip. Or, for example, a toy persuades parents to accept their child's requests for thing to do on a trip due to an improvement in the child's marks in a certain subject.

The function of interactive toys as tour guides as described by the present invention offers a unique opportunity to conduct Research and Development (R&D) into the areas of travel habits and tourism. In a preferred embodiment of the present invention a toy keeps track of its user/s tour in a foreign country. This enables a system's server to store information about the preferred activities of tourists relative to their age, nationality and social background. With users' permission, such information may be used for research into a variety of issues such as, for example, the preferences of tourists from a specific country visiting another specific country. Users may be encouraged to give their permission by being assured that the information is processed in a way that does not involve their identities. Such research may be used to enhance the entertainment and commercial of a networked systems of toys in action as tour guides. Alternatively, research may be shared or exchanged with other establishments interested in tourism trends.

Figure 60:
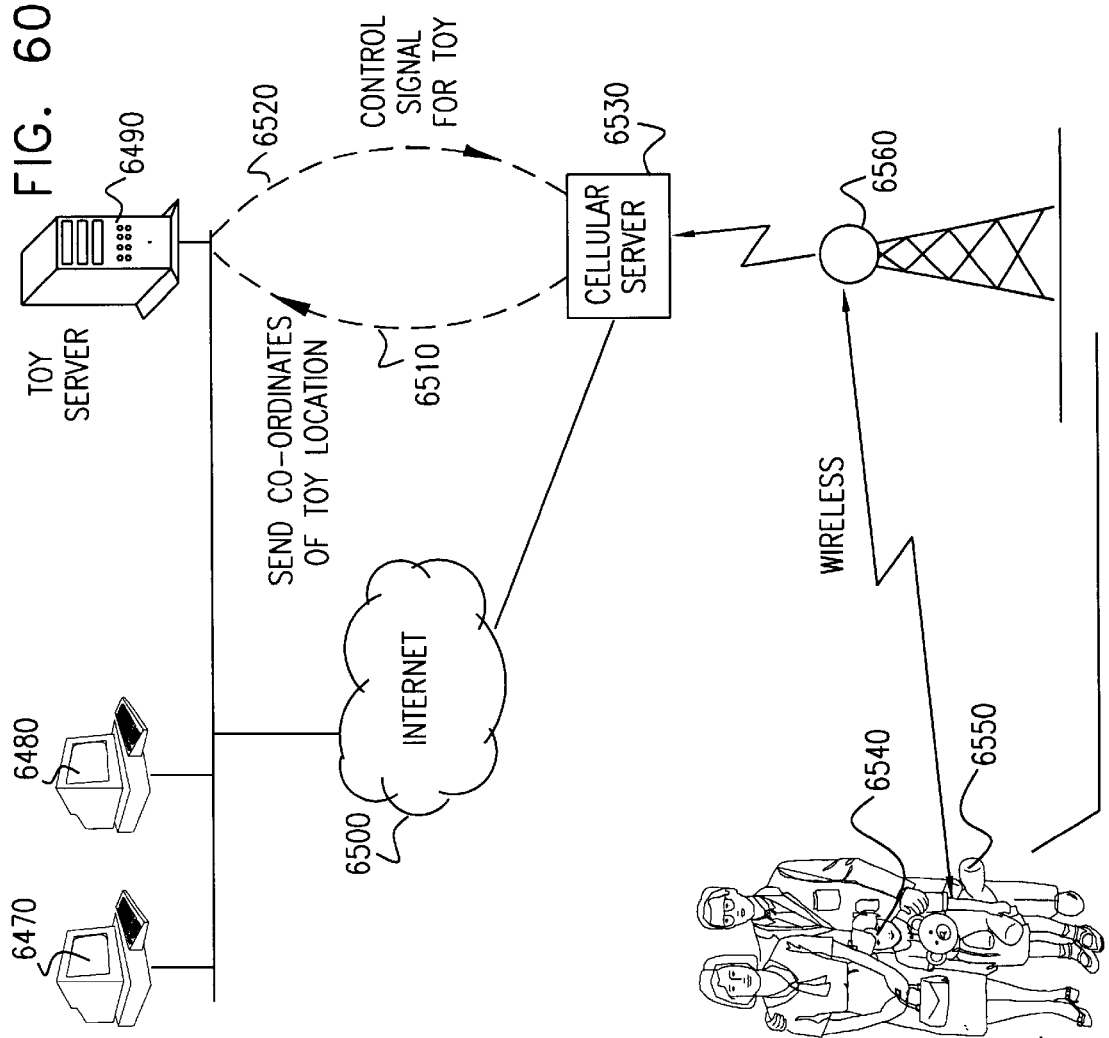
FIG. 60 is a part pictorial and part block diagram representation of an interactive toy and its users, visiting a well-known site in accordance with a preferred embodiment of the present invention.

FIG. 60 is a part pictorial and part block diagram representation of an interactive toy and its users, visiting a well-known site in accordance with a preferred embodiment of the present invention. In this figure, a family, in this case a parent, a child 6540 and the child's toy 6550, visiting a well-known site such as the World Trade Center in New York City. In the example shown toy is equipped with cellular communication capability which establish wireless connection between the toy and a nearby cellular phone antenna. The cellular antenna is connected, in this example, to a digital cellular telephone system (such as the WAP (Wireless Application Protocol) system) operative to connect the toy to the Internet via a Cellular Phone Server.

Control signals for the toy are, in this example, sent from the Interactive Toy Server to the toy via the Internet and the cellular phone system. In the present example the Cellular Phone Server utilizes the Cellular Phone Network to identify the location of the toy. This location is provided to the Interactive Toy Server via an Internet connection. The server, if authorized to do so, makes an entry into user's information database stating that at a given time on a given day the user visited the World Trade Center and spent a given amount of time there. This provides a method for automatically obtaining information about user's habits such as places which user has visited.

In another preferred embodiment of this invention, an interactive toy sends a user to a physical sales outlet (store). This is exemplified in the example below. In this case a child is sent by a toy to a store. In this example the child is encouraged to bring his toy to the store. This has two advantages. The first is that the toy is visible to other people in the store and encourages them to buy such a toy—especially if they see that the toy has allowed the child to receive a discount. The second advantage is that by bringing his toy to a store a user allows an interactive toy server to track sales. This example also shows how advertising may be targeted to the location of a user. i.e. how a toy knows the location of a user and targets advertising accordingly. This idea is illustrated in Example II.

EXAMPLE II

Child user is in a car with his parent who is driving on an inter-city highway.

Child: I'm Hungry!

Toy identifies the phrase "I'm hungry".

Toy uses services of cellular phone provider to identify the location of user and the direction of travel.

Toy queries sales promotion database for restaurants which are located nearby the user and in the direction the user is traveling.

Toy: There is a "Burger Boy" restaurant just 2 minutes ahead!

Scenario A

Child: But I'm in the mood for Pizza!

Toy identifies the word "Pizza" checks database for Pizza restaurants

Toy: There is a Mr. Pizza just 5 minutes ahead.

Child: But I like "Pizza Me"!

Toy identifies "Pizza Me" as a branded Pizza chain for which a sales promotion exists in its sales promotion database.

Toy: There is a "Pizza Me" ahead but you'll have to wait an hour to get there! But if you wait and bring me into the store you get 20% off!

Child informs parent and agrees to go to "Pizza Me".

The Pizza Me store does not have facilities for communicating with Interactive Toys but is aware of the 20% discount offer. Store proprietor scans or reads code from back of toy and enters it into his computer.

Toy server enters information regarding sale into its database for later billing the store or the advertising agent.

Scenario B

Child: Yuk! I only like Burger Queen!

Toy identifies the phrase "Burger Queen!". No promotion for Burger Queen exists in database.

Toy "But Burger Boy is best! Have you tried their nuggets?"

Child "No"

Toy: OK ask your parent to stop at Burger Boy and you'll get a free order of fries with your nuggets. But remember to bring me along.

At Burger Boy there is a "point of sale" interactive toy in the form of a talking Burger. This situation is shown pictorially in FIG. 61 and is described in more detail following this example. A computer in the store recognizes and is operative to interact with the visiting toy. The Interactive Toy Server has sent a message to the toy controlling program at the store with information regarding the expected visiting toy and child. When child arrives with his toy the toy begins interacting with store's computer which then knows that the particular child who was offered the free fries has come into the store.

Burger Toy: Welcome to the store! Are you going to order those nuggets!

Child's Toy: And don't forget! You get a free order of fries!

Child orders nuggets. Discount is managed by store's computer which is operative to allow linkage between its sales and billing software and the toy control software.

Toy server enters information regarding sale into its database for later billing the store or the advertising agent.

In another preferred embodiment of this invention, a user is using a mobile toy. FIG. 61 shows this situation pictorially.

The toy, in this example, comprises a toy controller and an RF transceiver operative to connect to the Internet via a commercial cellular phone network. Software for controlling the toy is run on any computer on a network (the Internet, for example) possibly the user's home computer or on the Interactive Toy Server. FIG. 61 shows pictorially a child in a Burger Boy restaurant. The restaurant has a point-of-sale talking burger 670.

The toy is passively listening for keywords and hears the child say that he is hungry. The toy makes a suggestion for a restaurant and then, depending on whether the suggestion was accepted or rejected it either directs the user to the suggested store or it suggests alternatives. In either case the toy offers incentives for the child to bring toy into store. If the store's computer does not have Interactive Toy controlling capabilities then any incentive such as free products or discount is achieved by other means such as, in this example, by scanning or reading a toy identification code off the body of the toy. If the store computer does have the capability to control the interactive toy then, upon recognizing the presence of the toy, sends a message via the network to the toy's controlling computer, to allow it to control the toy temporarily. In the current example the store's computer also controls another toy which is a talking burger. This "point of sale" toy helps make the sale by entertaining the user in a manner coordinated with his own toy. When the user's toy leaves the store it senses that the store's computer is no longer within range and it re-establishes its connection with the cellular system. It is appreciated that a point of sale toy may also interact with users who do not have their own toys. It thus acts as part of the sales force in the store. Thus, for example, a well known hamburger chain with a famous mascot, with Interactive Toy technology. Customers entering the store would be entertained by this mascot which would also help advise and advertise on products and promotions.

Figure 62A:
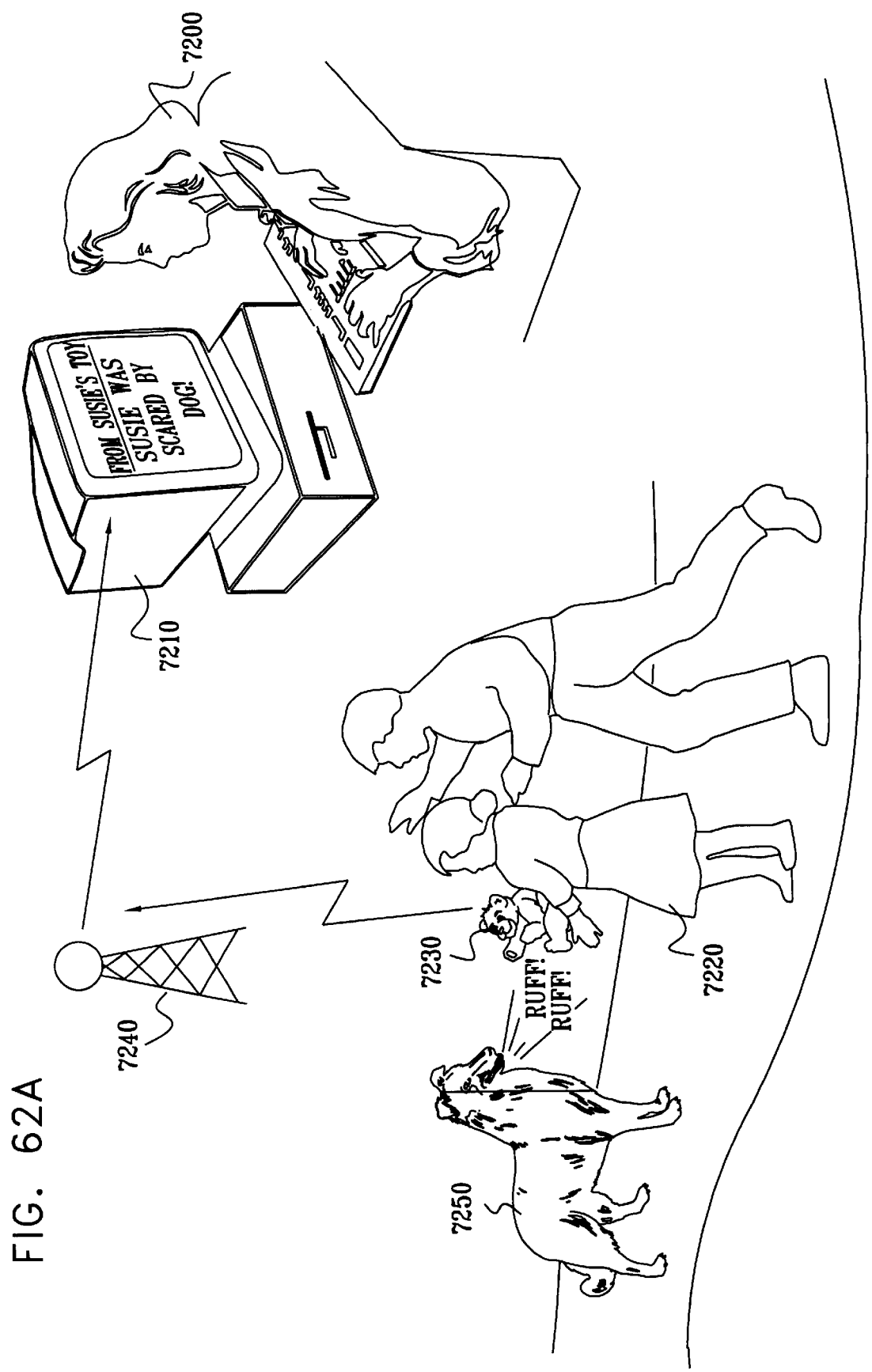
FIG. 62A shows how a networked interactive toy employing cellular technology can help a user to deal with a difficult situation, in accordance with a preferred embodiment of the present invention.
Figure 62B:
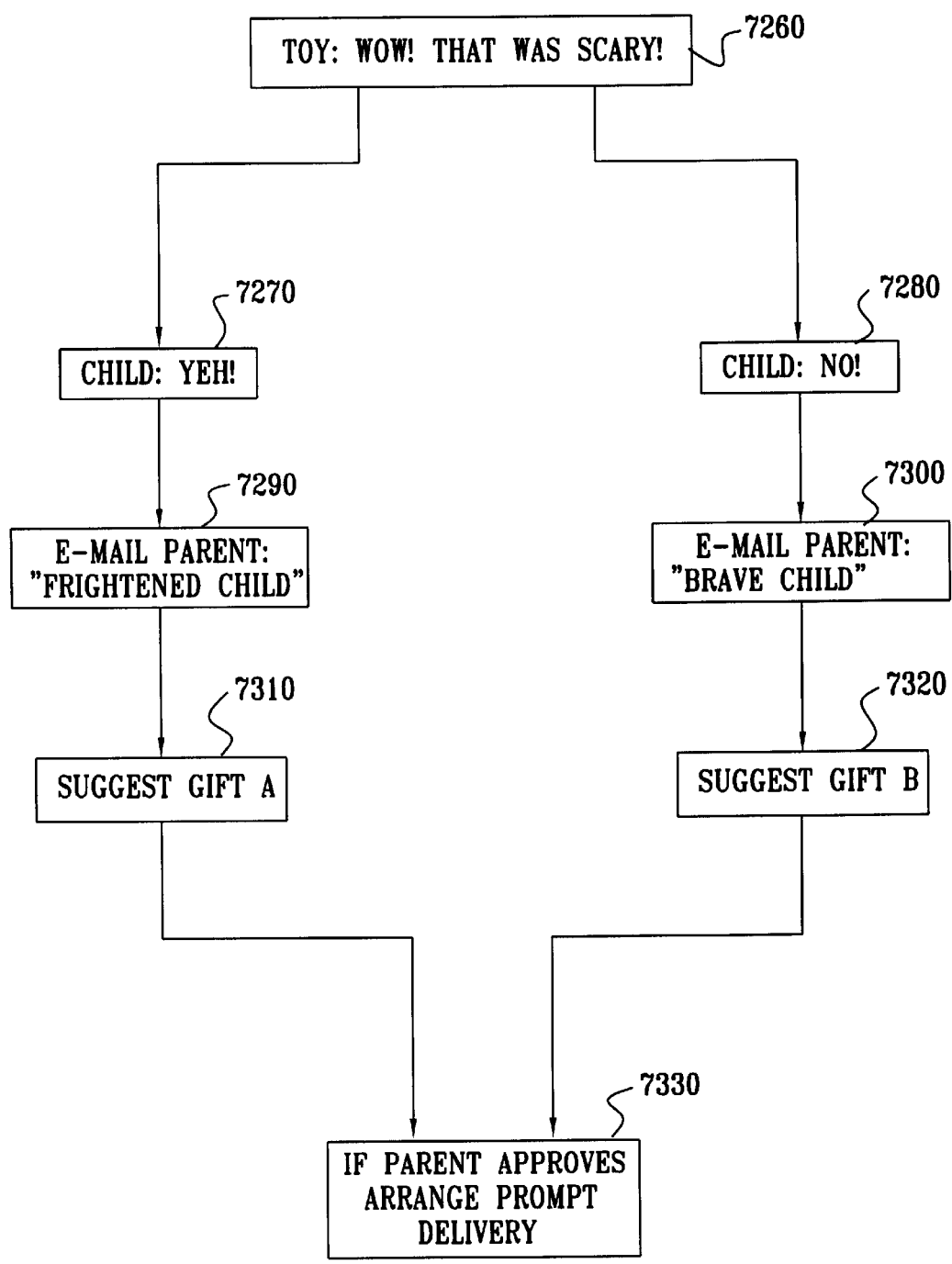
FIG. 62B is a flow chart showing how a networked interactive toy employing cellular technology can help a user to deal with a difficult situation and, at the same time, promote sales, in accordance with a preferred embodiment of the present invention.

FIG. 62A and FIG. 62B show how a networked interactive toy employing cellular technology may help a user, in this case a child, deal with a difficult situation and, at the same time, promote the sale of a gift to the child. In this example a child is going for a walk with his mobile toy as well as with his older sibling. Suddenly the child is frightened by a dog who is barking loudly. The frightened child hugs his toy. The toy senses the hug and recognizes the sound as the bark of a dog, for example, by matching the digital sound file resulting from the dog's bark with specimen sound files on the toy-controlling computer. A program on the toy-controlling computer has been programmed to recognize the combination of a dog bark and a subsequent hug as a sign that the child is frightened. The toy then says "Wow that was scary!" and awaits a response from child. Child's response indicates how brave the child is. An email is sent to parent at work describing the incident and suggesting a gift the nature of which depends on how frightened the child was. The Interactive Toy Server arranges prompt delivery.

FIG. 62A shows a pictorial representation of this situation.

FIG. 62B is a flow chart showing how the situation is handled by a server depending. A different level of involvement of the parent as well as a different gift is suggested depending on how frightened the child actually was when the dog barked at the child.

Figure 63:
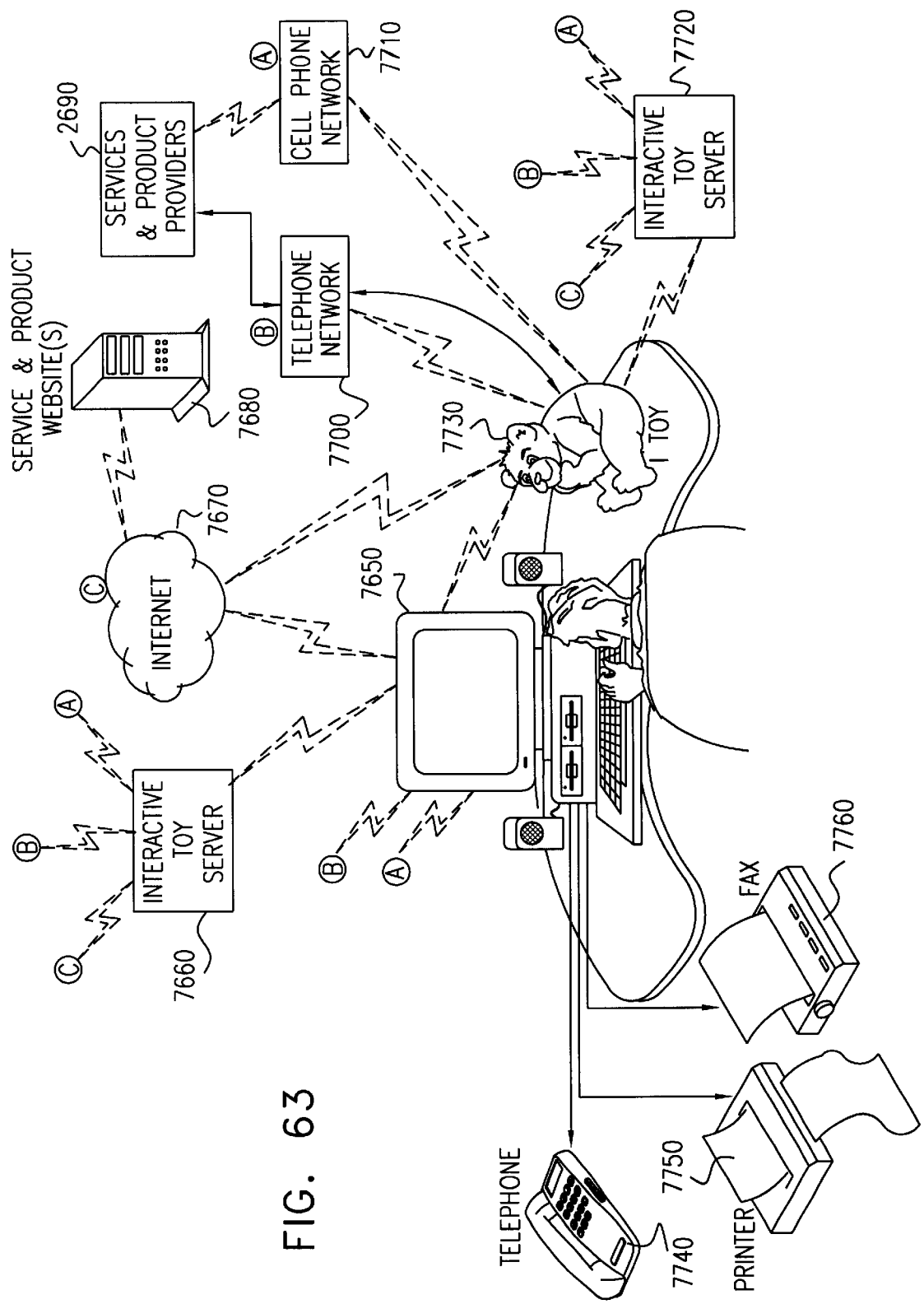
FIG. 63 describes some of the numerous ways in which an interactive toy may access information, in accordance with a preferred embodiment of the present invention.

FIG. 63 describes some of the numerous ways in which an interactive toy may access information. This may be directly via wired/unwired connection to a telephone network, via unwired cell-phone connection, or directly to Internet or the like. It may be indirectly via a home computer to Internet web-sites, such as information and item providing services, Interactive toy support services or other database, or computer connected up to a telephone network or cell-phone network, or the like. It may be indirectly via an interactive toy server to a cell-phone network, telephone network, or Internet, or the like. These, in turn may be linked up to item provider and/or Interactive Toy company's databases/telephones and the like. It may be indirectly via a home computer or other computer linked up to an interactive toy server, which links up to cell-phone network, telephone network, or Internet system or the like, or via any other similar combination.

Toys, by their very nature, are designed to entertain children and adults so that even in their current form, toys are a type of entertainment medium. Even inanimate toys may form a relationship with a user that may even take the form of "bonding". This bonding enhances the creative play of a user, which may be a child, and allows users to imagine that a toy has certain human (or superhuman or animal or alien or other) characteristics. Thus toys entertain users by focusing their imaginative play on certain characters or characteristics.

Inanimate toys are, however, limited in their abilities. First of all they entertain mostly by harnessing a user's imagination. Furthermore the entertainment is usually very localized since toys which are actually at the same location as users may only entertain users. The actual content of the entertainment is either wholly or partially predetermined by the designer/manufacturer of the toy. It may also be derived from the imagination of one or more users and/or their playmates.

The purpose of the series of inventions described in this document is to apply the "Living Objects" computer controlled toy technology to totally change the way in which people are entertained by toys. Thus, interactive networked toys allow one or more users' toys to become a mechanism for passive entertainment, in which a user is passively entertained by actions of one or more toys. Interactive networked toys may or may not also provide active entertainment, in which a user participates interactively in the content of the entertainment provided by the toys. Entertainment may be a combination or active and passive forms.

The content for entertainment is provided in a wide variety of ways. It may either follow the model of the television in which a single distant provider provides content or, alternatively, the origin of the content may be distributed among many providers and many users throughout a network. Content may or may not be provide both by network and by one or more single sources.

In any of these cases, such content may be individualized for each user, since the delivery of content is computer controlled. Thus, entertainment (which may include games) may or may not be local (i.e. played by one or more users situated at the same location), or it may be entirely global (i.e. the content being determined by a possibly complex interaction of all users and providers on such a system). Such a feature is made possible by interconnectivity of all toys and providers on one or more suitable networks, such as the Internet.

Entertainment content may or may not be totally predetermined, or it may or may not evolve dynamically, based on its previous history, and upon inputs of one or many of users of such systems.

A further purpose of this invention is to have in place a system, which utilizes this new medium for commercial purposes. Currently, all entertainment media such as, but not limited to, television, movies, and theatre, have enormous commercial possibilities. Commercial applications include charges for providing content, advertising, merchandising and many others.

Besides providing an opportunity for each and every one of the traditional commercial possibilities, networked interactive toys provide several entirely new mechanisms for generating commercial revenue. These mechanisms are described in the sections below. This new system of commerce, based on computer controlled networked interactive toys, is called "T-Commerce" (hinting to "Toy commerce"). T-Commerce includes both traditional methods for generating revenue from an entertainment medium, and many new opportunities unique to the novel interactive toy medium.

The commercial opportunities of T-Commerce include, but are not limited to, charges for content, advertising, providing discount coupons, encouraging a user to visit a particular store, and possibly bring his toy to the store, as well as using the relationship of user(s) with the toy(s). The toy, which may or may not be a doll or a cuddly stuffed animal, provides user(s) patriotism to one or more particular products.

The system described by this invention comprises a multitude of interactive toys (to be described in detail below). These toys are individually placed at a "site" which may be a home, an office, a retail store, a shopping mall, an entertainment outlet (such as an amusement park), or at any other location. Each such site contains either one or many computers (or, alternatively, any other computing device such as a Web-TV or a Web-Cable controller which allows connection to another computer on a network), which may or may not be connected by a local network. Each such site also contains one or many toys, each of which may or may not be connected via any form of wireless communication (including, but not limited to radio and infrared), with one or more of the computers at the site. It is desirable but not essential that each toy uses one such site and one computer on this site as its "home base".

Figure 64:
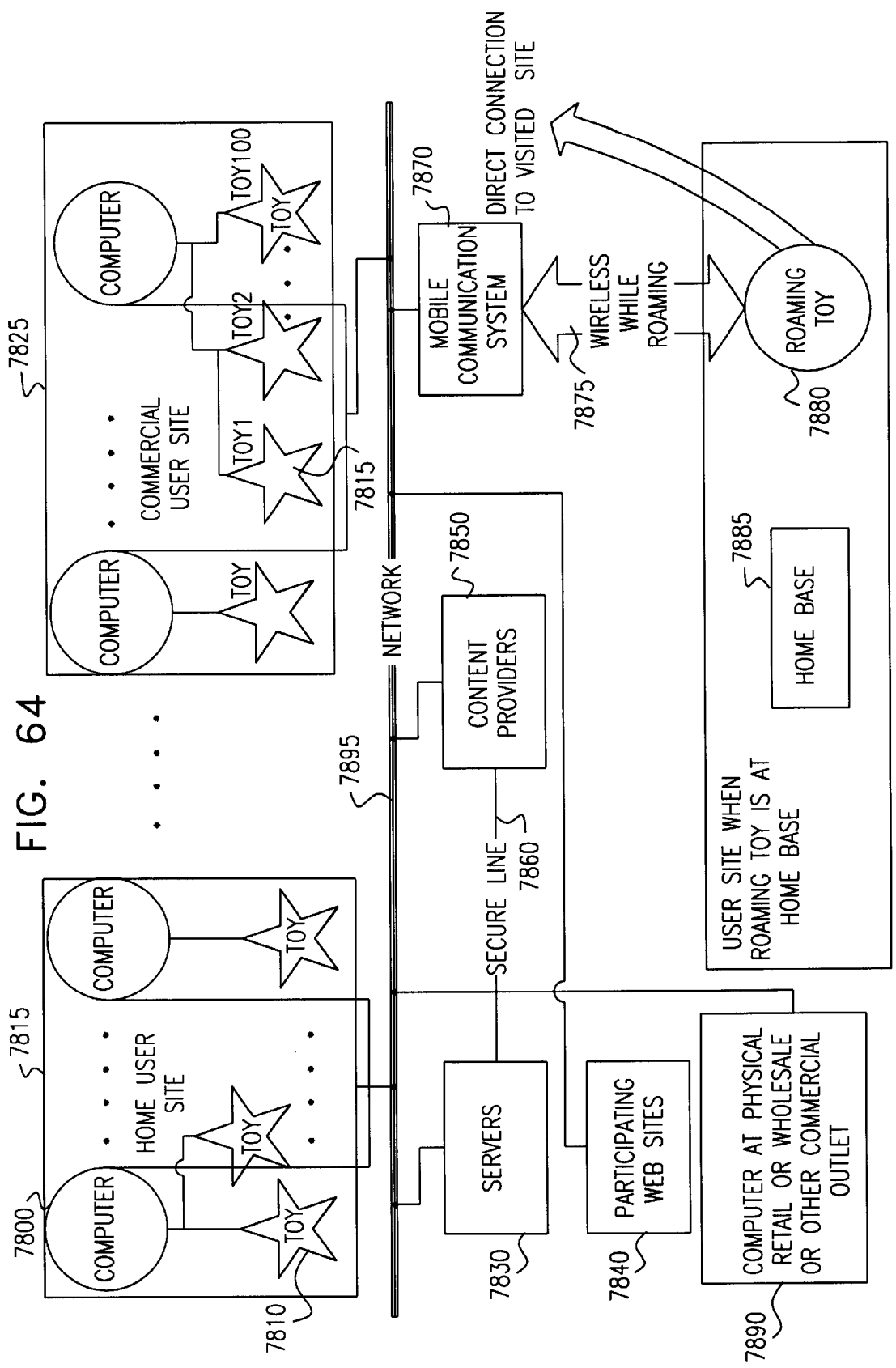
FIG. 64 is a diagrammatic representation of a networked system of interactive toys, constructed and operative in accordance with a preferred embodiment of the present invention.

It is preferred that each computer at a site communicates with one or more toys, and is connected to a network or to a series of interconnected networks. Such a computer may have software running on it, which may utilize one or more networks, in order to perform the various functions described in this document. A diagrammatic representation of the system is shown in FIG. 64.

It is preferred that each toy may be a guest at any other site. Such sites have computers running the aforementioned software. An individual toy on such a network may or may not contain hardware, which allows it to roam between different sites. If such hardware exists it could be connected to any wireless network (such as the cellular or the satellite network) which currently exists or which may exist in the future using the standard technology for connecting to this network. This allows such a toy to function with full capabilities when away from its home base (either by containing a powerful processor of its own or by connecting through the aforementioned networks to a central server or to the user's "home" computer). Such an interactive toy may only function with limited capabilities, in order to reduce cost to its user.

In most cases, a roaming toy may update its home base with all newly acquired information upon its return, or, if possible, at some convenient time while the toy is roving. The toy may also contain hardware (such as, for example, any light sensitive device, which could be used as a bar code scanner,) which would allow it to interact with standard equipment in a retail outlet such as a cash register. This feature allows a toy to send information about its user's purchase to the system's server, which would enable the store, or other outlet, to be charged a fee since such a toy "brought a user to a store or other outlet".

It is preferred that such a system contains one or more servers whose main purpose is to serve the global community of toys. Such a server may serve many functions including, but not limited to, providing support to the local computers, providing new content for the toys, providing technical support for the toys, and providing software support and upgrades.

Such a server may serve many other functions including providing an online store and user's club and, most important of all, coordinating all the commercial concerns of such a system. One or more servers receive information and content from users and provide content and information to users by means of one of the networks described above.

It is preferred that such a system contains one or more Entertainment Providers which may be individuals, companies or any other entities which provide any form of entertainment content, which may include educational or commercial content, to one or many of the toys on the system. This content is either provided directly by the Entertainment Provider to a user via any public network, or is provided to one or more aforementioned servers (either via a public network or by a secure private line or by any other means). When content is provided via a server, content is processed by the server, as required, and then sent to the consumer via a public network.

Interactive toy systems further contain retail outlets (which may be actual stores, online stores or other forms of sales outlets) which sell the interactive toys, as well as entertainment content on physical media and any other related items.

The functioning of such a system is summarized as follows: One or more Entertainment Providers provide Entertainment content. This content serves two purposes. The first is to entertain the user/users via their toy/toys, and the second is to derive the commercial benefit, which arises from the provision of this entertainment.

This commercial benefit comes in several forms. First of all the system allows for all the traditional commercial opportunities of any entertainment medium, including but not limited to advertising, charging for content and merchandising. Secondly, all traditional forms of networked electronic commerce (e-commerce) are now available using this new medium. Thirdly, there are several new exciting opportunities, arising from commerce with toys (T-Commerce) including the system of "reverse auction" described in this document and further detailed below. Finally, the presence of a huge number of toys in so many homes and commercial establishments leads to a unique opportunity for collection of data and profiling of consumers. This enormous new database of information may also be used for Research and Development purposes as will be described later in this document.

There are several elements, which allow such a system to be functional. Firstly, the various kinds of interactive toys have unique properties. These features are described below. The second is a unique and complex security system whose key feature is an extensive network of adaptable, multi-point context based content filters. This system is also described further below.

Each toy in such a system contains a wireless transmitter and receiver (though some versions of the toy may contain only a transmitter or only a receiver). (The use of wireless communication is intended to make the use of the toy more convenient though in an unusual case in which wire communication is more useful, this could be used as well for all or part of the system.) Each toy may or may not contain a mechanical system, which allows physical motion of parts of the toy and/or motion of the toy as a whole.

Figure 65:
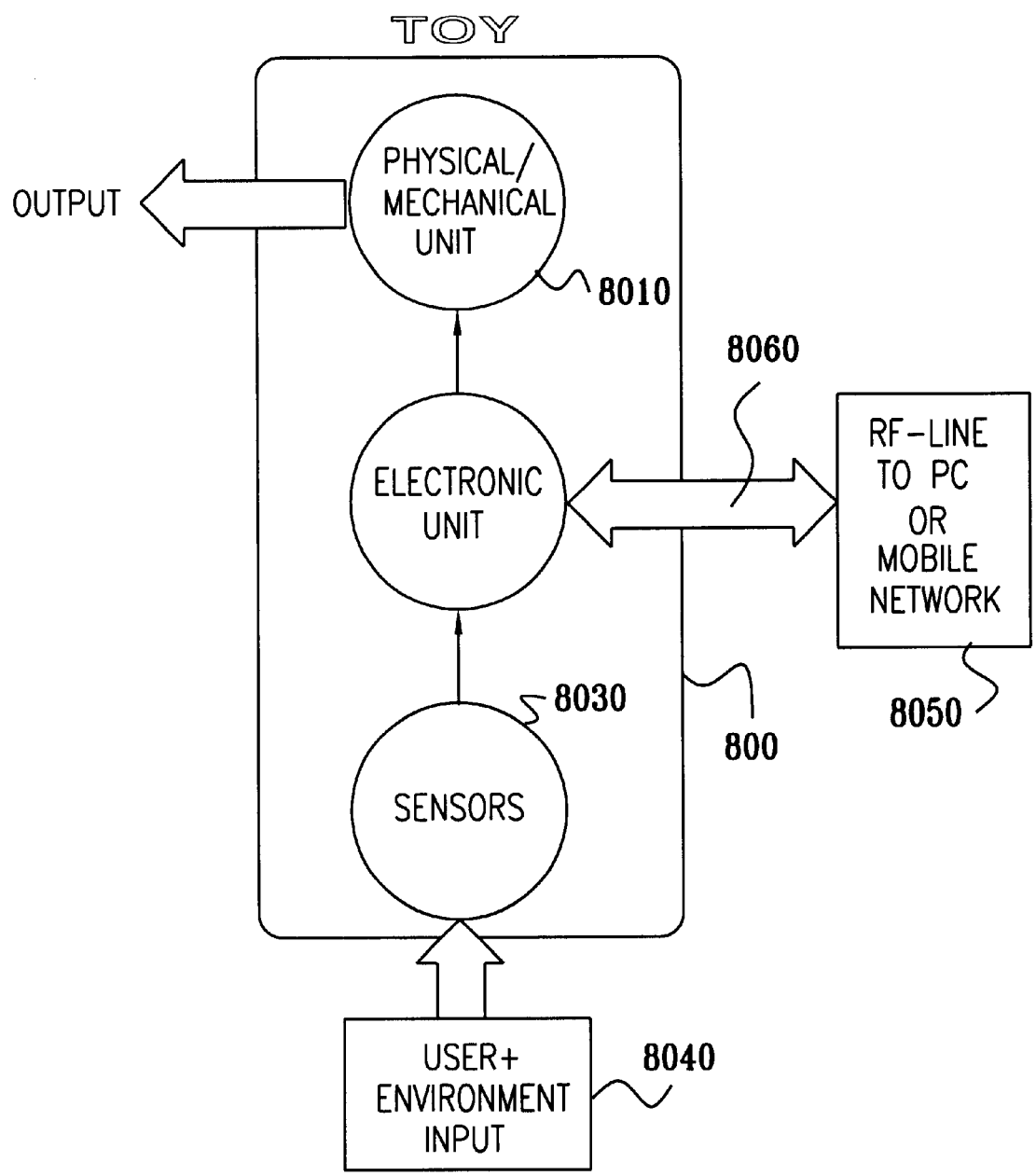
FIG. 65 shows diagrammatically, some of the sensors and hardware in a networked interactive toy, constructed and operative in accordance with a preferred embodiment of the present invention.
Figure 66:
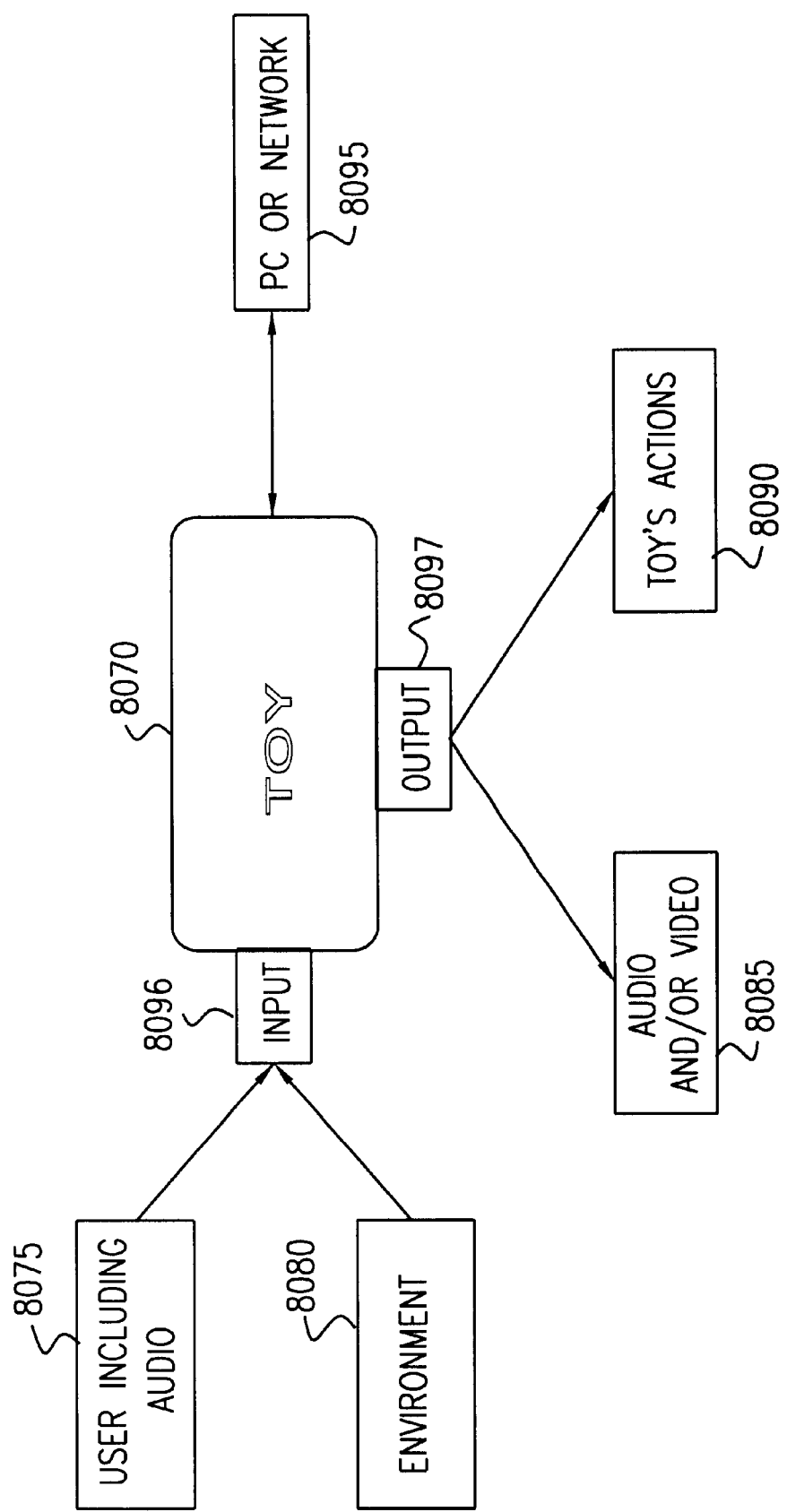
FIG. 66 shows diagrammatically, some of the sensors and hardware in a networked interactive toy, constructed and operative in accordance with a preferred embodiment of the present invention.
Figure 67:
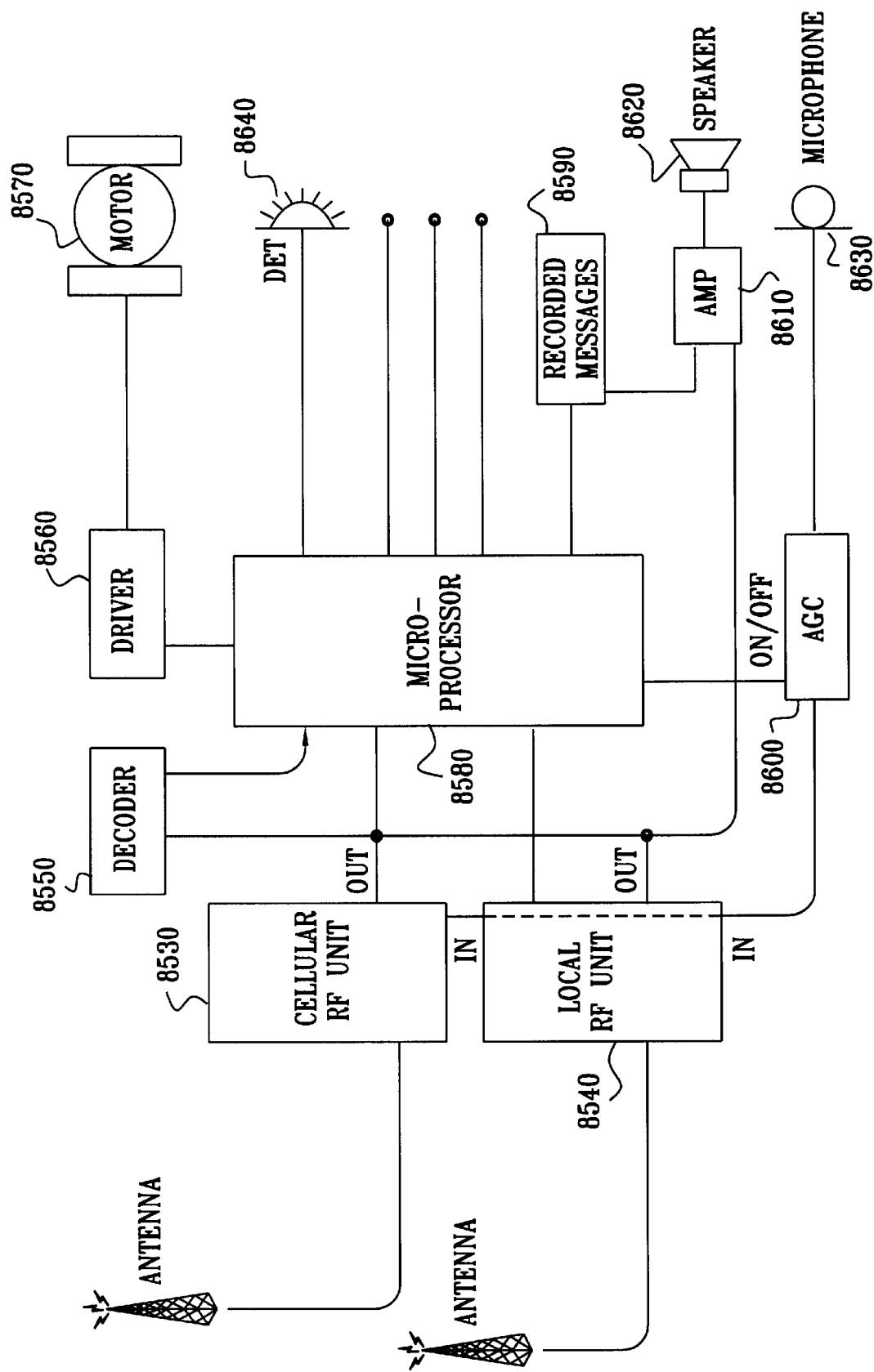
FIG. 67 shows diagrammatically, some of the sensors and hardware in a networked interactive toy, constructed and operative in accordance with a preferred embodiment of the present invention.

Each toy may or may not contain one or more sensors which may include sensors of sound (preferably one or more microphones), vibrations, touch, heat, light, motion, vision or any other sensor or combination of sensors. It is preferred that each toy contains an audio speaker or a system of such speakers. All these components are included in the toy in order to allow the toy to act as closely as possible as a human, an animal, any other living being or any imagined living being (such as an alien, a cartoon character or a science fiction character). FIG. 65, FIG. 66 and FIG. 67 show, diagrammatically, some of these sensors and the hardware involved.

It is preferred that each toy have a unique electronic identification code so that it may be uniquely identified by the computer system which runs our entertainment system.

Interactive toys on the system may have a variety of capabilities, ranging from simply receiving and playing sounds, to providing full portable functionality. This allows toys to be bought in a wide variety of price ranges. A "top of the line" version of the toy might also have one or more video or other cameras which would provide vision capabilities for the toy.

The invention shown and described herein is not limited in its applicability to toys as conventionally defined but rather is also applicable to any object into which interactive technology such as "Living Object™" technology may be incorporated. This may include home appliances or any inanimate object. Such objects may either be used alone, or they may be used in conjunction with more conventional toys to enhance the entertainment quality of the toy. For example, an adult who enjoys talking to himself, may want to put this technology into a mirror, and then carry on conversations with "himself", using either prepared scripts or some currently existing or future "Artificial Intelligence" technology. This is designed to simulate human response to a user's statements and to make the user think that he is speaking with another human.

The term "Living Object™ technology" is intended to include the subject matter of U.S. Pat. Nos. 5,752,880, and 6,022,273 to Gabai et al and the subject matter of the following published PCT Patent Applications filed by applicant, entitled Interactive Doll, WO 97/18871; Apparatus Methods for Controlling Household Appliances WO 98/43456; Programmable Assembly Toy WO 98/52667; Controllable Toy Operative with Audio Player, WO 98/53567; Techniques and Apparatus for Entertainment Sites, Amusement Parks and Other Information and/or Entertainment Dispensing Sites, WO 99/08762; Interactive Talking Toy, WO 99/10065; and Interactive Toy WO 99/54015.

The entertainment value of such toys is enhanced when a user owns more than one toy. This may not be difficult for commercial enterprises, but many individuals may not be able to afford to buy a large number of toys. Such a system provides several solutions to this problem.

One first solution relies on the concept of modular toys. A user may purchase many outer shells containing some of the mechanical and electronic devices needed to perform its various tasks, but as much as possible of the mechanical and electrical machinery as well as the core communication and processing unit is transferable from toy to toy. The system described by a preferred embodiment of the present invention also provides for the possibility of manufacturing relatively inexpensive toys with limited capabilities. A small toy with only a wireless receiving unit and a speaker would be able to entertain its user in conjunction with a more sophisticated "owner-toy" and the host computer. Intermediate complexities of toys are also envisioned. Alternately some form of portable object such as a necklace or belt could contain limited capabilities such as wireless communication, speech and hearing and it could be placed on conventional toys, which already exist in the home and transferred from one to the other. This would allow users to "bring to life" the various objects such as stuffed animals, which they already have in their home. In all the above cases the host computer, or possibly one of the other toys in the system, would be responsible for coordinating the identities of the various toys.

It is preferred that each site contain one or more toys with the capability to receive input from the user and that this input is used to recognize one or many characteristics of the user. This information is then passed on to a computer, which may or may not pass some or all of this information to a main server for further processing, storage or for contribution to a database of profiles of people's behavior, both commercial and otherwise.

Such information may or may not be used for other purposes, including but not limited to enhancing the security of the system using the context based filtering method described later in this document. "Pattern matching" technology including, but not limited to, technology which uses neural networks for predicting market trends and other business needs may or may not be used to monitor trends in the toy's user's behavior.

Such system technology may or may not receive as input direct active interactions of a user and his toy(s) (such as in the case of speech, touch or information about the changes in physical location of the toy). Such system technology may or may not receive as input passive actions of users. For example, in the case of listening or possibly seeing what is happening in the user's room and correlating it with other input such as, for example, temperature, time of day, lighting and many other possible inputs).

This information, either in its raw form, or once processed by a pattern matching engine, may be added to a server's database. This database application is discussed further in a later section of this document. Furthermore one or more toys, a site's computer (or computers), or one or more servers may provide a mechanism by which a toy can learn from its own previous experiences, or from those of other toys and/or users. This may or may not be accomplished using currently available Artificial Intelligence technology, and the aforementioned pattern matching ability, or other techniques, which may be developed in the future.

Artificial Intelligence technology with the aid of voice recognition and "text to speech" technology may or may not be used to allow entertaining non-scripted speech interaction between one or more users, and one or more toys which may either be in a single location or distributed throughout the network. This level of voice recognition and interactivity will require the latest technology in echo cancellation so that the toy can understand the user while the toy itself is speaking.

It is envisioned that some or all of the toys on a network may or may not have the capability to communicate with a wireless network such as, but not limited to, one or more existing cellular networks or satellite networks. A cellular phone or hardware-containing cellular phone technology connects a user to any server or Internet Service Provider on the cellular phone network. Any one of these servers or a user's home computer, when connected to a network may or may not be the server for the toy's functions. This is shown pictorially in FIG. 64.

When the toy is within range of one of a system's sites, it may or may not switch from using this global wireless network to using a local computer at the site. A toy with this capability would also be capable of using all the features of Mobile Commerce and such a system's server, or any other server, could provide remote computer services to the user. A remote toy could also help direct a user to a specific retail or service location, such as the nearest Fast Food Restaurant, or the like, or the nearest movie theatre, showing a particular movie.

Such a system encourages users to bring their toys to specific locations, in order to obtain discounts. Such an interactive toy system receives a fee or commission for bringing each and every user to each and every retail or service establishment.

A further advantage of mobile capability is the ability to track the location of users remotely. This proves useful when one or more toys or their users are lost. Furthermore, in cases where relatives and/or friends, are concerned about the location of a user, or in any other circumstances. This feature proves very useful.

In a case where a user is lost, his toy can help him communicate with his relatives and/or friends, and/or the Authorities. This avoids panic and allows such a user to be found more easily.

Many of the toys described above need a significant amount of electrical (or other forms) of power for their operation. In many cases the batteries (or other mobile power supply) which are used in toys last for a very limited amount of time. It is preferred; those one or more toys in such a system contain a "power management" scheme, whose purpose is to minimize the power used by toys. This power management scheme may or may not cause toys to turn off automatically when they have not been used for a certain period of time.

Alternatively, toys run in a mode requiring reduced power consumption, under certain predetermined (or possibly programmable) circumstances. In some cases, toys may be plugged into a charger some time, just as a cordless phone is plugged into a charger when not in use. A toy, while plugged into a charger, may or may not function fully including, possibly, the ability to detect motion and sound and respond to a person entering a room, or any other toy capabilities.

The toy may or may not contain a "wake up on signal" system which turns on a local computer when that toy receives a signal (much as current "wake up on ring" systems for modems operate). This allows user's families to turn their home computers off, yet still allows users to play with their toys.

Some of the multitude of ways the interactive toy system described above can be used to entertain a user or a large collection of users, who are either located at a single site or at many sites, either simultaneously or at different times are described herein.

In their most basic form, one or more toys entertain users by interacting with them through one or more toy communication mechanisms or structures. These include microphones, one or more audio speakers, motors or other devices causing motion of the toy, as well as any other mechanisms, and especially by voice input.

Interactive toys respond to user inputs. They respond to input in a way determined by the hardware and software on each specific toy, as well as by software on one or more host computers. Their response includes, but is not limited to sound (including voice), motion and light.

Responses may or may not be generated either by predetermined scripts, or by entertainment content, provided via one or more networks. Some form of computer program, such as currently available "Artificial Intelligence" programs may also provide them. These parse user input for content, and use this to determine output, or by some local or global game with predetermined, or adaptable rules which is played by one or more users on the network. In one very simple application of this, two users who are possibly located at a great distance from each other could simply use the toy as an intermediary to carry out a conversation.

It is preferred that interactive toys be part of a global entertainment network. The best way to understand such a system is to draw an analogy with traditional entertainment, such as television. In the case of television, there are many content providers, which provide content to the television station. The television station may also produce some of the content on its own. This content is then transmitted to the user's television, which provides the entertainment to the user who is watching the television.

In the case of an interactive toy system, there are many content providers of entertainment of various kinds, for use with interactive toys in such a system.

These or other entertainment providers may or may not provide their entertainment directly to a user's computer through one or more networks, or, preferably, provide their content to such a system's server, which then passes it on to user(s). In either case, an entertainment provider can design content, which affects the entire community of toys directly and can adapt content interactively, in response to the input of one or more members of this community. Furthermore software may or may not be provided to users, so users may or may not write their own content.

We envisage the entertainment provided by content providers to be very broad in its possible types. Some of the many possibilities are discussed below. The simplest possible content comprises predetermined interactive scripts written by a content provider, which may or may not make use of the specific characters of each toy, which is being animated. Thus, for example, a well known animation studio could write a script for one or many conversations (including physical actions) which would be appropriate to one of their popular toys, for example a toy representing a popular mouse character. The provider could enhance this script or any other kind of content discussed below. A provider could employ any one of the many Artificial Intelligence programs currently available on the market or any future applications. These are designed to provide a computer with the ability to have conversations (or any other form of interaction) with a human being in such a way that the computer responds as much as possible as a human.

One or more users are then able to hold a conversation (or other interaction) with one or more toys without using a predetermined script. This is extended to any other program, which is written and defines toy response as a function of user (s) inputs that of other toys in one or more system.

In addition, content providers provide clips of movies or plays, either by purely audio means, or by combining audio and other possible movements of toy(s). This form of entertainment is greatly enhanced when one or more users have many interactive toys, even when some are limited in their abilities, or if some are modular in nature, as discussed in the previous section. In such a case, one or more content providers may have the various toys act out one or more scenes of a movie or a play. As technology of interactive toys is improved, they may be able to design a play whose actors are a collection of toys.

The entertainment value improves yet further, if some of the toys are inanimate objects, such as toy cars or furniture, are controlled by one or more content providers, thus providing props for the play. Allowing many users on a network to see such entertainment simultaneously may further enhance this multi-user, multi-toy entertainment approach.

As a further possibility, there may or may not be made available for purchase an entire suite of characters form a particular movie, play of television show which could then collectively act out, possibly interactive, scenes prepared by the producers of the particular show (or by any other person(s)).

A related application of this is to turn a collection of dolls into a full entertainment center. Further enhancement occurs when users' response to such a play would affect further development of the play. There currently exist books and movies on CD-ROM, which use this technique. In such a case, this is done online while one or more content providers send content, and the response of one or many users affect the progress of the play for all other viewers. Thus, in the simplest possible example, if a majority of people "boo" at a particular scene, the scene could be changed for everyone, thus giving one user a feeling for what is happening globally.

A further possibility is that of character animation which can take several forms. In one form one or more users purchase a particular character whose content provider programs or scripts animate features and personalities.

The aforementioned modular technology is useful but not essential for this purpose in that reduces cost to consumers. Specific characters may or may not be designed by special request, although this is quite expensive. The animated character may or may not be a character (either human, animal, alien or other). This may or may not be from a movie, television show, play or other famous, real or fictitious entertainment figure. It may also be any other publicly known personality, possibly a sports figure, a religious leader, or a historical figure.

In case of a special order interactive toy, this may or may not include a figure of oneself, or a family member, or friend, or, in fact any character human, or otherwise of one's imagination. Content is then provided to animate these characters in either a passive or, preferably, in an interactive way to simulate the characters, which they represent.

It is also possible to produce an animation of an entertainer, or politician, or other historical figure of the past, performing his famous act. Thus, for example, a doll of Elvis performs his songs "live". It is clear that this technology is not limited a particular character receiving content related only to its specific character. Thus for example, it is entirely possible that a user may want to use his well known mouse character to act as if he was a football star.

Another form of character animation utilizes the imagination of the user to enhance the entertainment value. A preferred method for achieving this would be to provide some mechanism for some or all of the active components of a toy to be put on an existing toy which were not designed with the Living Toy technology. Thus, for example, a necklace is designed containing a radio transmitter and receiver as well as a microphone and speaker. This is attached to any one of the user's existing toys. When many such necklaces are used, a user animates a large number of his toys. This kind of entertainment is enhanced by the Artificial Intelligence technology discussed above, since a user is able to hold conversations with his/her toys which may, for example, be having a (fictitious) dinner party. Interactions with other toys on one or more networks would make this even more exciting and entertaining.

Such an interactive toy system may or may not be used to simulate live performances such as, but not limited to, sports games. Thus, for example, a sports club or a bar purchases a set of figures representing two or more sports teams (note: too expensive for most individual users to purchase). These figures each contain the Living Toys technology.

During a live sports event, various cameras may be used to generate images. These are analyzed to determine the motion of the various parts of each player on the field, as well as the motion of the ball or any other objects used in a game. This information is passed on to one or more user computers using a network, and then passed on to various toys representing the sports players.

A suitable arrangement would then allow the toy players, balls and any other objects in the game, to move around on an artificially designed field. A feedback mechanism allowing the reactions of the crowds at home to affect the play of the players (probably though cheers and other crowd comments) could be incorporated.

Interconnectivity of all toys on one or more network provides unique opportunity for multi-player interactive gaming. The multi-player nature of these games may or may not range from being very localized (i.e. just among friends) or it can be global in nature, thus joining users from different cultures and countries in a global game.

Language barriers may be overcome, either by translation of some simple or standardized content, or by using computerized translators (combined with voice recognition and text to speech technologies). Another alternative is by using the movements of the toys to use some existing or new form of communication via "sign language" which is any form of communication using the motion of (in this case) toys as the medium.

It is the role of entertainment providers to design games for use by such a system. The nature of such games can range from very simple to very complex. The simplest form of these games may or may not be adaptations of existing computer games (possibly but not limited to strategy games) to the world of interactive toys. More interesting games make use of the interactive nature of interactive toys, and global network(s) to which they are connected.

Thus, for example, a user sends his toy on a trip to one or more far away lands, in search of one or more users with certain characteristics. Alternately a toy, in response to certain criteria set up by the producers of the game, may decide to do this on its own. It will then return from this virtual trip with some or all of the characteristics and/or experiences of some or all of these toys. Such a game may be designed so that this trip is presented to user(s) as a "party" or other social or business gathering to which the toy has gone. The results of this party or meeting can then be presented to user (s) (possibly by animating the meeting with more than one toy) and the results (including users' interaction) are then used to decide on new and exciting adventures. Such a game may or may not be an educational experience, as a toy is visiting interesting lands and cultures and finding out the actual properties of people in that area. Education applications of this technology are discussed further below.

One or more interactive toy systems provide a unique gaming opportunity for adults. There is a whole class of games, which can be designed, with the goal of changing the course of user life. A game could may or may not lead a user to get another job, meet a new mate, make new business contacts, move to a new place in the world, meet a group of people with different lifestyles or to make many other such changes in an adult's life.

Interactive toy systems hold several advantages in administering such a game. First of all, the Interactive Toy System is aware of many of the characteristics and habits of its users. Such information is obtained both by asking users for information, and by passively observing users' habits. These habits are analyzed using either a pattern matching program, such as is available for analyzing business trends, or by any other means. Secondly, information is collected by the Interactive Toy System using the special relationship created between an animated characters chosen by users, and those users. These relationships are also utilized to help convince users to follow the instructions of their toys.

It is preferred that such games are closely tied to the commercial applications of this system. Thus, for example, an Interactive Toy System, knowing that a male and a female user are basically compatible and that they both like a particular play, may offer them tickets to this play and give them seats together. The system may also, for example, provide them with a discount coupon for a restaurant which might only be valid if both halves of the coupon (the half given to the male and the half given to the female) are used together (or if both toys are present). This increases the possibility that such a pair would meet. The Interactive Toy System analyzes the results of the meeting by communicating with the users, and uses this information to design further adventures for that pair. Various content providers may design different games with this or other themes.

Interactive toys may also be used as one or more diaries, organizers and reminders. Much of this functionality parallels the standard electronic diaries, organizers and reminders, and uses toy speech capability, possibly with text to speech technology, to pass the reminders to the user. Entry of items in the diary, organizer or reminder can be done either via the user's computer or via the toy itself, using speech recognition, for all or part of this process. This system has several advantages over traditional electronic organizers and reminders especially when applied to users.

First of all, a user is much more likely to listen to a reminder by his toy which represents a well known mouse character, for example, than a reminder by even an animated character on a computer screen.

Imagine, for example, a parent who leaves for work in the morning before the user, and, for example, the user's older sibling takes him/her to school. Before the parent goes to sleep, he/she may remind the toy to remind the child that he has certain subjects in school, or to go home with a particular parent, or to have some particular food for breakfast. The child enjoys this communication with the toy and he will thus be more likely to cooperate. The toy may also ask the child whether he did what he was told, and provide positive or negative reinforcement depending on the situation.

A sophisticated version of an interactive toy includes a video camera. This may or may not be able to check whether the child did what he was supposed to do. The toy may or may not reward the child for compliance by providing coupons or other commercial benefits. The diary, organizer or reminder can also be used for advertising purposes by adding reminders and notices as dictated by the advertisers. Thus, for example. The user could be reminded about the release date of a new movie or about the expiration of a major sale of airline tickets.

One of the most valuable services provided by the traditional entertainment media is Education. Television, radio, theatre and cinema provide a significant amount of educational content. Interactive toys provide a unique opportunity for a variety of types of education especially for (but not limited to) children who are favorably influenced by their special relationship with certain toys with special personalities.

The simplest form of educational content is the teaching of academic subjects in an interesting and personalized way. Thus, for example, a user, or his/her parents, or anyone else, may purchase an educational package on Mathematics, Science, History or even Religion, all at various levels, and for various ages.

A user learns much more willingly from his own toy which, for example, may represent a popular mouse character, than from a computer screen, especially if this learning is spontaneous and unstructured.

For example, a toy can offer a user a prize, in exchange for the correct answer to some math questions. It is preferable for the prize to be commercial in nature. It may or may not be a coupon (or points) to buy more content for a toy. It may or may not be a coupon to go to a store or other outlet, and buy some product or service. This advertises one or more products/services, and may or may not encourage a user's family/fiends to accompany him to that store/outlet.

A further advantage of an Interactive Toy System is that the leading world experts on any given subject can provide the content for any of these courses. These courses may or may not be very flexible and unstructured in nature. A course in Geography may include a virtual visit to the land or city in question to meet some of the toys or toy users who "live" there and learn from them about life in that particular place.

A particularly important educational application of interactive toys is in language education. Here too, language courses prepared by leading world experts can be applied to users' toys, and may teach these courses in an animated, personalized and interactive way.

One further advantage of an Interactive Toy System is that it allows language to be taught to infants and babies in a very subtle way. Thus, for example, even before a parent purchases a language module, a toy could teach a child an interesting word in a foreign language. That toy then persuades the child to show his parents that he knows this word. When the parent sees what the child has learnt, he/she is encouraged to purchase a language module. The interactive toy encourages the parent to tell friends about this wonderful toy. This, in turn, will increase not only sales of the toy and related entertainment content, but also all advertising revenue resulting from the toy, as will be described in detail in the next section.

Another educational role of toys in general and toys in particular is in role-modeling good behavior. Thus particular content is provided which teaches proper behavior under various circumstances, or which explains to a user interactively, why stealing, hitting, cheating or other behavior is wrong. This content may or may not be individualized for different cultures. Thus, for example, one toy teaches environmental awareness, whereas another role models or teaches some cultural or religious behavior.

Using more than one toy to role-model behavior enhances educational experience. Thus, for example, two or more toys act out a situation at school, which leads to a fight, and they then suggest some techniques of how to avoid such fights.

Another possibility is the use of Artificial Intelligence technology to create a conversation between one or more users and one or more toys regarding any of the above examples, or any other moral issues.

Another educational application of interactive toys, which is related to the toy as a role model, is called "Corrective Toy". When a particular user shows certain consistent inappropriate behavior, he or his guardian may purchase, or otherwise acquire, a content module, which is designed to "correct" user behavior. Interactive toys thus act, in a limited manner, as counselors, consultants or psychologists who use any available techniques such as, but not limited to, behavior modification techniques to help users to correct their inappropriate behavior.

It is conceivable that, if necessary, interactive toys' speech and actions are controlled by human psychologists or others, who see and/or hear user reactions (from the comfort of their own offices), and who then tell toys such as these, what actions to take next. This is very useful and potent in many kinds of counseling.

All entertainment media provide enormous opportunity for commercial utilization. One or more interactive toy systems, besides providing all the traditional methods of commercial utilization of entertainment, provide significant additional opportunity for commerce. These new opportunities are strongly enhanced by the interactive characteristics of the toys. This new system of commerce, which we call "T-Commerce", is further described below.

T-Commerce provides all the commercial opportunities of the traditional entertainment media. The most basic or these applications is charging for content. It costs money to go and see a play or a movie and PAY-TV is increasing in popularity. Subscription to Cable TV is, in fact, simply a charge for a package of content. T-Commerce utilizes this method, as well by charging for content by purchases at physical stores, at web stores, directly through entertainment providers, or by a prepaid subscription.

Another important way in which entertainment media produce revenue is by advertising. Use of interactive toys as advertisers, as is discussed further below.

Yet another method of generating revenue is by sponsorships. Thus, certain advertisers sponsor certain shows especially major sporting events. In interactive toy systems, opportunity is given to advertisers to sponsor certain entertainment or educational programs, which are provided to the users.

A full range of e-commerce applications is made possible employing interactive toy systems, due to network interconnectivity of the community of toys. In its simplest form, one or more web sites and users' clubs are provided on the Internet. These are designed to inform and entertain users, and also offer many products and services for sale (including entertainment and other content).

Interactive toy system users may or may not be children and/or parents. Parents may allow their children to spend money at the site. Parents maintain control over the total amount by prepaying for content, and allowing the children to use the credits as they see fit. Children or other users may also earn credits by listening to or responding to advertising, or by doing well in certain games, educational or otherwise. Access may also be provided to other web sites and advertising may appear on the system's web site so that the web site has the potential of providing a full-service e-commerce center.

The e-commerce shopping experience is enhanced if shopping is done via one or more toys, rather than users sitting at their computers. Thus, for example, a user may ask his toy(s) what books are available for his age on dinosaurs. The toy may respond by saying that there are too many to list. It may offer to print the long list or ask the user to be more specific. After a brief discussion the toy might suggest a few books to the user and ask if he wants to purchase it and give him some options of suppliers. Of course the parents would have to be involved if the purchaser is a young child.

The T-commerce equivalent of "one click shopping" is that a user asks his toy to see if the website known by the trademark "Amazon" has a particular book, and then authorize him to buy it. It is possible but not essential to secure the purchase using a voiceprint.

It was mentioned previously that some of the toys have mobile technology, which connects to a mobile network. Thus all the applications of "Mobile-Commerce" will apply to this system. A mobile toy is able to order theatre tickets, pay for parking, order restaurants and do anything which an Internet enabled cellular phone can do either using the voice technology described in the previous paragraph or by providing a toy with a small LCD or other monitor. This may be integrated into toys in an entertaining way, either openly or hidden behind some part of the toy. Thus all M-Commerce applications become T-Commerce applications.

Networked interactive toys provide a unique opportunity for commercial utilization of this entertainment medium. A child, teenager or adult's interactive toy is absolutely unique in its role and in its abilities as an advertiser. Such a toy may be characterized as an "interactive and responsive advertiser".

In the simplest case, a toy advertises by simply presenting a user with a predetermined advertisement, which the toy animates for user entertainment. Though this is similar to advertising on television and other media, it has the unique feature that the user has developed a relationship with his toy(s) and he is thus much more likely to be influenced by advertising.

It is true that even in television users develop a relationship with television characters. It is clear that most users are much more likely to listen to their cute cuddly bear, which tells them to buy a product, than to an image of that bear on a television screen.

A major advantage of toys as advertisers is provided by the unique database, which interactive toy servers have accumulated. First of all, the interactive toy system knows the basis characteristics of users, such as age, gender, nationality, location, and interests, simply by a registration procedure, which may be required for receiving support. Secondly, an advanced version of this system is constructed, in which one or more toys study user behaviors, and develop a profile of each and every user. Toys thus becomes extremely well informed salesmen who know all about the habits and behaviors of users, and can thus advertise the products, which users are most likely to buy.

Toys may or may not ask a user whether he bought a product, or, preferably, use one of the tracking techniques, described below, to track user purchases. Furthermore, since toys are networked, a toy may track it user's reaction to a specific purchase as time progresses, and use this information to plan further advertising strategy for sales in the user's area, or in other parts of the world. Powerful sales and profiling systems develop in which buying habits and product satisfaction can carefully be tracked as a function of many parameters. Thus, such systems may decide that a certain ethnic group with a certain income level with users in a given age group buys a particular product at a certain rate.

One real advantage of an interactive toy server system in this is that the information in the profile is much more specific and personal than profiles developed by other means. Standard pattern matching technology used for analyzing business trends can be used to analyze these profiles.

An interactive toy is thus an interactive and responsive advertiser. It reacts to known features of the user as derived from its database and advertises accordingly. It reacts to the answers to the questions, which it asks the user and it reacts to trends and behaviors, which it notices from the user using the aforementioned pattern matching technology.

In many senses the toy can be viewed as a "super salesman". Besides knowing everything about its user, a toy also knows everything about all the other users on the system. Thus, in a virtual sense, the various toys can have a "sales meeting" in which they combine all their knowledge about sales and create new strategies and techniques for selling to certain kinds of people and groups of people.

By learning each other's experiences, toys can also create fads and trends, and thus direct the users' shopping in a more significant way.

A toy may or may not also be used as a negotiator, and it can thus serve a useful educational function by teaching users the skills of negotiation. Negotiation could be as simple as requesting that the seller sell at a lower price due to limitations of a particular user's budget, or it could take a more proactive role modeled after current sites offering reverse auctions on the Internet. The idea is that a user asks his toy to find a certain product at a certain price, and the toy (virtually) scans a network, and finds out whether any sellers are willing to sell for that price. Similarly the Interactive Toy System also helps users buy and sell used items.

Commerce with toys is unique in this respect. Suppose a user is looking for a particular type of used doll sold under the trademark Barbie, then some or all of the toys in the system can ask their users whether they have such a doll which they would like to sell. After the sale is completed a server would charge the buyer and/or the seller a fee for negotiating the deal. This can be extended to online auctions or any other kind of online sales strategy.

Toys' advertising takes many forms. It may either advertise a product directly as mentioned previously, or, in addition, it may direct advertising to its own needs. Thus, for example, if a toy's batteries are running out, it could suggest to its user that the batteries be replaced by a specific brand. A toy could advertise products appropriate to its personality. For example, a doll such as the doll sold under the trademark Barbie could advertise cosmetics.

Toys may advertise other toys (either Living Objects or ordinary toys) and insist that they need these other toys to make them happy. A toy may suggest that its user should go and see some new movie, and possibly provide a discount coupon for the movie. Similarly, a toy may advertise any product or service in a user specific manner.

Alternately, a toy may attract its user or his/her parents to go to the system's web site or to the advertiser's web site. If a toy attracts its user to an advertiser's web site, the Interactive Toy System charges a fee to that web site in exchange for attracting the customer to that site.

Most importantly, a toy may encourage a child and his family to go to a particular store to purchase a particular item. The toy may offer a user a coupon or it might insist that the specific user (a certain child) take the toy to the store in order to receive a discount. This latter method would empower that child in his family since the family needs to take that child to the store in order to get the discount. The presence of that specific child may be verified using a voiceprint. The presence of that toy at the store has significant commercial value, since the toy, when connected to the store's system (assuming they have the Living Objects software installed) informs the server that a purchase was made. This is a consequence of following advice of the toy, and thus allows an Interactive Toy System to charge a fee. A mechanism is provided for tracking the future purchases of that user's family at that store, which arise as a direct result of the toy's initial advertising.

An additional advantage of having a user's toy at the store physically is that other customers in the store will see the toy and will see it getting a discount, and they will be encouraged to purchase a toy themselves. This leads to an increase in the number of users, and thus the value of an Interactive Toy System. Furthermore, many stores may have Living Object toys as well as "point of sale" items. These stores essentially act as salesmen for Living Object toys. A user who brings his/her toy to a store may be provided with content, which allows interaction of such a user's toy with the point of sale toys thus providing an enhanced shopping experience.

The use of interactive toys for playing games also provides many commercial opportunities. Games may have embedded advertising. Users may be sent to certain movies, restaurants or other establishments as part of a game. In the case of strategy games, users may be given some prize for doing well in the game. It is even conceivable that if the game were large enough, the prize may be very large. Thus, for example, every user pays a few dollars to play a long and interesting game, and one or more winners may win millions of dollars.

A network of toys, as described in this document, provides an opportunity for the creation of a unique database of consumer information. As the use of toys in such a network increases, this database will increase in size and complexity, and eventually construction of detailed profiles of consumers will be possible. This database and consumer profiles contained therein are of significant commercial value.

The collection of information about a user begins when he registers his toy on an interactive toy system's server. Users are encouraged to register, and are offered free support services an online shop and club, as well as other online services in exchange for registering their toys. During registration, certain basic information about each user is requested (some of which may be required for registration) including but not limited to gender, age, cultural background, school grade (for a child), level of education and occupation (for an adult), hobbies and interests. This information is stored in an online database.

Information in such a database may be updated whenever a user interacts in any way with his toy, or whenever a user performs any action at the system's online server's web site. It is preferred that not all such information be stored in a database, but rather that such a database is selective about which information is relevant and is stored.

It is preferred that such a database stores information about all commercial activities, which one or more users performs via one or more toys or via the system's web site. This includes all requests for commercial information and all purchases (and returns of goods) that can be tracked by toys. Various methods of tracking the commercial activity of users have been discussed previously in this document. These include but are not limited to direct purchase requests through toys, purchases with coupons provided by toys, and purchases in which a certain toy was physically brought to a store (possibly in exchange for that user receiving a discount or other benefit).

The power of such a database described in this section is further enhanced by the ability of one or more toys to directly gauge their user's or users' response to advertising.

Such a database is initially used to choose suitable advertising for any given user. Since it is preferred that all advertising include some form of encouragement (such as a discount) for use of a toy in a purchase, it is possible to track whether a specific advertisement or form of advertisement was effective in selling a particular item to a particular user. This information, correlated with the personal information of the user, provides a powerful profile of consumer response to advertising.

The ability to track the effectiveness of advertising is enhanced dramatically by utilization of the unique personal relationship that will, in many cases, develop between a toy and its user. Such a user may, in many cases, be willing to "tell" his toy(s) whether he enjoyed the advertisement and whether he intends to purchase the item. It is then possible to know not only whether the item was purchased, but also whether there was an initial intention to purchase. The information about initial intention, combined with information about an actual purchase, may be combined with a question to that specific user as to why that purchase was not made. The answer may be, for example, be that the parents were unwilling to spend the sum of money required for that specific purchase.

The relationship of a user with his toy may also be used to study user satisfaction with their purchase. After a purchase is made, a user might be asked whether he enjoys the purchase. This question may be asked several times possibly days or weeks apart. Information about user satisfaction is thus gathered as time progresses. Thus, for example, it may be possible to determine the length of time a child is interested in a particular toy before becoming bored with it. This information is, as usual, correlated with the personal information about every individual user.

It is possible that the use of toy-user relationships for receipt of information be made voluntary. A user should be able to configure his computer so that the toy sends only certain information to a database and keeps other information private.

As discussed in previous sections, some toys in the system have the ability to function while they are away from their base station, and even whilst traveling. They communicate with the server via a mobile communication network. This network has the ability to track the location of the user and suggest products and services relevant to the location and other personal information about a specific user.

An Interactive Toy System has the capability of tracking user location and storing this information. It is more likely that users will be willing to release this information than would be the case for users of cellular phones, as toys use this information to suggest products and services to their users. These products and services may have significant discounts, relevant to the current location of the user. In order to reduce user resistance of use and storage of such information, there is an option available to store this information in a less personalized manner. In such a case, user identity remains anonymous but only certain properties of the user such as, for example, age, gender and interests, are correlated with the movements of a user with his toy.

Toys provide a very effective method of market research about existing and future products. If, for example, a company would like to know whether a certain product would be accepted in a certain type of market, the company can arrange for the toys to ask questions to their users to learn about whether they would like such a product. Again the user's relationship with the toy plays an important role here as well as the existing information in the database about user's interests and consumer related habits.

The possibility that the toy is active even when its user is not interacting with it was discussed in previous sections. In this case, a toy may be passively "listening" to activities in a room, and, if equipped with light sensing or video camera equipment it may also be "watching" these activities. A toy may thus "learn" about activities of its user and his family, for example, by interjecting at certain points and asking about the type of game that they are playing.

The power of an interactive toy system's database may be greatly enhanced if its information is shared with other commercial or any other database. Thus, for example, an interactive toy system can benefit from receiving information about the users of cellular phones, not all of who will have toys, and the cellular phone companies benefit from receiving information from such an interactive toy system database. Such a database contains information received using one or many of the unique possibilities described above.

The unique information retrieval ability of a network of toys that was detailed above has a further exciting application as a tool for Research and Development (R&D). It is possible to perform R&D in areas directly related to the functioning of toys in an interactive toy system. For example, research and development in, but not limited to, speech recognition, text to speech processing and shape recognition in computerized "vision". This R&D may be extremely useful for all commercial and other applications of these subjects. It is further possible to use a network of toys to do R&D in areas with other direct commercial applications such as, but not limited to, marketing, sales and advertising.

Additionally it is possible to do research into areas with indirect commercial value such as, but not limited to methods of teaching various academic subjects, mechanisms by which children and adults learn and sociological behavior.

Speech processing, both voice recognition and text to speech, are areas which have very active R&D programs and which still require much work. Although there exist many techniques on the market for using the sound of a human voice and converting it into text and for taking text and converting it into various human voices, the results are still quite poor and the techniques require much improvement.

One of the most effective methods for suggesting which techniques work best is to have as many users as possible test the system, and to analyze in as much detail as possible the results of these tests. This holds true for directing researchers to new methods of speech recognition, and text to speech processing.

Interactive toy networks provide a unique opportunity for such tests. In such a system, there will be a huge number of users with different ages, languages, education levels and personalities. They listen to their toys and respond to them. Thus, for any speech generated from text by a user's computer, and then "spoken" by his toy, response of that user is stored and may be quantified (as to whether it is one of a variety of suitable responses). Furthermore when a user speaks, his computer's attempts to understand this speech can be recorded and tested by asking him further questions, which are designed to determine whether the speech was correctly understood.

Given the huge number of users expected to use this system, it may provide a huge database of information to help in choosing the best techniques for voice processing and for suggesting new techniques.

Another area for R&D using the network of toys is in Artificial Intelligence. There are a variety of methods in existence for simulating intelligent response to a human's conversation. More precisely a human speaks to a computer (either using voice or direct text input) and a computer analyzes the content of the speech, and attempts to respond to it in a manner that simulates the response of a human to the initial statement. Thus a computer carries on a conversation with a person. Although such methods exist they also require much improvement.

An interactive toy network system provides an opportunity for aiding this research by allowing a multitude of users to carry on such conversations with their toys. When toys respond to a user, the user's reaction to that toy's statement may be analyzed to determine whether that toy spoke in a reasonably human manner. Thus, for example, a user's response of "what did you say!" would indicate a failure of the toy to communicate in such a case. This information is then used to improve the Artificial Intelligence system.

An R&D application that was discussed several times in this document is the ability to analyze advertising, marketing and sales strategy. Thus, the enormous commercial network created by T-Commerce provides a huge testing ground for R&D in all areas concerned with advertising, marketing and sales.

Since toys in such an interactive toy system are used for education, a huge opportunity for all forms of research into education exists here. This includes research into which educational techniques are more effective, as well as, research to determine how children learn and develop. The toys can also be used to give informal tests to users, either standardized or individualized, as a researcher may see fit.

Some toys in such a system may have the ability to learn from their environment. Thus, for example, a toy may begin with a very limited vocabulary of words and phrases (possibly containing no words) and may attempt to repeat words and phrases that it hears. It may gauge user response its or other toy's phrases. Thus, a toy acts in a similar way to a baby that is learning to speak. Thus, for example, a researcher may design such a learning system to suit his theory of how humans learn speech and then test this theory out on the toys to see how much the toys can learn using the given method.

The network of toys described in this document requires an excellent security system. First of all, such network contains a database of user information including highly confidential personal information and commercial information including possibly credit card and bank information. Secondly there is a constant flow of information in this system, both content information, personal user information and credit card information. All this information needs to be secured.

Possibly the most dangerous of all security risks in an interactive toy system is the potential for delivery of inappropriate content, especially to children. Inappropriate content includes primarily speech and action, which are either obscene or age inappropriate, but may also include unwanted inappropriate or unauthorized commercial content. Thus an advertiser may try to send an advertisement to a user without proper authorization or which the user has specifically requested he not received.

Fake scripts can be particularly dangerous. Imagine, for example, that due to a security violation, all toys say something horrible to all the children on the system at a particular moment. The reaction to such an event could harm the operation of such a system significantly, and causes damage to the system users.

Even if it is found out that such a system has been compromised, and it is turned off and fixed, there may still be some content that was already passed to the computers on the specific system. Thus the inappropriate content already exists in one or more users' computer, and it may be designed to cause damage at some later time. It is very difficult to fix all these systems since many of them will not be connected to the computer network and thus not all users will get the message that their system needs to be cleaned of inappropriate content. This problem is especially serious since most users are likely to be children.

The security system for such a network begins with the usual tight security of a properly secured computer system. All servers are behind "firewalls" which allow very limited and controlled access through the network. It is preferred that the database itself be stored on a device that is physically read-only so that it cannot be modified except by replacing the actual physical device.

All changes are preferably done on another computer, which later updates the full database. It is preferred that there is a mechanism for virus and intrusion detection, as well as encryption of information transfer whenever personal or other private information is being transferred on the network. The network may contain one or more private secure lines connecting the content providers to one or more servers, or connecting any other two sensitive parts of such a system to each other.

It is preferred that all the above standard security procedures be combined with what we have designated a system of "Multi-point, Adaptable, Context based Filters".

The idea is to set up a network of filters, at many points in the network, which filter content. The content that is filtered includes both text and non-text content and will include sound files (which are filtered using voice recognition or using direct filtering of certain sound bites) as well as commands for actions to be taken by the toy.

A key feature of such filters is that they are context based. In other words, one may utilize a system's unique ability of having detailed information about who the sender and the receiver are supposed to be, and about who the receiver actually is. Thus one may know that this content is intended to be between a popular mouse character and a popular fuzzy owl or between a popular toy villain and a well known robot. The supposed age of the sending and receiving users is also known. This information enhances the filters. For example one may filter out a case in which a popular furry owl sends a popular mouse character information about wars! Thus, besides simply having a security system based on user authentication, user content authentication may be based on the context of the message.

It is preferred that such a security system be adaptable. This means that it responds to its detailed knowledge of the current state of the system, and its users. Thus, for example, one can set up a system of alerts. So, for example, if there is no reason to be particularly concerned about exceptional security risks, the system might be on a low alert, which causes some default level of filtering to be used. However if the system is known to have been under attack, or if part of the system has been attacked with attempts to send inappropriate content, then the alert level can be changed. This may apply to all or in parts of this network, and both the general security and the filtering may be increased as necessary.

For example, a particular type of filter is described as follows: A filter which is placed at some point in the network receives input which includes the content itself together with information about the supposed sender and the intended recipient and the supposed type of content. It then queries the database on the server for characteristic features of sender and receiver (such as the age of the user, personality of the toy, habits and interests of the user etc.) and requests further information about the type of content expected.

The database also knows the full history of alerts and security violations on the system as well as the experience of other parts of the system with such content. Thus, for example, suppose that a given user receives inappropriate content that is caught by one of the filters on his system. The system then informs the server that then updates the filter engine and, if necessary, it may disallow content from that particular sender until the situation is cleared. The filter then checks the current level of any alerts that exists and then decides whether the content should be passed. If it passes the content then the system just continues. If it decides that the content should not be passed it rejects the content and sends the content to the server with all the information it has about the incident. The server then decides whether to set an alarm. If it decides not to set an alarm it still stores all information about the incident. If an alarm is set, the server decides based on the history of all previous alarms whether there is a pattern to be concerned about and thus decides which filters are to be modified, at what level and for how long.

The server sends off the alarm codes to the affected filters and then decides whether human intervention is needed, whether users should be informed and whether users should be urged to reset their system. In a serious case users may have to be informed by telephone or mail if their network connection is consistently down.

It is preferred that for serious cases there may be available groups of people working in geographically separated areas which can check content manually. Thus when there are serious security alarms on the system, content can be sent to these people for analysis.

It is preferred that filters be placed at many points on such a network especially between the content providers and the system's server, at points within the server's system, between the server and the user and within the user's software on his computer. One of the key points to place a filter is at the final stage between a user's computer and the transmission unit that transmits the content to his toy. This final check can be incorporated in the hardware of the transmission unit to avoid any external tampering. This provides a final check for fake content.

One traditional method for securing content is the coding of information to make sure that the information sent is the one being received (this is often called an electronic signature). This is not sufficient in this case since one can imagine a scenario in which person working for a content provider is paid by a competitor to send false information. His signature is accepted despite the improper content of the information.

This invention provides several methods to avoid this problem. First of all such a network of filters may filter out this unwanted information. Secondly it is possible to minimize the damage caused by this scenario by informing the user when he opens up the content that it comes directly from the content provider. The rest of the system is properly secured so that it is known that the user is receiving the content in its original form. Thus the content provider will be blamed for the inappropriate content rather than those responsible for the system's server.

It is also possible to have a filter that only passes certain pre-authorized content rather than rejecting inappropriate content. This is likely to be used only in special cases, in which there are exceptionally serious concerns about security. It is also possible to restrict inputs into a certain filter only to pre-approved persons.

If, for example, the content relates to a game being played then the previous results of the game can be used to help verify the content.

It is preferred that the level of filtering is configurable by a user, so that if, for example, a child user's parents want to use a cuddly stuffed animal to obtain some material appropriate to a toy warier figure, that they would be able to do so. Thus, with the parent's permission, a child could use one toy to represent another toy with a totally different personality. It is appreciated that the term "television network" may comprise any network interconnecting a plurality of displays large enough to display a pictorial scene.

Figure 68:
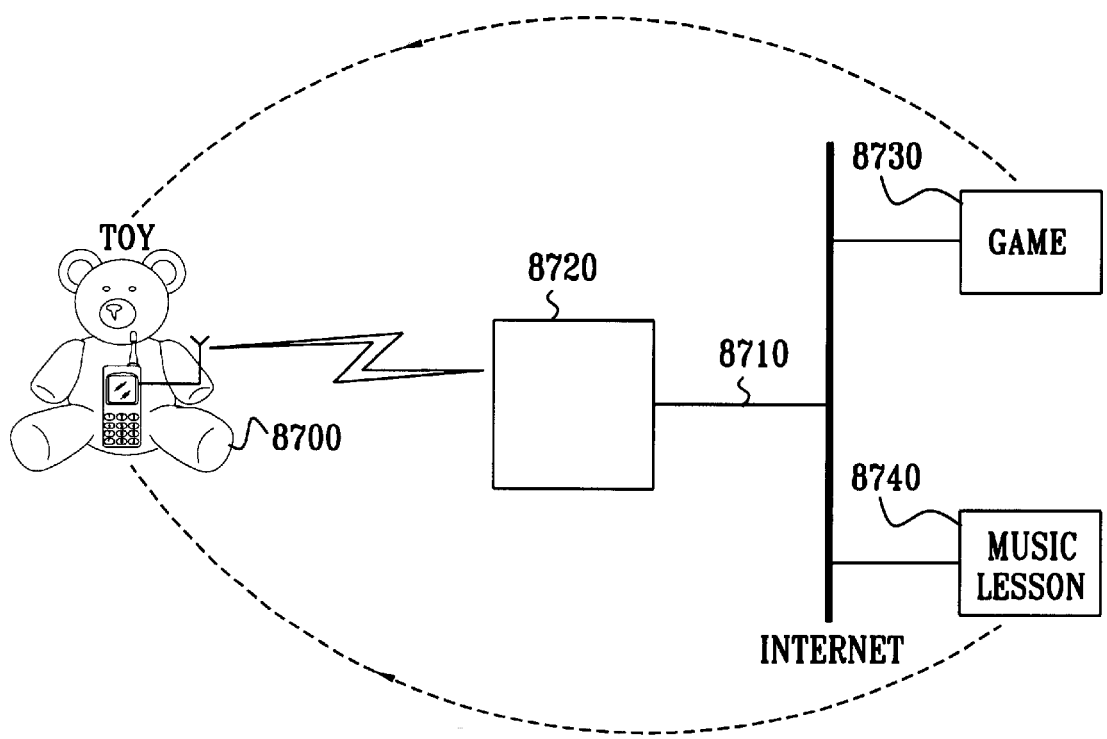
FIG. 68 shows an interactive toy connected to a network via an electronic device, constructed and operative in accordance with a preferred embodiment of the present invention.

FIG. 68 shows an interactive toy 8700 connected to a network 8710 via an electronic device 8720. Two computers 8730 and 8740 connected to the network are also shown. The computer 8730, in this example, stores a game for use by the toy 8700 and the computer 8740 stores a music lesson designed for use by the toy 8700. The computers 8730 and 8740 are operative to present their respective data to the toy via the network 8710 and the electronic device 8720.

Figure 69:
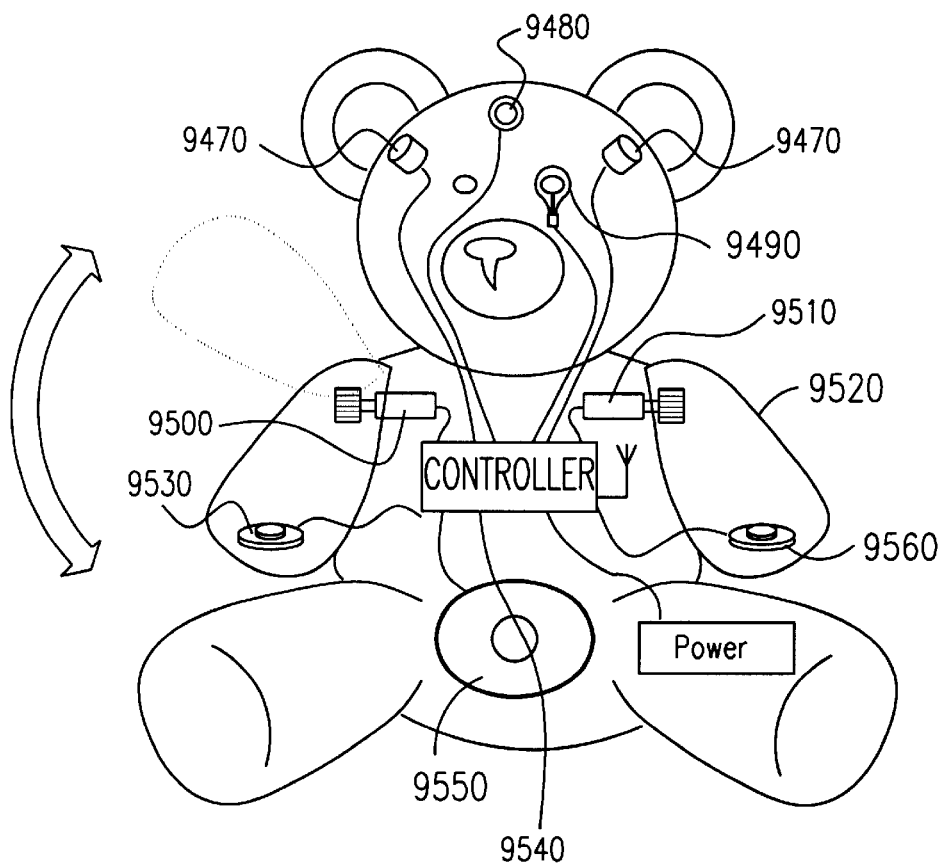
FIG. 69 shows a diagrammatic example of sensors and actuators which may be incorporated into an interactive toy, constructed and operative in accordance with a preferred embodiment of the present invention.

FIG. 69 shows a diagrammatic example of sensors and actuators which may be incorporated into an interactive toy. A controller 9540, preferably incorporating an RF transceiver, controls, in this example, two microphones 9470, a speaker 9550, a light 9490, two motors 9500 and 9510 which move the toy's arms and two sensors 9530 and 9560 which are activated when the end of the toy's arms are touched.

Figure 70:
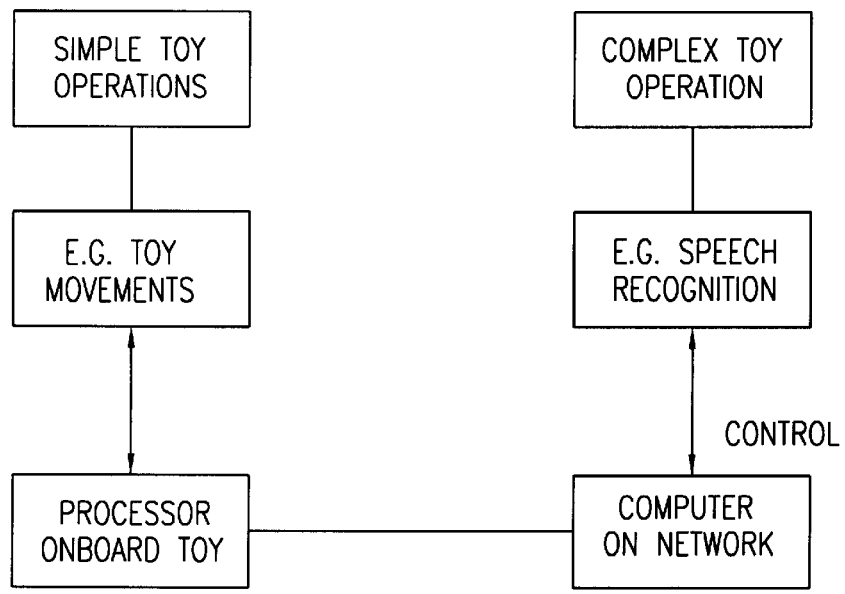
FIG. 70 shows diagrammatically control of simple and complex toy operations, in accordance with a preferred embodiment of the present invention.

FIG. 70 shows diagrammatically an embodiment of the present invention in which a processor onboard a toy controls simple operations of the toy such as the movements of the toy whereas a computer on a network which is typically more powerful, controls more complex operations of the toy such as, for example, speech recognition, text-to speech synthesis or any other operations requiring large amounts of computing power or a large amount of data storage capabilities.

The term "interactive toy" refers to a toy which receives at least one control input from a toy controlling entity and which includes an electronic device capable of generating, at least partly in response to the control input, at least one output which is discernible by the toy controlling entity. The toy controlling entity may be a human user and may alternatively be a device.

The term "networked interactive toy" means an interactive toy which is connected to the toy controlling entity via a network. The toy therefore receives at least one control input over the network and may or may not receive additional, locally generated control inputs which are not transmitted over the network.

It is appreciated that the toy system shown and described herein is not useful only for children and alternatively may be used by adult toy users such as executive toy users.

Appropriate commercially available software for speech recognition include, but are not limited to, Via Voice and Voice Dictation by IBM; Naturally Speaking by Dragon Systems, L&H Voice Xpress by Lernout & Hauspie, and Conversa by Conversa.

Techniques and applications of Speech Recognition suitable for implementation of a preferred embodiment of the present invention are described in the following references.
1. Speech and Language Processing: An Introduction to Natural Language Processing, Computational Linguistics and Speech Recognition by Dan Jurafsky, James H. Martin, Nigel Ward and Daniel Jurafsky; Published by Prentice Hall, January 2000.
2. Fundamentals of Speech Recognition by Lawrence Rabiner, Biing-Hwang Juang, Bilng-Hwang Juang; Published by Prentice Hall, April 1993.
3. The Dragon NaturallySpeaking Guide: Speech Recognition made Fast and Simple by Dan Newman &, James Baker; Published by Waveside Pub, September 1999.
4. How to Build a Speech Recognition Application by Bruce Balentine, David P. Morgan and William S. Meisel; Published by Enterprise Integration Group, April 1999.
5. Computer Speech: Recognition, Compression, Synthesis; by Manfred R.
Schroeder; Springer Series in Information Sciences, 35; Published by Springer Verlag, May 1999
6. Electronic Speech Recognition: Techniques, Technology & Applications; Geoff Bristow (Editor); McGraw Hill 1986;

WAP (Wireless Application Protocol) technology for providing Internet services via cellular phones in accordance with a preferred embodiment of the present invention is described in the following references:
1. Professional WAP by Charles Arehart, et al (Wrox Press Inc.—July 2000)
2. Understanding WAP: Wireless Applications, Devices, and Services (Artech House Telecommunications Library) by Marcel Van Der Heijden(Editor), et al (Artech House—July 2000)
3. Programming Applications with the Wireless Application Protocol: The Complete Developer's Guide; Steve Mann (John Wiley & Sons, March 2000).

GSM (Global System for Mobile Communication) technology suitable for the implementation of preferred embodiments of the present invention is described in the following references:
1. GSM Made Simple by George Lamb, et al (Cordero Consulting—June 1997)
2. GSM Networks : Protocols, Terminology, and Implementation (Artech House Mobile Communications Library—January 1999) by Gunnar Heine
3. The GSM System for Mobile Communications by Michel Mouly, Marie-Bernadette Pautet (Telecom—June 1992)

Technology for Interactive Television systems including set-top boxes and related technology suitable for the implementation of preferred embodiments of the present invention is described in the following references:
1. The Essential Guide to Digital Set-Top Boxes and Interactive TV by Gerard O'Driscoll (Prentice Hall, November 1999).
2. The Inside Story of Interactive TV and Microsoft WebTV for Windows by David Feinleib (Morgan Kaufmann Publishers, July 1999).

3. Building Interactive Entertainment and E-Commerce Content for Microsoft TV by Peter Krebs, et al (Microsoft Press, February 2000).

Cable television and modem technology suitable for the implementation of preferred embodiments of the present invention is described in the following references:
1. Modern Cable Television Technology : Video, Voice, and Data Communications (Morgan Kaufmann Series in Networking—December 1998) by James Farmer, et al.
2. The Theory and Practice of Modem Design by John A. C. Bingham (John Wiley & Sons, April 1988).

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub combination.

It will be appreciated by persons skilled in the art that the present invention is not limited to what has been particularly shown and described hereinabove. Rather, the scope of the present invention is defined only by the claims that follow:

1. An interactive cell phone toy device comprising:

a toy body capable of executing at least one behavior;

wireless communication apparatus providing wireless communication between the toy body and a computer having a wireless communication capability which defines a wireless communication range surrounding the computer; and mobile communication facilitating apparatus providing mobile communication of the toy body with a mobile communication network;

wherein the wireless communication apparatus and the mobile communication facilitation apparatus each define a toy-controlling data line operative to at least partly control at least one parameter of at least one behavior of said toy body; and a decision maker operative to activate said wireless communication apparatus, thereby to provide wireless communication between the toy body and the computer, when the toy body is within said wireless communication range; and operative to activate said mobile communication facilitating apparatus, thereby to provide mobile communication of the toy body with the mobile communication network, when the toy body is not within said wireless communication range; and wherein said decision maker is onboard the toy body; and wherein said decision maker is operative:

to listen for a signal from a local computer, thereby to identify a local computer which is active and able to serve the toy body;

if a local computer which is active and able to serve the toy body is identified, to activate said wireless communication apparatus, thereby to provide wireless communication between the toy body and the local computer; and to activate said mobile communication facilitating apparatus if no such local computer is identified.

\* \* \* \* \*